US012684598B2

(12) United States Patent
Kim et al.

(10) Patent No.: US 12,684,598 B2
(45) Date of Patent: Jul. 14, 2026

(54) MULTICAST/BROADCAST SERVICE IN MOBILE COMMUNICATION SYSTEM

(71) Applicant: Samsung Electronics Co., Ltd., Suwon-si (KR)

(72) Inventors: Donggun Kim, Suwon-si (KR); Soenghun Kim, Suwon-si (KR); Sangkyu Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 310 days.

(21) Appl. No.: 18/249,531

(22) PCT Filed: Oct. 19, 2021

(86) PCT No.: PCT/KR2021/014577
§ 371 (c)(1),
(2) Date: Apr. 18, 2023

(87) PCT Pub. No.: WO2022/086121
PCT Pub. Date: Apr. 28, 2022

(65) Prior Publication Data
US 2023/0389049 A1 Nov. 30, 2023

(30) Foreign Application Priority Data
Oct. 19, 2020 (KR) ........................ 10-2020-0135542

(51) Int. Cl.
*H04W 72/30* (2023.01)
*H04W 72/23* (2023.01)
*H04W 76/27* (2018.01)

(52) U.S. Cl.
CPC ........... *H04W 72/30* (2023.01); *H04W 72/23* (2023.01); *H04W 76/27* (2018.02)

(58) Field of Classification Search
CPC ..... H04W 72/30; H04W 76/27; H04W 72/23; H04W 28/16; H04W 76/10; H04W 52/02;
(Continued)

(56) References Cited

U.S. PATENT DOCUMENTS

2004/0103435 A1* 5/2004 Yi ......................... H04W 72/30
455/555
2006/0035645 A1* 2/2006 Kim ...................... H04W 36/10
455/445
(Continued)

FOREIGN PATENT DOCUMENTS

KR 10-2019-0087614 A 7/2019
KR 10-2021-0147717 A 12/2021

OTHER PUBLICATIONS

Dynamic switch between PTM and PTP for service continuity Cedex, France Aug. 7, 2020 (Year: 2020).*
(Continued)

*Primary Examiner* — Mewale A Ambaye

(57) ABSTRACT

The present disclosure relates to a 5G communication system for supporting a higher data transmission rate than a 4G communication system such as LTE. The present disclosure provides a method of a terminal supporting a multicast/broadcast service (MBS) in a wireless communication system. The method includes the steps of: receiving, from a base station, a radio resource control (RRC) message indicating to switch from a multicast service (point-to-multicast (PTM)) to a unicast service (point-to-point (PTP)); and initializing at least one window parameter on the basis of received packet data convergence protocol (PDCP) data.

13 Claims, 21 Drawing Sheets

(58) Field of Classification Search
CPC ... H04W 76/40; H04W 36/0007; H04W 4/06;
H04W 48/08
See application file for complete search history.

(56) References Cited

U.S. PATENT DOCUMENTS

| | | | | |
|---|---|---|---|---|
| 2020/0314717 | A1 | 10/2020 | Kim et al. | |
| 2021/0144516 | A1 | 5/2021 | Kim et al. | |
| 2022/0159760 | A1* | 5/2022 | Parron | H04L 43/087 |
| 2023/0388871 | A1* | 11/2023 | Guo | H04W 36/0069 |
| 2023/0389049 | A1* | 11/2023 | Kim | H04W 4/06 |
| 2024/0014974 | A1* | 1/2024 | Chen | H04W 72/232 |
| 2024/0023198 | A1* | 1/2024 | Wang | H04W 4/06 |
| 2024/0040662 | A1* | 2/2024 | Fujishiro | H04W 76/20 |

OTHER PUBLICATIONS

Report of 3GPP TSG RAN2#107 meeting Prague, Czech republic. Aug. 26, 2019 (Year: 2019).*
European Search Report dated Sep. 19, 2024, in connection with European Application No. 24192974.4, 8 pages.
Supplementary European Search Report dated Apr. 3, 2024, in connection with European Patent Application No. 21883190.7, 10 pages.
Catt, "38.323 CR for NR V2X," R2-2002018, Revision of R2-2000203, 3GPP TSG RAN WG2#109-e, Electronic meeting, Feb. 24-Mar. 6, 2020, 31 pages.

ETSI MCC, "Report of 3GPP TSG RAN2#107 meeting, Prague, Czech Republic," R2-1912001, 3GPP TSG-RAN WG2 meeting #107bis, Aug. 2019, 317 pages.
International Search Report and Written Opinion of the International Searching Authority dated Jan. 19, 2022, in connection with International Application No. PCT/KR2021/014577, 9 pages.
Ericsson, "KI#4, AF specific priority for 5MBS group member," S2-2004971, SA WG2 Temporary Document, SA WG2 Meeting #S2-140E, Aug. 19-Sep. 2, 2020, 6 pages.
Intel Corporation, "Dynamic switch between PTM and PTP for service continuity," R2-2007637, 3GPP TSG-RAN WG2 Meeting #111-e, Electronic meeting, Aug. 17-28, 2020, 4 pages.
Nokia, et al., "Scope and solution approach for NR MBS," R2-2006983, 3GPP TSG-RAN WG2 Meeting #111 Electronic, Aug. 17-28, 2020, 4 pages.
Samsung, "Dynamic Change Between PTP and PTM with Service Continuity," R3-205398, 3GPP TSG-RAN WG3 Meeting #109-e, E-Meeting, Aug. 17-28, 2020, 2 pages.
Communication pursuant to Article 94(3) EPC dated Mar. 31, 2026, in connection with European Application No. 24192974.4, 9 pages.
Notice of Submission of Opinion dated Mar. 31, 2026, in connection with Korean Application No. 10-2020-0135542, 16 pages.
ETSI TS 138 323 V16.1.0 (Jul. 2020), Technical Specification, 5G, NR, Packet Data Convergence Protocol (PDCP) specification (3GPP TS 38.323 version 16.1.0 Release 16), Jul. 2020, 43 pages.
ETSI TS 138 331 V16.1.0 (Jul. 2020), Technical Specification, 5G; NR; Radio Resource Control (RRC); Protocol specification (3GPP TS 38.331 version 16.1.0 Release 16), Jul. 2020, 886 pages.
Samsung, "MBS Mobility for Connected Mode UEs," R2-2008061, 3GPP TSG RAN WG2 Meeting #111-e, e-Meeting, Aug. 17-28, 2020, 2 pages.

* cited by examiner

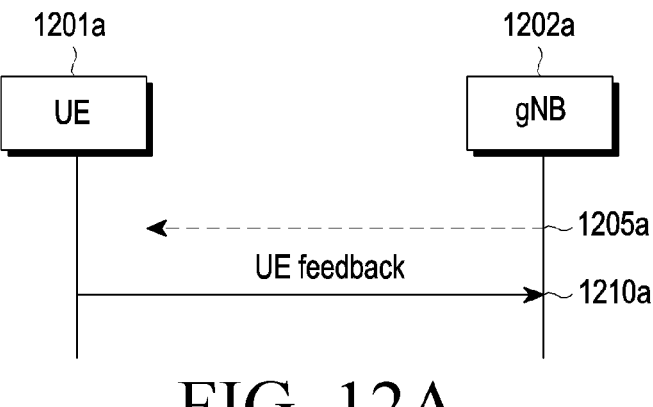
FIG. 12A
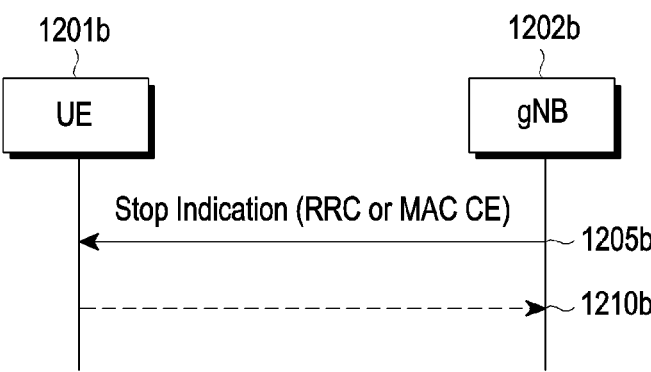
FIG. 12B
FIG. 12C

MULTICAST/BROADCAST SERVICE IN MOBILE COMMUNICATION SYSTEM

CROSS-REFERENCE TO RELATED APPLICATIONS

This application is a U.S. National Phase Entry of PCT International Application No. PCT/KR2021/014577, which was filed on Oct. 19, 2021, and claims priority to Korean Patent Application No. 10-2020-0135542, which was filed on Oct. 19, 2020 in the Korean Intellectual Property Office, the contents of which are incorporated herein by reference.

BACKGROUND

1. Field

The disclosure relates to a method for supporting a lossless MBS service in a next-generation mobile communication system.

2. Description of Related Art

To meet the demand for wireless data traffic having increased since deployment of 4th-Generation (4G) communication systems, efforts have been made to develop an improved 5th-Generation (5G) or pre-5G communication system. Therefore, the 5G or pre-5G communication system is also called a Beyond 4G Network or a Post LTE System.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques, and/or the like are discussed in 5G communication systems.

In addition, in 5G communication systems, development for system network improvement is under way based on advanced small cells, cloud Radio Access Networks (RANs), ultra-dense networks, Device to Device (D2D) communication, wireless backhaul, moving network, cooperative communication, Coordinated Multi-Points (CoMP), reception-end interference cancellation and/or the like. In the 5G system, Hybrid FSK and QAM Modulation (FQAM) and Sliding Window Superposition Coding (SWSC) as an Advanced Coding Modulation (ACM), and Filter Bank Multi Carrier (FBMC), non-orthogonal multiple access (NOMA), sparse code multiple access (SCMA), and/or the like as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications In line with this, various attempts have been made to apply 5G communication systems to IoT networks. For example, technologies such as a sensor network, Machine Type Communication (MTC), Machine to Machine (M2M) communication, and/or the like may be implemented by beamforming, MIMO, and array antennas. Application of a cloud radio access network (RAN) as the above-described Big Data processing technology may also be considered to be as an example of convergence between the 5G technology and the IoT technology.

SUMMARY

In a next-generation mobile communication system, an MBS service (a Multicast or Broadcast service, a Multimedia Broadcast and Multicast Service (MBMS), or an Multicast and Broadcast Service (MBS)) may be supported for supporting a service such as a broadcast (Broadcast/Multicast) service, a Mission critical service, or a public safety network (Public safety) service, and/or the like. The MBS service may be provided to a terminal via a Multicast bearer or a Unicast bearer. In the disclosure, the Multicast bearer may refer to a bearer providing a Multicast service or a broadcast service, and may indicate a broadcast bearer. The multicast service may indicate a service provided only to a terminal registered or authorized in the network, or the broadcast service may indicate a service provided to a unspecified number of terminals or a terminal not registered or not authorized in the network. In the disclosure, for convenience of a description, a bearer supporting the multicast service or the broadcast service may be referred to as a multicast bearer.

In order to support the MBS service, a structure or configuration method for a multicast bearer or a unicast bearer supporting the MBS service, and a data processing method of a physical layer device, a MAC layer device, an RLC layer device, or a PDCP layer device which receives MBS data and processes the MBS data are required.

In addition, a signaling procedure or an operation of a terminal needs to be specified for continuing to support the MBS service in an RRC Connected mode, an RRC IDLE mode, or an RRC INACTIVE mode, or when changing between the modes.

In addition, a method of reconfiguration (or switching) from a multicast bearer to a unicast bearer or reconfiguration (or switching) from the unicast bearer to the multicast bearer is required to support the MBS service with no data loss or low data loss depending on a handover between base stations or networks supporting the MBS service or mobility of the terminal.

The disclosure proposes methods for the terminal to normally receive the MBS service in the above scenarios.

An embodiment of the disclosure provides a method of a terminal supporting a multicast/broadcast service (MBS) in a wireless communication system. The method may include receiving, from a base station, a radio resource control (RRC) message indicating a switch from a multicast service (point-to-multicast (PTM)) to a unicast service (a point-topoint (PTP)); and initializing at least one window variable based on received packet data convergence protocol (PDCP) data.

Another embodiment of the disclosure provides a method of a terminal supporting a multicast/broadcast service (MBS) in a wireless communication system. The method may comprise receiving, from a base station, a radio resource control (RRC) message indicating a switch from a unicast service (a point-to-point (PTP)) to a multicast service (point-to-multicast (PTM)); and initializing at least one window variable based on received packet data convergence protocol (PDCP) data.

An embodiment of the disclosure provides a terminal supporting a multicast/broadcast service (MBS) in a wireless communication system. The terminal may comprise a transceiver; and a controller configured to control the transceiver to receive, from a base station, a radio resource control (RRC) message indicating a switch from a multicast service (point-to-multicast (PTM)) to a unicast service (a point-to-point (PTP)), and initialize at least one window variable based on received packet data convergence protocol (PDCP) data.

Another embodiment of the disclosure provides a terminal supporting a multicast/broadcast service (MBS) in a wireless communication system. The terminal may comprise a transceiver; and a controller configured to control the transceiver to receive, from a base station, a radio resource control (RRC) message indicating a switch from a unicast service (a point-to-point (PTP)) to a multicast service (point-to-multicast (PTM)), and initialize at least one window variable based on received packet data convergence protocol (PDCP) data.

Advantageous Effects

The disclosure proposes a structure or configuration method for a multicast bearer or a unicast bearer supporting an MBS service, and a data processing method of a physical layer device, a MAC layer device, an RLC layer device, or a PDCP layer device which receives MBS data and processes the MBS data in order to support the MBS service in a next-generation mobile communication system.

A signaling procedure or an operation of a terminal is proposed for continuing to support an MBS service in an RRC connected mode, an RRC idle mode, or an RRC inactive mode, or when changing between the modes.

A method of reconfiguration (or switching) from a multicast bearer to a unicast bearer or reconfiguration (or switching) from the unicast bearer to the multicast bearer is proposed to support an MBS service with no data loss or low data loss depending on a handover between base stations or networks supporting the MBS service or mobility of the terminal, thereby supporting a seamless MBS service.

BRIEF DESCRIPTION OF THE DRAWINGS

FIGS. 12A, 12B, and 12C are diagrams illustrating signaling procedures for efficiently supporting an MBS service according to an embodiment of the disclosure.

DETAILED DESCRIPTION

Hereinafter, an operating principle of the disclosure will be described in detail with reference to the accompanying drawings. In the following description of the disclosure, if it is determined that a detailed description of a related known function or configuration may unnecessarily obscure a subject matter of the disclosure, the detailed description will be omitted. In addition, terms to be described later are terms defined in consideration of functions in the disclosure, which may vary according to intentions, customs, and/or the like of a user or an operator. Therefore, definition thereof needs to be made based on the contents throughout the specification.

In the following description of the disclosure, if it is determined that a detailed description of a related known function or configuration may unnecessarily obscure a subject matter of the disclosure, a detailed description thereof will be omitted. Hereinafter, an embodiment of the disclosure will be described with reference to the accompanying drawings.

In the following description, a term to identify an access node, a term referring to network entities, a term referring to messages, a term referring to an interface between the network entities, a term referring to various pieces of identification information, and/or the like are illustrated for convenience of a description. Accordingly, the disclosure is not limited to the terms described below, and other terms referring to objects having equivalent technical meanings may be used.

Hereinafter, for convenience of a description, the disclosure uses terms and names defined in a 3rd Generation Partnership Project Long Term Evolution (3GPP LTE) specification. However, the disclosure is not limited to the terms and the names, and may be equally applied to systems conforming to other specifications. In the disclosure, an eNB may be used interchangeably with a gNB for convenience of a description. That is, a base station described as the eNB may indicate the gNB.

Figure 1:
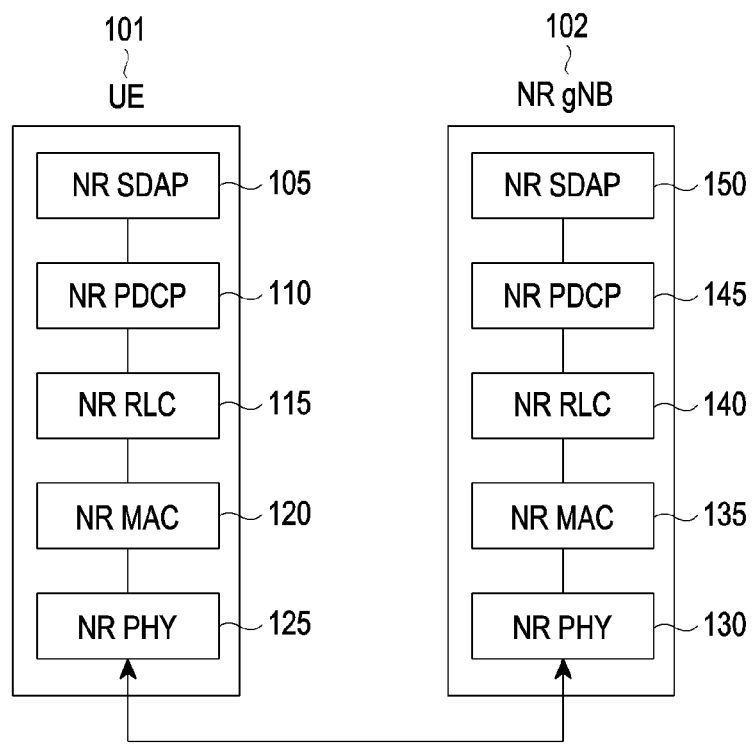
FIG. 1 is a diagram illustrating a radio protocol structure of a next-generation mobile communication system applicable to the disclosure.

FIG. 1 is a diagram illustrating a radio protocol structure of a next-generation mobile communication system applicable to the disclosure.

Referring to FIG. 1, in a radio protocol of a next-generation mobile communication system, a terminal 101 and an NR base station 102 consist of NR SDAPs 105 and 150, NR PDCPs 110 and 145, NR RLCs 115 and 140, and NR MACs 120 and 135, respectively.

A main function of the NR SDAPs 105 and 150 may include some of the following functions.

Delivery function of user plane data

Mapping function between a QoS flow and a Data Radio Bearer (DRB) for a uplink and a downlink Function of marking QoS flow Identifier in a uplink and a downlink Function of mapping a reflective QoS flow to a DRB for uplink SDAP PDUs For the SDAP layer device, for each PDCP layer device, each bearer, or each logical channel, whether to use a header of the SDAP layer device or whether to use a function of the SDAP layer device may be configured to the terminal with a Radion Resource Control (RRC) message, and if the SDAP header is configured, it may indicate to the terminal so that the terminal may update or reconfigure mapping information for a QoS flow and a DRB of a uplink and a downlink with a Non Access Stratum (NAS) QoS reflective configuration 1-bit indicator (a NAS reflective QoS) and an Access Stratum (AS) QoS reflective configuration 1-bit indicator (an AS reflective QoS) in the SDAP header. The SDAP header may include QoS flow ID information indicating a QoS. The QoS flow ID information may be used as a data processing priority, scheduling information, and/or the like to support a smooth service.

A main function of the NR PDCPs 110 and 145 may include some of the following functions.

Header compression and decompression function (ROHC only)

User data transfer function

In-sequence delivery function for upper layer PDUs

Out-of-sequence delivery function for upper layer PDUs

Reordering function for received PDCP PDUs

Duplication detection function for lower layer SDUs

Retransmission function for PDCP SDUs

Ciphering and deciphering function

Timer-based SDU deletion function

A reordering function of an NR PDCP device refers to a function of reordering PDCP PDUs received from a lower layer in order based on a PDCP sequence number (SN), and may include a function of transfer data to a upper layer in the reordered order, or may include a function of directly delivering the data to the upper layer without considering the order. Also, a function of reordering the order and recording lost PDCP PDUs may be included, and a function of reporting status of the lost PDCP PDUs to a transmitting side may be included. Also, a function of requesting retransmission of the lost PDCP PDUs may be included.

A main function of the NR RLCs 115 and 140 may include some of the following functions.

Transfer function for upper layer PDUs

In-sequence delivery function for upper layer PDUs

Out-of-sequence delivery function for upper layer PDUs

Error correction function via ARQ

Concatenation, segmentation and reassembly function for RLC SDUs

Re-segmentation function for RLC data PDUs

Reordering function for RLC data PDUs

Duplication detection function

Error detection function

RLC SDU deletion function

RLC re-establishment function

An in-sequence delivery function of an NR RLC device refers to a function of sequentially delivering RLC SDUs received from a lower layer to a upper layer, and if one original RLC SDU is segmented into several RLC SDUs and received, the in-sequence delivery function may include a function of reassembling and delivering them. Also, a function of reordering the received RLC PDUs based on an RLC SN or a PDCP SN may be included, and a function of reordering the order and recording lost RLC PDUs may be included. A function of reporting status of the lost RLC PDUs to a transmitting side may be included, and a function of requesting retransmission of the lost RLC PDUs may be included. If there is a lost RLC SDU, a function of sequentially delivering only RLC SDUs prior to the lost RLC SDU to the upper layer may be included, if a predetermined timer expires even if there is the lost RLC SDU, a function of sequentially delivering all RLC SDUs received before the timer has been started to the upper layer, or if the predetermined timer expires even if there is the lost RLC SDU, a function of sequentially delivering all RLC SDUs received so far to the upper layer may be included. In addition, the RLC PDUs may be processed in an order in which they are received (regardless of order of SNs, in order of arrival) and delivered to a PDCP device regardless of order, and in a case of segments, segments which are stored in a buffer or which will be received later may be received, reassembled into one complete RLC PDU, processed, and delivered to the PDCP device. The NR RLC layer may not include a concatenation function, and the aggregation function may be performed in an NR MAC layer or may be replaced with a multiplexing function of the NR MAC layer.

An out-of-sequence delivery function (Out-of-sequence delivery) of the NR RLC device refers to a function of immediately delivering RLC SDUs received from the lower layer to the upper layer regardless of order, and if one original RLC SDU is segmented into several RLC SDUs and received, the out-of-sequence delivery function may include a function of reassembling and delivering them. In addition, a function of storing RLC SNs or PDCP SNs of the received RLC PDUs, and reordering them to record lost RLC PDUs may be included.

The NR MACs 120 and 135 may be connected to several NR RLC layer devices configured in one terminal, and a main function of the NR MACs 120 and 135 may include some of the following functions.

Mapping function between logical channels and transport channels

Multiplexing and de-multiplexing function for MAC SDUs

Scheduling information reporting function

Error correction function via HARQ

Priority adjusting function between logical channels of one terminal

Priority adjusting function between terminals via dynamic scheduling

MBMS service identification function

Transport format selection function

Padding function

The NR physical (PHY) layers 125 and 130 may perform an operation of channel coding and modulating upper layer data to generate OFDM symbols, and transmit them via a radio channel. Alternatively, an operation of demodulating and channel decoding an OFDM symbol received via a radio channel to deliver it to a upper layer may be performed.

Because a very high band frequency may be used in a next-generation mobile communication system, a frequency bandwidth may also be very wide. However, in terms of terminal implementation, supporting all very wide bandwidths requires high implementation complexity and incurs high costs. Therefore, in the next-generation mobile communication system, the concept of partial bandwidth (BWP) may be introduced, and a plurality of partial bandwidths (BWPs) may be configured in one cell (an Spcell or an Scell) and data may be transmitted and received in one or more partial bandwidths according to an indication of a base station.

In the disclosure, a state transition method and/or partial bandwidth switching method considering state of an Scell and a plurality of partial bandwidths configured in the Scell when introducing a dormant partial bandwidth according to an embodiment of the disclosure, and specific operations will be described. Each of a method of managing a dormant mode in units of partial bandwidth (BWP-level) and transiting state, or a partial bandwidth switching method will be described, and an operation for a specific partial bandwidth according to state of each SCell, or state or a mode (activate, inactivate, or dormant) of each partial bandwidth will be described.

In the disclosure, a plurality of partial bandwidths may be configured for each downlink or uplink in one cell (an Spcell, a Pcell, a Pscell, or an Scell), and an active partial bandwidth (an active DL or UL BWP), a dormant partial bandwidth (a dormant BWP or a dormant DL BWP), or an inactive partial bandwidth (an inactive or deactivated DL/UL BWP) may be configured and operated through partial bandwidth switching. That is, a data transmission rate may be increased in a method similar to a carrier aggregation technology by transiting a partial bandwidth of a downlink or uplink into an active state for the one cell. In addition, it is possible to save battery by transiting or switching a downlink partial bandwidth to a dormant partial bandwidth so that a terminal does not perform PDCCH monitoring for the cell. In addition, it is possible to support fast activation of a cell or partial bandwidth later by allowing the terminal to perform channel measurement on the downlink partial bandwidth and report the channel measurement result. In addition, by transiting the downlink (or uplink) partial bandwidth in the one cell into an inactive state, the battery of the terminal may be saved. A state transition indication or a partial bandwidth switching indication per partial bandwidth for each cell may be configured and indicated via an RRC message, a MAC CE, or Downlink Control Information (DCI) of a PDCCH.

In the disclosure, a partial bandwidth (BWP) may be used without distinguishing between a uplink and a downlink, and meaning thereof may indicate a uplink partial bandwidth and a downlink partial bandwidth, respectively, depending on the context.

In the disclosure, a link may be used without distinguishing between uplink and downlink, and may indicate a uplink and a downlink, respectively, depending on the context.

In the disclosure, a dormant partial bandwidth is configured or introduced for an SCell of a terminal performing a carrier aggregation technology, and a PDCCH is not monitored in the dormant partial bandwidth to reduce battery consumption of the terminal. In addition, in the dormant partial bandwidth, report channel measurement is performed and reported (e.g., channel state information (CSI) or channel quality information (CQI) measurement or report), or beam measurement, beam tracking, or beam operation is performed, so if data transmission is required, it is switched or activated to a normal partial bandwidth (normal BWP), thereby quickly starting data transmission in the normal partial bandwidth. The dormant portion bandwidth may not be configured or applied to an SpCell (a Primary Cell (PCell) of a Master Cell Group (MCG) or a PCell (or a PCell) of a Secondary Cell Group (SCG)) in which it needs to constantly monitor a signal, transmit or receive feedback, check and maintain synchronization) or an SCell in which a PUCCH is configured.

In the disclosure, various embodiments that operate based on DCI of a PDCCH, a MAC CE, or an RRC message in order to operate a dormant bandwidth according to an embodiment of the disclosure for an SCell of a terminal will be described.

A network or a base station may configure an Spcell (a Pcell and a PScell) and a plurality of Scells to a terminal. The Spcell may indicate the Pcell when the terminal communicates with one base station, and may indicate the Pcell of a master base station or the PScell of a secondary base station when the terminal communicates with two base stations (the master base station and the secondary base station). The Pcell or the Pscell represents a main cell used when the terminal and the base station communicate in each MAC layer device, and means a cell in which the terminal obtains timing to perform synchronization, performs a random access, transmits HARQ ACK/NACK feedback with a PUCCH transmission resource, and transmits and receives most of control signals. A technology in which the base station increases transmission resources by operating a plurality of Scells together with an SPcell and increases uplink or downlink data transmission resources is called carrier aggregation technology.

When the Spcell and the plurality of Scells are configured to the terminal via an RRC message, a state or a mode for a partial bandwidth of each Scell or each SCell may be configured to the terminal via the RRC message, the MAC CE, or the DCI of the PDCCH. The state or the mode of the Scell may be configured to an active mode or an activated state and a deactivated mode or a deactivated state. A case that the Scell is in an active mode or an active state may mean that the terminal may transmit and receive uplink or downlink with the base station, and monitor a PDCCH for identifying an indication of the base station in an activated partial bandwidth, an activated normal partial bandwidth, or a partial bandwidth which is not an activated dormant partial bandwidth of the Scell in the active mode or the activated Scell. In addition, the case that the Scell is in the active mode or the activated state may mean that the terminal may perform channel measurement on a downlink of the Scell (or the activated partial bandwidth, the activated normal partial bandwidth, or the partial bandwidth which is not the activated dormant partial bandwidth of the Scell) which is in the active mode or the activated state and report periodically measurement information to the base station, and periodically transmit a pilot signal (a Sounding Reference Signal (SRS)) to the base station so that the base station may perform uplink channel measurement.

However, the case that the Scell is in the deactivated mode or the deactivated state may mean that partial bandwidths configured in the Scell are in the deactivated state, the configured partial bandwidths are not activated, or there is no activated partial bandwidth among the configured partial bandwidths, so the terminal may not exchange data with the base station, does not monitor a PDCCH for identifying an indication of the base station, does not perform channel measurement, does not perform measurement report, and does not transmit a pilot signal.

Therefore, in order to activate Scells which are in the deactivated mode, the base station first configures frequency measurement configuration information to the terminal via an RRC message, and the terminal performs cell or frequency measurement based on the frequency measurement configuration information. The base station may activate the deactivated Scells based on frequency/channel measurement information after receiving a cell or frequency measurement report of the terminal. As a result, a lot of delay occurs when the base station activates a carrier aggregation technology for the terminal and starts transmitting or receiving data.

In the disclosure, a dormant mode or a dormant state for the partial bandwidth of each activated Scell (the activated Scell or the active SCell) to save the battery of the terminal and quickly start data transmission or reception will be described. Alternatively, in the disclosure, configuring or introducing a dormant partial bandwidth for each activated SCell will be described.

In a partial bandwidth which is in a dormant mode or a dormant partial bandwidth of the activated Scell (a dormant BWP in an activated SCell), when the dormant partial bandwidth is activated, the terminal may not exchange data with the base station, does not monitor a PDCCH for identifying an indication of the base station, or does not transmit a pilot signal. However, the terminal may perform channel measurement, and report a measurement result for a measured frequency/cell/channel periodically according to configuration of the base station or when an event occurs. Therefore, the terminal does not monitor the PDCCH and transmits the pilot signal in the dormant partial bandwidth of the activated Scell, so the terminal may save the battery compared to a normal partial bandwidth of the activated SCell (or a partial bandwidth other than the dormant partial bandwidth), or compared to when the normal partial bandwidth of the activated SCell (or the partial bandwidth other than the dormant partial bandwidth) is activated. Unlike when the SCell is deactivated, because the channel measurement report is performed, the base station may quickly activate the normal partial bandwidth of the activated SCell based on the measurement report or the measurement report of the dormant partial bandwidth of the activated SCell so that the carrier aggregation technology may be used quickly, thereby reducing transmission delay.

Therefore, in the disclosure, a case that an Scell is in an activated mode or an activated state may mean that a terminal may exchange uplink or downlink data with a base station and monitor a PDCCH for identifying an indication of the base station in an activated partial bandwidth, an activated normal partial bandwidth, or a partial bandwidth which is not an activated dormant partial bandwidth of the Scell in the activated mode or activated Scell. In the disclosure, the case that the Scell is in the activated mode or the activated state may mean that the terminal may perform channel measurement on a downlink of the Scell in the activated mode or the activated state (or the activated partial bandwidth, the activated normal partial bandwidth, or the partial bandwidth which is not the activated dormant partial bandwidth of the Scell) and report measurement information to the base station periodically, and transmit a pilot signal to the base station periodically so that the base station may perform uplink channel measurement. In the disclosure, the case that the Scell is in the activated mode or the activated state may mean that the terminal may not exchange uplink or downlink data with the base station in the activated dormant partial bandwidth of the Scell in the activated mode or activated Scell, or does not monitor the PDCCH to identify the indication of the base station, but may perform channel measurement on a downlink of the activated dormant partial bandwidth of the Scell in the activated mode or the activated state and report measurement information periodically to the base station.

In the disclosure, a dormant partial bandwidth may represent a state of a partial bandwidth, or the dormant partial bandwidth may be used as a name of a logical concept indicating a specific partial bandwidth. Thus, the dormant partial bandwidth may be activated or deactivated, or switched. For example, an indication to switch a second partial bandwidth activated in a first SCell to a dormant partial bandwidth, an indication to transit the first SCell into dormancy or a dormant mode, or an indication to activate the dormant partial bandwidth of the first SCell may be interpreted as the same meaning.

In the disclosure, a normal partial bandwidth may represent partial bandwidths other than a dormant partial bandwidth among partial bandwidths configured in each SCell of a terminal via an RRC message. In addition, in the normal partial bandwidth, uplink or downlink data may be exchanged with a base station, and a PDCCH may be monitored to identify an indication of the base station. In the normal partial bandwidth, channel measurement for a downlink may be performed and measurement information may be periodically reported to the base station, and the terminal may periodically transmit a pilot signal to the base station so that the base station may perform uplink channel measurement. Also, the normal partial bandwidth may indicate a first active partial bandwidth or a default partial bandwidth, or a first active partial bandwidth activated from dormancy or an initial partial bandwidth.

In addition, among the partial bandwidths configured in each Scell of the terminal, only one dormant partial bandwidth may be configured, and may be configured for a downlink. In another embodiment, among the partial bandwidths configured in each Scell of the terminal, one dormant partial bandwidth may be configured for a uplink or downlink.

Figure 2:
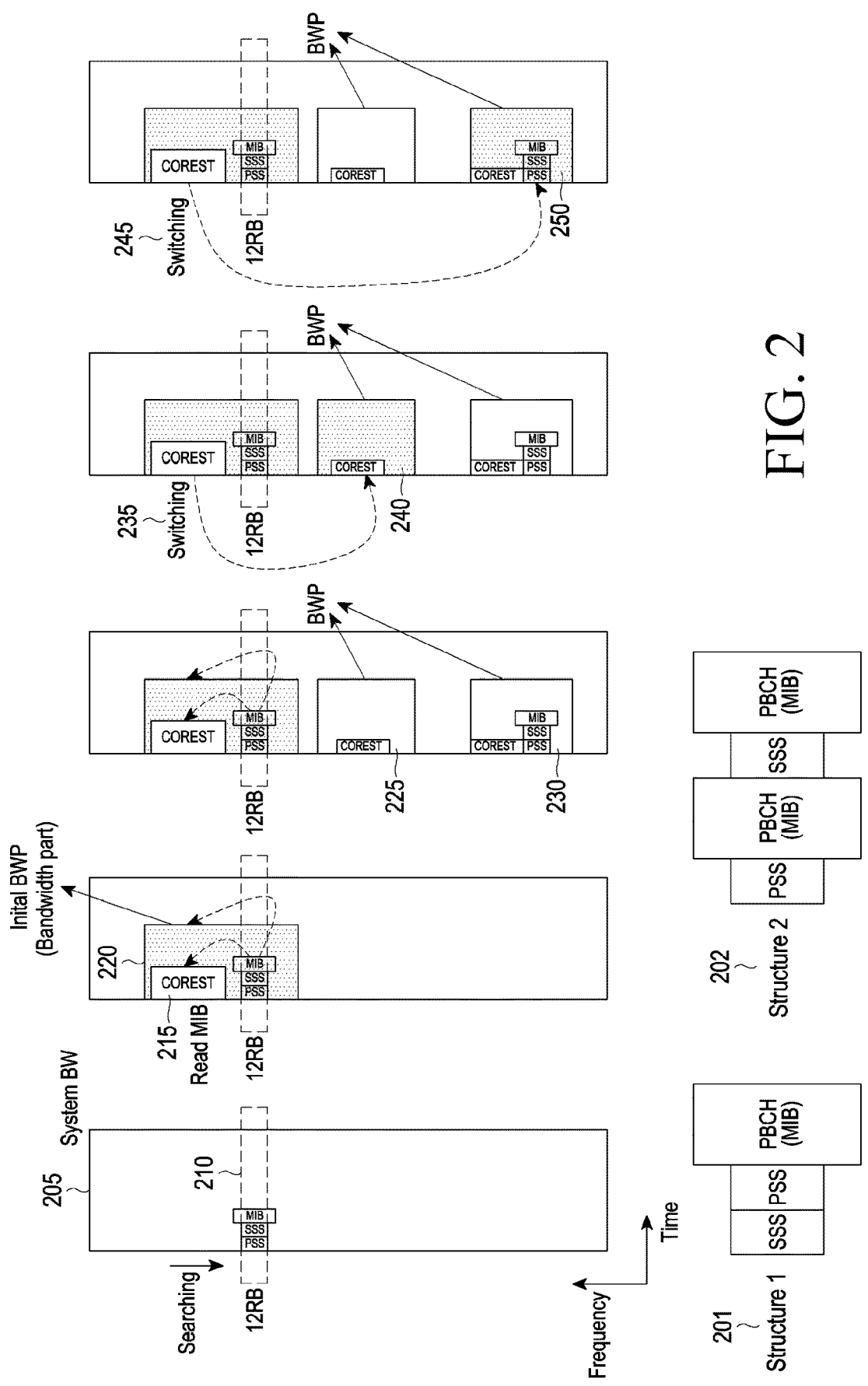
FIG. 2 is a diagram illustrating a procedure for providing a terminal with a service by efficiently using a very wide frequency bandwidth in a next-generation mobile communication system according to an embodiment of the disclosure.

FIG. 2 is a diagram illustrating a procedure for providing a service to a terminal by efficiently using a very wide frequency bandwidth in a next-generation mobile communication system according to an embodiment of the disclosure.

FIG. 2 describes how a next-generation mobile communication system may efficiently use a very wide frequency bandwidth to provide a service to terminals having different capabilities or categories and to save the battery.

Referring to FIG. 2, one cell in which a base station provides a service may serve a very wide frequency band 205. However, in order to provide a service to terminals with different capabilities, the very wide frequency band may be divided into a plurality of partial bandwidths and managed as the one cell.

A terminal that is initially powered on may search for the entire frequency band provided by an operator (a PLMN) in units of predetermined resource block (e.g., in units of 12 Resource Blocks (RBs)). That is, the terminal may search for a Primary synchronization sequence (PSS)/Secondary Synchronization Sequence (SSS) 210 in units of resource block over the entire system bandwidth. At this time, the PSS/SSS may have two structures 201 and 202. When the signals are detected while searching for the PSS/SSS 210 in units of resource block, the signals may be read and interpreted (decoded) to identify a boundary of a subframe and a radio transmission resource frame (a radio frame). Accordingly, the terminal may distinguish subframes in units of 1 ms and synchronize a downlink signal with a base station. A resource block (RB) may be defined as a unit on a two-dimension with a size of a predetermined frequency resource and a predetermined time resource. For example, it may be defined with 1 ms unit as a time resource and 12 subcarriers (1 carrier×15 kHz=180 kHz) as a frequency resource. When the synchronization is completed, the terminal may identify a master system information block (MIB) or minimum system information (MSI) to identify information of a Control Resource Set (CORESEST) 215, and identify an initial access Bandwidth Part (BWP) 220 information. The CORESET 215 information refers to a location of a time/frequency transmission resource in which a control signal is transmitted from the base station, and indicates, for example, a location of a resource in which a PDCCH channel is transmitted. That is, the CORESET information is information indicating where first system information (a system information block 1 (SIB1)) is transmitted, and indicates in which frequency/time resource the PDCCH is transmitted. The terminal may read the SIB1 and identify information about the initial partial bandwidth (initial BWP) 220. When the terminal completes synchronization of the downlink signal with the base station and becomes capable of receiving a control signal, the terminal may perform a random access procedure in the initial partial bandwidth 220 of a cell camped on, request RRC connection setup, and receive an RRC message to perform RRC connection setup.

In the RRC connection setup, a plurality of partial bandwidths 225 and 230 may be configured per cell (a Pcell, a Pscell, an Spcell, or an Scell). A plurality of partial bandwidths may be configured for a downlink within the one cell, and a plurality of partial bandwidths may be separately configured for a uplink.

The plurality of partial bandwidths may be indicated and configured with a partial bandwidth identifier (BWP Identifier) so that plurality of partial bandwidths may be used as an initial partial bandwidth (initial BWP) or a default partial bandwidth (default BWP), or a first active partial bandwidth (first active BWP) or a first active partial bandwidth (first active BWP from dormant) which is activated from a dormant partial bandwidth (dormant BWP) or from dormancy.

The initial partial bandwidth 220 may be used as a partial bandwidth determined on a cell-specific level, which exists one by one for each cell, and may be used as a partial bandwidth in which a terminal first accessing the cell may set up a connection to the cell via a random access procedure, or a terminal which sets up a connection may perform synchronization. The base station may configure an initial downlink partial bandwidth (initial downlink BWP) to be used in a downlink and an initial uplink partial bandwidth (initial uplink BWP) to be used in a uplink for each cell. In addition, configuration information for the initial partial bandwidth may be broadcasted on an SIB1 indicated by a CORESET, and the base station may reconfigure it to a connected terminal via an RRC message. The initial partial bandwidth may be designated and used as a number 0 of a partial bandwidth identifier in a uplink and a downlink, respectively. That is, all terminal(s) accessing the same cell may designate the same initial partial bandwidth with a partial bandwidth identifier 0 and use it. This is because when a random access procedure is performed, the base station may transmit a random access response (RAR) message in an initial partial bandwidth which may be read by all terminals, so there may be an advantage in facilitating a contention-based random access procedure.

The first active partial bandwidth (first active BWP) may be configured differently for each terminal (UE specific), and may be indicated by designating the first active partial bandwidth with a partial bandwidth identifier among a plurality of partial bandwidths. The first active partial bandwidth may be configured for a downlink and a uplink, respectively, and may be configured as a first active downlink partial bandwidth (first active downlink BWP) and a first active uplink partial bandwidth (first active uplink BWP) with partial bandwidth identifiers, respectively. The first active partial bandwidth may be used to indicate which partial bandwidth is to be first activated and used when a plurality of partial bandwidths are configured in one cell. For example, when a Pcell or a Pscell, and a plurality of Scells are configured for the terminal, and a plurality of partial bandwidths are configured for each Pcell, Pscell, or Scell, if the Pcell, Pscell, or Scell is activated, the terminal may activate and use the first active partial bandwidth among the plurality of partial bandwidths configured for the Pcell, Pscell, or Scell. That is, the first active downlink partial bandwidth may be activated and used for the downlink, and the first active uplink partial bandwidth may be activated and used for the uplink.

An operation, in which the terminal switches (235, 245) current or activated downlink partial bandwidths for the Scell to activate them as first active downlink partial bandwidths (or partial bandwidths configured or indicated via an RRC message) 240 and 250, or switches (235, 245) current or activated uplink partial bandwidths for the Scell to activate them as first active uplink partial bandwidths (or partial bandwidths configured or indicated via an RRC message) 240 and 250, may be performed when an activation indication is received via an RRC message, MAC control information, or DCI while the Scell or partial bandwidth is in an inactive state. In addition, it may be performed when an indication to transit the Scell or partial bandwidth into a dormant state is received via an RRC message, MAC control information, or DCI. This is because when the Scell or partial bandwidth is activated, the current or activated downlink partial bandwidth is switched to be activated as the first active downlink partial bandwidth (or the partial bandwidth configured or indicated by the RRC message) or the uplink partial bandwidth is switched to be activated as the first active uplink partial bandwidth (or the partial bandwidth configured or indicated by the RRC message), the base station may effectively use a carrier aggregation technology only when a frequency/channel is measured and reported for the first active downlink/uplink partial bandwidth even when a channel measurement report is performed in the dormant state.

A default partial bandwidth (default BWP) may be configured differently for each UE (UE specific), and may be designated and indicated with a partial bandwidth identifier among a plurality of partial bandwidths. The default partial bandwidth may be configured only for a downlink. The default partial bandwidth may be used as a partial bandwidth to which an activated partial bandwidth among a plurality of downlink partial bandwidths will fall back after predetermined time. For example, a partial bandwidth inactivity timer (bwp inactivity timer) may be configured for each cell or each partial bandwidth via an RRC message. The timer may be started or restarted when data transmission and reception occurs in an activated partial bandwidth which is not the default partial bandwidth. Alternatively, the timer may be started or restarted when the activated partial bandwidth is switched to another partial bandwidth. When the timer expires, the terminal may fall back or switch the downlink partial bandwidth activated in the cell to the default bandwidth. Switching may refer to a procedure of deactivating a currently activated partial bandwidth and activating a partial bandwidth for which switching is indicated, and the switching may be triggered via an RRC message, MAC control information (a MAC control element), or L1 signaling (Downlink Control Information (DCI) in a PDCCH). The Switching may be triggered by indicating a partial bandwidth to be switched or activated, and the partial bandwidth may indicated by a partial bandwidth identifier (e.g., 0, 1, 2, 3, or 4).

The reason why the default partial bandwidth is applied and used only for the downlink is that the base station makes the terminal fall back to the default partial bandwidth after determined time for each cell to receive an indication (e.g., DCI in a PDCCH) of the base station, thereby facilitating base station scheduling. For example, if the base station configures a default partial bandwidth of terminals accessing one cell as an initial partial bandwidth, the base station may continue to perform scheduling indication only in the initial partial bandwidth after determined time. If the default partial bandwidth is not configured via the RRC message, the initial partial bandwidth may be regarded as the default partial bandwidth and fall back to the initial partial bandwidth when the partial band inactivity timer expires.

In another embodiment, in order to increase a degree of freedom in implementation of a base station, a default partial bandwidth may be defined and configured for a uplink and used as a default partial bandwidth for a downlink.

A dormant partial bandwidth refers to a partial bandwidth which is in a dormant mode or a dormant partial bandwidth of an activated Scell. When the dormant partial bandwidth is activated, a terminal may not exchange data with a base station. In addition, the terminal does not monitor a PDCCH for identifying an indication of the base station and does not transmit a pilot signal. However, the terminal may perform channel measurement and report a measurement result of a measured frequency/cell/channel periodically or when an event occurs according to configuration of the base station. The terminal does not monitor the PDCCH and transmit the pilot signal in the dormant partial bandwidth of the activated Scell, so a battery may be saved compared to a normal partial bandwidth of the activated SCell (or a partial bandwidth which is not the dormant partial bandwidth) or compared to when the normal partial bandwidth of the activated SCell (or the partial bandwidth which is not the dormant partial bandwidth) is activated. In addition, unlike when the SCell is deactivated, because the channel measurement report is performed, the base station may quickly activate the normal partial bandwidth of the activated SCell based on the measurement report or the measurement report of the dormant partial bandwidth of the activated SCell to quickly use a carrier aggregation technology, thereby reducing transmission delay.

A first active partial bandwidth (or a first active non-dormant partial bandwidth or a partial bandwidth configured or indicated via an RRC message) which is activated in a dormant state or by being switched from a dormant partial bandwidth may be a partial bandwidth which a terminal needs to activate by switching a current or activated partial bandwidth of an activated SCell according to a corresponding indication or a partial bandwidth which is configured via an RRC message and which needs to be activated from a dormant state if a base station indicates to the terminal to switch the partial bandwidth of the activated SCell from the dormant partial bandwidth to a normal partial bandwidth (or a partial bandwidth which is not the dormant partial bandwidth) via DCI in a PDCCH, a MAC CE, or an RRC message, if the base station indicates to the terminal to switch or change the active partial bandwidth in the dormant partial bandwidth to the normal partial bandwidth, or if the base station indicates to the terminal to switch, change, or activate the active partial bandwidth in the dormant partial bandwidth to the normal partial bandwidth (e.g., a first active partial bandwidth activated from dormancy) when the terminal operates a partial bandwidth of one activated SCell as the dormant partial bandwidth, or when the activated partial bandwidth of the activated SCell is the dormant partial bandwidth, or when it is switched to the dormant partial bandwidth in an SCell.

Figure 3:
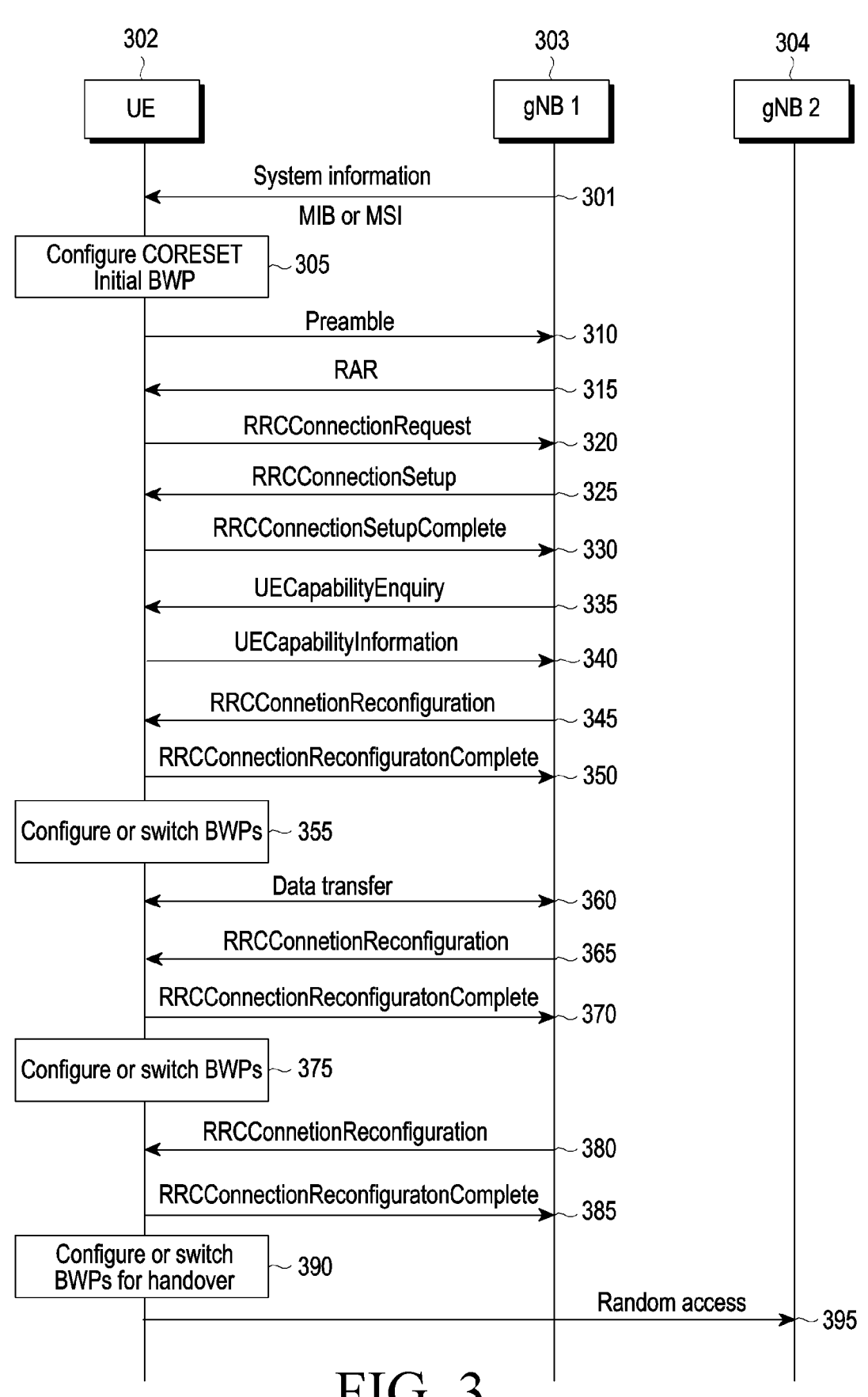
FIG. 3 is a diagram illustrating a procedure for a terminal to switch from an RRC idle mode to an RRC connected mode in a next-generation mobile communication system according to an embodiment of the disclosure.

FIG. 3 is a diagram illustrating a procedure in which a terminal transits from an RRC idle mode into an RRC connected mode in a next-generation mobile communication system according to an embodiment of the disclosure.

FIG. 3 proposes a method of configuring a plurality of partial bandwidths and configuring a default bandwidth or a first active bandwidth.

Referring to FIG. 3, one cell in which a base station 303 provides a service may serve a very wide frequency band. A terminal 302 may search the entire frequency band provided by an operator (a PLMN) in units of predetermined resource blocks (for example, in units of 12. Resource Blocks (RBs)). That is, the terminal 302 may search a PSS/SSS in units of the resource block in the entire system bandwidth. When the signals are detected while searching for the PSS/SSS in units of the resource block, a boundary of a subframe and a radio transmission resource frame may be identified by reading and interpreting (decoding) the signals. When synchronization has been completed, the terminal 302 may read system information of a cell on which the terminal 302 currently camps. That is, CORESEST information may be identified by identifying an MIB or MSI, and Initial Bandwidth Part (BWP) information may be identified by reading system information (step 301 and step 305). The CORESET information indicates a location of a time/frequency transmission resource via which a control signal is transmitted from a base station, and indicates, for example, a location of a resource via which a PDCCH channel is transmitted.

If the terminal 302 completes synchronization for a downlink signal with the base station 303 and becomes capable of receiving a control signal, the terminal may perform a random access procedure in the initial partial bandwidth (step 310), receive a random access response (step 315), request RRC connection setup (step 320), receive an RRC message (step 325), and perform RRC connection setup (step 330).

If default RRC connection setup is completed, the base station 303 may transmit, to the terminal 302, an RRC message enquiring about a performance (a UE capability) of the terminal 302 in order to identify the performance of the terminal 302 (UECapabilityEnquiry)(335). In another embodiment, the base station 303 may enquire an MME or an AMF about the capability of the terminal 302 in order to identify the performance of the terminal 302. This is because the MME or AMF may have stored capability information of the terminal 302 if the terminal 302 has previously accessed. If the base station 303 does not have desired terminal capability information, the base station 303 may request the terminal capability from the terminal 302.

The reason why the base station 303 transmits the RRC message to the terminal 302 to identify the performance of the terminal 302 is to identify the performance of the terminal 302, for example, to identify how much frequency band the terminal 302 may read or a region of a frequency band which the terminal 302 may read. After identifying the performance of the terminal 302, the base station 303 may configure an appropriate partial bandwidth for the terminal 302. If the terminal 302 receives the RRC message enquiring about the performance of the terminal 302, in response to this, the terminal 302 may indicate a range of bandwidth supported by the terminal 302, which range of bandwidth the terminal 302 supports from a current system bandwidth, and/or the like with an offset from a reference center frequency or with a center frequency and a bandwidth, or may indicate a start point and an end point of a supported frequency bandwidth (step 340).

A partial bandwidth may be configured by an RRCSetup message for RRC connection setup (step 325), or an RRCResume message or an RRCReconfiguration message (step 345). The RRC message may include configuration information for a PCell, a Pscell, or a plurality of Scells, and may configure a plurality of partial bandwidths for each cell (the PCell, the Pscell, or the Scell). When the plurality of partial bandwidths for each cell are configured, a plurality of partial bandwidths to be used in a downlink of each cell may be configured, and in a case of an FDD system, a plurality of partial bandwidths to be used in a uplink of each cell may be configured separately from the downlink partial bandwidths. In a case of a TDD system, a plurality of partial bandwidths to be commonly used in a downlink and a uplink of each cell may be configured.

Information for configuring the partial bandwidth of each cell (the PCell, the Pscell, or the Scell) may include some of the following information.

Downlink partial bandwidth configuration information of the cell

First downlink partial bandwidth configuration information

A plurality of pieces of partial bandwidth configuration information and a partial bandwidth identifier (BWP ID) corresponding to each partial bandwidth Initial state configuration information (e.g., an active state, a dormant state, or an inactive state) of the downlink partial bandwidth of the cell Partial bandwidth identifier indicating an initial active downlink part bandwidth Partial bandwidth identifier indicating a default partial bandwidth Configuration information for PDCCH monitoring for each bandwidth. For example, CORESET information, search space resource information, or a PDCCH transmission resource, a period, a subframe number information, and/or the like Partial bandwidth identifier indicating a dormant partial bandwidth or a 1-bit indicator indicating a dormant partial bandwidth for each partial bandwidth in the partial bandwidth configuration information Partial bandwidth identifier indicating a first activate partial bandwidth activated from dormant or a 1-bit indicator indicating a first active partial bandwidth activated from dormant for each partial bandwidth in the partial bandwidth configuration information Partial bandwidth inactivity timer configuration and a timer value Indicator indicating an MBS service, an indicator indicating an MBS service type, or an indicator indicating that the MBS service may be supported by falling back (or transiting or switching) to the partial bandwidth when the MBS service is not available (for example, when a radio signal is not good)

Uplink partial bandwidth configuration information of the cell

Initial uplink partial bandwidth configuration information

A plurality of pieces of partial bandwidth configuration information and a partial bandwidth identifier (BWP ID) corresponding to each partial bandwidth Initial state configuration information (e.g., an active state, a dormant state, or an inactive state) of the downlink partial bandwidth of the cell Partial bandwidth identifier indicating a dormant partial bandwidth or a 1-bit indicator indicating a dormant partial bandwidth for each partial bandwidth in the partial bandwidth configuration information Partial bandwidth identifier indicating a first active uplink part bandwidth Indicator indicating an MBS service, an indicator indicating an MBS service type, or an indicator indicating that the MBS service may be supported by falling back (or transiting or switching) to the partial bandwidth when the MBS service is not available (for example, when a radio signal is not good)

The configured initial partial bandwidth, the default partial bandwidth, or the first active partial bandwidth may be used for the following purpose, and may operate as follows to suit the purpose.

An initial partial bandwidth may be used as a partial bandwidth determined at a cell level, which exists one by one for each cell, and may be used as a partial bandwidth in which a terminal first accessing the cell sets up a connection with the cell via a random access procedure or a terminal which sets up a connection may perform synchronization. In addition, a base station may configure an initial downlink partial bandwidth to be used in a downlink and an initial uplink partial bandwidth to be used in a uplink for each cell. Configuration information for the initial partial bandwidth may be broadcasted on an SIB1 indicated by a CORESET, and may be reconfigured to a terminal connected to the base station via an RRC message. The initial partial bandwidth may be designated and used by a partial bandwidth identifier 0 in a uplink and a downlink, respectively. That is, all terminals accessing the same cell may equally designate and use the same initial partial bandwidth by the partial bandwidth identifier 0. This is because when performing a random access procedure, the base station may transmit a random access response (RAR) message in an initial partial bandwidth which may be read by all terminals, so there may be an advantage in facilitating a contention-based random access procedure.

A first active partial bandwidth may be configured differently for each terminal, and may be indicated by designating the first active partial bandwidth by a partial bandwidth identifier among a plurality of partial bandwidths. The first active partial bandwidth may be configured for a downlink and a uplink, respectively, and may be configured as a first active downlink partial bandwidth and a first active uplink partial bandwidth with a partial bandwidth identifier, respectively. The first active partial bandwidth may be used to indicate which partial bandwidth is to be initially activated and used when a plurality of partial bandwidths are configured in one cell. For example, when a Pcell or a Pscell and a plurality of Scells are configured for a terminal, and a plurality of partial bandwidths are configured for each Pcell, Pscell, or Scell, if the Pcell, Pscell, or Scell is activated, the terminal may activate and use a first active partial bandwidth among the plurality of partial bandwidths configured in the Pcell, Pscell, or Scell. That is, the first active downlink partial bandwidth may be activated and used for the downlink, and the first active uplink partial bandwidth may be activated and used for the uplink.

An operation, in which a terminal switches a current or activated downlink partial bandwidth for an Scell and activates it as a first active downlink partial bandwidth (or a partial bandwidth configured or indicated via an RRC message), or switches a current or activated uplink partial bandwidth for the Scell and activates it as a first active uplink partial bandwidth (or a partial bandwidth configured or indicated via an RRC message), may be performed when the terminal receives an activation indication while a certain Scell or a partial bandwidth of a certain activated Scell is in an inactive or dormant state, or receives an indication to switch from an inactive or dormant partial bandwidth to a normal partial bandwidth or to activate it via an RRC message, MAC control information, or DCI in a PDCCH. In addition, when the terminal receives an indication to transit an activated Scell or partial bandwidth into a dormant state or an indication to switch or activate the activated Scell or partial bandwidth to a dormant partial bandwidth via an RRC message, MAC control information, or DCI in a PDCCH, the terminal may switch the partial bandwidth to the dormant partial bandwidth, activate the partial bandwidth, or make the partial bandwidth dormant.

Being dormant, or switching to a dormant partial bandwidth, or activation of the dormant partial bandwidth may mean performing an operation described for a dormant state in the disclosure. That is, an operation of measuring a channel for a downlink partial bandwidth (or a dormant partial bandwidth) and reporting it to a base station, without performing PDCCH monitoring, may be performed. In another embodiment, when the activated Scell or partial bandwidth is activated or switched to a normal partial bandwidth, a downlink partial bandwidth will be switched and activated to a first active downlink partial bandwidth and a uplink partial bandwidth will be switched and activated to a first active uplink partial bandwidth, so the dormant partial bandwidth may be configured as the first active downlink or uplink partial bandwidth, or a default partial bandwidth. The default partial bandwidth may be configured differently for each terminal, and may be designated and indicated by a partial bandwidth identifier among a plurality of partial bandwidths. The default partial bandwidth may be configured only for a downlink. The default partial bandwidth may be used as a partial bandwidth to which an activated partial bandwidth among a plurality of downlink partial bandwidths will fall back after predetermined time. For example, a partial bandwidth inactivity timer (a bwp inactivity timer) may be configured for each cell or each partial bandwidth via an RRC message, and the timer may start or restart when data transmission and reception occurs in an activated partial bandwidth, not the default partial bandwidth, or when the activated partial bandwidth is switched to another partial bandwidth. When the timer expires, the terminal may fall back or switch the downlink partial bandwidth activated in the cell to a default bandwidth. Switching may mean a procedure of inactivating a currently activated partial bandwidth and activating a partial bandwidth to which switching is indicated, and the switching may be triggered via an RRC message, MAC control information, or L1 signaling (DCI in a PDCCH). The switching may be triggered by indicating a partial bandwidth to be switched or activated, and a partial bandwidth may be indicated by a partial bandwidth identifier (e.g., 0, 1, 2, 3, or 4).

The reason why the default partial bandwidth is applied and used only for the downlink is that the base station makes the terminal fall back to the default partial bandwidth after determined time to receive an indication (e.g., DCI in a PDCCH) of the base station for each cell, thereby facilitating base station scheduling. For example, if the base station configures a default partial bandwidth of terminals accessing one cell to an initial partial bandwidth, the base station may continue to perform scheduling indication only in the initial partial bandwidth after predetermined time. If the default partial bandwidth is not configured via the RRC message, the initial partial bandwidth may be regarded as the default partial bandwidth and fall back to the initial partial bandwidth when the partial band inactivity timer expires.

In another embodiment, in order to increase a degree of freedom of implementation for a base station, a default partial bandwidth may be also defined and configured for a uplink and used as a default partial bandwidth for a downlink.

A dormant partial bandwidth refers to a dormant partial bandwidth or a partial bandwidth which is a domant mode of an activated Scell. When the dormant partial bandwidth is activated, a terminal may not exchange data with a base station, and does not monitor a PDCCH for checking an indication of the base station, or does not transmit a pilot signal. However, the terminal may perform channel measurement and report a measurement result of a measured frequency/cell/channel periodically or when an event occurs according to configuration of the base station. The terminal does not monitor the PDCCH and transmit the pilot signal in the dormant partial bandwidth of the activated Scell, so the terminal may save a battery, compared to a normal partial bandwidth of the activated SCell (or a partial bandwidth other than the dormant partial bandwidth) or compared to when the normal partial bandwidth of the activated SCell (or the partial bandwidth other than the dormant partial bandwidth) is activated. Further, the terminal performs a channel measurement report unlike when the SCell is deactivated, so the base station may activate the normal partial bandwidth of the activated SCell quickly to use a carrier aggregation technology quickly based on the measurement report or the measurement report for the dormant partial bandwidth of the activated SCell, thereby reducing transmission delay.

When a partial bandwidth of one activated SCell of a terminal is operated as a dormant partial bandwidth, or when an activated partial bandwidth in an activated SCell is a dormant partial bandwidth or when it is switched to a dormant partial bandwidth in an SCell, if a base station indicates to the terminal to switch a partial bandwidth of the activated SCell from a dormant partial bandwidth to a normal partial bandwidth (or a partial bandwidth other than the dormant partial bandwidth) via DCI of a PDCCH, a MAC CE, or an RRC message, or indicates to switch or transit from an active partial bandwidth in a dormant partial bandwidth to a normal partial bandwidth, or indicates to switch or transit or activate from an active partial bandwidth in a dormant partial bandwidth to a normal partial bandwidth (e.g., a first active partial bandwidth activated from dormancy), the first active partial bandwidth activated from the dormancy (or a first active non-dormant partial bandwidth) may be a partial bandwidth to which the terminal needs to switch the partial bandwidth of the activated SCell according to the indication or a partial bandwidth which the terminal needs to activate according to the indication, or a first active partial bandwidth activated from dormancy which is configured in the RRC message.

In the disclosure, the meaning of switching a first partial bandwidth to a second partial bandwidth may be interpreted as the meaning of activating the second partial bandwidth, or may be interpreted as the meaning that the first partial bandwidth which has been activated is deactivated and the second partial bandwidth is activated.

Further, the RRCSetup message (step 325), the RRCResume message, or the RRCReconfiguration message (step 345) for the RRC connection setup may configure frequency measurement configuration information (measurement configuration) and frequency measurement gap configuration information (measurement gap information), and/or the like, and may include frequency measurement target (measurement object) information. Further, the RRCSetup message (step 625), the RRCResume message or the RRCReconfiguration message (step 345) for the RRC connection setup may configure a function (a power saving mode) to reduce power consumption of the terminal, or may configure configuration information such as a Discontinuous Reception (DRX) cycle, an offset, an on-duration period (a period in which the terminal needs to monitor the PDCCH), time information, and/or the like for MBS service reception, or short time period information or time information indicating when to monitor or detect the PDCCH from the base station before the on-duration period in the DRX cycle, and/or the like in order to reduce power consumption when the terminal receives the MBS service. If the function to reduce the power consumption of the terminal is configured, the terminal may configure a DRX cycle and detect a Wake-Up Signal (WUS) signal in an interval configured to monitor the PDCCH of the base station before the on-duration interval. In addition, the base station may indicate to the terminal whether to skip (or not perform) or perform PDCCH monitoring in the immediately following on-duration interval via DCI of the PDCCH for the WUS signal. The terminal always needs to monitor a PDCCH in an on-duration interval, but the base station may indicate to the terminal not to monitor the PDCCH in the on-duration interval with the WUS signal to save battery consumption of the terminal. In addition, when receiving the MBS service, the terminal applies the DRX configuration information configured for the MBS service to periodically determine the interval for PDCCH monitoring based on the configuration information, and does not always perform PDCCH monitoring, thereby reducing power consumption.

When the RRC connection setup is completed, the terminal 302 may configure a plurality of partial bandwidths according to the indication configured via the RRC message (step 355). One or a small number of bandwidths among the configured plurality of partial bandwidths may be activated in order to save battery power. For example, one partial bandwidth to be activated may be indicated. The base station 303 may indicate activation of a partial bandwidth via an RRC message, MAC control information (MAC CE), or L1 signaling (a physical Y layer control signal such as DCI of a PDCCH, and/or the like) to indicate switch from the initial access partial bandwidth to a new partial bandwidth (step 355). In another embodiment, new bitmap information may be defined in DCI of a PDCCH, and activation, dormancy, or inactivation may be indicated. In another embodiment, whether to activate a normal partial bandwidth (e.g., a first active partial bandwidth to be activated from dormancy) or to activate a dormant partial bandwidth, or whether to switch to a dormant partial bandwidth or to switch a partial bandwidth may be indicated with the bitmap. There may be many other newly accessed users in the initial access partial bandwidth, so it may be more advantageous to allocate a new partial bandwidth and separately manage connected users in terms of scheduling. This is because the initial access partial bandwidth is not configured for each terminal but may be commonly shared and used by all terminals. In order to reduce signaling overhead, a default partial bandwidth may be dynamically indicated by the MAC control information, L1 signaling, or system information. The base station 303 may switch or change a partial bandwidth of a certain cell (e.g., a PCell or an SCell) of the terminal 302 to a partial bandwidth (e.g., an MBS-dedicated partial bandwidth) supporting the MBS service, thereby the terminal may receive the MBS service (step 360).

Steps 365 to 395 in FIG. 3 are procedures related to a handover and will be described in more detail in steps 1605 to 1675 in FIG. 16 below.

In the disclosure, when a base station or a network supports an MBS service to a terminal, the base station or the network may configure, to a terminal, at least one of bearer configuration information for the MBS service, or transmission resource information for the MBS service (e.g., a time resource, a frequency resource, a bandwidth or a frequency, a partial bandwidth (or a partial bandwidth identifier) or a bandwidth, subcarrier spacing, a transmission resource period, and an RNTI identifier for each MBS service or a logical channel identifier for each MBS service) via system information, an RRC message (e.g., an RRCSetup message, an RRCResume message, an RRCReconfiguration message, an RRCRelease message, or a newly defined RRC message), or a control message for an MBS channel. In another embodiment, configuration information of a bearer for the MBS service may be promised or designated as a default configuration. The bearer for the MBS service may be considered as a multicast bearer or a unicast bearer from the viewpoint of the base station or the terminal. In another embodiment, a separate identifier or indicator is configured via the system information, the RRC message (e.g., the RRCSetup message, the RRCResume message, the RRCReconfiguration message, the RRCRelease message, or the newly defined RRC message), or the control message for the MBS channel, thereby distinguishing whether it is a multicast bearer (or a broadcast bearer) for the MBS service or the unicast bearer for the MBS service to configure it to the terminal.

In the disclosure, a multicast bearer may refer to a bearer providing a multicast service or a broadcast service, and may indicate a broadcast bearer. The multicast service may indicate a service provided only to a terminal registered or authorized in a network. The broadcast service may indicate a service provided to an unspecified number of terminals, or to a terminal which is not registered or not authorized in the network. In the disclosure, for convenience of a description, a bearer supporting the multicast service or the broadcast service may be referred to as a multicast bearer.

In the disclosure, the MBS service may indicate a multicast service, a broadcast service, or a unicast service for the MBS service, and may be described as the MBS service for convenience of a description.

In the disclosure, the multicast service may indicate an MBS service supported by a Point to Multicast (PTM) scheme or may be supported with the multicast bearer, and the unicast service may indicate an MBS service supported by a Point to Point (PTP) scheme or may be supported with the unicast bearer.

In the disclosure, the MBS bearer may indicate the multicast bearer or the unicast bearer.

A Downlink Shared Channel (DL-SCH) described in the disclosure may include or indicate a Common Control Channel (CCCH), a Dedicated Control Channel (DCCH), or a Dedicated Traffic Channel (DTCH).

The bearer, the multicast bearer, or the unicast bearer for the MBS service described in the disclosure may be interpreted as a multicast bearer or a unicast bearer.

In the disclosure, it may mean that a bearer includes an SRB and a DRB, the SRB means a signaling radio bearer and the DRB means a data radio bearer. The SRB is mainly used to transmit and receive an RRC message of an RRC layer device, and the DRB is mainly used to transmit and receive pieces of user layer data. A UM DRB means a DRB using an RLC layer device operating in a UM mode, and an AM DRB means a DRB using an RLC layer device operating in an AM mode.

MBS data for the MBS service described in the disclosure may be interpreted as MBS control data (control plane data) for configuration information of an MBS channel, or bearer configuration or service configuration, or MBS user data (user plane data) supporting the MBS service.

A Radio Network Temporary Identifier (RNTI) identifier described in the disclosure is an identifier used for a terminal to monitor a PDCCH in a physical layer device, descramble or check Cyclic Redundancy Check (CRC) of a received PDCCH to identify whether it is an RNTI value configured in the terminal or an RNTI value corresponding to a PDCCH which the terminal intends to receive, and to determine whether it is a PDCCH which the terminal needs to read.

FIGS. 4A to 4D are diagrams illustrating a structure of a bearer configured for an MBS service according to an embodiment of the disclosure. That is, FIGS. 4A to 4D describe a structure of a bearer which a terminal establishes for receiving an MBS service or which a base station or a network may configure to the terminal for the MBS service via system information, an RRC message (e.g., an RRC-Setup message, an RRCResume message, an RRCReconfiguration message, an RRCRelease message, or a newly defined RRC message) or a control message for an MBS channel when the base station or the network supports the MBS service to the terminal in an RRC connected mode, an RRC inactive mode, or an RRC idle mode. Bearer structures described in FIGS. 4A to 4D may be extended and applied or configured even when a normal data service is supported.

A bearer structure configured for the MBS service may have one or a plurality of bearer structures from bearer structures in FIGS. 4A to 4D. In another embodiment, one or a plurality of structures of the bearer structures in FIGS. 4A to 4D may be promised or designated as default configuration in configuration information of a bearer for the MBS service. The bearer structures in FIGS. 4A to 4D may be configured or applied to a terminal or a base station.

Figures 4A, 4B, 4C:
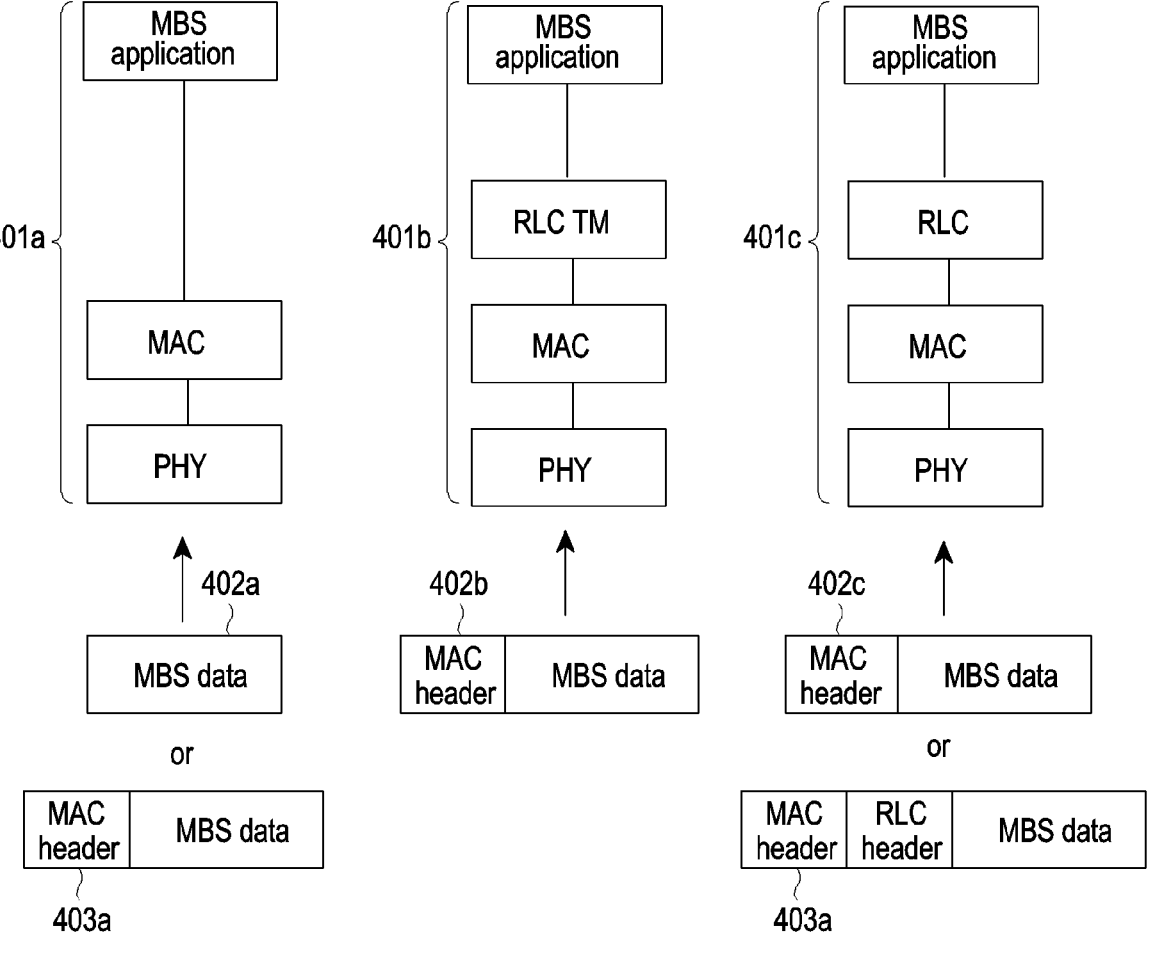
FIGS. 4A, 4B, 4C, and 4D are diagrams illustrating a structure of a bearer configured for an MBS service according to an embodiment of the disclosure.

FIG. 4A is a diagram illustrating a first bearer structure for supporting an MBS service according to an embodiment of the disclosure.

If a unicast bearer or a multicast bearer for the MBS service is established with the first bearer structure 401a, a terminal may configure a bearer structure directly connecting a MAC layer device and a upper MBS application layer device as a bearer for the MBS service. Transmission of HARQ ACK or NACK, or a HARQ retransmission procedure or a HARQ processing procedure of a MAC layer device may not be applied to the first bearer structure. In the first bearer structure 401a, the terminal may transfer MBS data (MBS control data or MBS user data) received via a physical layer device or the MAC layer device to a upper MBS application layer device. In the first bearer structure 401a, the MBS data may not include a MAC header. For example, this is because the MBS data may be distinguished in the MAC layer device even without the MAC header if a separate physical channel or transport channel for the MBS service is configured and a separate transmission resource (a frequency or time resource or a transmission period) is configured. In another embodiment, for example, this is because the MBS data may be distinguished in the physical layer device or the MAC layer device even without the MAC header when a first RNTI is allocated or determined for the MBS data if the separate physical channel or transport channel for the MBS service is configured, and the separate transmission resource (the frequency or time resource or the transmission period) is configured. The first RNTI for the MBS data may be allocated or designated as a 1-1 RNTI for MBS control data (or an MBS control data channel) or a 1-2 RNTI for MBS user data (or an MBS user data channel), respectively. In the first bearer structure 401a, the MAC layer device may not basically apply the transmission of HARQ ACK or NACK, the HARQ retransmission procedure, or the HARQ processing procedure to the bearer supporting the MBS service. Further, configuration information of an SDAP layer device for the first bearer structure 401a is not configured in the system information, the RRC message, or the control message for the MBS channel, and the SDAP layer device may directly transfer data of the first bearer to the MBS application layer device without processing (for example, bypassing) the data of the first bearer. In another embodiment, SDAP layer device configuration information for the bearer may be configured in system information, an RRC message (e.g., an RRCSetup message, an RRCResume message, an RRCReconfiguration message, an RRCRelease message, or a newly defined RRC message), or a control message for an MBS channel, or mapping information between a QoS flow and a bearer may be configured or reconfigured. Presence/absence of an SDAP header for downlink data or presence/absence of an SDAP header for uplink data may be configured in the SDAP layer device configuration information. In addition, a reconfiguration or switching procedure between a unicast bearer or a multicast bearer may be supported using the mapping information between the QoS flow and the bearer. In addition, MBS services may be supported by mapping a QoS flow for the MBS service to the bearer in the SDAP configuration information for the bearer. MBS data which may be received or transmitted in the first bearer structure 401*a* may have a structure 402*a* or 403*a*. For example, the MBS data which may be received or transmitted in the first bearer structure 401*a* may have the structure 402*a* or 403*a* according to configuration information in the system information, the RRC message (e.g., the RRCSetup message, the RRCResume message, the RRCReconfiguration message, the RRCRelease message, or the newly defined RRC message), or the control message for the MBS channel.

FIG. 4B is a diagram illustrating a second bearer structure for supporting an MBS service according to an embodiment of the disclosure.

If a unicast bearer or a multicast bearer for the MBS service is established with the second bearer structure 401*b*, a terminal may configure an RLC layer device which corresponds to an MBS control data channel, an MBS user data channel, or a logical channel identifier (or an MBS service) of the MBS user data channel and which is connected to a MAC layer device. The terminal may configure a bearer structure directly connecting the RLC layer device and a upper MBS application layer device as a bearer for the MBS service. Transmission of HARQ ACK or NACK, or a HARQ retransmission procedure or a HARQ processing procedure of a MAC layer device may not be applied to the second bearer in the second bearer structure 401*b*. Alternatively, in the second bearer structure 401*b*, the terminal may transfer MBS data (MBS control data or MBS user data) received via a physical layer device or the MAC layer device to a upper MBS application layer device via the RLC layer device. In the second bearer structure 401*b*, the MBS data may not include a MAC header. For example, this is because the MBS data may be distinguished in the MAC layer device even without the MAC header if a separate physical channel or transport channel for the MBS service is configured and a separate transmission resource (a frequency or time resource or a transmission period) is configured. In another embodiment, for example, this is because the MBS data may be distinguished in the physical layer device or the MAC layer device even without the MAC header when a first RNTI is allocated or determined for the MBS data if the separate physical channel or transport channel for the MBS service is configured, and the separate transmission resource (the frequency or time resource or the transmission period) is configured. The first RNTI for the MBS data may be allocated or designated as a 1-1 RNTI for MBS control data (or an MBS control data channel) or 1-2 RNTIs for MBS user data (or per MBS user data channel, logical channel identifier, or MBS service), respectively. In another embodiment, in the second bearer structure 401*b*, a separate physical channel or transport channel for the MBS service may be configured, or the MBS service may be supported in a DL-SCH used for a normal data service. Alternatively, if a separate transmission resource (a frequency or time resource or a transmission period) is configured, MBS data may include a MAC header, and MBS control data (or an MBS control data channel), MBS user data (or per MBS user data channel, logical channel identifier, or MBS service), or the MBS service may be distinguished based on a logical channel identifier included in the MAC header, or it may be distinguished, demultiplexed, and transferred to each RLC layer device. In another embodiment, in the second bearer structure 401*b*, a separate physical channel or transport channel for the MBS service may be configured, or the MBS service may be supported in a DL-SCH used for a normal data service. Alternatively, if a separate transmission resource (a frequency or time resource or a transmission period) is configured, MBS data may be received in the transmission resource, and if the first RNTI for the MBS data is allocated or determined, the MBS data may be received in the transmission resource according to a PDCCH indication with the first RNTI. The MBS data may include a MAC header, and MBS control data (or an MBS control data channel), MBS user data (or per MBS user data channel, logical channel identifier, or MBS service), or the MBS service may be distinguished based on a logical channel identifier included in the MAC header, or it may be distinguished, demultiplexed, and transferred to each RLC layer device. That is, for a logical channel, different logical channel identifiers may be configured or defined per MBS control data channel, MBS user data channel, or MBS service, and the MBS service may be supported. The RLC layer device configured in the second bearer structure 401*b* may be configured with a Transparent Mode (TM), and MBS data may not include an RLC header. Alternatively, an RLC serial number length may not be set in the RLC layer device. Alternatively, the RLC layer device may not apply a data processing procedure to the MBS data. Further, the RLC layer device configured in the second bearer structure 401*b* may not apply a procedure for segmenting data or a procedure for reassembling data to the MBS data in the TM mode. Alternatively, the RLC layer device configured in the second bearer structure 401*b* may set an RLC reception window size to 0 or may not operate the RLC reception window. In the second bearer structure, the MAC layer device may not basically apply the transmission of HARQ ACK or NACK, the HARQ retransmission procedure, or the HARQ processing procedure to the bearer supporting the MBS service. Alternatively, configuration information of an SDAP layer device for the second bearer structure 401*b* is not configured in the system information, the RRC message, or the control message for the MBS channel, and the SDAP layer device may directly transfer data of the second bearer to the MBS application layer device without processing (for example, bypassing) the data of the second bearer. In another embodiment, SDAP layer device configuration information for the bearer may be configured in system information, an RRC message (e.g., an RRCSetup message, an RRCResume message, an RRCReconfiguration message, an RRCRelease message, or a newly defined RRC message), or a control message for an MBS channel, or mapping information between a QoS flow and a bearer may be configured or reconfigured. Presence/absence of an SDAP header for downlink data or presence/absence of an SDAP header for uplink data may be configured in the SDAP layer device configuration information. In addition, a reconfiguration or switching procedure between a unicast bearer or a multicast bearer may be supported using the mapping information between the QoS flow and the bearer. In addition, MBS services may be supported by mapping a QoS flow for the MBS service to the bearer in the SDAP configuration information for the bearer. MBS data which may be received or transmitted in the second bearer structure 401b may have a structure 402b. For example, the MBS data which may be received or transmitted in the second bearer structure 401b may have the structure 402b according to configuration information in the system information, the RRC message (e.g., the RRCSetup message, the RRCResume message, the RRCReconfiguration message, the RRCRelease message, or the newly defined RRC message), or the control message for the MBS channel.

FIG. 4C is a diagram illustrating a third bearer structure for supporting an MBS service according to an embodiment of the disclosure.

If a unicast bearer or a multicast bearer for the MBS service is established with the third bearer structure 401c, a terminal may configure an RLC layer device which corresponds to an MBS control data channel, an MBS user data channel, or a logical channel identifier (or an MBS service) of the MBS user data channel and which is connected to a MAC layer device. The terminal may configure a bearer structure directly connecting the RLC layer device and a upper MBS application layer device as a bearer for the MBS service. Transmission of HARQ ACK or NACK, or a HARQ retransmission procedure or a HARQ processing procedure of a MAC layer device may not be applied to the third bearer in the third bearer structure. In another embodiment, whether the transmission of HARQ ACK or NACK, or the HARQ retransmission procedure or the HARQ processing procedure of the MAC layer device will be performed may be configured with an indicator in system information, an RRC message (e.g., an RRCSetup message, an RRCResume message, an RRCReconfiguration message, an RRCRelease message, or a newly defined RRC message), or a control message for an MBS channel. For example, if an indicator is configured to perform the transmission of HARQ ACK or NACK, or the HARQ retransmission procedure or the HARQ processing procedure in the system information, the RRC message, or the control message for the MBS channel (if an indicator value indicates a specific value or if there is no indicator field), it may be performed. Alternatively, if the indicator is configured not to perform the transmission of HARQ ACK or NACK, or the HARQ retransmission procedure or the HARQ processing procedure (if the indicator value indicates a specific value or if there is no indicator field), it may not be performed. Alternatively, in the MAC layer device, the transmission of HARQ ACK or NACK, or the HARQ retransmission procedure or the HARQ processing procedure may not basically applied to the bearer supporting the MBS service. Alternatively, the indicator may be configured for the MBS control data channel, the MBS user data channel, or a logical channel identifier (or an MBS service) or a bearer identifier of the MBS user data channel, respectively. In another embodiment, if the transmission of HARQ ACK or NACK, or the HARQ retransmission procedure or the HARQ processing procedure of the MAC layer device is performed or configured, or it is configured for a specific logical channel identifier, MBS service, or bearer, an indicator (if an indicator value indicates a specific value or if there is no indicator field) may be configured to perform a HARQ reordering or RLC reordering function (RLC reordering or in-order delivery) for the RLC layer device configured for the MBS control data channel, the MBS user data channel, or the logical channel identifier (or the MBS service) or the bearer identifier of the MBS user data channel in the system information, the RRC message (e.g., the RRCSetup message, the RRCResume message, the RRCReconfiguration message, the RRCRelease message, or the newly defined RRC message), or the control message for the MBS channel. Alternatively, an RLC reception window size may be set to a value (for example, $2^{(RLC\ serial\ number\ length-1)}$) greater than 0 and operated. This is because if a HARQ process or retransmission is performed on the MBS data, an order of data may be mixed, so reordering needs to be performed on the MBS data based on an RLC reception window or based on an RLC serial number, or the MBS service may sequentially be supported in order only when a reordering timer is driven. In another embodiment, if the transmission of HARQ ACK or NACK, or the HARQ retransmission procedure or the HARQ processing procedure of the MAC layer device is not performed or configured not to be performed, an indicator (if an indicator value indicates a specific value or if there is no indicator field) may be configured not to perform a HARQ reordering or RLC reordering function for the RLC layer device configured for the MBS control data channel, the MBS user data channel, or the logical channel identifier (or the MBS service) or the bearer identifier of the MBS user data channel in the system information, the RRC message (e.g., the RRCSetup message, the RRCResume message, the RRCReconfiguration message, the RRCRelease message, or the newly defined RRC message), or the control message for the MBS channel. Alternatively, the transmission of HARQ ACK or NACK, the HARQ retransmission procedure, or the HARQ processing procedure is not basically applied to the bearer supporting the MBS service in the MAC layer device, thereby the HARQ reordering or RLC reordering function may not basically performed in the RLC layer device configured for the bearer supporting the MBS service. Alternatively, the RLC reception window may not be operated by setting the RLC reception window size to 0. For example, in the absence of the configuration information or by default, the terminal may transfer data always received in the RLC layer device to the upper layer device in an out-of-order delivery method regardless of the order. Alternatively, in the third bearer structure 401c, the terminal may transfer MBS data (MBS control data or MBS user data) received via the physical layer device or the MAC layer device to the upper MBS application layer device via the RLC layer device. In the third bearer structure 401c, the MBS data may include a MAC header. Alternatively, a logical identifier included in the MAC header may be set or defined to indicate an MBS control data channel, an MBS user data channel, or each MBS service. For example, if a separate physical channel or transport channel for the MBS service is configured and a separate transmission resource (a frequency or time resource or a transmission period) is configured, when the first RNTI for MBS data is allocated or determined, the physical layer device or the MAC layer device may distinguish whether the MBS data is MBS control data, MBS user data, or data for a certain MBS service based on an RNTI or a logical channel identifier, or may distinguish, demultiplex and transfer it to each RLC layer device. The first RNTI for the MBS data may be allocated or designated as a 1-1 RNTI for MBS control data (or an MBS control data channel) or 1-2 RNTIs for MBS user data (or per MBS user data channel, logical channel identifier, or MBS service), respectively. In another embodiment, in the third bearer structure 401c, a separate physical channel or transport channel for the MBS service may be configured, or the MBS service is supported in a DL-SCH used for a normal data service. Alternatively, if a separate transmission resource (a frequency or time resource or a transmission period) is configured, MBS data may include a MAC header, and MBS control data (or an MBS control data channel), MBS user data (or per MBS user data channel, logical channel identifier, or MBS service), or the MBS service may be distinguished based on a logical channel identifier included in the MAC header, or it may be distinguished, demultiplexed, and transferred to each RLC layer device. In another embodiment, in the third bearer structure 401c, a separate physical channel or transport channel for the MBS service may be configured, or the MBS service is supported in a DL-SCH used for a normal data service. Alternatively, if a separate transmission resource (a frequency or time resource or a transmission period) is configured, MBS data may be received in the transmission resource, and if the first RNTI for the MBS data is allocated or determined, the MBS data may be received in the transmission resource according to a PDCCH indication with the first RNTI. The MBS data may include a MAC header, and MBS control data (or an MBS control data channel), MBS user data (or per MBS user data channel, logical channel identifier, or MBS service), or the MBS service may be distinguished based on a logical channel identifier included in the MAC header, or it may be distinguished, demultiplexed, and transferred to each RLC layer device. That is, for a logical channel, different logical channel identifiers may be configured or defined per MBS control data channel, MBS user data channel, or MBS service, and the MBS service may be supported. An RLC layer device configured in the third bearer structure may be configured with a TM, a UM, a uni-directional mode of a UM mode, a bi-directional mode of the UM mode, or an AM mode. In an RLC TM mode, the MBS data may not include an RLC header, and in an RLC UM mode or AM mode, the RLC header may be included. In addition, in the RLC TM mode, the RLC layer device may not apply a data processing procedure to the MBS data (for example, a data segmentation procedure or a reassembly procedure may not be applied), and in the RLC UM mode or AM mode, a data processing procedure may be applied to the MBS data. Alternatively, configuration information of an SDAP layer device for the third bearer structure 401c is not configured in the system information, the RRC message, or the control message for the MBS channel, and the SDAP layer device may directly transfer data of the third bearer to the MBS application layer device without processing (for example, bypassing) the data of the third bearer. In another embodiment, SDAP layer device configuration information for the bearer may be configured in system information, an RRC message (e.g., an RRCSetup message, an RRCResume message, an RRCReconfiguration message, an RRCRelease message, or a newly defined RRC message), or a control message for an MBS channel, or mapping information between a QoS flow and a bearer may be configured or reconfigured. Presence/absence of an SDAP header for downlink data or presence/absence of an SDAP header for uplink data may be configured in the SDAP layer device configuration information. In addition, a reconfiguration or switching procedure between a unicast bearer or a multicast bearer may be supported using the mapping information between the QoS flow and the bearer. In addition, MBS services may be supported by mapping a QoS flow for the MBS service to the bearer in the SDAP configuration information for the bearer. MBS data which may be received or transmitted in the third bearer structure 401c may have a structure 402c or 403c. For example, the MBS data which may be received or transmitted in the third bearer structure 401c may have the structure 402c or 403c according to configuration information in the system information, the RRC message (e.g., the RRCSetup message, the RRCResume message, the RRCReconfiguration message, the RRCRelease message, or the newly defined RRC message), or the control message for the MBS channel. If it is configured to perform the transmission of HARQ ACK or NACK, or the HARQ retransmission procedure or the HARQ processing procedure of the MAC layer device, or if it is configured to perform it with an indicator in the system information, the RRC message (e.g., the RRCSetup message, the RRCResume message, the RRCReconfiguration message, the RRCRelease message, or the newly defined RRC message), or the control message for the MBS channel, transmission resource (e.g., a time or frequency resource, a transport channel, frequency spacing, and/or the like) information for transmitting HARQ ACK or NACK may be transmitted together. If it is configured to perform the transmission of HARQ ACK or NACK, or the HARQ retransmission procedure or the HARQ processing procedure, the terminal in the RRC connected mode, the RRC inactive mode, or the RRC idle mode may transmit HARQ ACK or NACK via the configured transmission resource (e.g., a physical transmission resource) after receiving downlink MBS data. If the base station detects at least one NACK in the transmission resource or detects that at least one terminal has transmitted a NACK, the base station may perform retransmission for the MBS data. Alternatively, retransmission may be performed so that all terminals may receive it via the MBS channel. In another embodiment, after receiving the downlink MBS data, the terminal in the RRC connected mode, the RRC inactive mode, or the RRC idle mode may define MAC control information (or RLC control information, PDCP control information, or an RRC message), and may cause the base station to indicate which terminal has not successfully receive data (for example, the MAC control information (or the RLC control information, the PDCP control information, or the RRC message) may be transmitted in the configured transmission resource) by including a terminal identifier, an MBS service identifier, a logical channel identifier, an RNTI identifier, or a bearer identifier into the MAC control information (or the RLC control information, the PDCP control information, or the RRC message) to transmit the MAC control information. The base station may perform retransmission for the MBS data only to a terminal in the RRC connected mode, the RRC idle mode, or the RRC inactive mode which transmits NACK in the transmission resource, or which indicates that successful reception is not achieved. In another embodiment, if the base station detects the at least one NACK in the transmission resource or detects that the at least one terminal has transmitted the NACK, the base station may perform the retransmission for the MBS data. Alternatively, retransmission may be performed so that all terminals may receive it via the MBS channel.

Figure 4D:
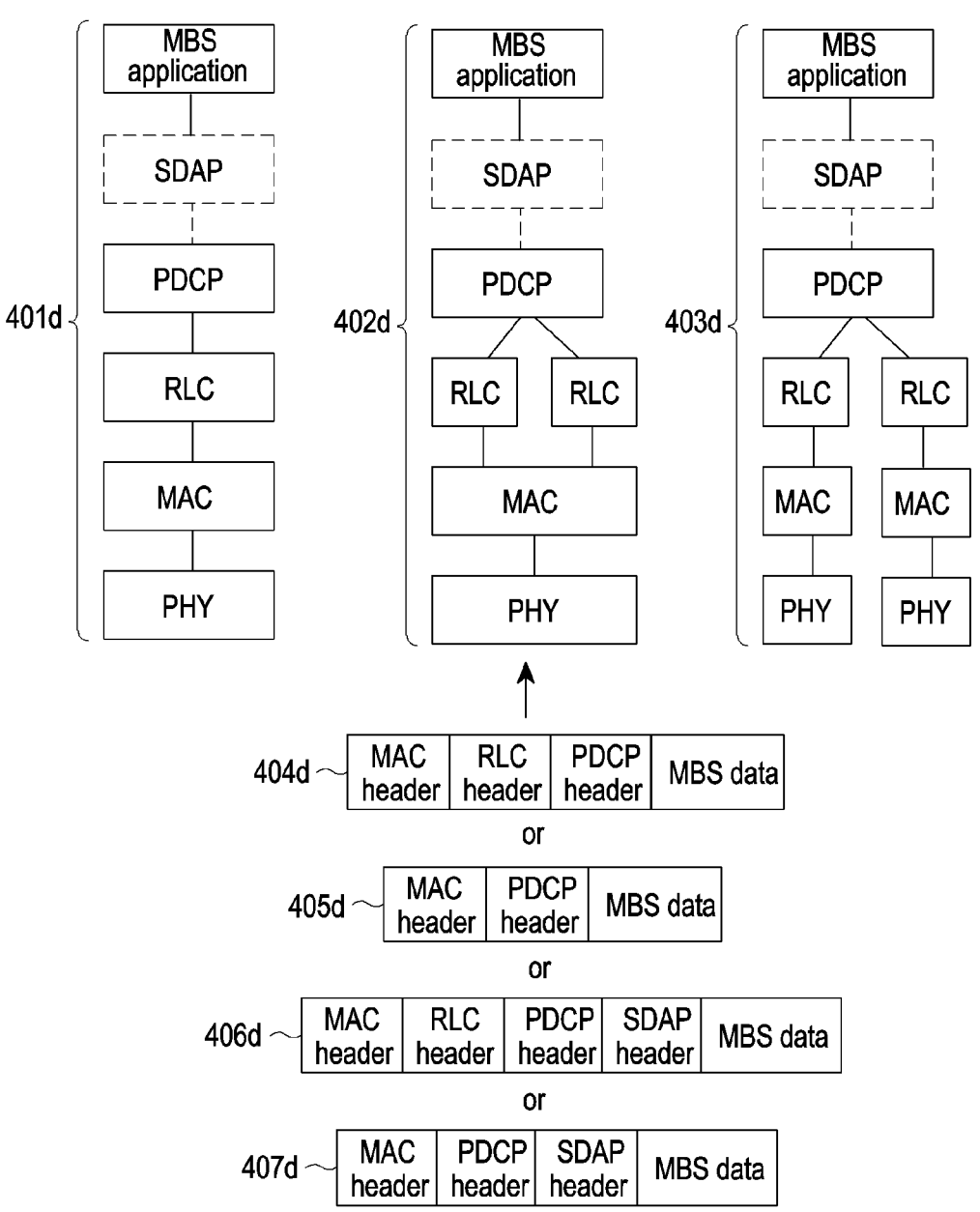

FIG. 4D is a diagram illustrating a fourth bearer structure for supporting an MBS service according to an embodiment of the disclosure.

If a unicast bearer or a multicast bearer for an MBS service is configured with the fourth bearer structure 401d, 402d, or 403d, a terminal may configure an RLC layer device which is connected to a MAC layer device and which corresponds to an MBS control data channel, an MBS user data channel, or a logical channel identifier (or an MBS service) of the an MBS user data channel. Each RLC layer device may be configured for each MBS service or each MBS service type (e.g., a multicast service (PTM, and Point to Multicast MBS service) or a unicast service (Point to Point MBS service)), and may be configured as in 401d, 402d, or 403d to be connected to one base station (or one MAC layer device) or a plurality of base stations (or a plurality of MAC layer devices) to receive a service. In the configuration information, a PDCP layer device connected to each RLC layer device or a plurality of RLC layer devices may be configured, and a bearer structure directly connecting the PDCP layer device to an upper MBS application layer device may be configured as a bearer for the MBS service.

In the fourth bearer structure as in step 402d, a base station configures a first RLC layer device for a multicast service and a second RLC layer device for a unicast service in one PDCP layer device, thereby facilitating switching (PTM to PTP switching or PTP to PTM switching) or change between a multicast service scheme and a unicast scheme. In the fourth bearer structure as in 402d, the base station may transmit MBS service data to the first RLC layer device or the second RLC layer device. An indicator (e.g., an indicator indicating PTP or PTM, an MBS service identifier, an indicator indicating a primary RLC device, a cell group identifier, or a logical channel identifier) may be configured in an RRC message so that the first RLC layer device (e.g., an RLC layer device for a multicast service, a primary RLC layer device, or a secondary RLC layer device) or the second RLC layer device (e.g., an RLC layer device for a unicast service, a primary RLC layer device, or a secondary RLC layer device) may be distinguished, or the first RLC layer device or the second RLC layer device may be configured as a primary RLC layer device or a secondary RLC layer device, respectively to be distinguished.

In the fourth bearer structure as in step 403d, a base station may configure a first RLC layer device for a multicast service and a second RLC layer device for a unicast service in one PDCP layer device, and facilitate switching or change between a multicast service scheme and a unicast scheme. In the fourth bearer structure as in 403d, the base station may transmit MBS service data to the first RLC layer device or the second RLC layer device, and may configure the terminal to receive MBS service data from different base stations by connecting the first RLC layer device or the second RLC layer device with a MAC or physical layer device which corresponds to different base stations (a first base station or a second base station), respectively, like a dual access technology. An indicator (e.g., an indicator indicating PTP or PTM, an MBS service identifier, an indicator indicating a primary RLC device, a cell group identifier, or a logical channel identifier) may be configured in an RRC message so that the first RLC layer device (e.g., an RLC layer device for a multicast service, a primary RLC layer device, or a secondary RLC layer device) or the second RLC layer device (e.g., an RLC layer device for a unicast service, a primary RLC layer device, or a secondary RLC layer device) may be distinguished. Alternatively, the first RLC layer device or the second RLC layer device may be configured as a primary RLC layer device or a secondary RLC layer device, respectively to be distinguished.

The fourth bearer structure, such as 401d, 402d, or 403d may configure a plurality of RLC devices in one PDCP layer device for each MBS service or each MBS service type (e.g., a multicast service or a unicast service) to support an MBS service. RLC layer devices configured in the fourth bearer structure may be configured in with a UM mode, an AM mode, or a TM mode. For example, an RLC layer device supporting a multicast service (PTM) may be configured with a UM mode, or an RLC layer device supporting a unicast service (PTP) may be configured with a UM mode or an AM mode. In the fourth bearer structure, transmission of HARQ ACK or NACK, a HARQ retransmission procedure, or a HARQ processing procedure of a MAC layer device may not be applied to the fourth bearer.

In another embodiment, whether the transmission of HARQ ACK or NACK, or the HARQ retransmission procedure or the HARQ processing procedure of the MAC layer device will be performed may be configured via an indicator in system information, an RRC message (e.g., an RRCSetup message, an RRCResume message, an RRCReconfiguration message, an RRCRelease message, or a newly defined RRC message), or a control message for an MBS channel. For example, if an indicator is configured to perform the transmission of HARQ ACK or NACK, or the HARQ retransmission procedure or the HARQ processing procedure in the system information, the RRC message, or the control message for the MBS channel (if an indicator value indicates a specific value or if there is no indicator field), it may be performed. Alternatively, if the indicator is configured not to perform the transmission of HARQ ACK or NACK, or the HARQ retransmission procedure or the HARQ processing procedure (if the indicator value indicates a specific value or if there is no indicator field), it may not be performed, or in the MAC layer device, the transmission of HARQ ACK or NACK, or the HARQ retransmission procedure or the HARQ processing procedure may not basically applied to the bearer supporting the MBS service. Alternatively, the indicator may be configured for the MBS control data channel, the MBS user data channel, or a logical channel identifier (or an MBS service) or a bearer identifier of the MBS user data channel, respectively. In another embodiment, if the transmission of HARQ ACK or NACK, or the HARQ retransmission procedure or the HARQ processing procedure of the MAC layer device is performed or configured, or it is configured for a specific logical channel identifier, MBS service, or bearer, an indicator (if an indicator value indicates a specific value or if there is no indicator field) may be configured to perform a HARQ reordering or RLC reordering function for the RLC layer device configured for the MBS control data channel, the MBS user data channel, or the logical channel identifier (or the MBS service) or the bearer identifier of the MBS user data channel in the system information, the RRC message (e.g., the RRCSetup message, the RRCResume message, the RRCReconfiguration message, the RRCRelease message, or the newly defined RRC message), or the control message for the MBS channel. Alternatively, an RLC reception window size may be set to a value (for example, $2^{(RLC\ serial\ number\ length-1)}$) greater than 0 and operated. This is because if a HARQ process or retransmission is performed on the MBS data, an order of data may be mixed, so reordering is performed on the MBS data based on an RLC reception window or based on an RLC serial number, or the MBS service may sequentially be supported in order only when a reordering timer is driven.

In another embodiment, if the transmission of HARQ ACK or NACK, or the HARQ retransmission procedure or the HARQ processing procedure of the MAC layer device is not performed or configured not to be performed, an indicator (if an indicator value indicates a specific value or if there is no indicator field) may be configured not to perform a HARQ reordering or RLC reordering function for the RLC layer device configured for the MBS control data channel, the MBS user data channel, or the logical channel identifier (or the MBS service) or the bearer identifier of the MBS user data channel in the system information, the RRC message (e.g., the RRCSetup message, the RRCResume message, the RRCReconfiguration message, the RRCRelease message, or the newly defined RRC message), or the control message for the MBS channel. Alternatively, the transmission of HARQ ACK or NACK, the HARQ retransmission procedure, or the HARQ processing procedure is not basically applied to the bearer supporting the MBS service in the MAC layer device, thereby the HARQ reordering or RLC reordering function may not basically performed in the RLC layer device configured for the bearer supporting the MBS service. Alternatively, if the MAC layer device does not perform the transmission of HARQ ACK or NACK, the HARQ retransmission procedure, or the HARQ processing procedure, or if it is configured not to perform, the RLC reception window of an RLC layer device of the MBS bearer may not be operated by setting the RLC reception window size to 0. For example, in the absence of the configuration information or by default, the terminal may transfer data always received in the RLC layer device to the upper layer device in an out-of-order delivery method regardless of the order. Alternatively, in the fourth bearer structure, the terminal may transfer MBS data (MBS control data or MBS user data) received via the physical layer device or the MAC layer device to the upper MBS application layer device via the RLC layer device or the PDCP layer device. In the fourth bearer structure, the MBS data may include a MAC header. Alternatively, a logical channel identifier included in the MAC header may be set or defined to indicate an MBS control data channel, an MBS user data channel, or each MBS service. For example, if a separate physical channel or transport channel for the MBS service is configured and a separate transmission resource (a frequency or time resource or a transmission period) is configured, when the first RNTI for MBS data is allocated or determined, the physical layer device or the MAC layer device may distinguish whether the MBS data is MBS control data, MBS user data, or data for a certain MBS service based on an RNTI or a logical channel identifier, or may distinguish, demultiplex and transfer it to each RLC layer device. The first RNTI for the MBS data may be allocated or designated as a 1-1 RNTI for MBS control data (or an MBS control data channel) or 1-2 RNTIs for MBS user data (or per MBS user data channel, logical channel identifier, or MBS service), respectively.

In another embodiment, in the third bearer structure 401c, a separate physical channel or transport channel for the MBS service may be configured, or the MBS service is supported in a DL-SCH used for a normal data service, or if a separate transmission resource (a frequency or time resource or a transmission period) is configured, MBS data may include a MAC header, and MBS control data (or an MBS control data channel), MBS user data (or per MBS user data channel, logical channel identifier, or MBS service), or the MBS service may be distinguished based on a logical channel identifier included in the MAC header, or it may be distinguished, demultiplexed, and transferred to each RLC layer device.

In another embodiment, in the fourth bearer structure, a separate physical channel or transport channel for the MBS service may be configured, or the MBS service may be supported in a DL-SCH used for a normal data service. If a separate transmission resource (a frequency or time resource or a transmission period) is configured, MBS data may be received in the transmission resource, and if the first RNTI for the MBS data is allocated or determined, the MBS data may be received in the transmission resource according to a PDCCH indication with the first RNTI. The MBS data may include a MAC header. Alternatively, MBS control data (or an MBS control data channel), MBS user data (or per MBS user data channel, logical channel identifier, or MBS service), or the MBS service may be distinguished based on a logical channel identifier included in the MAC header, or it may be distinguished, demultiplexed, and transferred to each RLC layer device. That is, for a logical channel, different logical channel identifiers may be configured or defined per MBS control data channel, MBS user data channel, or MBS service, and the MBS service may be supported. An RLC layer device configured in the fourth bearer structure may be configured with one of a TM mode, a UM mode, a unidirectional mode of a UM mode, a bi-directional mode of the UM mode, or AM modes. In an RLC TM mode, the MBS data may not include an RLC header. In an RLC UM mode or AM mode, the RLC header may be included. In addition, in the RLC TM mode, the RLC layer device may not apply a data processing procedure to the MBS data (for example, a data segmentation procedure or a reassembly procedure may not be performed). In the RLC UM mode or AM mode, a data processing procedure may be applied to the MBS data. For the fourth bearer structure, an RLC layer device may be configured with a TM mode in system information, an RRC message (e.g., an RRCSetup message, an RRCResume message, an RRCReconfiguration message, an RRCRelease message, or a newly defined RRC message), or a control message for an MBS channel, thereby reducing overhead for MBS data (for example, overhead may be reduced by not using an RLC header). For the fourth bearer structure, an out-of-order delivery function may be configured in a PDCP layer device in system information, an RRC message (e.g., an RRCSetup message, an RRCResume message, an RRCReconfiguration message, an RRCRelease message, or a newly defined RRC message), or a control message for an MBS channel, thereby preventing transmission delay of MBS data.

In another embodiment, in the fourth bearer structure for the MBS bearer, if HARQ retransmission, a HARQ ACK/NACK indication procedure, or a HARQ processing procedure is not performed or configured not to be performed, or if an RLC UM mode (or an RLC TM mode) is configured, a PDCP layer device is configured to basically (for example, an out-of-order delivery indicator is always set to True) performs an out-of-order delivery function or to set a PDCP reordering timer value to 0, and not to perform a reordering procedure even if a gap of a PDCP serial number (or a COUNT value) occurs (received data is transferred to a upper layer device immediately after data processing (e.g., a PDCP header removal or decoding procedure, an integrity verification procedure, or a header decompression procedure) of a receiving PDCP layer device without waiting for a data of a PDCP sequence number (or a COUNT value) corresponding to the gap by not triggering a reordering timer or setting a reordering timer value to 0), thereby preventing transmission delay of MBS data. This is because if the HARQ retransmission or HARQ processing procedure is not performed on the MBS data and the RLC retransmission procedure is not performed on the MBS data, when data loss occurs in the reordering function in the PDCP layer device, the reordering timer is triggered due to the gap in the PDCP serial number (or the COUNT value), and data corresponding to the gap needs to be waited for as long as the reordering timer value, so it may cause transmission delay.

In another embodiment, if the HARQ retransmission, the HARQ ACK/NACK indication procedure, or the HARQ processing procedure is performed or configured to be performed, the PDCP layer device may basically perform the PDCP reordering function. The PDCP layer device may determine a size of a reception window (e.g., a length of a PDCP serial number 16 bits, and a window size is $2^{(16-1)}$) based on the length of the PDCP serial number, and drive a reordering timer. In the fourth bearer structure, SDAP layer device configuration information may be configured in system information, an RRC message (e.g., an RRCSetup message, an RRCResume message, an RRCReconfiguration message, an RRCRelease message, or a newly defined RRC message), or a control message for an MBS channel, or mapping information between a QoS flow and a bearer may be configured or reconfigured. Presence/absence of an SDAP header for downlink data or presence/absence of an SDAP header for uplink data may be configured in the SDAP layer device configuration information. In addition, a reconfiguration or switching procedure between a unicast bearer or a multicast bearer configured in the fourth bearer structure 402d or 403d may be supported using the mapping information between the QoS flow and the bearer. A reconfiguration or switching procedure between a unicast bearer having the fourth bearer structure 401d or a multicast bearer having the fourth bearer structure 401d may be supported. If configuration information of an SDAP layer device is not configured for the fourth bearer structure in the system information, the RRC message (e.g., the RRCSetup message, the RRCResume message, the RRCReconfiguration message, the RRCRelease message, or the newly defined RRC message), or the control message for the MBS channel, the SDAP layer device may directly transfer data of the fourth bearer to the MBS application layer device without processing it (e.g., by bypassing it). In addition, MBS services may be supported by mapping a QoS flow for the MBS service to the bearer in the SDAP configuration information for the bearer. MBS data which may be received or transmitted in the fourth bearer structure may have a structure 404d, 405d, 406d, or 407d. For example, the MBS data which may be received or transmitted in the fourth bearer structure may have the structure 404d, 405d, 406d, or 407d according to configuration information in the system information, the RRC message (e.g., the RRCSetup message, the RRCResume message, the RRCReconfiguration message, the RRCRelease message, or the newly defined RRC message), or the control message for the MBS channel. If it is configured to perform the transmission of HARQ ACK or NACK, or the HARQ retransmission procedure or the HARQ processing procedure of the MAC layer device, or if it is configured to perform it via an indicator in the system information, the RRC message (e.g., the RRCSetup message, the RRCResume message, the RRCReconfiguration message, the RRCRelease message, or the newly defined RRC message), or the control message for the MBS channel, transmission resource (e.g., a time or frequency resource, a transport channel, frequency spacing, and/or the like) information for transmitting HARQ ACK or NACK may be transmitted together. If it is configured to perform the transmission of HARQ ACK or NACK, or the HARQ retransmission procedure or the HARQ processing procedure, the terminal in the RRC connected mode, the RRC inactive mode, or the RRC idle mode may receive downlink MBS data and transmit HARQ ACK or NACK via the configured transmission resource (e.g., a physical transmission resource). If the base station detects at least one NACK in the transmission resource or detects that at least one terminal has transmitted a NACK, the base station may perform retransmission for the MBS data. Alternatively, retransmission may be performed so that all terminals may receive it via the MBS channel.

In another embodiment, the terminal in the RRC connected mode, the RRC inactive mode, or the RRC idle mode may receive downlink MBS data, define MAC control information (or RLC control information, PDCP control information, or an RRC message), and may indicate which terminal has not successfully receive data to the base station receiving MAC control information by transmitting the MAC control information including at least one of a terminal identifier, an MBS service identifier, a logical channel identifier, an RNTI identifier, or a bearer identifier (for example, the terminal may transmit the MAC control information in a configured transmission resource). The base station may perform retransmission for the MBS data only to a terminal in the RRC connected mode, the RRC idle mode, or the RRC inactive mode which transmits NACK in the transmission resource, or which indicates that successful reception is not achieved. If the base station detects the at least one NACK in the transmission resource or detects that the at least one terminal has transmitted the NACK, the base station may perform the retransmission for the MBS data. Retransmission may be performed so that all terminals may receive it via the MBS channel.

When a terminal receives system information, when the terminal intends to receive a service of interest, when the terminal has the service of interest, when the terminal determines the service of interest, when the terminal exists in or enters a cell or area supporting an MBS service in the system information, when the terminal configures or connects to the MBS service (or session), or when configuration information or bearer configuration information for the MBS service is received or broadcasted via the system information, an RRC message (e.g., an RRCSetup message, an RRCResume message, an RRCReconfiguration message, an RRCRelease message, or a newly defined new RRC message), or a control message for an MBS channel (for example, transmitted on an MBS control data channel), the terminal may configure a unicast bearer, a multicast bearer, or an MBS bearer, which has a bearer structure in FIGS. 4A to 4D, for receiving the MBS service.

If the base station configures the fourth bearer structure (401d, 402d, or 403d) to the terminal, the base station may configure a first RLC layer device for a multicast service and a second RLC layer device for a unicast service in one PDCP layer device. The base station may support the MBS service to the terminal while dynamically switching to a multicast scheme or a unicast scheme in consideration of at least one of a transmission resource of the base station, a scheduling resource, or mobility of the terminal, so a service with low transmission delay or with no or low data loss may be supported.

In the fourth bearer structure 401d, 402d, or 403d, pieces of MBS service data received in the first RLC layer device for a multicast service may include pieces of data (e.g., data having a logical channel identifier corresponding to the multicast service, data received in a transmission resource allocated for the multicast service, or data received according to DCI indication of a PDCCH scrambled with an RNTI identifier for the multicast service) received in a transmission resource for supporting the multicast service to a plurality of terminals. The plurality of terminals may receive the pieces of MBS service data (e.g., common MBS data) in the same transmission resource, and receive and process the pieces of MBS service data in a first RLC layer device for the multicast service configured in each terminal.

In the fourth bearer structure 401d, 402d, or 403d, pieces of MBS service data received in the second RLC layer device for a unicast service may include pieces of data (e.g., data having a logical channel identifier corresponding to the unicast service, data received in a transmission resource allocated for the unicast service, or data received according to DCI indication of a PDCCH scrambled with an RNTI identifier for the unicast service) received in a transmission resource for supporting the unicast service of each terminal. One terminal (one terminal which corresponds to the unicast service or which receives the unicast service (or which is configured to receive the unicast service)) may receive the pieces of MBS service data in the same transmission resource, and receive and process the pieces of MBS service data in a second RLC layer device for the unicast service configured in the one terminal. For example, for the unicast service, each terminal may receive unicast data for each terminal in different transmission resources (a transmission resource for each terminal), not the same transmission resource. So, different terminals may receive data (e.g., data having a logical channel identifier corresponding to the unicast service of the terminal, data received in a transmission resource allocated for the unicast service of the terminal, or data received according to DCI indication of a PDCCH scrambled with an RNTI identifier for the unicast service of the terminal) for each terminal in each transmission resource allocated to receive different unicast services, respectively, and process the data in the second RLC layer device for the unicast service configured in each terminal.

So, if the base station supports the MBS service by configuring the fourth bearer structure 401d, 402d, or 403d to a plurality of terminals, the base station may transmit the same MBS service data to the plurality of terminals via one transmission resource in a multicast scheme (each terminal may receive the MBS service data in an RLC layer device for the multicast service (or an RLC layer device configured with a logical channel identifier corresponding to the multicast service)). The base station may transmit MBS service data to each terminal in different transmission resources in a unicast scheme (each terminal may receive the MBS service data in an RLC layer device for the unicast service (or an RLC layer device configured with a logical channel identifier corresponding to the unicast service)). So, if the MBS service is provided to the plurality of terminals in the multicast scheme, a transmission resource may be saved and the transmission resource may be efficiently used. Meanwhile, if the MBS service is provided to each terminal in the unicast scheme, the MBS service which satisfies a QoS or requirement requested by each terminal may be supported.

For example, the base station may configure the fourth bearer structure 401d, 402d, or 403d to the plurality of terminals, and transmit a common control message or request message (e.g., whether the MBS service is received, the preference of the MBS service, whether the MBS service is currently received, whether an MBS service type is switched (e.g., switching from PTM to PTP or from PTP to PTM), or a frequency measurement result request)) to the plurality of terminals receiving the MBS service at one time via an RLC layer device for the multicast service (an RLC layer device configured with a logical channel identifier corresponding to the multicast service) in a common transmission resource, thereby saving a transmission resource. The base station may transmit an individual control message or request message (e.g., whether the MBS service is received, the preference of the MBS service, whether the MBS service is currently received, whether an MBS service type is switched (e.g., switching from PTM to PTP or from PTP to PTM), or a frequency measurement result request)) to each terminal receiving the MBS service via an RLC layer device for the unicast service (an RLC layer device configured with a logical channel identifier corresponding to the unicast service) in a each transmission resource allocated to each terminal, thereby individually controlling and scheduling each terminal.

The base station may transmit a duplicate MBS data service to terminals for which the fourth bearer structure 401d, 402d, or 403d has been configured via the RLC layer device for the multicast service (the RLC layer device configured with the logical channel identifier corresponding to the multicast service) or the RLC layer device for the unicast service (the RLC layer device configured with the logical channel identifier corresponding to the unicast service), thereby increasing reliability for the MBS service of the terminal and reducing the possibility of data loss. In addition, packet duplicate transmission may be performed in a upper layer device (e.g., a PDCP layer device).

The fourth bearer structure 401d, 402d, or 403d may be used usefully for a switching or changing procedure of an MBS service type (e.g., changing from a multicast service (PTM) to a unicast service (PTP) or changing from a unicast service (PTP) to a multicast service (PTM)). For example, the base station may indicate the switching or changing procedure of the MBS service type for an MBS bearer configured for a terminal for which the fourth bearer structure is configured or which receives the MBS service based on at least one of an RRC message, an MBS control message, MAC control information, PDCP control data, or RLC control data.

In another embodiment, if data is received in the RLC layer device for the multicast service configured in the MBS bearer, the terminal may determine that changing from the unicast service (PTP) to the multicast service (PTM) is indicated from the base station. If data is received in the RLC layer device for the unicast service configured in the MBS bearer, the terminal may determine that changing from the multicast service (PTM) to the unicast service (PTP) is indicated from the base station (UE autonomous MBS bearer switching).

1> If the base station indicates switching from the multicast service (PTM) to the unicast service (PTP) to the terminal, the terminal may perform the following procedures for the MBS bearer in order to continue to receive the MBS service without error or data loss or prevent a problem in a reception window operation.

2> In a PDCP layer device connected to an RLC layer device for a multicast service or an RLC layer device for a unicast service in the fourth bearer structure, the terminal may not perform an initialization procedure on window variables (e.g., RX_NEXT (a variable indicating a COUNT value of data (a PDCP SDU) expected to be received next), RX_DELIV (a variable indicating a COUNT value of first data (a PDCP SDU) not transferred to a upper layer device, or data still waiting to be received), or RX_REORD (a variable indicating a next COUNT value (or a COUNT value incremented by 1) of a COUNT value of data (PDCP data PDU) triggering a PDCP reordering timer, or may use the PDCP reordering timer as it is without initializing the PDCP reordering timer. This is because information (e.g., a PDCP status report) about data which is retransmitted or is not received is transmitted to the base station to recover data loss, thereby minimizing data loss because a COUNT value (or a PDCP serial number) of the data by the window variables is maintained if the window variables are not initialized or the PDCP reordering timer is not initialized (if it is running, it is kept running) and then is used as it is. In another embodiment, to facilitate synchronization for window variables with the base station and to reduce data transmission delay, the terminal may perform a PDCP re-establishment procedure or a PDCP data recovery procedure in the PDCP layer device, initialize the window variables, or stop (or initializes) the PDCP reordering timer, and perform data processing on stored (or received) data and transfer it to the upper layer device. The window variables may be initialized to a value of 0, or in order for the base station to easily manage the window variables (for example, in order for the terminal to synchronize the window variables based on received data even though the base station does not initialize the window variables), the window variables may be initialized based on received data. For example, the RX_NEXT variable may be initialized to a combination of a PDCP serial number of data (a PDCP data PDU or a PDCP SDU) firstly received after a change indication from a multicast service (PTM) to a unicast service (PTP)+1 or an HFN value initialized to 0 (or a previously used HFN value, an HFN value determined by terminal implementation, or an HFN value included in the change indication). The RX_DELIV variable may be initialized to the initialized RX_NEXT value or the combination of the PDCP serial number of the data (the PDCP data PDU or the PDCP SDU) firstly received after the change indication+1 or the HFN value initialized to 0 (or the previously used HFN value, the HFN value determined by the terminal implementation, or the HFN value included in the change indication). The RX_REORD value may be initialized to the initialized RX_NEXT value or the combination of the PDCP serial number of the data (the PDCP data PDU or the PDCP SDU) firstly received after the change indication+1 or the HFN value initialized to 0 (or the previously used HFN value, the HFN value determined by the terminal implementation, or the HFN value included in the change indication). In another embodiment, initialization for the RX_REORD variable may be omitted so that the reordering timer is driven. In another embodiment, the RX_DELIV may be initialized to a value obtained by subtracting a reception window size (or half of the reception window size) from the RX_NEXT value and adding 1 thereto. In another embodiment, to facilitate base station implementation, the window variables may initialized to each initialization value (reference values or initial values) for the variables included in the indication information (an RRC message, system information, MAC control information, or PDCP control data) indicated by the base station.

2> Upon receiving the change indication from the multicast service (PTM) to the unicast service (PTP) from the base station, the terminal may report to the base station whether data has been successfully received, and the base station may configure a PDCP status report to transmit the PDCP status report to an RLC layer device for a unicast service (or an RLC layer device configured with a logical channel identifier which corresponds to the unicast service) in order to perform retransmission for reducing loss. Upon receiving the PDCP status report, the base station may retransmit data via the RLC layer device for the unicast service based on the PDCP status report. If the terminal transmits the PDCP status report via the RLC layer device for the unicast service, the base station may easily distinguish which terminal the PDCP status report is for. In addition, if the base station performs retransmission via the RLC layer device for the unicast service, the base station may prevent waste of a transmission resource by performing the retransmission via an individual transmission resource. In another embodiment, the terminal may transmit a PDCP status report in an RLC layer device for multicast. In another embodiment, upon receiving the change indication, the terminal may report to the base station whether data has been successfully received, and the base station may configure a PDCP status report to transmit the PDCP status report to an RLC layer device for a multicast service (or an RLC layer device configured with a logical channel identifier which corresponds to the multicast service) in order to perform retransmission for reducing loss. Upon receiving the PDCP status report, the base station may retransmit data via an RLC layer device for the multicast service or the unicast service based on the PDCP status report. If the terminal transmits the PDCP status report via the RLC layer device for the multicast service, the base station may easily detect PDCP status reports of all terminals.

2> The terminal may still receive data via the RLC layer device for the multicast service in the fourth bearer structure. This is because the terminal may receive data transmitted late. In another embodiment, the RLC layer device may be released or re-established (initialization of window variables or discard of stored divided data), thereby facilitating window variable synchronization of the RLC layer device in the base station and quickly discarding unnecessary data.

2> The terminal may not perform an initialization procedure on the window variables (for example, in a case of UM mode, RX_Next_Reassembly (a variable indicating the smallest (or the fastest) RLC serial number value which is still under consideration for reassembly), RX_Timer_Trigger (a variable indicating an RLC serial number which is 1 greater than an RLC serial number which triggers the RLC reassembly timer, or which is after the RLC serial number which triggers the RLC reassembly timer), or RX_Next_Highest (a variable indicating an RLC serial number which is 1 greater than an RLC serial number which is the highest among received data (UMD PDUs), or which is after the RLC serial number which is the highest among the received data), or for example, in a case of AM mode, RX_Next (a variable indicating an RLC serial number which is 1 greater than an RLC serial number of the last completely received data (an RLC SDU) in sequence, or which is after the RLC serial number of the last completely received data, RX_Next_Status_Trigger (a variable indicating an RLC serial number which is 1 greater than an RLC serial number which triggers the RLC reassembly timer, or which is after the RLC serial number which triggers the RLC reassembly timer), or RX_Highest_Status (a variable indicating a highest RLC serial number which may be indicated with ACK_SN (a variable indicating an RLC serial number of the next data (an RLC SDU) which has not been reported as lost in the RLC status report or has not yet been received)) or may use an RLC reassembly timer as it is without initializing the RLC reassembly timer in the RLC layer device for the unicast service (or the RLC layer device configured with the logical channel identifier which corresponds to the unicast service). This is because it is easy to implement the terminal or the base station (for example, no additional procedure is required) because an RLC serial number of data by the window variables is maintained if the window variables are not initialized or the RLC reassembly timer is not initialized (if it is running, it is kept running) and then is used as it is. In another embodiment, to facilitate synchronization for window variables with the base station and to reduce data transmission delay, the terminal may perform the RLC re-establishment (or establishment) procedure, initialize the window variables, or stop (or initialize) the RLC reassembly timer in the RLC layer device. The window variables may be initialized to a value of 0, or in order for the base station to easily manage the window variables (for example, in order for the terminal to synchronize the window variables based on received data even though the base station does not initialize the window variables), the window variables may be initialized based on received data. For example, in the case of UM mode, because an RLC serial number is included only for divided data, complete data without an RLC serial number may be directly processed and transferred to the upper layer device, and a window variable may be updated based on the RLC serial number of the received divided data. For example, RX_Next_Reassembly may be initialized to an RLC serial number of data (an RLC SDU, a UMD PDU, or an RLC SDU segment) which is received first after the change indication and includes the RLC serial number. The RX_Next_Highest may be initialized to the RLC serial number of the data (the RLC SDU, the UMD PDU, or the RLC SDU segment) which is received first after the change indication and includes the RLC serial number. The RX_Timer_Trigger may be initialized to the RLC serial number of the data (the RLC SDU, the UMD PDU, or the RLC SDU segment) which is received first after the change indication and includes the RLC serial number. Meanwhile, the RX_Timer_Trigger variable does not have a significant effect on window operation (it causes unnecessary processing), so variable initialization may be omitted. For another example, in the case of AM mode, an RLC serial number is included for all data (RLC data PDU or an RLC SDU), so the RX_Next, the RX_Next_Status_Trigger, or the RX_Highest_Status may be initialized to the RLC serial number of the data (the RLC SDU, the UMD PDU, or the RLC SDU segment) which is received first after the change indication and includes the RLC serial number. Meanwhile, the RX_Next_Status_Trigger variable or the RX_Highest-_Status variable does not have a significant effect on window operation (it causes unnecessary processing), so variable initialization may be omitted. In another embodiment, to facilitate base station implementation, the window variables may initialized to each initialization value (reference values or initial values) for the variables included in the change indication information (an RRC message, system information, MAC control information, or PDCP control data) indicated by the base station. In another embodiment, an RLC re-establishment procedure may be performed to minimize complexity of an ARQ operation for an RLC layer device configured with an RLC AM mode.

2> Then, the terminal may start receiving data in the RLC layer device for the unicast service (or the RLC layer device configured with the logical channel identifier which corresponds to the unicast service).

1> If the base station indicates switching from the unicast service (PTP) to the multicast service (PTM) to the terminal, the terminal may perform the following procedures in order to continue to receive the MBS service without error or data loss or prevent a problem in a reception window operation.

2> In a PDCP layer device connected to an RLC layer device for a multicast service or an RLC layer device for a unicast service in the fourth bearer structure, the terminal may not perform an initialization procedure on window variables (e.g., RX_NEXT (a variable indicating a COUNT value of data (a PDCP SDU) expected to be received next), RX_DELIV (a variable indicating a COUNT value of first data (a PDCP SDU) not transferred to a upper layer device, or data still waiting to be received), or RX_REORD (a variable indicating a next COUNT value (or a COUNT value incremented by 1) of a COUNT value of data (PDCP data PDU) triggering a PDCP reordering timer, or may use the PDCP reordering timer as it is without initializing the PDCP reordering timer. This is because information (e.g., a PDCP status report) about data which is retransmitted or is not received is transmitted to the base station to recover data loss, thereby minimizing data loss because a COUNT value (or a PDCP serial number) of the data by the window variables is maintained if the window variables are not initialized or the PDCP reordering timer is not initialized (if it is running, it is kept running) and then is used as it is. In another embodiment, to facilitate synchronization for window variables with the base station and to reduce data transmission delay, the terminal may perform a PDCP re-establishment procedure or a PDCP data recovery procedure in the PDCP layer device, initialize the window variables, or stop (or initializes) the PDCP reordering timer, and perform data processing on stored (or received) data and transfer it to the upper layer device. The window variables may be initialized to a value of 0, or in order to easily manage the base station window variables (for example, in order for the terminal to synchronize the window variables based on received data even though the base station does not initialize the window variables), the window variables may be initialized based on received data. For example, the RX_NEXT variable may be initialized to a combination of a PDCP serial number of data (a PDCP data PDU or a PDCP SDU) firstly received after the indication+1 or an HFN value initialized to 0 (or a previously used HFN value, an HFN value determined by terminal implementation, or an HFN value included in the change indication). The RX_DELIV variable may be initialized to the initialized RX_NEXT value or the combination of the PDCP serial number of the data (the PDCP data PDU or the PDCP SDU) firstly received after the change indication+1 or the HFN value initialized to 0 (or the previously used HFN value, the HFN value determined by the terminal implementation, or the HFN value included in the change indication). The RX_REORD value may be initialized to the initialized RX_NEXT value or the combination of the PDCP serial number of the data (the PDCP data PDU or the PDCP SDU) firstly received after the change indication+1 or the HFN value initialized to 0 (or the previously used HFN value, the HFN value determined by the terminal implementation, or the HFN value included in the change indication). In another embodiment, initialization for the RX_REORD variable may be omitted so that the reordering timer is driven. In another embodiment, the RX_DELIV may be initialized to a value obtained by subtracting a reception window size (or half of the reception window size) from the RX_NEXT value and adding 1 thereto. In another embodiment, to facilitate base station implementation, the window variables may initialized to each initialization value (reference values or initial values) for the variables included in the change indication information (an RRC message, system information, MAC control information, or PDCP control data) indicated by the base station.

2> Upon receiving a change indication from the unicast service (PTP) to the multicast service (PTM), the terminal may report to the base station whether data has been successfully received, and the base station may configure a PDCP status report to transmit the PDCP status report to an RLC layer device for a unicast service (or an RLC layer device configured with a logical channel identifier which corresponds to the unicast service) in order to perform retransmission for reducing loss. Upon receiving the PDCP status report, the base station may retransmit data via the RLC layer device for the unicast service based on the PDCP status report. If the terminal transmits the PDCP status report via the RLC layer device for the unicast service, the base station may easily distinguish which terminal the PDCP status report is for. In addition, if the base station performs retransmission via the RLC layer device for the unicast service, the base station may prevent waste of a transmission resource by performing the retransmission via an individual transmission resource. In another embodiment, the terminal may transmit a PDCP status report in an RLC layer device for multicast. In another embodiment, upon receiving the change indication, the terminal may report to the base station whether data has been successfully received, and the base station may configure a PDCP status report to transmit the PDCP status report to an RLC layer device for a multicast service (or an RLC layer device configured with a logical channel identifier which corresponds to the multicast service) in order to perform retransmission for reducing loss. Upon receiving the PDCP status report, the base station may retransmit data via an RLC layer device for the multicast service or the unicast service based on the PDCP status report. If the terminal transmits the PDCP status report via the RLC layer device for the multicast service, the base station may easily detect PDCP status reports of all terminals.

2> The terminal may still receive data via the RLC layer device for the multicast service in the fourth bearer structure. This is because the terminal may receive data transmitted late. In another embodiment, the RLC layer device may be released or re-established (initialization of window variables or discard of stored divided data), thereby facilitating window variable synchronization of the RLC layer device in the base station and quickly discarding unnecessary data.

2> The terminal may not perform an initialization procedure on the window variables (for example, in a case of UM mode, RX_Next_Reassembly (a variable indicating the smallest (or the fastest) RLC serial number value which is still under consideration for reassembly), RX_Timer_Trigger (a variable indicating an RLC serial number which is 1 greater than an RLC serial number which triggers the RLC reassembly timer, or which is after the RLC serial number which triggers the RLC reassembly timer), or RX_Next_Highest (a variable indicating an RLC serial number which is 1 greater than an RLC serial number which is the highest among received data (UMD PDUs), or which is after the RLC serial number which is the highest among the received data), or for example, in a case of AM mode, RX_Next (a variable indicating an RLC serial number which is 1 greater than an RLC serial number of the last completely received data (an RLC SDU) in sequence, or which is after the RLC serial number of the last completely received data, RX_Next_Status_Trigger (a variable indicating an RLC serial number which is 1 greater than an RLC serial number which triggers the RLC reassembly timer, or which is after the RLC serial number which triggers the RLC reassembly timer), or RX_Highest_Status (a variable indicating a highest RLC serial number which may be indicated with ACK_SN (a variable indicating an RLC serial number of the next data (an RLC SDU) which has not been reported as lost in the RLC status report or has not yet been received)) or may use an RLC reassembly timer as it is without initializing the RLC reassembly timer in the RLC layer device for the multicast service (or the RLC layer device configured with the logical channel identifier which corresponds to the unicast service). This is because it is easy to implement the terminal or the base station (for example, no additional procedure is required) because an RLC serial number of data by the window variables is maintained if the window variables are not initialized or the RLC reassembly timer is not initialized (if it is running, it is kept running) and then is used as it is. In another embodiment, to facilitate synchronization for window variables with the base station and to reduce data transmission delay, the terminal may perform the RLC re-establishment (or establishment) procedure, initialize the window variables, or stop (or initialize) the RLC reassembly timer in the RLC layer device. The window variables may be initialized to a value of 0, or in order for the base station to easily manage the window variables (for example, in order for the terminal to synchronize the window variables based on received data even though the base station does not initialize the window variables), the window variables may be initialized based on received data. For example, in the case of UM mode, because an RLC serial number is included only for divided data, complete data without an RLC serial number may be directly processed and transferred to the upper layer device, and a window variable may be updated based on the RLC serial number of the received divided data. For example, RX_Next_Reassembly may be initialized to an RLC serial number of data (an RLC SDU, a UMD PDU, or an RLC SDU segment) which is received first after the change indication and includes the RLC serial number. The RX_Next_Highest may be initialized to the RLC serial number of the data (the RLC SDU, the UMD PDU, or the RLC SDU segment) which is received first after the change indication and includes the RLC serial number. The RX_Timer_Trigger may be initialized to the RLC serial number of the data (the RLC SDU, the UMD PDU, or the RLC SDU segment) which is received first after the change indication and includes the RLC serial number. Meanwhile, the RX_Timer_Trigger variable does not have a significant effect on window operation (it causes unnecessary processing), so variable initialization may be omitted. For another example, in the case of AM mode, an RLC serial number is included for all data (RLC data PDU or an RLC SDU), so the RX_Next, the RX_Next_Status_Trigger, or the RX_Highest_Status may be initialized to the RLC serial number of the data (the RLC SDU, the UMD PDU, or the RLC SDU segment) which is received first after the indication and includes the RLC serial number. Meanwhile, the RX_Next_Status_Trigger variable or the RX_Highest_Status variable does not have a significant effect on window operation (it causes unnecessary processing), so variable initialization may be omitted. In another embodiment, to facilitate base station implementation, the window variables may initialized to each initialization value (reference values or initial values) for the variables included in the change indication information (an RRC message, system information, MAC control information, or PDCP control data) indicated by the base station. In another embodiment, an RLC re-establishment procedure may be performed to minimize complexity of an ARQ operation for an RLC layer device configured with an RLC AM mode.

2> Then, the terminal may start receiving data via the RLC layer device for the multicast service (or the RLC layer device configured with the logical channel identifier which corresponds to the unicast service).

The fourth bearer structure 401d, 402d, or 403d may be effectively used to support an MBS service with no data loss or little data loss even in a handover procedure. For example, when the terminal performs a handover procedure to the target base station according to indication (e.g., a handover command message (RRCReconfiguration message)) of the source base station while receiving an MBS service (a multicast service or a unicast service) from the source base station via an MBS bearer for which the fourth bearer structure is configured, the terminal may maintain the fourth bearer structure for the MBS bearer, or the MBS bearer may be reconfigured with the fourth bearer structure, or may be newly configured. For example, in order to continuously receive the MBS service based on the handover command message while receiving the MBS service from the source base station via the MBS bearer configured with the structure 401d, 402d, or 403d in the source base station, the terminal may reconfigure the MBS bearer with the structure 401*d*, 402*d*, or 403*d* or configure new MBS bearer. When reconfiguring or newly configuring the MBS bearer due to the handover procedure, the terminal may perform the following procedures.

1> The terminal receives the handover command message (the RRCReconfiguration message)(e.g., an RRC message including a reconfigurationWithsync indicator) from the source base station. If the handover command message includes configuration information for configuring or reconfiguring an MBS bearer, or includes a PDCP layer device reestablishment indicator (reestablishPDCP) for the MBS bearer, or includes a PDCP layer device recovery indicator (recoverPDCP) for the MBS bearer, or if it indicates to reconfigure the PDCP layer device for the MBS bearer, or if the handover command message includes indication to re-establish or release a certain RLC layer device for the MBS bearer, the terminal may perform the following procedures for the MBS bearer in order to continuously receive the MBS service without error or data loss or to prevent a problem in a reception window operation.

2> In a PDCP layer device connected to an RLC layer device for a multicast service or an RLC layer device for a unicast service in the fourth bearer structure, the terminal may not perform an initialization procedure on window variables (e.g., RX_NEXT (a variable indicating a COUNT value of data (a PDCP SDU) expected to be received next), RX_DELIV (a variable indicating a COUNT value of first data (a PDCP SDU) not transferred to a upper layer device, or data still waiting to be received), or RX_REORD (a variable indicating a next COUNT value (or a COUNT value incremented by 1) of a COUNT value of data (PDCP data PDU) triggering a PDCP reordering timer, or may use the PDCP reordering timer as it is without initializing the PDCP reordering timer. This is because information (e.g., a PDCP status report) about data which is retransmitted or is not received is transmitted to the base station to recover data loss, thereby minimizing data loss because a COUNT value (or a PDCP serial number) of the data by the window variables is maintained if the window variables are not initialized or the PDCP reordering timer is not initialized (if it is running, it is kept running) and then is used as it is. In another embodiment, to facilitate synchronization for window variables with the base station and to reduce data transmission delay, the terminal may perform a PDCP re-establishment procedure or a PDCP data recovery procedure in the PDCP layer device, initialize the window variables, or stop (or initializes) the PDCP reordering timer, and perform data processing on stored (or received) data and transfer it to the upper layer device. The window variables may be initialized to a value of 0, or in order to easily manage the base station window variables (for example, in order for the terminal to synchronize the window variables based on received data even though the base station does not initialize the window variables), the window variables may be initialized based on received data. For example, the RX_NEXT variable may be initialized to a combination of a PDCP serial number of data (a PDCP data PDU or a PDCP SDU) firstly received after the indication included in the handover command message+1 or an HFN value initialized to 0 (or a previously used HFN value, an HFN value determined by terminal implementation, or an HFN value included in the indication included in the handover command message). The RX_DELIV variable may be initialized to the initialized RX_NEXT value and/or the combination of the PDCP serial number of the data (the PDCP data PDU or the PDCP SDU) firstly received after the handover indication or the HFN value initialized to 0 (or the previously used HFN value, the HFN value determined by the terminal implementation, or the HFN value included in the handover indication). The RX_REORD value may be initialized to the initialized RX_NEXT value and/or the combination of the PDCP serial number of the data (the PDCP data PDU or the PDCP SDU) firstly received after the handover indication+1 or the HFN value initialized to 0 (or the previously used HFN value, the HFN value determined by the terminal implementation, or the HFN value included in the handover indication). Meanwhile, initialization for the RX_REORD variable may be omitted so that the reordering timer is driven. In another embodiment, the RX_DELIV may be initialized to a value obtained by subtracting a reception window size (or half of the reception window size) from the RX_NEXT value and adding 1 thereto. In another embodiment, to facilitate base station implementation, the window variables may initialized to each initialization value (reference values or initial values) for the window variables included in the handover indication information (an RRC message, system information, MAC control information, and PDCP control data) indicated by the base station.

2> Upon receiving the handover indication from the base station, the terminal may report to the base station whether data has been successfully received, and the base station may configure a PDCP status report to transmit the PDCP status report to an RLC layer device for a unicast service (or an RLC layer device configured with a logical channel identifier which corresponds to the unicast service) in order to perform retransmission for reducing loss. Upon receiving the PDCP status report, the base station may retransmit data via the RLC layer device for the unicast service based on the PDCP status report. If the terminal transmits the PDCP status report via the RLC layer device for the unicast service, the base station may easily distinguish which terminal the PDCP status report is for. In addition, if the base station performs retransmission via the RLC layer device for the unicast service, it is possible to prevent waste of a transmission resource by performing the retransmission via an individual transmission resource. In another embodiment, the terminal may transmit a PDCP status report in an RLC layer device for multicast. In another embodiment, upon receiving the handover indication, the terminal may report to the base station whether data has been successfully received, and the base station may configure a PDCP status report to transmit the PDCP status report to an RLC layer device for a multicast service (or an RLC layer device configured with a logical channel identifier which corresponds to the multicast service) in order to perform retransmission for reducing loss. Upon receiving the PDCP status report, the base station may retransmit data via an RLC layer device for the multicast service or the unicast service based on the PDCP status report. If the terminal transmits the PDCP status report via the RLC layer device for the multicast service, the base station may easily detect PDCP status reports of all terminals.

2> Upon receiving the indication included in the handover command message, the terminal may still receive data via the RLC layer device for the unicast service or the RLC layer device for the multicast service in the fourth bearer structure. This is because the terminal may receive data transmitted late. In another embodiment, the RLC layer device may be released or re-established (initialization of window variables or discard of stored divided data), thereby facilitating window variable synchronization of the RLC layer device in the base station and quickly discarding unnecessary data.

2> Upon receiving the indication included in the handover command message, the terminal may not perform an initialization procedure on the window variables (for example, in a case of UM mode, RX_Next_Reassembly (a variable indicating the smallest (or the fastest) RLC serial number value which is still under consideration for reassembly), RX_Timer_Trigger (a variable indicating an RLC serial number which is 1 greater than an RLC serial number which triggers the RLC reassembly timer, or which is after the RLC serial number which triggers the RLC reassembly timer), or RX_Next_Highest (a variable indicating an RLC serial number which is 1 greater than an RLC serial number which is the highest among received data (UMD PDUs), or which is after the RLC serial number which is the highest among the received data), or for example, in a case of AM mode, RX_Next (a variable indicating an RLC serial number which is 1 greater than an RLC serial number of the last completely received data (an RLC SDU) in sequence, or which is after the RLC serial number of the last completely received data, RX_Next_Status_Trigger (a variable indicating an RLC serial number which is 1 greater than an RLC serial number which triggers the RLC reassembly timer, or which is after the RLC serial number which triggers the RLC reassembly timer), or RX_Highest_Status (a variable indicating a highest RLC serial number which may be indicated with ACK_SN (a variable indicating an RLC serial number of the next data (an RLC SDU) which has not been reported as lost in the RLC status report or has not yet been received)) or may use an RLC reassembly timer as it is without initializing the RLC reassembly timer in the RLC layer device for the multicast service or the RLC layer device for the unicast service (or the RLC layer device configured with the logical channel identifier which corresponds to the unicast service). This is because it is easy to implement the terminal or the base station (for example, no additional procedure is required) because an RLC serial number of data by the window variables is maintained if the window variables are not initialized or the RLC reassembly timer is not initialized (if it is running, it is kept running) and then is used as it is. In another embodiment, to facilitate synchronization for window variables with the base station and to reduce data transmission delay, the terminal may perform the RLC re-establishment (or establishment) procedure, initialize the window variables, or stop (or initialize) the RLC reassembly timer in the RLC layer device. The window variables may be initialized to a value of 0, or in order for the base station to easily manage the window variables (for example, in order for the terminal to synchronize the window variables based on received data even though the base station does not initialize the window variables), the window variables may be initialized based on received data. For example, in the case of UM mode, because an RLC serial number is included only for divided data, complete data without an RLC serial number may be directly processed and transferred to the upper layer device, and a window variable may be updated based on the RLC serial number of the received divided data. For example, RX_Next_Reassembly may be initialized to an RLC serial number of data (an RLC SDU, a UMD PDU, or an RLC SDU segment) which is received first after the handover indication and includes the RLC serial number. The RX_Next_Highest may be initialized to the RLC serial number of the data (the RLC SDU, the UMD PDU, or the RLC SDU segment) which is received first after the handover indication and includes the RLC serial number. The RX_Timer_Trigger may be initialized to the RLC serial number of the data (the RLC SDU, the UMD PDU, or the RLC SDU segment) which is received first after the handover indication and includes the RLC serial number. Meanwhile, the RX_Timer_Trigger variable does not have a significant effect on window operation (it causes unnecessary processing), so variable initialization may be omitted. Alternatively, for example, in the case of AM mode, an RLC serial number is included for all data (RLC data PDU or an RLC SDU), so the RX_Next, the RX_Next_Status_Trigger, or the RX_Highest_Status may be initialized to the RLC serial number of the data (the RLC SDU, the UMD PDU, or the RLC SDU segment) which is received first after the handover indication and includes the RLC serial number. Meanwhile, the RX_Next_Status_Trigger variable or the RX_Highest_Status variable does not have a significant effect on window operation (it causes unnecessary processing), so variable initialization may be omitted. In another embodiment, to facilitate base station implementation, the window variables may initialized to each initialization value (reference values or initial values) for the window variables included in the indication information (an RRC message, system information, MAC control information, or PDCP control data) indicated by the base station. In another embodiment, an RLC re-establishment procedure may be performed to minimize complexity of an ARQ operation for an RLC layer device configured with an RLC AM mode.

2> The terminal may start receiving data in the RLC layer device for the multicast service or the RLC layer device for the unicast service (or the RLC layer device configured with the logical channel identifier which corresponds to the unicast service).

Figure 5:
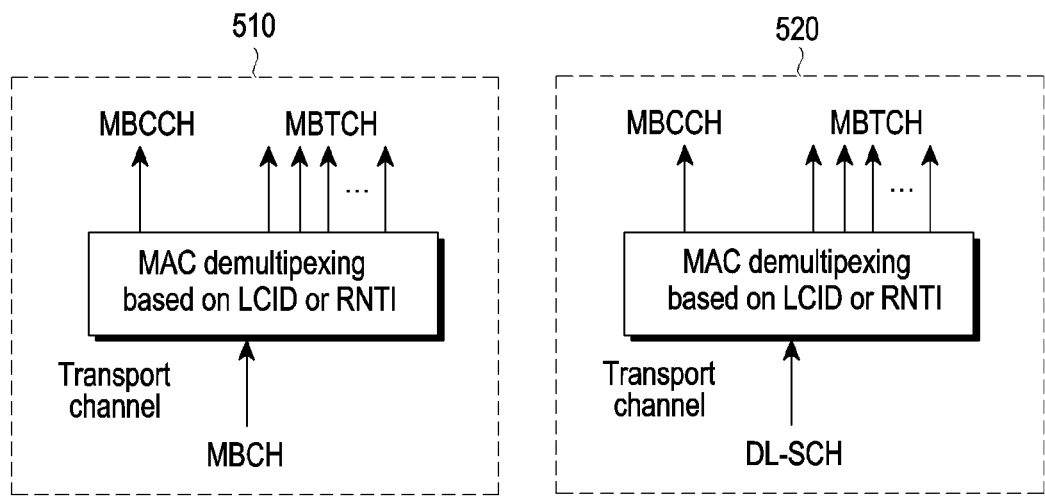
FIG. 5 is a diagram illustrating a method of demultiplexing MBS data received by a terminal in a MAC layer device according to an embodiment of the disclosure.

FIG. 5 is a diagram illustrating a method of demultiplexing MBS data received by a terminal in a MAC layer device according to an embodiment of the disclosure.

FIG. 5 shows an embodiment of demultiplexing MBS data in MAC layer device in a case that a terminal in an RRC connected mode, an RRC inactive mode, or an RRC idle mode receives the MBS data (e.g., MBS control data, MBS user data, or normal data other than MBS data) via a multicast bearer or a unicast bearer supporting an MBS service with a bearer structure described in FIGS. 4A to 4D. In addition, an embodiment of transmitting uplink MBS data (e.g., MBS control data, MBS user data, or normal data other than MBS data) in a terminal will be described.

In FIG. 5, an embodiment of receiving MBS data or an embodiment of receiving MBS data and demultiplexing the MBS data may apply one embodiment or a plurality of embodiments among the following embodiments. In another embodiment, different embodiments among the following embodiments may be applied depending on whether the terminal is in the RRC connected mode, the RRC inactive mode, or the RRC idle mode.

MBS Reception Embodiment 1-1

In MBS reception embodiment 1-1 510 in FIG. 5, in system information, an RRC message (e.g., an RRCSetup message, an RRCResume message, an RRCReconfiguration message, an RRCRelease message, or a newly defined RRC message), or a control channel for an MBS channel (for example, transmitted in an MBS control channel), a separate physical channel or transport channel (e.g., an MBS channel (MBCH)) for an MBS service may be configured, and a separate transmission resource (a frequency or time resource, a transmission period, a partial bandwidth (or a partial bandwidth identifier) or bandwidth, a dedicated frequency (frequency information or an SCell identifier), or subcarrier spacing, and/or the like) may be configured or defined. A MAC header may be always included in MBS data transmitted for the MBS service, and a logical channel identifier included in the MAC header may be differently assigned for an MBS control data channel (e.g., an MBS Control Channel (MBCCH)) or an MBS user data channel (e.g., an MBS Traffic channel (MBTCH)), respectively. In addition, a different logical channel identifier may be assigned to each MBS service provided in the MBS user data channel. A first identifier or a second identifier for each MBS service may be configured or broadcasted, and each logical channel identifier corresponding to the first identifier or the second identifier for each MBS service may be may be configured or broadcasted via the system information, the RRC message, or the control message for the MBS channel. The first identifier may indicate a Public Land Mobile Network (PLMN) that provides the MBS service, or may indicate an MBS service type or session. The second identifier may indicate a more specific MBS service session or type. A logical channel identifier which may be allocated to a bearer for a normal data service (a voice, Internet, or video service) in a DL-SCH channel may be allocated as one predetermined bit (e.g., 6-bit) combination in a first logical channel identifier space which may be generated with predetermined bits (e.g., 6 bits). A logical channel identifier for the MBS control data channel, the MBS user data channel, or each service of the MBS user data channel may be allocated as one predetermined bit (e.g., 6-bit) combination in the first logical channel identifier space. MAC control information (e.g., a MAC Control Element (CE) for indicating that a network stops the MBS service or indicating to the network that a terminal stops receiving the MBS service) for supporting the MBS service, or a logical channel identifier for padding for inserting the padding into MBS data for supporting the MBS service may be allocated as one predetermined bit (e.g., 6-bit) combination in the first logical channel identifier space.

In another embodiment, in order to double a logical channel identifier space, the logical channel identifier for the MBS control data channel, the MBS user data channel, or each service of the MBS user data channel may be allocated as one predetermined bit (e.g., 6-bit) combination in a new second logical channel identifier space. The MAC control information (the MAC CE)(e.g., the MAC Control Element (CE) for indicating that the network stops the MBS service or indicating to the network that the terminal stops receiving the MBS service) for supporting the MBS service, or the logical channel identifier for the padding for inserting the padding into the MBS data for supporting the MBS service may be allocated as one predetermined bit (e.g., 6-bit) combination in the new second logical channel identifier space. The first logical channel identifier space and the second logical channel identifier space, in a MAC layer device, may be distinguished by an MBS channel, a DL-SCH channel, or a transmission resource (a frequency or time transmission resource, frequency information, a partial bandwidth identifier, partial bandwidth configuration information, a dedicated carrier or dedicated cell (an SCell) identifier, or dedicated cell information), or may be distinguished by using different RNTIs. So, when receiving MBS data via a channel or a transmission resource for receiving the MBS service, the MAC layer device of the terminal may distinguish or demultiplex the MBS data to transfer the data to a corresponding upper layer device based on at least one of the received transfer channel (e.g., an MBCH, a DL-SCH, or a BCH, and/or the like), a partial bandwidth identifier, an SCell identifier, a logical channel identifier, or an RNTI identifier. MBS reception embodiment 1-1 may be applied to a terminal in an RRC connected mode, an RRC inactive mode, or an RRC idle mode.

MBS Reception Embodiment 1-2

In MBS reception method 1-2 810 in FIG. 5, via system information, an RRC message (e.g., an RRCSetup message, an RRCResume message, an RRCReconfiguration message, an RRCRelease message, or a newly defined RRC message), or a control channel for an MBS channel (for example, transmitted in an MBS control channel), a separate physical channel or transport channel (e.g., an MBS channel (MBCH)) for an MBS service may be configured, and a separate transmission resource (a frequency or time resource, a transmission period, a partial bandwidth (or a partial bandwidth identifier) or bandwidth, a dedicated frequency (frequency information or an SCell identifier), or subcarrier spacing, and/or the like) may be configured or defined. A MAC header may be included in MBS data transmitted for the MBS service, and a logical channel identifier included in the MAC header may be differently assigned for an MBS control data channel (e.g., an MBCCH) or an MBS user data channel (e.g., an MBTCH), respectively. In addition, a different logical channel identifier may be assigned to each MBS service provided in the MBS user data channel. In addition, different RNTI identifiers may be allocated to the MBS control data channel (e.g., the MBCCH) or the MBS user data channel (e.g., the MBTCH), respectively. In addition, a different RNTI identifier may be allocated to each MBS service provided via the MBS user data channel. The MBS control data channel (e.g., the MBCCH), the MBS user data channel, or each MBS service provided in the MBS user data channel may be distinguished by the RNTI identifiers, so the same logical channel identifier may be allocated for the MBS control data channel, the MBS user data channel, or each MBS service provided in the MBS user data channel.

In another embodiment, the same RNTI identifier may be allocated to the MBS control data channel (e.g., the MBCCH), the MBS user data channel, or each MBS service provided in the MBS user data channel, and in more detail, the channel or data may be distinguished by allocating a different logical channel identifier to the MBS control data channel, the MBS user data channel, or each MBS service provided in the MBS user data channel. An RNTI identifier for the MBS service may be configured differently from an RNTI identifier (e.g., a C-RNTI, an MCS-C-RNTI, or a CS-RNTI, and/or the like) for a DL-SCH.

In another embodiment, the RNTI identifier for the MBS service may be configured to be the same as the RNTI identifier (e.g., the C-RNTI, the MCS-C-RNTI, or the CS-RNTI, and/or the like) for the DL-SCH, and distinction thereof may be performed with a logical channel identifier. For each MBS service provided in the MBS user data channel, a first identifier or a second identifier for each MBS service may be configured or broadcasted, and each logical channel identifier or each RNTI identifier corresponding to the first identifier or the second identifier for each MBS service may be may be configured or broadcasted via the system information, the RRC message, or the control message for the MBS channel. The first identifier may indicate a PLMN that provides the MBS service, or may indicate an MBS service type or session. The second identifier may indicate a more specific MBS service session or type. A logical channel identifier which may be allocated to a bearer for a normal data service (a voice, Internet, or video service)

in a DL-SCH channel may be allocated as one predetermined bit (e.g., 6-bit) combination in a first logical channel identifier space which may be generated with predetermined bits (e.g., 6 bits). A logical channel identifier for the MBS control data channel, the MBS user data channel, or each service of the MBS user data channel may be allocated as one predetermined bit (e.g., 6-bit) combination in the first logical channel identifier space. Alternatively, MAC control information (MAC CE)(e.g., a MAC CE for indicating that a network stops the MBS service or indicating to the network that a terminal stops receiving the MBS service) for supporting the MBS service, or a logical channel identifier for padding for inserting the padding into MBS data for supporting the MBS service may be allocated as one predetermined bit (e.g., 6-bit) combination in the first logical channel identifier space.

In another embodiment, in order to double a logical channel identifier space, the logical channel identifier for the MBS control data channel, the MBS user data channel, or each service of the MBS user data channel may be allocated as one predetermined bit (e.g., 6-bit) combination in a new second logical channel identifier space. The MAC control information (the MAC CE)(e.g., the MAC CE for indicating that the network stops the MBS service or indicating to the network that the terminal stops receiving the MBS service) for supporting the MBS service, or the logical channel identifier for the padding for inserting the padding into the MBS data for supporting the MBS service may be allocated as one predetermined bit (e.g., 6-bit) combination in the new second logical channel identifier space. The first logical channel identifier space and the second logical channel identifier space, in a MAC layer device, may be distinguished by an MBS channel, a DL-SCH channel, or a transmission resource (a frequency or time transmission resource, frequency information, a partial bandwidth identifier, partial bandwidth configuration information, a dedicated carrier or dedicated cell (an SCell) identifier, or dedicated cell information), or may be distinguished by using different RNTIs. So, when receiving MBS data via a channel or a transmission resource for receiving the MBS service, the MAC layer device of the terminal may distinguish or demultiplex the MBS data to transfer the data to a corresponding upper layer device based on at least one of the received transfer channel (e.g., an MBCH, a DL-SCH, or a BCH, and/or the like), a partial bandwidth identifier, an SCell identifier, a logical channel identifier, or an RNTI identifier. MBS reception embodiment 1-2 may be applied to a terminal in an RRC connected mode, an RRC inactive mode, or an RRC idle mode.

MBS Reception Embodiment 1-3

In MBS reception embodiment 1-3 510 in FIG. 5, in system information, an RRC message (e.g., an RRCSetup message, an RRCResume message, an RRCReconfiguration message, an RRCRelease message, or a newly defined RRC message), or a control channel for an MBS channel (for example, transmitted in an MBS control channel), a separate physical channel or transport channel (e.g., an MBCH) for an MBS service may be configured, and a separate transmission resource (a frequency or time resource, a transmission period, a partial bandwidth (or a partial bandwidth identifier) or bandwidth, a dedicated frequency (frequency information or an SCell identifier), or subcarrier spacing, and/or the like) may be configured or defined. A MAC header is not included in MBS data transmitted for the MBS service, and the MBS control data channel (e.g., the MBCCH) or the MBS user data channel (e.g., the MBTCH) may be distinguished differently from each other based on an RNTI identifier. In addition, different RNTI identifiers may be allocated to the MBS control data channel (e.g., the MBCCH) or the MBS user data channel (e.g., the MBTCH), respectively. In addition, a different RNTI identifier may be allocated to each MBS service provided via the MBS user data channel. The MBS control data channel (e.g., the MBCCH), the MBS user data channel, or each MBS service provided in the MBS user data channel may be distinguished by the RNTI identifiers, so a logical channel identifier may not be configured for the MBS control data channel, the MBS user data channel, or each MBS service provided in the MBS user data channel, and the MAC header does not need to be included in MBS data. For each MBS service provided in the MBS user data channel, a first identifier or a second identifier for each MBS service may be configured or broadcasted, and each RNTI identifier corresponding to the first identifier or the second identifier for each MBS service may be may be configured or broadcasted via the system information, the RRC message, or the control message for the MBS channel. The first identifier may indicate a PLMN that provides the MBS service, or may indicate an MBS service type or session. The second identifier may indicate a more specific MBS service session or type. So, when receiving MBS data via a channel or a transmission resource for receiving the MBS service, the MAC layer device of the terminal may distinguish or demultiplex the MBS data to transfer the data to a corresponding upper layer device based on at least one of the received transfer channel (e.g., an MBCH, a DL-SCH, or a BCH, and/or the like), a partial bandwidth identifier, an SCell identifier, or an RNTI identifier. MBS reception embodiment 1-3 may be applied to a terminal in an RRC connected mode, an RRC inactive mode, or an RRC idle mode.

MBS Reception Embodiment 2-1

In MBS reception embodiment 2-1 520 in FIG. 5, in system information, an RRC message (e.g., an RRCSetup message, an RRCResume message, an RRCReconfiguration message, an RRCRelease message, or a newly defined RRC message), or a control channel for an MBS channel (for example, transmitted in an MBS control channel), a separate physical channel or transport channel (e.g., an MBS channel (MBCH), or a DL-SCH channel) for an MBS service may be configured, and a separate transmission resource (a frequency or time resource, a transmission period, a partial bandwidth (or a partial bandwidth identifier) or bandwidth, a dedicated frequency (frequency information or an SCell identifier), or subcarrier spacing, and/or the like) may be configured or defined in an existing DL-SCH channel. A MAC header may be always included in MBS data transmitted for the MBS service, and a logical channel identifier included in the MAC header may be differently assigned for an MBS control data channel (e.g., an MBCCH) or an MBS user data channel (e.g., an MBTCH), respectively. In addition, a different logical channel identifier may be assigned to each MBS service provided in the MBS user data channel. A first identifier or a second identifier for each MBS service may be configured or broadcasted, and each logical channel identifier corresponding to the first identifier or the second identifier for each MBS service may be may be configured or broadcasted via the system information, the RRC message, or the control message for the MBS channel. The first identifier may indicate a PLMN that provides the MBS service, or may indicate an MBS service type or session. The second identifier may indicate a more specific MBS service session or type. A logical channel identifier which may be allocated to a bearer for a normal data service (a voice, Internet, or video service) in a DL-SCH channel may be allocated as one predetermined bit (e.g., 6-bit) combination in a first logical channel identifier space which may be generated with predetermined bits (e.g., 6 bits). A logical channel identifier for the MBS control data channel, the MBS user data channel, or each service of the MBS user data channel may be allocated as one predetermined bit (e.g., 6-bit) combination in the first logical channel identifier space. Alternatively, MAC control information (a MAC CE)(e.g., a MAC CE for indicating that a network stops the MBS service or indicating to the network that a terminal stops receiving the MBS service) for supporting the MBS service, or a logical channel identifier for padding for inserting the padding into MBS data for supporting the MBS service may be allocated as one predetermined bit (e.g., 6-bit) combination in the first logical channel identifier space.

In another embodiment, in order to double a logical channel identifier space, the logical channel identifier for the MBS control data channel, the MBS user data channel, or each service of the MBS user data channel may be allocated as one predetermined bit (e.g., 6-bit) combination in a new second logical channel identifier space. Alternatively, the MAC control information (the MAC CE)(e.g., the MAC CE for indicating that the network stops the MBS service or indicating to the network that the terminal stops receiving the MBS service) for supporting the MBS service, or the logical channel identifier for the padding for inserting the padding into the MBS data for supporting the MBS service may be allocated as one predetermined bit (e.g., 6-bit) combination in the new second logical channel identifier space. The first logical channel identifier space and the second logical channel identifier space, in a MAC layer device, may be distinguished by an MBS channel, a DL-SCH channel, or a transmission resource (a frequency or time transmission resource, frequency information, a partial bandwidth identifier, partial bandwidth configuration information, a dedicated carrier or dedicated cell (an SCell) identifier, or dedicated cell information), or may be distinguished by using different RNTIs. So, when receiving MBS data via a channel or a transmission resource for receiving the MBS service, the MAC layer device of the terminal may distinguish, and demultiplex the MBS data to transfer the data to a corresponding upper layer device based on at least one of the received transfer channel (e.g., an MBCH, a DL-SCH, or a BCH, and/or the like), a partial bandwidth identifier, an SCell identifier, a logical channel identifier, or an RNTI identifier. MBS reception embodiment 2-1 may be applied to a terminal in an RRC connected mode, an RRC inactive mode, or an RRC idle mode.

MBS Reception Embodiment 2-2

In MBS reception embodiment 2-2 520 in FIG. 5, in system information, an RRC message (e.g., an RRCSetup message, an RRCResume message, an RRCReconfiguration message, an RRCRelease message, or a newly defined RRC message), or a control channel for an MBS channel (for example, transmitted in an MBS control channel), a physical channel or transport channel (e.g., an MBCH or a DL-SCH channel) for an MBS service may be configured, or a separate transmission resource (a frequency or time resource, a transmission period, a partial bandwidth (or a partial bandwidth identifier) or bandwidth, a dedicated frequency (frequency information or an SCell identifier), or subcarrier spacing, and/or the like) may be configured and defined in an existing DL-SCH channel. A MAC header may be included in MBS data transmitted for the MBS service, and a logical channel identifier included in the MAC header may be differently assigned for an MBS control data channel (e.g., an MBCCH) or an MBS user data channel (e.g., an MBTCH), respectively. In addition, a different logical channel identifier may be assigned to each MBS service provided in the MBS user data channel. In addition, different RNTI identifiers may be allocated to the MBS control data channel (e.g., the MBCCH) or the MBS user data channel (e.g., the MBTCH), respectively. In addition, a different RNTI identifier may be allocated to each MBS service provided via the MBS user data channel. The MBS control data channel (e.g., the MBCCH), the MBS user data channel, or each MBS service provided in the MBS user data channel may be distinguished by the RNTI identifiers, so the same logical channel identifier may be allocated for the MBS control data channel, the MBS user data channel, or each MBS service provided in the MBS user data channel.

In another embodiment, the same RNTI identifier may be allocated to the MBS control data channel (e.g., the MBCCH), the MBS user data channel, or each MBS service provided in the MBS user data channel, and in more detail, the channel or data may be distinguished by allocating a different logical channel identifier to the MBS control data channel, the MBS user data channel, or each MBS service provided in the MBS user data channel. An RNTI identifier for the MBS service may be configured differently from an RNTI identifier (e.g., a C-RNTI, an MCS-C-RNTI, or a CS-RNTI, and/or the like) for a DL-SCH.

In another embodiment, the RNTI identifier for the MBS service may be configured to be the same as the RNTI identifier (e.g., the C-RNTI, the MCS-C-RNTI, or the CS-RNTI, and/or the like) for the DL-SCH, and distinction thereof may be performed with a logical channel identifier. For each MBS service provided in the MBS user data channel, a first identifier or a second identifier for each MBS service may be configured or broadcasted, and each logical channel identifier or each RNTI identifier corresponding to the first identifier or the second identifier for each MBS service may be may be configured or broadcasted via the system information, the RRC message, or the control message for the MBS channel. The first identifier may indicate a PLMN that provides the MBS service, or may indicate an MBS service type or session. The second identifier may indicate a more specific MBS service session or type. A logical channel identifier which may be allocated to a bearer for a normal data service (a voice, Internet, or video service) in a DL-SCH channel may be allocated as one predetermined bit (e.g., 6-bit) combination in a first logical channel identifier space which may be generated with predetermined bits (e.g., 6 bits). A logical channel identifier for the MBS control data channel, the MBS user data channel, or each service of the MBS user data channel may be allocated as one predetermined bit (e.g., 6-bit) combination in the first logical channel identifier space. Alternatively, MAC control information (MAC CE)(e.g., a MAC CE for indicating that a network stops the MBS service or indicating to the network that a terminal stops receiving the MBS service) for supporting the MBS service, or a logical channel identifier for padding for inserting the padding into MBS data for supporting the MBS service may be allocated as one predetermined bit (e.g., 6-bit) combination in the first logical channel identifier space.

In another embodiment, in order to double a logical channel identifier space, the logical channel identifier for the MBS control data channel, the MBS user data channel, or each service of the MBS user data channel may be allocated as one predetermined bit (e.g., 6-bit) combination in a new second logical channel identifier space. The MAC control information for supporting the MBS service, or the logical channel identifier for the padding for inserting the padding into the MBS data for supporting the MBS service may be allocated as one predetermined bit (e.g., 6-bit) combination in the new second logical channel identifier space. The first logical channel identifier space and the second logical channel identifier space, in a MAC layer device, may be distinguished by an MBS channel, a DL-SCH channel, or a transmission resource (a frequency or time transmission resource, frequency information, a partial bandwidth identifier, partial bandwidth configuration information, a dedicated carrier or dedicated cell (an SCell) identifier, or dedicated cell information), or may be distinguished by using different RNTIs. So, when receiving MBS data via a channel or a transmission resource for receiving the MBS service, the MAC layer device of the terminal may distinguish or demultiplex the MBS data to transfer the data to a corresponding upper layer device based on at least one of the received transfer channel (e.g., an MBCH, a DL-SCH, or a BCH, and/or the like), a partial bandwidth identifier, an SCell identifier, a logical channel identifier, or an RNTI identifier. MBS reception embodiment 2-2 may be applied to a terminal in an RRC connected mode, an RRC inactive mode, or an RRC idle mode.

MBS Reception Embodiment 2-3

In MBS reception embodiment 2-3 520 in FIG. 5, in system information, an RRC message (e.g., an RRCSetup message, an RRCResume message, an RRCReconfiguration message, an RRCRelease message, or a newly defined RRC message), or a control channel for an MBS channel (for example, transmitted in an MBS control channel), a physical channel or transport channel (e.g., an MBCH or a DL-SCH channel) for an MBS service may be configured, or a separate transmission resource (a frequency or time resource, a transmission period, a partial bandwidth (or a partial bandwidth identifier) or bandwidth, a dedicated frequency (frequency information or an SCell identifier), or subcarrier spacing, and/or the like) may be configured and defined in an existing DL-SCH channel. A MAC header is not included in MBS data transmitted for the MBS service, and the MBS control data channel (e.g., the MBCCH) or the MBS user data channel (e.g., the MBTCH) may be distinguished differently from each other based on an RNTI identifier. In addition, different RNTI identifiers may be allocated to the MBS control data channel or the MBS user data channel, respectively. In addition, a different RNTI identifier may be allocated to each MBS service provided via the MBS user data channel. The MBS control data channel, the MBS user data channel, or each MBS service provided in the MBS user data channel may be distinguished by the RNTI identifiers, so a logical channel identifier may not be configured for the MBS control data channel, the MBS user data channel, or each MBS service provided in the MBS user data channel, and the MAC header does not need to be included in MBS data. For each MBS service provided in the MBS user data channel, a first identifier or a second identifier for each MBS service may be configured or broadcasted, and each RNTI identifier corresponding to the first identifier or the second identifier for each MBS service may be may be configured or broadcasted via the system information, the RRC message, or the control message for the MBS channel. The first identifier may indicate a PLMN that provides the MBS service, or may indicate an MBS service type or session. The second identifier may indicate a more specific MBS service session or type. So, when receiving MBS data via a channel or a transmission resource for receiving the MBS service, the MAC layer device of the terminal may distinguish or demultiplex the MBS data to transfer the data to a corresponding upper layer device based on at least one of the received transfer channel (e.g., an MBCH, a DL-SCH, or a BCH, and/or the like), a partial bandwidth identifier, an SCell identifier, or an RNTI identifier. MBS reception embodiment 2-3 may be applied to a terminal in an RRC connected mode, an RRC inactive mode, or an RRC idle mode.

Figure 6:
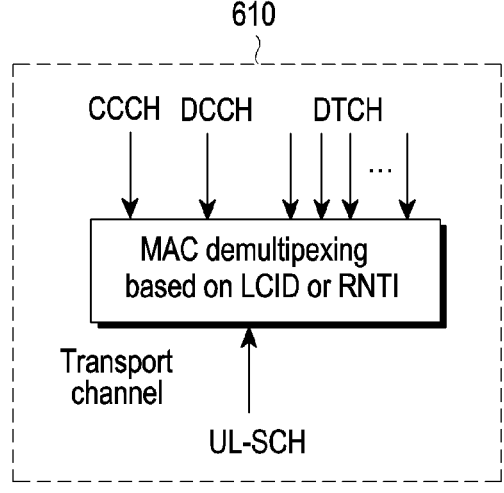
FIG. 6 is a diagram illustrating a method of multiplexing MBS data to be transmitted by a terminal in a MAC layer device according to an embodiment of the disclosure.

FIG. 6 is a diagram illustrating a method of multiplexing MBS data to be transmitted by a terminal in a MAC layer device according to an embodiment of the disclosure.

FIG. 6 shows an embodiment of multiplexing MBS data to be transmitted in MAC layer device in a case that a terminal in an RRC connected mode, an RRC inactive mode, or an RRC idle mode transmits the MBS data (e.g., MBS control data, MBS user data, or normal data other than MBS data) via a multicast bearer or a unicast bearer supporting an MBS service with a bearer structure described in FIGS. 4A to 4D.

In FIG. 6, an embodiment of transmitting MBS data or an embodiment of transmitting MBS data and multiplexing the MBS data may apply one embodiment or a plurality of embodiments among the following embodiments. In another embodiment, different embodiments among the following embodiments may be applied depending on whether the terminal is in the RRC connected mode, the RRC inactive mode, or the RRC idle mode.

MBS Transmission Embodiment 1

If a terminal receiving an MBS service with embodiments proposed in FIG. 5 needs to transmit uplink MBS data according to a network request or the necessity of the terminal itself, the terminal in an RRC connected mode, an RRC inactive mode, or an RRC idle mode may transmit the uplink MBS data to a base station or a network. The network or the base station may include a network request into MBS data (e.g., MBS control data, MBS user data, an RRC message, RLC control data (an RLC control PDU), PDCP control data (a PDCP control PDU), MAC control data (a MAC CE), or newly defined message) and transmit it to the terminal to transmit or configure an indication (e.g., service stop or resumption) for MBS service status or a response request (e.g., information or an indicator for requesting whether the terminal receives a specific MBS service, whether the terminal wants to receive the specific IBS service, whether the terminal is interested in the specific IBS service, preference between a multicast bearer and a unicast bearer, or whether bearer change is preferred (whether it wants to receive the MBS service via the multicast bearer or whether it wants to receive the IBS service via the unicast bearer)) for the MBS service. The base station or network may allow the terminal in the RRC connected mode, the RRC inactive mode, or the RRC idle mode for receiving the MBS service to receive MBS data including request of the network by transmitting the MBS data including request of the network via a separate downlink channel, a physical channel for the MBS service, a transport channel (e.g., an MBCH), or a separate transmission resource (a frequency or time resource, a transmission period, a partial bandwidth (or a partial bandwidth identifier) or bandwidth, a dedicated frequency (frequency information or an SCell identifier), or subcarrier spacing, and/or the like) configured via system information, an RRC message (e.g., an RRCSetup message, an RRCResume message, an RRCReconfiguration message, an RRCRelease message, or a newly defined RRC message), or a control message for an MBS channel (e.g., transmitted in an MBS control data channel) as described in FIG. 5. By transmitting it as described above, it is possible to transmit MBS data with one transmission resource and to allow a plurality of terminals to receive the MBS data, thereby preventing waste of a transmission resource and efficiently using it.

In another embodiment, the base station or network may allow terminals in an RRC connected mode for receiving the MBS service to receive MBS data including request of the network by transmitting the MBS data including request of the network to only the terminals in the RRC connected mode, respectively, via a downlink channel (e.g., a DL-SCH, a CCCH, or a DCCH), or a separate transmission resource (a frequency or time resource, a transmission period, a partial bandwidth (or a partial bandwidth identifier) or bandwidth, a dedicated frequency (frequency information or an SCell identifier), or subcarrier spacing, and/or the like), an SRB0(a CCCH), or an SRB1(a DCCH) configured via system information, an RRC message (e.g., an RRCSetup message, an RRCResume message, an RRCReconfiguration message, an RRCRelease message, or a newly defined RRC message), or a control message for an MBS channel (e.g., transmitted in an MBS control data channel) as described in FIG. 5. Uplink MBS data may include at least one of MBS control data, MBS user data, an RRC message, RLC control data, PDCP control data, MAC control data (a MAC CE), or a newly defined message. In MBS transmission embodiment 1 610, the terminal may transmit the uplink MBS data via a separate uplink channel, a physical channel for the MBS service, a transport channel (e.g., UL-MBCH and an MBS channel), or a separate transmission resource (a frequency or time resource, a transmission period, a partial bandwidth (or a partial bandwidth identifier) or bandwidth, a dedicated frequency (frequency information or an SCell identifier), or subcarrier spacing, and/or the like) configured via system information, an RRC message (e.g., an RRCSetup message, an RRCResume message, an RRCReconfiguration message, an RRCRelease message, or a newly defined RRC message), or a control message for an MBS channel (e.g., transmitted in an MBS control data channel). For example, the terminal may include a MAC header into the uplink MBS data, configure a logical channel identifier (a logical channel identifier configured or allocated for MBS control data (channel), MBS user data (channel), MBS user data (channel) for a specific MBS service, an SRB0 (CCCH) or an SRB1 (DCCH), a DRB, or MAC control information) of the MAC header corresponding to a purpose of the uplink MBS data (MBS control data, MBS user data, or MBS user data for the specific MBS service), and transmit the into the uplink MBS data. An RLC header, a PDCP header, or an SDAP header may also be included depending on which bearer structure is configured among bearer structures described in FIGS. 4A to 4D.

In another embodiment, the terminal may transmit the uplink MBS data in a uplink transmission resource indicated by a PDCCH by configuring an RNTI identifier (an RNTI configured for MBS user data (channel), or MBS user data (channel) for a specific MBS service) corresponding to a purpose of the uplink MBS data (MBS control data, MBS user data, or MBS user data for the specific MBS service). The uplink MBS data may be distinguished by an RNTI identifier, so the uplink MBS data may not include a MAC header or a logical channel identifier.

In another embodiment, the terminal may include a MAC header into the uplink MBS data, configure a logical channel identifier (a logical channel identifier configured or allocated for MBS control data (channel), MBS user data (channel), MBS user data (channel) for a specific MBS service, an SRB0 (CCCH) or an SRB1 (DCCH), a DRB, or MAC control information) of the MAC header corresponding to a purpose of the uplink MBS data (MBS control data, MBS user data, or MBS user data for the specific MBS service), and transmit the into the uplink MBS data. An RLC header, a PDCP header, or an SDAP header may also be included depending on which bearer structure is configured among bearer structures proposed in FIGS. 4A to 4D.

MBS Transmission Embodiment 2

If a terminal receiving an MBS service with embodiments described in FIG. 5 needs to transmit uplink MBS data according to a network request or the necessity of the terminal itself, only the terminal in an RRC connected mode may transmit the uplink MBS data to a base station or a network. The network or the base station may include a network request into MBS data (e.g., MBS control data, MBS user data, an RRC message, RLC control data, PDCP control data, MAC control data, or newly defined message) and transmit it to the terminal to transmit or configure an indication (e.g., service stop or resumption) for MBS service status or a response request (e.g., information or an indicator for requesting whether the terminal receives a specific MBS service, whether the terminal wants to receive the specific MBS service, whether the terminal is interested in the specific MBS service, preference between a multicast bearer and a unicast bearer, or whether bearer change is preferred (whether it wants to receive the MBS service via the multicast bearer or whether it wants to receive the MBS service via the unicast bearer)) for the MBS service. The base station or network may allow the terminal in the RRC connected mode, the RRC inactive mode, or the RRC idle mode for receiving the MBS service to receive MBS data including request of the network by transmitting the MBS data including request of the network via a separate downlink channel, a physical channel for the MBS service, a transport channel (e.g., an MBCH), or a separate transmission resource (a frequency or time resource, a transmission period, a partial bandwidth (or a partial bandwidth identifier) or bandwidth, a dedicated frequency (frequency information or an SCell identifier), or subcarrier spacing, and/or the like) configured via system information, an RRC message (e.g., an RRCSetup message, an RRCResume message, an RRCReconfiguration message, an RRCRelease message, or a newly defined RRC message), or a control message for an MBS channel (e.g., transmitted in an MBS control data channel) as proposed in FIG. 5. By transmitting it as described above, it is possible to transmit MBS data with one transmission resource and to allow a plurality of terminals to receive the MBS data, thereby preventing waste of a transmission resource and efficiently using it.

In another embodiment, the base station or network may allow terminals in an RRC connected mode for receiving the MBS service, to receive MBS data including request of the network by transmitting the MBS data including request of the network to only the terminals in the RRC connected mode, respectively, via a downlink channel (e.g., a DL-SCH, a CCCH, or a DCCH), or a separate transmission resource (a frequency or time resource, a transmission period, a partial bandwidth (or a partial bandwidth identifier) or bandwidth, a dedicated frequency (frequency information or an SCell identifier), or subcarrier spacing, and/or the like), an SRB0(a Common Control channel (CCCH)), or an SRB1(a Downlink Control Channel (DCCH)) configured via system information, an RRC message (e.g., an RRC-Setup message, an RRCResume message, an RRCRecon-figuration message, an RRCRelease message, or a newly defined RRC message), or a control message for an MBS channel (e.g., transmitted in an MBS control data channel) as described in FIG. 5. The uplink MBS data may be at least one of MBS control data, MBS user data, an RRC message, RLC control data, PDCP control data, MAC control data, or a newly defined message. In MBS transmission embodiment 2 510, the terminal in the RRC connection mode may transmit the uplink MBS data via a separate uplink channel, a physical channel, a transport channel (e.g., a UL-SCH, a channel for a normal data service), a separate transmission resource (a frequency or time resource, a transmission period, a partial bandwidth (or a partial bandwidth identifier) or a bandwidth, a dedicated frequency (frequency informa-tion or an SCell identifier), or subcarrier spacing, and/or the like), or a transmission resource allocated by a PDCCH scrambled with an RNTI identifier (e.g., a C-RNTI) allo-cated to the terminal in the RRC connected mode configured via the system information, the RRC message, or the control message for the MBS channel. If the terminal in the RRC connected mode transmits the uplink MBS data via the transmission resource allocated by the PDCCH scrambled with the RNTI identifier (e.g., the C-RNTI) allocated to the terminal in the RRC connected mode, the terminal in the RRC connected mode may transmit the uplink MBS data via an SRB0(a CCCH), an SRB1(a DCCH), or a DRB. For example, the terminal in the RRC connected mode may include a MAC header into the uplink MBS data, configure a logical channel identifier (a logical channel identifier configured or allocated for MBS control data (channel), MBS user data (channel), MBS user data (channel) for a specific MBS service, an SRB0 (CCCH) or an SRB1 (DCCH), a DRB, or MAC control information) of the MAC header corresponding to a purpose of the uplink MBS data (MBS control data, MBS user data, or MBS user data for the specific MBS service), and transmit the into the uplink MBS data. An RLC header, a PDCP header, or an SDAP header may also be included depending on which bearer structure is configured among bearer structures described in FIGS. 4A to 4D.

In another embodiment, the terminal in the RRC con-nected mode may configure an RNTI identifier (an RNTI configured for MBS user data (channel), or MBS user data (channel) for a specific MBS service) corresponding to a purpose of the uplink MBS data (MBS control data, MBS user data, or MBS user data for the specific MBS service), and transmit the uplink MBS data via a uplink transmission resource indicated by a PDCCH. The uplink MBS data may be distinguished by an RNTI identifier, so the uplink MBS data may not include a MAC header or a logical channel identifier.

In another embodiment, the terminal may include a MAC header into the uplink MBS data, configure a logical channel identifier (a logical channel identifier configured or allocated for MBS control data (channel), MBS user data (channel), MBS user data (channel) for a specific MBS service, an SRB0 (CCCH) or an SRB1 (DCCH), a DRB, or MAC control information) of the MAC header corresponding to a purpose of the uplink MBS data (MBS control data, MBS user data, or MBS user data for the specific MBS service), and transmit the into the uplink MBS data. An RLC header, a PDCP header, or an SDAP header may also be included depending on which bearer structure is configured among bearer structures described in FIGS. 4A to 4D.

Signaling procedures for a base station or a network to support an MBS service to a terminal and for the terminal to receive the MBS service will be described. The base station may provide the terminal with the MBS service or the terminal may receive the MBS service via one signaling procedure among various signaling procedures described below.

Figure 7:
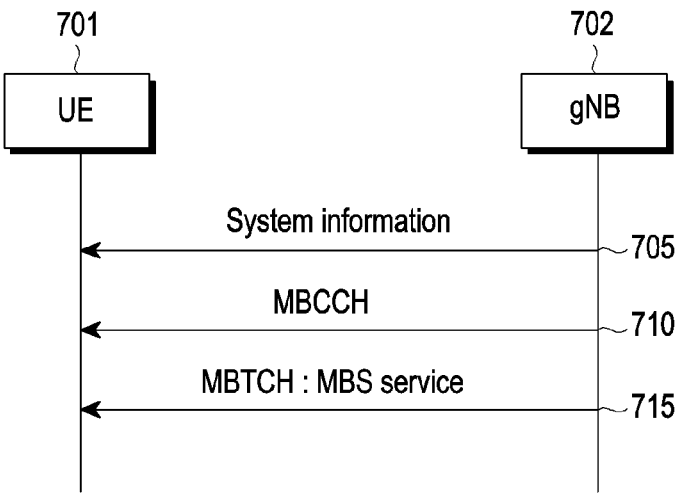
FIG. 7 is a diagram illustrating a first signaling procedure for supporting an MBS service according to an embodiment of the disclosure.

FIG. 7 is a diagram illustrating a first signaling procedure for supporting an MBS service according to an embodiment of the disclosure.

The first signaling procedure for supporting the MBS service may support the MBS service to a terminal based on system information.

Referring to FIG. 7, a terminal 701 performs a cell selection or reselection procedure in an RRC idle mode or an RRC inactive mode to select a suitable cell and perform camp on. In the RRC idle mode, the RRC inactive mode, or an RRC connected mode, the terminal receives system information from a base station 702 (step 705). The terminal may receive pieces of configuration information for the MBS service via the system information. The configuration information for the MBS service may include one or a plurality of pieces of the following configuration informa-tion. That is, a network may transmit the one or the plurality of pieces of the following configuration information in the system information to support the MBS service.

Information indicating whether the MBS service is sup-ported

Configuration information for a physical channel or a downlink or uplink transport channel (e.g., an MBCH, an MBCCH, an MBTCH, or a DL-SCH) for the MBS service Information about transmission resource (a frequency or time resource, a transmission period, a partial band-width (or a partial bandwidth identifier) or a bandwidth, a dedicated frequency (frequency information or an SCell identifier), subcarrier spacing, a subframe num-ber, or an identifier indicating a transmission pattern, and/or the like) on which the physical channel or downlink/uplink transport channel (e.g., an MBCH, an MBS control data channel (MBCCH), or an MBS user data channel (MBTCH)) is transmitted Configuration information for an MBS service supported in a current cell (e.g., a list of MBS services, or a first identifier (e.g., a Temporary Mobile Group Identity (TMGI)) or a second identifier (e.g., a session Identity)) for each MBS service may be configured or broad-casted, and each logical channel identifier, each bearer identifier, or each RNTI identifier information which corresponds to the first identifier or the second identi-fier of each MBS service may be configured or broad-casted. In another embodiment, for each bearer (or bearer identifier), each logical channel, each RLC con-figuration information, or each PDCP configuration information, the first identifier (e.g., the TMGI), the second identifier (e.g., the session identity) or the RNTI identifier for the MBS service may be configured or broadcasted. The first identifier may indicate a Public Land Mobile Network (PLMN) which provides the MBS service, or may indicate a service type or session of the MBS service. The second identifier may indicate a more specific session or type of the MBS service. The configuration information for the MBS service may include information about a transmission resource (a frequency or time resource, a transmission period, a partial bandwidth (or a partial bandwidth identifier) or bandwidth, dedicated frequency (frequency information or an SCell identifier), subcarrier spacing, a subframe number, or an identifier indicating a transmission pattern, and/or the like) on which each MBS service is supported or broadcasted or transmitted.

Bearer configuration information (including a bearer structure described in FIGS. 4A to 4D)

Indicator configuration information indicating whether to use HARQ reordering, HARQ retransmission, or HARQ ACK or NACK, indicator configuration information indicating whether to use an RLC reordering function, transmission resource information to transmit HARQ ACK or NACK, indicator configuration information indicating whether to use an RLC in-order delivery function, configuration information for an RLC reordering timer value, or indicator configuration information for whether to use a PDCP out-of-order delivery function (For example, the indicator configuration information indicating whether to use the HARQ reordering, HARQ retransmission, or HARQ ACK or NACK, the indicator configuration information indicating whether to use the RLC reordering function, the indicator configuration information indicating whether to use the RLC in-order delivery function, the configuration information for the RLC reordering timer value, configuration information for an RLC mode (a TM, UM, or AM), configuration information for whether to use a data division function in an RLC layer device, or the indicator configuration information for whether to use the PDCP out-of-order delivery function may be configured per MBS service or bearer. In another embodiment, the configuration information(s) is defined as default configuration information so that a terminal may configure an MBS bearer having some of the functions as a default function without the configuration information.)

Indicator configuration information indicating whether a bearer or bearer identifier which supports (transmits or receives) the MBS service is a unicast bearer or a multicast bearer Information (e.g., a frequency or time resource or cell identifier) related to an IBS dedicated carrier or cell (a Cell or SCell or PCell) for the MBS service MBS dedicated partial bandwidth information (e.g., downlink partial bandwidth or uplink partial bandwidth information) or partial bandwidth identifier information for the MBS service Indicator for configuring a header compression function or procedure for a bearer supporting the MBS service, or configuration information for a header compression procedure or data compression procedure (e.g., an indicator indicating whether to continue using header compression context)

Information about a length of a PDCP serial number or RLC serial number (In another embodiment, a default length for the RLC serial number or PDCP serial number may be determined.)

Indicator indicating whether an RLC layer device of the bearer supporting the MBS service supports or enables a unidirectional communication or supports or enables a bidirectional communication The terminal 701 may transmit, to a base station 702, a cell, or a network, a message or indicator which requests to broadcast system information for the MBS service in a camped-on cell if configuration information for the MBS service is not broadcasted via the system information in the camped-on cell. Upon receiving the request message or indicator, the base station 702 or network may broadcast or transmit the configuration information for the MBS service via the system information. By receiving the request message or indicator from the terminal 701, the base station 702 may prevent waste of a transmission resource which may occur due to MBS service-related system information unnecessarily always being broadcasted via the system information.

Upon receiving the system information in step 705, the terminal 701 may store MBS service-related configuration information. The terminal 701 may search for or determine an MBS service which the terminal 701 is interested in or intends to receive using the MBS service-related configuration information included in the system information. The terminal 701 may receive MBS data (IBS control data or MBS user data) on a transmission resource on which an MBS control data channel or an MBS user data channel for an MBS service of interest is transmitted. When the terminal 701 receives the system information, when the terminal 701 intends to receive a service of interest, when the terminal 701 has the service of interest, when the terminal 701 determines the service of interest, when the terminal 701 exists in or enters a cell or area supporting the MBS service in the system information, when the terminal 701 configures or connects to the MBS service (or session), or when the configuration information or bearer configuration information for the MBS service is received or broadcasted via the system information, an RRC message (e.g., an RRCSetup message, an RRCResume message, an RRCReconfiguration message, an RRCRelease message, or a newly defined new RRC message), or a control message for an MBS channel (for example, transmitted on the MBS control data channel), the terminal 701 may configure a unicast bearer, a multicast bearer, or an MBS bearer, which has a bearer structure described in FIGS. 4A to 4D, for receiving the MBS service.

The terminal 701 may receive the MBS service-related configuration information by receiving the MBS data (e.g., the MBS control data) via the MBS control data channel or transmission resource for the MBS service of interest (step 710).

The MBS service-related configuration information may include one or a plurality of pieces of the following configuration information to support the MBS service.

Information indicating whether the MBS service is supported

Configuration information for a physical channel or a downlink or uplink transport channel (e.g., an MBCH, an MBCCH, an MBTCH, or a DL-SCH) for the MBS service Information about transmission resource (a frequency or time resource, a transmission period, a partial bandwidth (or a partial bandwidth identifier) or a bandwidth, a dedicated frequency (frequency information or an SCell identifier), subcarrier spacing, a subframe number, or an identifier indicating a transmission pattern, and/or the like) on which the physical channel or downlink/uplink transport channel (e.g., an MBCH, an MBS control data channel (MBCCH), or MBS user data channel (MBTCH)) is transmitted Configuration information for an MBS service supported in a current cell (e.g., a list of MBS services, or a first identifier (e.g., a TMGI) or a second identifier (e.g., a session Identity)) for each MBS service may be configured or broadcasted, and each logical channel identifier, each bearer identifier, or each RNTI identifier information which corresponds to the first identifier or the second identifier of each MBS service may be configured or broadcasted. In another embodiment, for each bearer (or bearer identifier), each logical channel, each RLC configuration information, or each PDCP configuration information, the first identifier (e.g., the TMGI), the second identifier (e.g., the session identity) or the RNTI identifier for the MBS service may be configured or broadcasted. The first identifier may indicate a PLMN which provides the MBS service, or may indicate a service type or session of the MBS service. The second identifier may indicate a more specific session or type of the MBS service. The configuration information for the MBS service may include information about a transmission resource (a frequency or time resource, a transmission period, a partial bandwidth (or a partial bandwidth identifier) or bandwidth, dedicated frequency (frequency information or an SCell identifier), subcarrier spacing, a subframe number, or an identifier indicating a transmission pattern, and/or the like) on which each MBS service is supported or broadcasted or transmitted.

Bearer configuration information (including a bearer structure described in FIGS. 4A to 4D)

Indicator configuration information indicating whether to use HARQ reordering, HARQ retransmission, or HARQ ACK or NACK, indicator configuration information indicating whether to use an RLC reordering function, transmission resource information to transmit HARQ ACK or NACK, indicator configuration information indicating whether to use an RLC in-order delivery function, configuration information for an RLC reordering timer value, or indicator configuration information for whether to use a PDCP out-of-order delivery function (For example, the indicator configuration information indicating whether to use the HARQ reordering, HARQ retransmission, or HARQ ACK or NACK, the indicator configuration information indicating whether to use the RLC reordering function, the indicator configuration information indicating whether to use the RLC in-order delivery function, the configuration information for the RLC reordering timer value, configuration information for an RLC mode (a TM, UM, or AM), configuration information for whether to use a data division function in an RLC layer device, or the indicator configuration information for whether to use the PDCP out-of-order delivery function may be configured per MBS service or bearer. In another embodiment, the configuration information(s) is defined as default configuration information so that a terminal may configure an MBS bearer having some of the functions as a default function without the configuration information.)

Indicator configuration information indicating whether a bearer or bearer identifier which supports (transmits or receives) the MBS service is a unicast bearer or a multicast bearer Information (e.g., a frequency or time resource or cell identifier) related to an IBS dedicated carrier or cell (a Cell or SCell or PCell) for the MBS service MBS dedicated partial bandwidth information (e.g., downlink partial bandwidth or uplink partial bandwidth information) or partial bandwidth identifier information for the MBS service Indicator for configuring a header compression function or procedure for a bearer supporting the MBS service, or configuration information for a header compression procedure or data compression procedure (e.g., an indicator indicating whether to continue using header compression context)

Information about a length of a PDCP serial number or RLC serial number (In another embodiment, a default length for the RLC serial number or PDCP serial number may be determined.)

Indicator indicating whether an RLC layer device of the bearer supporting the MBS service supports or enables a unidirectional communication or supports or enables a bidirectional communication.

Upon receiving the MBS service-related configuration information, the terminal 701 may identify at least one of a first identifier, a second identifier, an RNTI identifier, or a logical channel identifier which is configured or allocated for an MBS service which the terminal 701 is interested in or intends to receive for receiving the MBS service. The terminal 701 may receive MBS data by applying an embodiment described in FIGS. 4A to 4D and/or FIG. 6 via an MBS user data service channel using the identified identifier to receive the MBS service (step 715).

Figure 8:
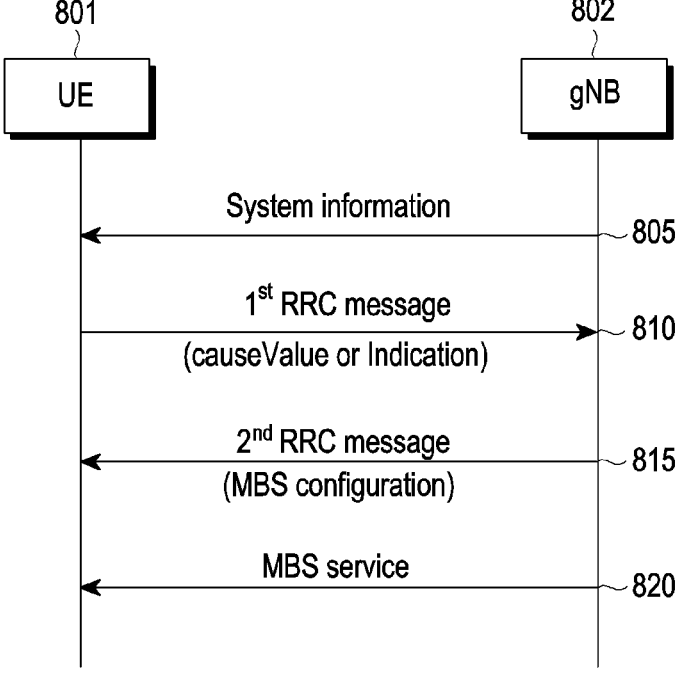
FIG. 8 is a diagram illustrating a second signaling procedure for supporting an MBS service according to an embodiment of the disclosure.

FIG. 8 is a diagram illustrating a second signaling procedure for supporting an MBS service according to an embodiment of the disclosure.

In the second signaling procedure for supporting the MBS service, a terminal may identify whether an MBS service, in which the terminal is interested or which is broadcasted, is broadcasted based on system information, or set up a connection with a network to transmit, to a base station (or the network), indication indicating the MBS service which the terminal is interested in or intends to receive, or indicating that the terminal intends to receive the MBS service, receive, from the base station (or the network), MBS service-related configuration information, and receive the MBS service. In the second signaling procedure, the terminal may maintain an RRC idle mode, an RRC connected mode, or an RRC inactive mode (for example, the terminal may receive the MBS service without switching an RRC mode). In another embodiment, the terminal may transmit, to the base station (or the network), the indication indicating the MBS service which the terminal is interested in or intends to receive, or indicating that the terminal intends to receive the MBS service, and enter the RRC connected mode from the RRC idle mode or the RRC inactive mode in order to receive the MBS service-related configuration information from the base station (or the network). Alternatively, upon receiving the MBS service-related configuration, information, the terminal may receive the MBS service in the RRC connected mode or may receive the MBS service in the RRC idle mode or the RRC inactive mode.

Referring to FIG. 8, a terminal 801 performs a cell selection or reselection procedure in an RRC idle mode or an RRC inactive mode to select a suitable cell and perform camp on. In the RRC idle mode, the RRC inactive mode, or an RRC connected mode, the terminal 801 receives system information from a base station 802 (step 805). The terminal 801 may receive pieces of configuration information for the MBS service via the system information. The configuration information for the MBS service may include one or a plurality of pieces of the following configuration information. That is, a network may transmit the one or the plurality of pieces of the following configuration information in the system information to support the MBS service.

Information indicating whether the MBS service is supported

Configuration information for a physical channel or a downlink or uplink transport channel (e.g., an MBCH, an MBCCH, an MBTCH, or a DL-SCH) for the MBS service Information about transmission resource (a frequency or time resource, a transmission period, a partial bandwidth (or a partial bandwidth identifier) or a bandwidth, a dedicated frequency (frequency information or an SCell identifier), subcarrier spacing, a subframe number, or an identifier indicating a transmission pattern, and/or the like) on which the physical channel or downlink/uplink transport channel (e.g., an MBCH, an MBCCH, or an MBTCH) is transmitted Configuration information for an MBS service supported in a current cell (e.g., a list of MBS services, or a first identifier (e.g., a TMGI) or a second identifier (e.g., a session Identity)) for each MBS service may be configured or broadcasted, and each logical channel identifier, each bearer identifier, or each RNTI identifier information which corresponds to the first identifier or the second identifier of each MBS service may be configured or broadcasted. In another embodiment, for each bearer (or bearer identifier), each logical channel, each RLC configuration information, or each PDCP configuration information, the first identifier (e.g., the TMGI), the second identifier (e.g., the session identity) or the RNTI identifier for the MBS service may be configured or broadcasted. The first identifier may indicate a PLMN which provides the MBS service, or may indicate a service type or session of the MBS service. The second identifier may indicate a more specific session or type of the MBS service. The configuration information for the MBS service may include information about a transmission resource (a frequency or time resource, a transmission period, a partial bandwidth (or a partial bandwidth identifier) or bandwidth, dedicated frequency (frequency information or an SCell identifier), subcarrier spacing, a subframe number, or an identifier indicating a transmission pattern, and/or the like) on which each MBS service is supported or broadcasted or transmitted.

Bearer configuration information (including a bearer structure described in FIGS. 4A to 4D)

Indicator configuration information indicating whether to use HARQ reordering, HARQ retransmission, or HARQ ACK or NACK, indicator configuration information indicating whether to use an RLC reordering function, transmission resource information to transmit HARQ ACK or NACK, indicator configuration information indicating whether to use an RLC in-order delivery function, configuration information for an RLC reordering timer value, or indicator configuration information for whether to use a PDCP out-of-order delivery function (For example, the indicator configuration information indicating whether to use the HARQ reordering, HARQ retransmission, or HARQ ACK or NACK, the indicator configuration information indicating whether to use the RLC reordering function, the indicator configuration information indicating whether to use the RLC in-order delivery function, the configuration information for the RLC reordering timer value, configuration information for an RLC mode (a TM, UM, or AM), configuration information for whether to use a data division function in an RLC layer device, or the indicator configuration information for whether to use the PDCP out-of-order delivery function may be configured per MBS service or bearer. In another embodiment, the configuration information(s) is defined as default configuration information so that a terminal may configure an MBS bearer having some of the functions as a default function without the configuration information.)

Indicator configuration information indicating whether a bearer or bearer identifier which supports (transmits or receives) the MBS service is a unicast bearer or a multicast bearer Information (e.g., a frequency or time resource or cell identifier) related to an IBS dedicated carrier or cell (a Cell or SCell or PCell) for the MBS service MBS dedicated partial bandwidth information (e.g., downlink partial bandwidth or uplink partial bandwidth information) or partial bandwidth identifier information for the MBS service Indicator for configuring a header compression function or procedure for a bearer supporting the MBS service, a scheme to configure and support a data compression procedure, or configuration information for a header compression procedure or data compression procedure (e.g., an indicator indicating whether to continue using header compression context)

Information about a length of a PDCP serial number or RLC serial number (In another embodiment, a default length for the RLC serial number or PDCP serial number may be determined.)

Indicator indicating whether an RLC layer device of the bearer supporting the MBS service supports or enables a unidirectional communication or supports or enables a bidirectional communication The terminal 801 may transmit, to a base station 802, a cell, or a network, a message or indicator which requests to broadcast system information for the MBS service in a camped-on cell if configuration information for the MBS service is not broadcasted via the system information in the camped-on cell. Upon receiving the request message or indicator, the base station 802 or network may broadcast or transmit the configuration information for the MBS service via the system information. By receiving the request message or indicator from the terminal 801, the base station 802 may prevent waste of a transmission resource which may occur due to MBS service-related system information unnecessarily always being broadcasted via the system information.

The terminal 801 which receives or identifies the MBS service-related information via the system information received in step 805, the terminal 801 which identifies that the MBS service of interest is broadcasted in a current cell via the system information, or the terminal 801 which intends to request the MBS service of interest from the network may perform a random access procedure and transmit a first RRC message to the network (step 810). The first RRC message may include at least one of a newly defined RRC message for the MBS service, an RRCSetupRequest message, an RRCResumeRequest message, another existing RRC message, MAC control information, RLC control information, or PDCP control information. The first RRC message may include an indicator which the terminal 801 intends to receive the MBS service. In addition, the first RRC message may include an indicator indicating MBS service reception as a reason for setting up an RRC connection with the network. In addition, the first RRC message may include at least one of a first identifier, a second identifier, a logical channel identifier, an RNTI identifier, or a bearer identifier of the MBS service which the terminal 801 is interested in or intends to receive. The terminal 801 may transmit an indicator indicating a type (e.g., a unicast bearer or a multicast bearer) or a structure of a bearer to need to be applied, established, or used for the MBS service via the first RRC message. The terminal 801 may transmit an indicator indicating a type (e.g., a unicast bearer or a multicast bearer) or a structure of a preferred bearer via the first RRC message. The terminal 801 may transmit an indicator indicating in which RRC mode (an RRC connected mode, an RRC idle mode, or an RRC inactive mode) the terminal 801 wants to receive the MBS service via the first RRC message. The terminal 801 may transmit, via the first RRC message, at least one of an indicator for an MBS service of no interest, an indicator for an MBS service for which reception is to be stopped, an indicator for an MBS service for which reception has been stopped, or an indicator for changing the MBS service to another MBS service. The indicator(s) transmitted by the terminal 801 via the first RRC message may be determined or indicated based on the system information received in step 805. The terminal 801 may transmit terminal capability information via the first RRC message. For example, when intending to receive the MBS service, the terminal 801 may transmit, via the first RRC message, a function supported by the terminal capability and/or configurable configuration information, or a function and/or configuration information implemented in the terminal to inform the base station 802 of them. If the terminal 801 has previously set up a connection or stored a terminal identifier allocated from the network, or if a terminal identifier is indicated by a upper layer device (e.g., a NAS layer device or an RRC layer device), the terminal 801 may transmit the terminal identifier to the network via the first RRC message. The network may distinguish or identify the terminal 801 based on the received terminal identifier. For example, the base station 802 or the network may identify the terminal based on the terminal identifier included in the first RRC message, may identify the terminal by retrieving terminal capability information from a core network, or identify the terminal by retrieving configuration information of the terminal from a base station with which the terminal has previously set up a connection. When the terminal 801 receives the system information, when the terminal 801 intends to receive a service of interest, when the terminal 801 has the service of interest, when the terminal 801 determines the service of interest, when the terminal 801 exists in or enters a cell or area supporting the MBS service in the system information, or when the terminal 801 establishes or connects to the MBS service (or session), the terminal 801 may set up a connection with the network and transmit the first RRC message.

In step 810, upon receiving the first RRC message, the base station 802 may identify the MBS service which the terminal 801 is interested in or intends to receive and/or the terminal capability information.

The base station 802 or the network may transmit a second RRC message to the terminal 801 to support and/or configure the MBS service (step 815). The second RRC message may include at least one of a newly defined RRC message for the MBS service, an RRCRelease message, an RRCReconfiguration message, or another existing RRC message.

The second RRC message may include at least one of configuration information for the MBS service, configuration information for the MBS service indicated by the terminal 801 via the first RRC message, bearer configuration information, or unicast bearer, multicast bearer or MBS bearer configuration information for receiving the MBS service.

The second RRC message may include one or a plurality of pieces of the following configuration information to support the MBS service.

Information indicating whether the MBS service is supported

Configuration information for a physical channel or a downlink or uplink transport channel (e.g., an MBCH, an MBCCH, an MBTCH, or a DL-SCH) for the MBS service Information about transmission resource (a frequency or time resource, a transmission period, a partial bandwidth (or a partial bandwidth identifier) or a bandwidth, a dedicated frequency (frequency information or an SCell identifier), subcarrier spacing, a subframe number, or an identifier indicating a transmission pattern, and/or the like) on which the physical channel or downlink/uplink transport channel (e.g., an MBCH, an MBCCH, or an MBTCH) is transmitted Configuration information for an MBS service supported in a current cell (e.g., a list of MBS services, or a first identifier (e.g., a TMGI) or a second identifier (e.g., a session Identity)) for each MBS service may be configured or broadcasted, and each logical channel identifier, each bearer identifier, or each RNTI identifier information which corresponds to the first identifier or the second identifier of each MBS service may be configured or broadcasted. In another embodiment, for each bearer (or bearer identifier), each logical channel, each RLC configuration information, or each PDCP configuration information, the first identifier (e.g., the TMGI), the second identifier (e.g., the session identity) or the RNTI identifier for the MBS service may be configured or broadcasted. The first identifier may indicate a PLMN which provides the MBS service, or may indicate a service type or session of the MBS service. The second identifier may indicate a more specific session or type of the MBS service. The configuration information for the MBS service may include information about a transmission resource (a frequency or time resource, a transmission period, a partial bandwidth (or a partial bandwidth identifier) or bandwidth, dedicated frequency (frequency information or an SCell identifier), subcarrier spacing, a subframe number, or an identifier indicating a transmission pattern, and/or the like) on which each MBS service is supported or broadcasted or transmitted.

Bearer configuration information (including a bearer structure described in FIGS. 4A to 4D)

Indicator configuration information indicating whether to use HARQ reordering, HARQ retransmission, or HARQ ACK or NACK, indicator configuration information indicating whether to use an RLC reordering function, transmission resource information to transmit HARQ ACK or NACK, indicator configuration information indicating whether to use an RLC in-order delivery function, configuration information for an RLC reordering timer value, or indicator configuration information for whether to use a PDCP out-of-order delivery function (For example, the indicator configuration information indicating whether to use the HARQ reordering, HARQ retransmission, or HARQ ACK or NACK, the indicator configuration information indicating whether to use the RLC reordering function, the indicator configuration information indicating whether to use the RLC in-order delivery function, the configuration information for the RLC reordering timer value, configuration information for an RLC mode (a TM, UM, or AM), configuration information for whether to use a data division function in an RLC layer device, or the indicator configuration information for whether to use the PDCP out-of-order delivery function may be configured per MBS service or bearer. In another embodiment, the configuration information(s) is defined as default configuration information so that a terminal may configure an MBS bearer having some of the functions as a default function without the configuration information.)

Indicator configuration information indicating whether a bearer or bearer identifier which supports (transmits or receives) the MBS service is a unicast bearer or a multicast bearer Indicator or configuration information commanding transition into an RRC idle mode, an RRC inactive mode, or an RRC connected mode MBS service configuration information or bearer configuration information proposed above which allows the MBS service to be received in the RRC idle mode MBS service configuration information or bearer configuration information proposed above which allows the MBS service to be received in the RRC inactive mode Information (e.g., a frequency or time resource or cell identifier) related to an MBS dedicated carrier or cell (a Cell or SCell or PCell) for the MBS service MBS dedicated partial bandwidth information (e.g., downlink partial bandwidth or uplink partial bandwidth information) or partial bandwidth identifier information for the MBS service Indicator for configuring a header compression function or procedure for a bearer supporting the MBS service, or configuration information for a header compression procedure or data compression procedure (e.g., an indicator indicating whether to continue using header compression context)

Information about a length of a PDCP serial number or RLC serial number (In another embodiment, a default length for the RLC serial number or PDCP serial number may be determined.)

Indicator indicating whether an RLC layer device of the bearer supporting the MBS service supports or enables a unidirectional communication or supports or enables a bidirectional communication Upon receiving the second RRC message, the terminal 801 may store MBS service-related configuration information. The terminal 801 may search for or determine an MBS service which the terminal 801 is interested in or intends to receive using the MBS service-related configuration information included in the second RRC message. The terminal 801 may receive MBS data (MBS control data or MBS user data) on a transmission resource on which an MBS control data channel or an MBS user data channel for an MBS service of interest is transmitted. When the terminal receives the system information (or the second RRC message), when the terminal intends to receive a service of interest, when the terminal has the service of interest, when the terminal determines the service of interest, when the terminal exists in or enters a cell or area supporting the MBS service in the system information, when the terminal establishes or connects to the MBS service (or session), or when the configuration information or bearer configuration information for the MBS service is received or broadcasted via the system information, an RRC message (e.g., an RRCSetup message, an RRCResume message, an RRCReconfiguration message, an RRCRelease message, or newly defined new RRC message), or a control message for an MBS channel (for example, transmitted on the MBS control data channel), the terminal 801 may establish a unicast bearer, a multicast bearer, or an MBS bearer, which has a bearer structure described in FIGS. 4A to 4D, for receiving the MBS service.

The terminal 801 may receive MBS service-related configuration information by receiving MBS data (e.g., MBS control data) via an MBS control data channel or a transmission resource for an MBS service of interest.

Upon receiving the MBS service-related configuration information, the terminal 801 may identify at least one of a first identifier, a second identifier, an RNTI identifier, or a logical channel identifier which is configured or allocated for an MBS service which the terminal 801 is interested in or intends to receive for receiving the MBS service. The terminal 801 may receive MBS data by applying an embodiment described in FIGS. 4A to 4D and/or FIG. 6 via an MBS user data service channel using the identified identifier to receive the MBS service (step 820).

An encryption procedure or an integrity protection procedure may not be applied to the first RRC message or the second RRC message. In another embodiment, the encryption procedure or the integrity protection procedure may be applied to the first RRC message or the second RRC message in order to enhance security.

Figure 9:
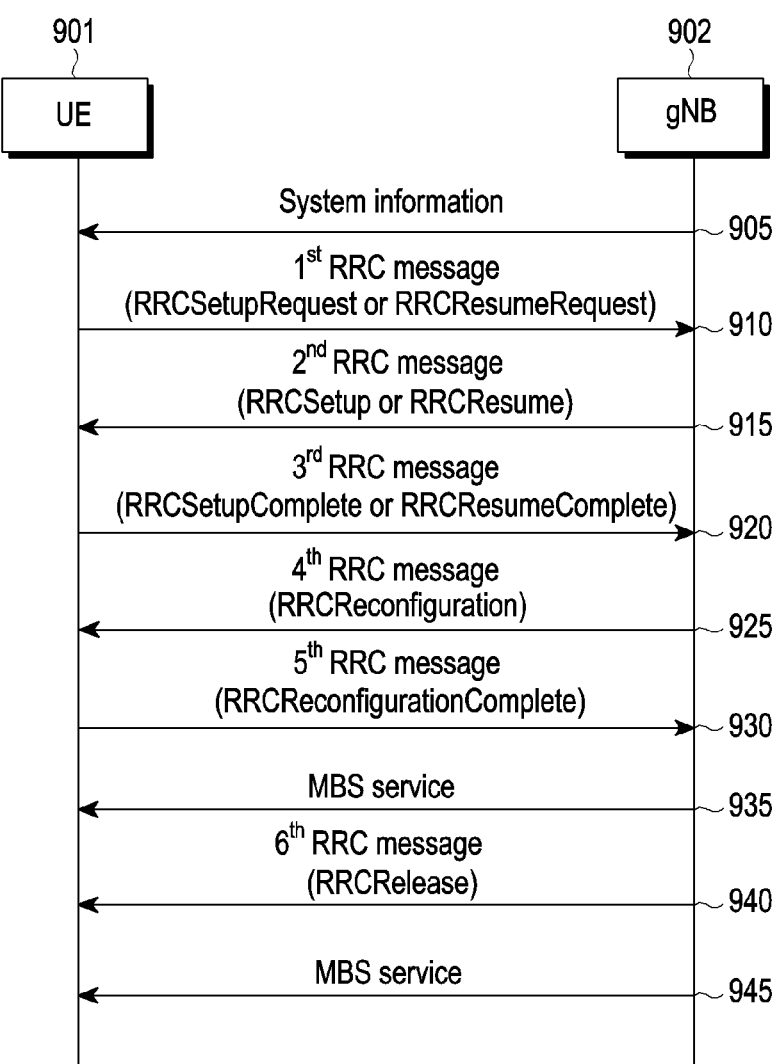
FIG. 9 is a diagram illustrating a third signaling procedure for supporting an MBS service according to an embodiment of the disclosure.

FIG. 9 is a diagram illustrating a third signaling procedure for supporting an MBS service according to an embodiment of the disclosure.

In the third signaling procedure for supporting the MBS service, a terminal may identify whether an MBS service, which the terminal is interested in or which is broadcasted, is broadcasted based on system information, or set up a connection with a network to transmit, to a base station (or the network), indication indicating the MBS service which the terminal is interested in or intends to receive, or indicating that the terminal intends to receive the MBS service, receive, from the base station (or the network), MBS service-related configuration information, and receive the MBS service. In the third signaling procedure, the terminal may maintain an RRC idle mode, an RRC connected mode, or an RRC inactive mode. In another embodiment, the terminal may transmit, to the base station (or the network), the indication indicating the MBS service which the terminal is interested in or intends to receive, or indicating that the terminal intends to receive the MBS service, and enter the RRC connected mode from the RRC idle mode or the RRC inactive mode in order to receive the MBS service-related configuration information from the base station (or the network). Alternatively, upon receiving the MBS service-related configuration, information, the terminal may receive the MBS service in the RRC connected mode or may receive the MBS service in the RRC idle mode or the RRC inactive mode.

Referring to FIG. 9, a terminal 901 performs a cell selection or reselection procedure in an RRC idle mode or an RRC inactive mode to select a suitable cell and perform camp on. In the RRC idle mode, the RRC inactive mode, or an RRC connected mode, the terminal 901 receives system information from a base station 902 (step 905). The terminal 901 may receive pieces of configuration information for the MBS service via the system information. The configuration information for the MBS service may include one or a plurality of pieces of the following configuration information. That is, a network may transmit the one or the plurality of pieces of the following configuration information in the system information to support the MBS service.

Information indicating whether the MBS service is supported

Configuration information for a physical channel or a downlink or uplink transport channel (e.g., an MBCH, an MBCCH, an MBTCH, or a DL-SCH) for the MBS service Information about transmission resource (a frequency or time resource, a transmission period, a partial bandwidth (or a partial bandwidth identifier) or a bandwidth, a dedicated frequency (frequency information or an SCell identifier), subcarrier spacing, a subframe number, or an identifier indicating a transmission pattern, and/or the like) on which the physical channel or downlink or uplink transport channel (e.g., an MBCH, an MBCCH, or an MBTCH) is transmitted Configuration information for an MBS service supported in a current cell (e.g., a list of MBS services, or a first identifier (e.g., a TMGI) or a second identifier (e.g., a session Identity)) for each MBS service may be configured or broadcasted, and each logical channel identifier, each bearer identifier, or each RNTI identifier information which corresponds to the first identifier or the second identifier of each MBS service may be configured or broadcasted. In another embodiment, for each bearer (or bearer identifier), each logical channel, each RLC configuration information, or each PDCP configuration information, the first identifier (e.g., the TMGI), the second identifier (e.g., the session identity) or the RNTI identifier for the MBS service may be configured or broadcasted. The first identifier may indicate a PLMN which provides the MBS service, or may indicate a service type or session of the MBS service. The second identifier may indicate a more specific session or type of the MBS service. The configuration information for the MBS service may include information about a transmission resource (a frequency or time resource, a transmission period, a partial bandwidth (or a partial bandwidth identifier) or bandwidth, dedicated frequency (frequency information or an SCell identifier), subcarrier spacing, a subframe number, or an identifier indicating a transmission pattern, and/or the like) on which each MBS service is supported or broadcasted or transmitted.

Bearer configuration information (including a bearer structure described in FIGS. 4A to 4D)

Indicator configuration information indicating whether to use HARQ reordering, HARQ retransmission, or HARQ ACK or NACK, indicator configuration information indicating whether to use an RLC reordering function, transmission resource information to transmit HARQ ACK or NACK, indicator configuration information indicating whether to use an RLC in-order delivery function, configuration information for an RLC reordering timer value, or indicator configuration information for whether to use a PDCP out-of-order delivery function (For example, the indicator configuration information indicating whether to use the HARQ reordering, HARQ retransmission, or HARQ ACK or NACK, the indicator configuration information indicating whether to use the RLC reordering function, the indicator configuration information indicating whether to use the RLC in-order delivery function, the configuration information for the RLC reordering timer value, configuration information for an RLC mode (a TM, UM, or AM), configuration information for whether to use a data division function in an RLC layer device, or the indicator configuration information for whether to use the PDCP out-of-order delivery function may be configured per MBS service or bearer. In another embodiment, the configuration information(s) is defined as default configuration information so that a terminal may configure an MBS bearer having some of the functions as a default function without the configuration information.)

Indicator configuration information indicating whether a bearer or bearer identifier which supports (transmits or receives) the MBS service is a unicast bearer or a multicast bearer Information (e.g., a frequency or time resource or cell identifier) related to an IBS dedicated carrier or cell (a Cell or SCell or PCell) for the MBS service MBS dedicated partial bandwidth information (e.g., downlink partial bandwidth or uplink partial bandwidth information) or partial bandwidth identifier information for the MBS service Indicator for configuring a header compression function or procedure for a bearer supporting the MBS service, or configuration information for a header compression procedure or data compression procedure (e.g., an indicator indicating whether to continue using header compression context)

Information about a length of a PDCP serial number or RLC serial number (In another embodiment, a default length for the RLC serial number or PDCP serial number may be determined.)

Indicator indicating whether an RLC layer device of the bearer supporting the MBS service supports or enables a unidirectional communication or supports or enables a bidirectional communication The terminal 901 may transmit, to a base station 902, a cell, or a network, a message or indicator which requests to broadcast system information for the MBS service in a camped-on cell if configuration information for the MBS service is not broadcasted via the system information in the camped-on cell. Upon receiving the request message or indicator, the base station 902 or network may broadcast or transmit the configuration information for the MBS service via the system information. By receiving the request message or indicator from the terminal 1201, the base station 902 may prevent waste of a transmission resource which may occur due to MBS service-related system information unnecessarily always being broadcasted via the system information.

The terminal 901 which receives or identifies the MBS service-related information via the system information, the terminal 901 which identifies that the MBS service of interest is broadcasted in a current cell via the system information, or the terminal 901 which intends to request the MBS service of interest from the network may perform a random access procedure and transmit a first RRC message to the network (step 910). The first RRC message may include at least one of a newly defined RRC message for the MBS service, an RRCSetupRequest message, an RRCResumeRequest message, or another existing RRC message. The first RRC message may include an indicator which the terminal 901 intends to receive the MBS service. In addition, the first RRC message may include an indicator indicating MBS service reception as a reason for setting up an RRC connection with the network. If the terminal 901 has previously set up a connection or stored a terminal identifier (e.g., a terminal identifier (5G-S-TMSI) allocated from a core network or a terminal identifier (a short I-RNTI or an I-RNTI) for resuming an RRC connection allocated from a base station) allocated from the network, or if the terminal identifier is indicated by a upper layer device (e.g., a NAS layer device or an RRC layer device), the terminal 901 may transmit the terminal identifier via the first RRC message thereby causing the network to distinguish or identify the terminal. For example, the base station 902 or the network may identify the terminal based on the terminal identifier included in the first RRC message, may identify the terminal by retrieving terminal capability information from a core network, or identify the terminal by retrieving configuration information or the terminal capability information of the terminal from a base station with which the terminal has previously set up a connection. When the terminal 901 receives the system information, when the terminal 901 intends to receive a service of interest, when the terminal 901 has the service of interest, when the terminal 901 determines the service of interest, when the terminal 901 exists in or enters a cell or area supporting the MBS service in the system information, or when the terminal 901 establishes or connects to the MBS service (or session), the terminal 901 may set up a connection with the network and transmit the first RRC message.

In step 910, upon receiving the first RRC message, the base station 902 may identify the MBS service which the terminal 901 is interested in or intends to receive and/or the terminal capability information.

The base station 902 or the network may transmit a second RRC message to the terminal 901 to support and/or configure the MBS service (step 915). The second RRC message may include at least one of a newly defined RRC message for the MBS service, an RRCSetup message, an RRCResume message, or another existing RRC message.

The second RRC message may include configuration information for the MBS service, configuration information for the MBS service indicated by the terminal 901 via the first RRC message, bearer configuration information, or unicast bearer, multicast bearer, or MBS bearer configuration information for receiving the MBS service.

The second RRC message may include one or a plurality of pieces of the following configuration information to support the MBS service.

Information indicating whether the MBS service is supported

Configuration information for a physical channel or a downlink or uplink transport channel (e.g., an MBCH, an MBCCH, an MBTCH, or a DL-SCH) for the MBS service Information about transmission resource (a frequency or time resource, a transmission period, a partial bandwidth (or a partial bandwidth identifier) or a bandwidth, a dedicated frequency (frequency information or an SCell identifier), subcarrier spacing, a subframe number, or an identifier indicating a transmission pattern, and/or the like) on which the physical channel or downlink/uplink transport channel (e.g., an MBCH, an MBCCH, or an MBTCH) is transmitted Configuration information for an MBS service supported in a current cell (e.g., a list of MBS services, or a first identifier (e.g., a TMGI) or a second identifier (e.g., a session Identity)) for each MBS service may be configured or broadcasted, and each logical channel identifier, each bearer identifier, or each RNTI identifier information which corresponds to the first identifier or the second identifier of each MBS service may be configured or broadcasted. In another embodiment, for each bearer (or bearer identifier), each logical channel, each RLC configuration information, or each PDCP configuration information, the first identifier (e.g., the TMGI), the second identifier (e.g., the session identity) or the RNTI identifier for the MBS service may be configured or broadcasted. The first identifier may indicate a PLMN which provides the MBS service, or may indicate a service type or session of the MBS service. The second identifier may indicate a more specific session or type of the MBS service. The configuration information for the MBS service may include information about a transmission resource (a frequency or time resource, a transmission period, a partial bandwidth (or a partial bandwidth identifier) or bandwidth, dedicated frequency (frequency information or an SCell identifier), subcarrier spacing, a subframe number, or an identifier indicating a transmission pattern, and/or the like) on which each MBS service is supported or broadcasted or transmitted.

Bearer configuration information (including a bearer structure described in FIGS. 4A to 4D)

Indicator configuration information indicating whether to use HARQ reordering, HARQ retransmission, or HARQ ACK or NACK, indicator configuration information indicating whether to use an RLC reordering function, transmission resource information to transmit HARQ ACK or NACK, indicator configuration information indicating whether to use an RLC in-order delivery function, configuration information for an RLC reordering timer value, or indicator configuration information for whether to use a PDCP out-of-order delivery function (For example, the indicator configuration information indicating whether to use the HARQ reordering, HARQ retransmission, or HARQ ACK or NACK, the indicator configuration information indicating whether to use the RLC reordering function, the indicator configuration information indicating whether to use the RLC in-order delivery function, the configuration information for the RLC reordering timer value, configuration information for an RLC mode (a TM, UM, or AM), configuration information for whether to use a data division function in an RLC layer device, or the indicator configuration information for whether to use the PDCP out-of-order delivery function may be configured per MBS service or bearer. In another embodiment, the configuration information(s) is defined as default configuration information so that a terminal may configure an MBS bearer having some of the functions as a default function without the configuration information.)

Indicator configuration information indicating whether a bearer or bearer identifier which supports (transmits or receives) the IBS service is a unicast bearer or a multicast bearer Information (e.g., a frequency or time resource or cell identifier) related to an IBS dedicated carrier or cell (a Cell or SCell or PCell) for the MBS service MBS dedicated partial bandwidth information (e.g., downlink partial bandwidth or uplink partial bandwidth information) or partial bandwidth identifier information for the MBS service Indicator for configuring a header compression function or procedure for a bearer supporting the MBS service (configuration information for a header compression procedure for an MBS bearer in the present invention or a header compression procedure or data compression procedure (e.g., an indicator indicating whether to continue using header compression context))

Information about a length of a PDCP serial number or RLC serial number (In another embodiment, a default length for the RLC serial number or PDCP serial number may be determined.)

Indicator indicating whether an RLC layer device of the bearer supporting the MBS service supports or enables a unidirectional communication or supports or enables a bidirectional communication When the terminal 901 receives the system information, when the terminal 901 intends to receive a service of interest, when the terminal 901 has the service of interest, when the terminal 901 determines the service of interest, when the terminal 901 exists in or enters a cell or area supporting the MBS service in the system information, when the terminal 901 establishes or connects to the MBS service (or session), or when the configuration information or bearer configuration information for the MBS service is received or broadcasted via the system information, an RRC message (e.g., an RRCSetup message, an RRCResume message, an RRCReconfiguration message, an RRCRelease message, or newly defined new RRC message), or a control message for an MBS channel (for example, transmitted on the MBS control data channel), the terminal 1201 may establish a unicast bearer, a multicast bearer, or an MBS bearer, which has a bearer structure described in FIGS. 4A to 4D, for receiving the MBS service.

Upon receiving the second RRC message, the terminal 901 may apply the configuration information included in the second RRC message, and transmit, to the base station 902 or the network, a third RRC message (e.g., an RRCSetupComplete message or an RRCResumeComplete message) in response to the second RRC message (step 920).

In the third RRC message, the terminal 901 may include, an indicator indicating that the terminal 901 intends to receive the MBS service in the first RRC message, or may include an indicator indicating reception of the MBS service as a reason for setting up an RRC connection with the network, or may include the first identifier, the second identifier, the logical channel identifier, the RNTI identifier, or the bearer identifier of the MBS service which the terminal 901 is interested in or the terminal intends to receive to indicate them. The terminal 901 may include, in the first RRC message, an indicator indicating a type (e.g., a unicast bearer or a multicast bearer) and/or a structure of a bearer to need to be applied, established, or used for the MBS service, an indicator indicating a type (e.g., a unicast bearer or a multicast bearer) and/or a structure of a preferred bearer, or an indicator indicating in which RRC mode (an RRC connected mode, an RRC idle mode, or an RRC inactive mode) the terminal 901 wants to receive the MBS service. The terminal 901 may include, into the first RRC message, an indicator for an MBS service of no interest, an MBS service for which reception is to be stopped, or an MBS service for which reception has been stopped, or an indicator for changing the MBS service to another MBS service to transmit it. The indicator included by the terminal 901 into the first RRC message may be determined or indicated based on the system information received in step 905.

The base station 902 may transmit, to the terminal 901, a fourth RRC message (e.g., RRCReconfiguration) based on at least one of a preference reported by the terminal 901, an indicator indicated by the terminal 901, or base station implementation in order to support the MBS service to the terminal 901, configure or reconfigure a bearer for the MBS service which the terminal 901 currently receives, or configure or reconfigure the MBS service-related configuration information (step 925). For example, the fourth RRC message may include configuration information for changing a bearer type (e.g., an indicator to switch from a unicast bearer to a multicast bearer, an indicator to switch from a multicast bearer to a unicast bearer, or bearer configuration information corresponding thereto) and/or logical identifier information changed or updated for each MBS service, RNTI identifier information, the first identifier or second identifier information for the MBS service, and/or the like.

The fourth RRC message may include pieces of following configuration information or some of the pieces of the following configuration information.

Information indicating whether the MBS service is supported

Configuration information for a physical channel or a downlink or uplink transport channel (e.g., an MBCH, an MBCCH, an MBTCH, or a DL-SCH) for the MBS service Information about transmission resource (a frequency or time resource, a transmission period, a partial bandwidth (or a partial bandwidth identifier) or a bandwidth, a dedicated frequency (frequency information or an SCell identifier), subcarrier spacing, a subframe number, or an identifier indicating a transmission pattern, and/or the like) on which the physical channel or downlink/uplink transport channel (e.g., an MBCH, an MBCCH, or an MBTCH) is transmitted Configuration information for an MBS service supported in a current cell (e.g., a list of MBS services, or a first identifier (e.g., a TMGI) or a second identifier (e.g., a session Identity)) for each MBS service may be configured or broadcasted, and each logical channel identifier, each bearer identifier, or each RNTI identifier information which corresponds to the first identifier or the second identifier of each MBS service may be configured or broadcasted. In another embodiment, for each bearer (or bearer identifier), each logical channel, each RLC configuration information, or each PDCP configuration information, the first identifier (e.g., the TMGI), the second identifier (e.g., the session identity) or the RNTI identifier for the MBS service may be configured or broadcasted. The first identifier may indicate a PLMN which provides the MBS service, or may indicate a service type or session of the MBS service. The second identifier may indicate a more specific session or type of the MBS service. The configuration information for the MBS service may include information about a transmission resource (a frequency or time resource, a transmission period, a partial bandwidth (or a partial bandwidth identifier) or bandwidth, dedicated frequency (frequency information or an SCell identifier), subcarrier spacing, a subframe number, or an identifier indicating a transmission pattern, and/or the like) on which each MBS service is supported or broadcasted or transmitted.

Bearer configuration information (including a bearer structure described in FIGS. 4A to 4D)

Indicator configuration information indicating whether to use HARQ reordering, HARQ retransmission, or HARQ ACK or NACK, indicator configuration information indicating whether to use an RLC reordering function, transmission resource information to transmit HARQ ACK or NACK, indicator configuration information indicating whether to use an RLC in-order delivery function, configuration information for an RLC reordering timer value, or indicator configuration information for whether to use a PDCP out-of-order delivery function (For example, the indicator configuration information indicating whether to use the HARQ reordering, HARQ retransmission, or HARQ ACK or NACK, the indicator configuration information indicating whether to use the RLC reordering function, the indicator configuration information indicating whether to use the RLC in-order delivery function, the configuration information for the RLC reordering timer value, configuration information for an RLC mode (a TM, UM, or AM), configuration information for whether to use a data division function in an RLC layer device, or the indicator configuration information for whether to use the PDCP out-of-order delivery function may be configured per MBS service or bearer. In another embodiment, the configuration information is defined as default configuration information so that a terminal may configure an MBS bearer having some of the functions as a default function without the configuration information.)

Indicator configuration information indicating whether a bearer or bearer identifier which supports (transmits or receives) the MBS service is a unicast bearer or a multicast bearer Indicator configuration information indicating whether a bearer or bearer identifier supporting the MBS service is a unicast bearer or a multicast bearer Indicator or configuration information commanding transition into an RRC idle mode, an RRC inactive mode, or an RRC connected mode MBS service configuration information or bearer configuration information proposed above which allows the MBS service to be received in the RRC idle mode MBS service configuration information or bearer configuration information proposed above which allows the MBS service to be received in the RRC inactive mode Information (e.g., a frequency or time resource or cell identifier) related to an MBS dedicated carrier or cell (a Cell or SCell or PCell) for the MBS service MBS dedicated partial bandwidth information (e.g., downlink partial bandwidth or uplink partial bandwidth information) or partial bandwidth identifier information for the MBS service Indicator for configuring a header compression function or procedure for a bearer supporting the MBS service (configuration information for a header compression procedure for an MBS bearer or a header compression procedure or data compression procedure (e.g., an indicator indicating whether to continue using header compression context))

Information about a length of a PDCP serial number or RLC serial number (In another embodiment, a default length for the RLC serial number or PDCP serial number may be determined.)

Indicator indicating whether an RLC layer device of the bearer supporting the MBS service supports or enables a unidirectional communication or supports or enables a bidirectional communication Upon receiving the fourth RRC message, the terminal 901 may store the MBS service-related configuration information and apply the MBS service-related configuration information. The terminal 901 may configure and transmit a fifth RRC message (e.g., RRCReconfigurationComplete) to the base station 902 to indicate successful configuration or reconfiguration (step 930).

Upon receiving the MBS service-related configuration information, the terminal 901 may, in the RRC connected mode, identify at least one of a first identifier, a second identifier, an RNTI identifier, or a logical channel identifier which is configured or allocated for an MBS service which the terminal 901 is interested in or intends to receive for receiving the MBS service. The terminal 901 may receive MBS data by applying an embodiment in FIGS. 4A to 4D and/or FIG. 5 via an MBS user data service channel using the identified identifier to receive the MBS service (step 935).

The terminal 901 may receive the MBS service-related configuration information by receiving MBS data (e.g., MBS control data) via an MBS control data channel or a transmission resource for the MBS service of interest.

If the base station 902 intends to transit the terminal 901 into an RRC inactive mode or an RRC idle mode (e.g., according to implementation of the base station or according to a request or indication of the terminal), the base station 902 may transit the terminal 901 into the RRC inactive mode or the RRC idle mode by configuring a sixth RRC message (e.g., an RRCRelease message) to transmit it to the terminal (step 940). The sixth RRC message may include pieces of the following configuration information or some of the pieces of the following configuration information so that the terminal may continue to receive the MBS service even in the RRC idle mode or the RRC inactive mode.

Information indicating whether the MBS service is supported

Configuration information for a physical channel or a downlink/uplink transport channel (e.g., an MBCH, an MBCCH, an MBTCH, or a DL-SCH) for the MBS service Information about transmission resource (a frequency or time resource, a transmission period, a partial bandwidth (or a partial bandwidth identifier) or a bandwidth, a dedicated frequency (frequency information or an SCell identifier), subcarrier spacing, a subframe number, or an identifier indicating a transmission pattern, and/or the like) on which the physical channel or downlink/uplink transport channel (e.g., an MBCH, an MBCCH, or an MBTCH) is transmitted Configuration information for an MBS service supported in a current cell (e.g., a list of MBS services, or a first identifier (e.g., a TMGI) or a second identifier (e.g., a session Identity)) for each MBS service may be configured or broadcasted, and each logical channel identifier, each bearer identifier, or each RNTI identifier information which corresponds to the first identifier or the second identifier of each MBS service may be configured or broadcasted. In another embodiment, for each bearer (or bearer identifier), each logical channel, each RLC configuration information, or each PDCP configuration information, the first identifier (e.g., the TMGI), the second identifier (e.g., the session identity) or the RNTI identifier for the MBS service may be configured or broadcasted. The first identifier may indicate a PLMN which provides the MBS service, or may indicate a service type or session of the MBS service. The second identifier may indicate a more specific session or type of the MBS service. The configuration information for the MBS service may include information about a transmission resource (a frequency or time resource, a transmission period, a partial bandwidth (or a partial bandwidth identifier) or bandwidth, dedicated frequency (frequency information or an SCell identifier), subcarrier spacing, a subframe number, or an identifier indicating a transmission pattern, and/or the like) on which each MBS service is supported or broadcasted or transmitted.

Bearer configuration information (including a bearer structure described in FIGS. 4A to 4D)

Indicator configuration information indicating whether to use HARQ reordering, HARQ retransmission, or HARQ ACK or NACK, indicator configuration information indicating whether to use an RLC reordering function, transmission resource information to transmit HARQ ACK or NACK, indicator configuration information indicating whether to use an RLC in-order delivery function, configuration information for an RLC reordering timer value, or indicator configuration information for whether to use a PDCP out-of-order delivery function (For example, the indicator configuration information indicating whether to use the HARQ reordering, HARQ retransmission, or HARQ ACK or NACK, the indicator configuration information indicating whether to use the RLC reordering function, the indicator configuration information indicating whether to use the RLC in-order delivery function, the configuration information for the RLC reordering timer value, configuration information for an RLC mode (a TM, UM, or AM), configuration information for whether to use a data division function in an RLC layer device, or the indicator configuration information for whether to use the PDCP out-of-order delivery function may be configured per MBS service or bearer. In another embodiment, the configuration information(s) is defined as default configuration information so that a terminal may configure an MBS bearer having some of the functions as a default function without the configuration information.)

Indicator configuration information indicating whether a bearer or bearer identifier which supports (transmits or receives) the MBS service is a unicast bearer or a multicast bearer Indicator or configuration information commanding transition into an RRC idle mode, an RRC inactive mode, or an RRC connected mode MBS service configuration information or bearer configuration information proposed above which allows the MBS service to be received in the RRC idle mode MBS service configuration information or bearer configuration information proposed above which allows the MBS service to be received in the RRC inactive mode Information (e.g., a frequency or time resource or cell identifier) related to an MBS dedicated carrier or cell (a Cell or SCell or PCell) for the MBS service MBS dedicated partial bandwidth information (e.g., downlink partial bandwidth or uplink partial bandwidth information) or partial bandwidth identifier information for the MBS service Indicator for configuring a header compression function or procedure for a bearer supporting the MBS service, or configuration information for a header compression procedure or data compression procedure (e.g., an indicator indicating whether to continue using header compression context)

Information about a length of a PDCP serial number or RLC serial number (In another embodiment, a default length for the RLC serial number or PDCP serial number may be determined.)

Indicator indicating whether an RLC layer device of the bearer supporting the MBS service supports or enables a unidirectional communication or supports or enables a bidirectional communication Upon receiving the MBS service-related configuration information, the terminal 901 may, in the RRC idle mode or the RRC inactive mode, identify at least one of a first identifier, a second identifier, an RNTI identifier, or a logical channel identifier which is configured or allocated for an MBS service which the terminal 901 is interested in or intends to receive for receiving the MBS service. The terminal 901 may receive MBS data by applying an embodiment in FIGS. 4A to 4D and/or FIG. 5 via an MBS user data service channel using the identified identifier to receive the MBS service (step 945).

The terminal 901 may transmit the first RRC message and receive the second RRC message in order to receive the MBS service. The terminal 901 may transmit the third RRC message and receive the fourth RRC message. The terminal 901 may transmit the fifth RRC message and receive the MBS service in the RRC connected mode. The terminal 901 may receive the sixth RRC message and receive the MBS service in the RRC idle mode or the RRC inactive mode.

In another embodiment, the terminal 901 may transmit the first RRC message and receive the second RRC message in order to receive the MBS service (transition into the RRC connected mode). The terminal 901 may transmit the third RRC message and receive the sixth RRC message. Upon receiving the sixth RRC message, the terminal 901 may switch to the RRC idle mode or the RRC inactive mode to receive the MBS service in the RRC idle mode or the RRC inactive mode.

An encryption procedure or an integrity protection procedure may not be applied to the first RRC message or the second RRC message. In another embodiment, the encryption procedure or the integrity protection procedure may be applied to the first RRC message or the second RRC message in order to enhance security. The encryption procedure or the integrity protection procedure may be applied to the third RRC message. The encryption procedure or the integrity protection procedure may be applied to the fourth RRC message, the fifth RRC message, or the sixth RRC message.

Figure 10:
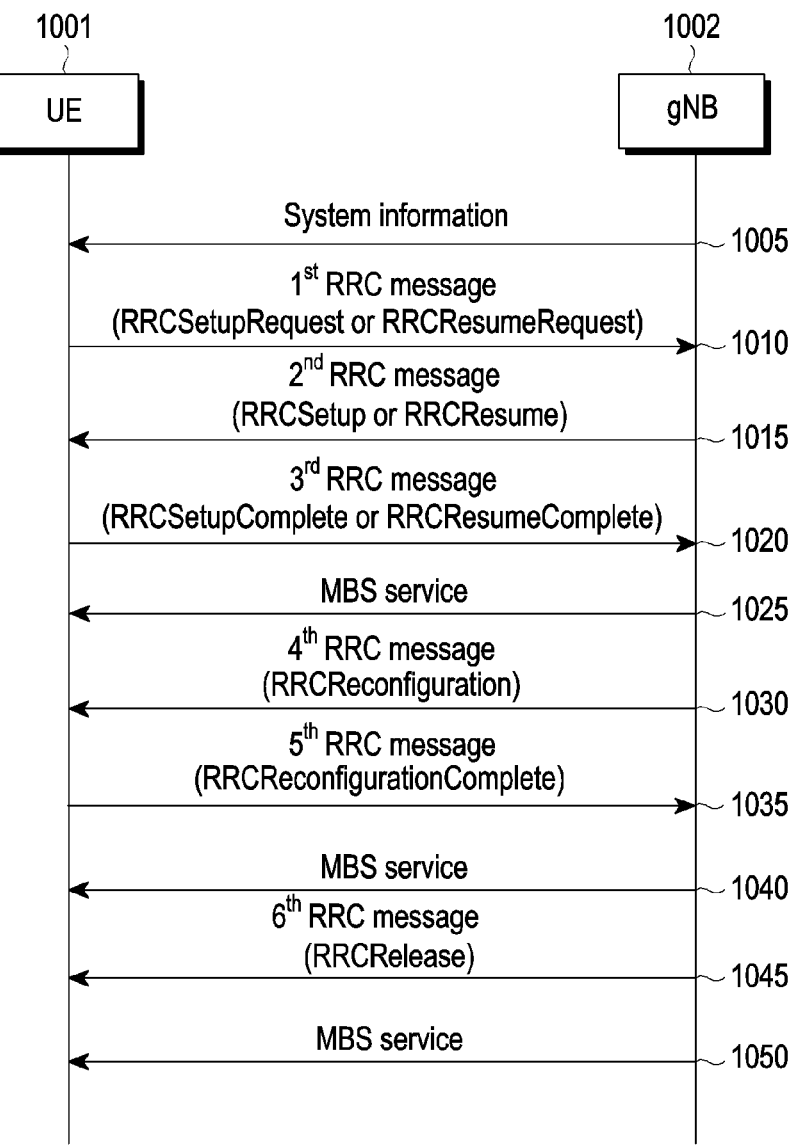
FIG. 10 is a diagram illustrating a fourth signaling procedure for supporting an MBS service according to an embodiment of the disclosure.

FIG. 10 is a diagram illustrating a fourth signaling procedure for supporting an MBS service according to an embodiment of the disclosure.

In the fourth signaling procedure for supporting the MBS service, a terminal may identify whether an MBS service, which the terminal is interested in or which is broadcasted, is broadcasted based on system information, or set up a connection with a network to transmit, to a base station (or the network), indication indicating the MBS service which the terminal is interested in or intends to receive, or indicating that the terminal intends to receive the MBS service, receive, from the base station (or the network), MBS service-related configuration information, and receive the MBS service. In the fourth signaling procedure, the terminal may maintain an RRC idle mode, an RRC connected mode, or an RRC inactive mode. In another embodiment, the terminal may transmit, to the base station (or the network), the indication indicating the MBS service which the terminal is interested in or intends to receive, or indicating that the terminal intends to receive the MBS service, and enter the RRC connected mode from the RRC idle mode or the RRC inactive mode in order to receive the MBS service-related configuration information from the base station (or the network). Alternatively, upon receiving the MBS service-related configuration, information, the terminal may receive the MBS service in the RRC connected mode or may receive the MBS service in the RRC idle mode or the RRC inactive mode.

Referring to FIG. 10, a terminal 1001 performs a cell selection or reselection procedure in an RRC idle mode or an RRC inactive mode to select a suitable cell and perform camp on. In the RRC idle mode, the RRC inactive mode, or an RRC connected mode, the terminal 1001 receives system information from a base station 1002 (step 1005). The terminal 1001 may receive pieces of configuration information for the MBS service via the system information. The configuration information for the MBS service may include one or a plurality of pieces of the following configuration information. That is, a network may transmit the one or the plurality of pieces of the following configuration information in the system information to support the MBS service.

Information indicating whether the MBS service is supported

Configuration information for a physical channel or a downlink or uplink transport channel (e.g., an MBCH, an MBCCH, an MBTCH, or a DL-SCH) for the MBS service Information about transmission resource (a frequency or time resource, a transmission period, a partial bandwidth (or a partial bandwidth identifier) or a bandwidth, a dedicated frequency (frequency information or an SCell identifier), subcarrier spacing, a subframe number, or an identifier indicating a transmission pattern, and/or the like) on which the physical channel or downlink or uplink transport channel (e.g., an MBCH, an MBCCH, or an MBTCH) is transmitted Configuration information for an MBS service supported in a current cell (e.g., a list of MBS services, or a first identifier (e.g., a TMGI) or a second identifier (e.g., a session Identity)) for each MBS service may be configured or broadcasted, and each logical channel identifier, each bearer identifier, or each RNTI identifier information which corresponds to the first identifier or the second identifier of each MBS service may be configured or broadcasted. In another embodiment, for each bearer (or bearer identifier), each logical channel, each RLC configuration information, or each PDCP configuration information, the first identifier (e.g., the TMGI), the second identifier (e.g., the session identity) or the RNTI identifier for the MBS service may be configured or broadcasted. The first identifier may indicate a PLMN which provides the MBS service, or may indicate a service type or session of the MBS service. The second identifier may indicate a more specific session or type of the MBS service. The configuration information for the MBS service may include information about a transmission resource (a frequency or time resource, a transmission period, a partial bandwidth (or a partial bandwidth identifier) or bandwidth, dedicated frequency (frequency information or an SCell identifier), subcarrier spacing, a subframe number, or an identifier indicating a transmission pattern, and/or the like) on which each MBS service is supported or broadcasted or transmitted.

Bearer configuration information (including a bearer structure described in FIGS. 4A to 4D)

Indicator configuration information indicating whether to use HARQ reordering, HARQ retransmission, or HARQ ACK or NACK, indicator configuration information indicating whether to use an RLC reordering function, transmission resource information to transmit HARQ ACK or NACK, indicator configuration information indicating whether to use an RLC in-order delivery function, configuration information for an RLC reordering timer value, or indicator configuration information for whether to use a PDCP out-of-order delivery function (For example, the indicator configuration information indicating whether to use the HARQ reordering, HARQ retransmission, or HARQ ACK or NACK, the indicator configuration information indicating whether to use the RLC reordering function, the indicator configuration information indicating whether to use the RLC in-order delivery function, the configuration information for the RLC reordering timer value, configuration information for an RLC mode (a TM, UM, or AM), configuration information for whether to use a data division function in an RLC layer device, or the indicator configuration information for whether to use the PDCP out-of-order delivery function may be configured per MBS service or bearer. In another embodiment, the configuration information(s) is defined as default configuration information so that a terminal may configure an MBS bearer having some of the functions as a default function without the configuration information.)

Indicator configuration information indicating whether a bearer or bearer identifier which supports (transmits or receives) the IBS service is a unicast bearer or a multicast bearer Information (e.g., a frequency or time resource or cell identifier) related to an IBS dedicated carrier or cell (a Cell or SCell or PCell) for the MBS service MBS dedicated partial bandwidth information (e.g., downlink partial bandwidth or uplink partial bandwidth information) or partial bandwidth identifier information for the MBS service Indicator for configuring a header compression function or procedure for a bearer supporting the MBS service, or configuration information for a header compression procedure or data compression procedure (e.g., an indicator indicating whether to continue using header compression context)

Information about a length of a PDCP serial number or RLC serial number (In another embodiment, a default length for the RLC serial number or PDCP serial number may be determined.)

Indicator indicating whether an RLC layer device of the bearer supporting the MBS service supports or enables a unidirectional communication or supports or enables a bidirectional communication The terminal 1001 may transmit, to a base station 1002, a cell, or a network, a message or indicator which requests to broadcast system information for the MBS service in a camped-on cell if configuration information for the MBS service is not broadcasted via the system information in the camped-on cell. Upon receiving the request message or indicator, the base station 1002 or network may broadcast or transmit the configuration information for the MBS service via the system information. By receiving the request message or indicator from the terminal 1001, the base station 1002 may prevent waste of a transmission resource which may occur due to MBS service-related system information unnecessarily always being broadcasted via the system information.

The terminal 1001 which receives or identifies the MBS service-related information via the system information, the terminal 1001 which identifies that the MBS service of interest is broadcasted in a current cell via the system information, or the terminal 1001 which intends to request the MBS service of interest from the network may perform a random access procedure and transmit a first RRC message to the network (step 1010). The first RRC message may include a newly defined RRC message for the MBS service, an RRCSetupRequest message, an RRCResumeRequest message, or another existing RRC message. The first RRC message may include an indicator which the terminal 1001 intends to receive the MBS service. In addition, the first RRC message may include an indicator indicating MBS service reception as a reason for setting up an RRC connection with the network. In addition, the first RRC message may include at least one of a first identifier, a second identifier, a logical channel identifier, an RNTI identifier, or a bearer identifier of the MBS service which the terminal 1001 is interested in or intends to receive. The terminal 1001 may transmit an indicator indicating a type (e.g., a unicast bearer or a multicast bearer) or a structure of a bearer to need to be applied, established, or used for the MBS service via the first RRC message. The terminal 1001 may transmit an indicator indicating a type (e.g., a unicast bearer or a multicast bearer) or a structure of a preferred bearer via the first RRC message. The terminal 1001 may transmit an indicator indicating in which RRC mode (an RRC connected mode, an RRC idle mode, or an RRC inactive mode) the terminal 1001 wants to receive the MBS service via the first RRC message. The terminal 1001 may transmit, via the first RRC message, an indicator for an MBS service of no interest, an indicator for an MBS service for which reception is to stopped, an indicator for an MBS service for which reception has been stopped, or an indicator for changing the MBS service to another MBS service. The indicator(s) transmitted by the terminal 1001 via the first RRC message may be determined or indicated based on the system information received in step 1005. The terminal 1001 may transmit, to a base station or a network, MBS service-related terminal capability information via a separate RRC message. For example, when the base station transmits an RRC message enquiring terminal capability information to the terminal and the terminal intends to receive the MBS service in response to the RRC message, the terminal may include, into a terminal capability response RRC message, a function supported by a terminal capability and/or configurable configuration information, or a function and/or configuration information implemented by the terminal to transmit it to the base station 1002 or the network. If the terminal 1001 has previously set up a connection or stored a terminal identifier (e.g., a terminal identifier (5G-S-TMSI) allocated from a core network or a terminal identifier (a short I-RNTI or an I-RNTI) for resuming an RRC connection allocated from a base station) allocated from the network, or if the terminal identifier is indicated by a upper layer device (e.g., a NAS layer device or an RRC layer device), the terminal 1001 may include the terminal identifier into the first RRC message to transmit it to the network. The network may distinguish or identify the terminal 1001 based on the received terminal identifier. For example, the base station 1002 or the network may identify the terminal based on the terminal identifier included in the first RRC message, may identify the terminal by retrieving terminal capability information from a core network, or identify the terminal by retrieving configuration information or the terminal capability information of the terminal from a base station with which the terminal has previously set up a connection. When the terminal 1001 receives the system information, when the terminal 1001 intends to receive a service of interest, when the terminal 1001 has the service of interest, when the terminal 1001 determines the service of interest, when the terminal 1001 exists in or enters a cell or area supporting the MBS service in the system information, or when the terminal 1001 establishes or connects to the MBS service (or session), the terminal 1001 may set up a connection with the network and transmit the first RRC message.

In step 1010, upon receiving the first RRC message, the base station 1002 may identify the MBS service which the terminal 1001 is interested in or intends to receive and/or the terminal capability information.

The base station 1002 or the network may transmit a second RRC message to the terminal 1001 to support and/or configure the MBS service (step 1015). The second RRC message may include a newly defined RRC message for the MBS service, an RRCSetup message, an RRCResume message, or another existing RRC message.

The second RRC message may include at least one of configuration information for the MBS service, configuration information for the MBS service indicated by the terminal 1001 via the first RRC message, bearer configuration information, or unicast bearer, multicast bearer, or MBS bearer configuration information for receiving the MBS service.

The second RRC message may include one or a plurality of pieces of the following configuration information to support the MBS service.

Information indicating whether the MBS service is supported

Configuration information for a physical channel or a downlink or uplink transport channel (e.g., an MBCH, an MBCCH, an MBTCH, or a DL-SCH) for the MBS service Information about transmission resource (a frequency or time resource, a transmission period, a partial bandwidth (or a partial bandwidth identifier) or a bandwidth, a dedicated frequency (frequency information or an SCell identifier), subcarrier spacing, a subframe number, or an identifier indicating a transmission pattern, and/or the like) on which the physical channel or downlink/uplink transport channel (e.g., an MBCH, an MBCCH, or an MBTCH) is transmitted Configuration information for an MBS service supported in a current cell (e.g., a list of MBS services, or a first identifier (e.g., a TMGI) or a second identifier (e.g., a session Identity)) for each MBS service may be configured or broadcasted, and each logical channel identifier, each bearer identifier, or each RNTI identifier information which corresponds to the first identifier or the second identifier of each MBS service may be configured or broadcasted. In another embodiment, for each bearer (or bearer identifier), each logical channel, each RLC configuration information, or each PDCP configuration information, the first identifier (e.g., the TMGI), the second identifier (e.g., the session identity) or the RNTI identifier for the MBS service may be configured or broadcasted. The first identifier may indicate a PLMN which provides the MBS service, or may indicate a service type or session of the MBS service. The second identifier may indicate a more specific session or type of the MBS service. The configuration information for the MBS service may include information about a transmission resource (a frequency or time resource, a transmission period, a partial bandwidth (or a partial bandwidth identifier) or bandwidth, dedicated frequency (frequency information or an SCell identifier), subcarrier spacing, a subframe number, or an identifier indicating a transmission pattern, and/or the like) on which each MBS service is supported or broadcasted or transmitted.

Bearer configuration information (including a bearer structure described in FIGS. 4A to 4D)

Indicator configuration information indicating whether to use HARQ reordering, HARQ retransmission, or HARQ ACK or NACK, indicator configuration information indicating whether to use an RLC reordering function, transmission resource information to transmit HARQ ACK or NACK, indicator configuration information indicating whether to use an RLC in-order delivery function, configuration information for an RLC reordering timer value, or indicator configuration information for whether to use a PDCP out-of-order delivery function (For example, the indicator configuration information indicating whether to use the HARQ reordering, HARQ retransmission, or HARQ ACK or NACK, the indicator configuration information indicating whether to use the RLC reordering function, the indicator configuration information indicating whether to use the RLC in-order delivery function, the configuration information for the RLC reordering timer value, configuration information for an RLC mode (a TM, UM, or AM), configuration information for whether to use a data division function in an RLC layer device, or the indicator configuration information for whether to use the PDCP out-of-order delivery function may be configured per MBS service or bearer. In another embodiment, the configuration information(s) is defined as default configuration information so that a terminal may configure an MBS bearer having some of the functions as a default function without the configuration information.)

Indicator configuration information indicating whether a bearer or bearer identifier which supports (transmits or receives) the MBS service is a unicast bearer or a multicast bearer Information (e.g., a frequency or time resource or cell identifier) related to an MBS dedicated carrier or cell (a Cell or SCell or PCell) for the MBS service MBS dedicated partial bandwidth information (e.g., downlink partial bandwidth or uplink partial bandwidth information) or partial bandwidth identifier information for the MBS service Indicator for configuring a header compression function or procedure for a bearer supporting the MBS service, or configuration information for a header compression procedure or data compression procedure (e.g., an indicator indicating whether to continue using header compression context)

Information about a length of a PDCP serial number or RLC serial number (In another embodiment, a default length for the RLC serial number or PDCP serial number may be determined.)

Indicator indicating whether an RLC layer device of the bearer supporting the MBS service supports or enables a unidirectional communication or supports or enables a bidirectional communication Upon receiving the second RRC message, the terminal 1001 may store MBS service-related configuration information. The terminal 1001 may search for or determine an MBS service which the terminal 1001 is interested in or intends to receive using the MBS service-related configuration information included in the second RRC message. The terminal 1001 may receive MBS data (MBS control data or MBS user data) on a transmission resource on which an MBS control data channel or an MBS user data channel for an MBS service of interest is transmitted. When the terminal receives the system information, when the terminal intends to receive a service of interest, when the terminal has the service of interest, when the terminal determines the service of interest, when the terminal exists in or enters a cell or area supporting the MBS service in the system information, when the terminal establishes or connects to the MBS service (or session), or when the configuration information or bearer configuration information for the MBS service is received or broadcasted via the system information, an RRC message (e.g., an RRCSetup message, an RRCResume message, an RRCReconfiguration message, an RRCRelease message, or newly defined new RRC message), or a control message for an MBS channel (for example, transmitted on the MBS control data channel), the terminal 1001 may establish a unicast bearer, a multicast bearer, or an MBS bearer, which has a bearer structure described in FIGS. 4A to 4D, for receiving the MBS service.

Upon receiving the second RRC message, the terminal 1001 may apply the configuration information included in the second RRC message, and transmit, to the base station 1002 or the network, a third RRC message (e.g., an RRC-SetupComplete message or an RRCResumeComplete message) in response to the second RRC message (step 1020).

The terminal 1001 may receive the MBS service-related configuration information by receiving MBS data (e.g., MBS control data) via an MBS control data channel or a transmission resource for the MBS service of interest.

Upon receiving the MBS service-related configuration information, the terminal 1001 may identify at least one of a first identifier, a second identifier, an RNTI identifier, or a logical channel identifier which is configured or allocated for an MBS service which the terminal 1001 is interested in or intends to receive for receiving the MBS service. The terminal 1001 may receive MBS data by applying an embodiment in FIGS. 4A to 4D and/or FIG. 5 via an MBS user data service channel using the identified identifier to receive the MBS service (step 1025).

The base station 1002 may transmit, to the terminal, a fourth RRC message (e.g., RRCReconfiguration message) based on at least one of a preference reported by the terminal 1001, an indicator indicated by the terminal 901, or base station implementation in order to reconfigure a bearer via which the terminal 901 receives the MBS service, or reconfigure the MBS service-related configuration information (step 1030). For example, the fourth RRC message may include configuration information for changing a bearer type (e.g., an indicator to switch from a unicast bearer to a multicast bearer, an indicator to switch from a multicast bearer to a unicast bearer, or bearer configuration information corresponding thereto) and/or logical channel identifier information changed or updated for each MBS service, RNTI identifier information, the first identifier or second identifier information for the MBS service, and/or the like.

Upon receiving the fourth RRC message, the terminal 1001 may store the MBS service-related configuration information and apply the MBS service-related configuration information. The terminal 1001 may configure and transmit a fifth RRC message (e.g., RRCReconfigurationComplete message) to the base station 1002 to indicate successful reconfiguration (step 1035).

The terminal 1001 may receive the MBS service-related configuration information by receiving MBS data (e.g., MBS control data) via an MBS control data channel or a transmission resource for the MBS service of interest.

Upon receiving the MBS service-related configuration information, the terminal 1001 may identify at least one of a first identifier, a second identifier, an RNTI identifier, or a logical channel identifier which is configured or allocated for an MBS service which the terminal 1001 is interested in or intends to receive for receiving the MBS service. The terminal 1001 may receive MBS data by applying an embodiment in FIGS. 4A to 4D and/or FIG. 5 via an MBS user data service channel using the identified identifier to receive the MBS service (step 1040).

If the base station 1002 intends to transit the terminal 1001 into an RRC inactive mode or an RRC idle mode (e.g., according to implementation of the base station or according to a request or indication of the terminal), the base station 1002 may transit the terminal 1001 into the RRC inactive mode or the RRC idle mode by configuring a sixth RRC message (e.g., an RRCRelease message) to transmit it to the terminal (step 1045). The sixth RRC message may include pieces of the following configuration information or some of the pieces of the following configuration information so that the terminal may continue to receive the MBS service even in the RRC idle mode or the RRC inactive mode.

Information indicating whether the MBS service is supported

Configuration information for a physical channel or a downlink/uplink transport channel (e.g., an MBCH, an MBCCH, an MBTCH, or a DL-SCH) for the MBS service Information about transmission resource (a frequency or time resource, a transmission period, a partial bandwidth (or a partial bandwidth identifier) or a bandwidth, a dedicated frequency (frequency information or an SCell identifier), subcarrier spacing, a subframe number, or an identifier indicating a transmission pattern, and/or the like) on which the physical channel or downlink/uplink transport channel (e.g., an MBCH, an MBCCH, or an MBTCH) is transmitted Configuration information for an MBS service supported in a current cell (e.g., a list of MBS services, or a first identifier (e.g., a TMGI) or a second identifier (e.g., a session Identity)) for each MBS service may be configured or broadcasted, and each logical channel identifier, each bearer identifier, or each RNTI identifier information which corresponds to the first identifier or the second identifier of each MBS service may be configured or broadcasted. In another embodiment, for each bearer (or bearer identifier), each logical channel, each RLC configuration information, or each PDCP configuration information, the first identifier (e.g., the TMGI), the second identifier (e.g., the session identity) or the RNTI identifier for the MBS service may be configured or broadcasted. The first identifier may indicate a PLMN which provides the MBS service, or may indicate a service type or session of the MBS service. The second identifier may indicate a more specific session or type of the MBS service. The configuration information for the MBS service may include information about a transmission resource (a frequency or time resource, a transmission period, a partial bandwidth (or a partial bandwidth identifier) or bandwidth, dedicated frequency (frequency information or an SCell identifier), subcarrier spacing, a subframe number, or an identifier indicating a transmission pattern, and/or the like) on which each MBS service is supported or broadcasted or transmitted.

Bearer configuration information (including a bearer structure described in FIGS. 4A to 4D)

Indicator configuration information indicating whether to use HARQ reordering, HARQ retransmission, or HARQ ACK or NACK, indicator configuration information indicating whether to use an RLC reordering function, transmission resource information to transmit HARQ ACK or NACK, indicator configuration information indicating whether to use an RLC in-order delivery function, configuration information for an RLC reordering timer value, or indicator configuration information for whether to use a PDCP out-of-order delivery function (For example, the indicator configuration information indicating whether to use the HARQ reordering, HARQ retransmission, or HARQ ACK or NACK, the indicator configuration information indicating whether to use the RLC reordering function, the indicator configuration information indicating whether to use the RLC in-order delivery function, the configuration information for the RLC reordering timer value, configuration information for an RLC mode (a TM, UM, or AM), configuration information for whether to use a data division function in an RLC layer device, or the indicator configuration information for whether to use the PDCP out-of-order delivery function may be configured per MBS service or bearer. In another embodiment, the configuration information(s) is defined as default configuration information so that a terminal may configure an MBS bearer having some of the functions as a default function without the configuration information.)

Indicator configuration information indicating whether a bearer or bearer identifier which supports (transmits or receives) the IBS service is a unicast bearer or a multicast bearer Indicator or configuration information commanding transition into an RRC idle mode, an RRC inactive mode, or an RRC connected mode MBS service configuration information or bearer configuration information proposed above which allows the MBS service to be received in the RRC idle mode MBS service configuration information or bearer configuration information proposed above which allows the MBS service to be received in the RRC inactive mode Information (e.g., a frequency or time resource or cell identifier) related to an IBS dedicated carrier or cell (a Cell or SCell or PCell) for the IBS service MBS dedicated partial bandwidth information (e.g., downlink partial bandwidth or uplink partial bandwidth information) or partial bandwidth identifier information for the MBS service Indicator for configuring a header compression function or procedure for a bearer supporting the MBS service, or configuration information for a header compression procedure or data compression procedure (e.g., an indicator indicating whether to continue using header compression context)

Information about a length of a PDCP serial number or RLC serial number (In another embodiment, a default length for the RLC serial number or PDCP serial number may be determined.)

Indicator indicating whether an RLC layer device of the bearer supporting the MBS service supports or enables a unidirectional communication or supports or enables a bidirectional communication Upon receiving the MBS service-related configuration information, the terminal 1001 may identify a first identifier, a second identifier, an RNTI identifier, or a logical channel identifier which is configured or allocated for an MBS service which the terminal 1001 is interested in or intends to receive for receiving the MBS service. The terminal 1001 may receive MBS data by applying an embodiment in FIGS. 4A to 4D and/or FIG. 5 via an MBS user data service channel using the identified identifier to receive the MBS service (step 1050).

The terminal 1001 may transmit the first RRC message and receive the second RRC message in order to receive the MBS service. The terminal 1001 may transmit the third RRC message and receive the fourth RRC message. The terminal 1001 may transmit the fifth RRC message and receive the MBS service in the RRC connected mode. The terminal 1001 may receive the sixth RRC message and receive the MBS service in the RRC idle mode or the RRC inactive mode.

In another embodiment, the terminal 1001 may transmit the first RRC message and receive the second RRC message in order to receive the MBS service (transition into the RRC connected mode). The terminal 1001 may transmit the third RRC message and receive the sixth RRC message. Upon receiving the sixth RRC message, the terminal 1001 may switch to the RRC idle mode or the RRC inactive mode to receive the MBS service in the RRC idle mode or the RRC inactive mode.

An encryption procedure or an integrity protection procedure may not be applied to the first RRC message or the second RRC message. In another embodiment, the encryption procedure or the integrity protection procedure may be applied to the first RRC message or the second RRC message in order to enhance security. The encryption procedure or the integrity protection procedure may be applied to the third RRC message. The encryption procedure or the integrity protection procedure may be applied to the fourth RRC message, the fifth RRC message, or the sixth RRC message.

According to embodiments of the disclosure, a next-generation mobile communication system may support at least one of the first signaling procedure, the second signaling procedure, the third signaling procedure, or the fourth signaling procedure for MBS service support.

Figure 11:
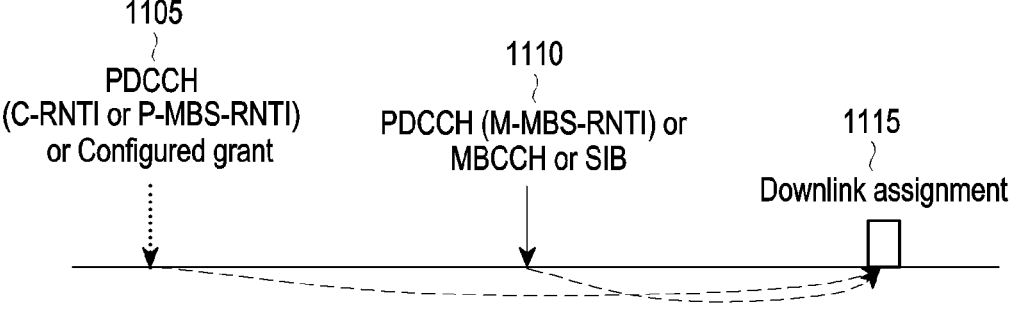
FIG. 11 is a diagram illustrating a case where normal data and MBS data collide or overlap when a terminal receives a normal data service and an MBS service in an RRC connected mode.

FIG. 11 is a diagram illustrating a case where normal data and MBS data collide or overlap when a terminal receives a normal data service and an MBS service in an RRC connected mode.

Referring to FIG. 11, an RRC connected mode-terminal receiving a normal data service or an MBS service may receive first scheduling information 1105 for the normal data service and second scheduling information 1110 for MBS service data.

The first scheduling information 1105 may be indicated as a time resource or a frequency resource on which downlink normal data is transmitted via DCI of a PDCCH scrambled with a first RNTI identifier (e.g., a C-RNTI and an RNTI identifier for normal data scheduling). In another embodiment, the first scheduling information 1105 may be indicated as a time resource or frequency resource configured for downlink normal data transmission via an RRC message. In another embodiment, the first scheduling information 1105 may be indicated as a periodic time resource or frequency resource configured for downlink normal data transmission via an RRC message, or may be indicated by activating or deactivating the periodic time resource or frequency resource with a DCI of a PDCCH.

The second scheduling information 1110 may indicate a time resource or a frequency resource on which downlink MBS service data is transmitted via DCI of a PDCCH scrambled with a first RNTI identifier (e.g., an MBS-RNTI, an RNTI identifier for MBS service data scheduling, or an RNTI identifier for each MBS service). In another embodiment, the second scheduling information 1110 may be indicated as a time resource or frequency resource configured for downlink MBS service data transmission via system information, an RRC message, or a control channel or control message for an MBS. In another embodiment, the second scheduling information 1110 may be indicated as a periodic time resource or frequency resource configured for downlink MBS service data transmission via system information, an RRC message, or a control channel or control message for an MBS, or may be indicated by activating or deactivating the periodic time resource or frequency resource with a DCI of a PDCCH.

Meanwhile, if the downlink time resources or frequency resources indicated by the first scheduling information 1105 and/or the second scheduling information 1110 are the same or overlap, data collision may occur.

Therefore, embodiments, in which the terminal receiving the first scheduling information 1105 and the second scheduling information 1110 processes the first scheduling information 1105 and the second scheduling information 1110 if data collision occurs because the downlink time resources or frequency resources indicated by the first scheduling information 1105 and the second scheduling information 1110 are the same or overlap, will be described below.

First Embodiment

If data collision occurs because time resources or frequency resources indicated by the first scheduling information 1105 and the second scheduling information 1110 received in a terminal are the same or overlap, the terminal may receive normal data on the time resources or frequency resources according to the first scheduling information 1105. The terminal may not receive or ignore MBS service data indicated by the second scheduling information 1110, or may not consider the second scheduling information 1110. In another embodiment, if a transmission resource (e.g., a PUCCH) for transmitting HARQ ACK or NACK for downlink MBS service data indicated in the second scheduling information 1110 is configured or if it is configured to be capable of transmitting HARQ ACK or NACK, the terminal may request retransmission by (NACK) indicating that the MBS service data was not successfully received, and receive downlink MBS service data which was not received later through the retransmission.

Second Embodiment

If data collision occurs because time resources or frequency resources indicated by the first scheduling information 1105 and the second scheduling information 1110 received in a terminal are the same or overlap, the terminal may receive MBS service data on the time resources or frequency resources according to the second scheduling information 1110. The terminal may not receive or ignore normal data indicated by the first scheduling information 1105, or may not consider the first scheduling information 1105. However, the terminal may request retransmission by indicating (NACK) that downlink normal data was not successfully received via a transmission resource (e.g., a PUCCH) for transmitting HARQ ACK or NACK for the downlink normal data indicated in the first scheduling information 1105, and receive the downlink normal data which was not received later through the retransmission.

Third Embodiment

If terminal capability supports that a terminal is capable of simultaneously receiving different data in a transmission resource in which time resources or frequency resources are the same, the terminal may receive all of normal data or MBS service data indicated by the first scheduling information 1105 and the second scheduling information 1110. For example, for a case of a terminal whose terminal capability has a plurality of antennas or satisfies high requirements, the third embodiment may be applied.

Fourth Embodiment

A base station may configure or indicate whether a terminal performs the first embodiment, the second embodiment, or the third embodiment with an indicator via an RRC message or system information.

Fifth Embodiment

A base station may multiplex normal data and MBS service data which are different each other into one data (e.g., a MAC PDU) to transmit it on a transmission resource of the same time resource or the same frequency resource. That is, on the transmission resources of the same time resource or the same frequency resource, a terminal may receive the one data (e.g., the MAC PDU), and normal data and MBS service data may be multiplexed in the one data. In the one data, each normal data may be distinguished by a logical channel identifier (e.g., an identifier included in a MAC header) which corresponds to each normal data, and each MBS service data may be distinguished by a logical channel identifier (e.g., an identifier included in the MAC header) which corresponds to each MBS service data. Upon receiving the one data to perform data processing, the terminal may receive (or demultiplex) data which corresponds to a logical channel identifier configured for the terminal to transfer it to a upper layer device (e.g., an RLC layer device or a upper layer device) which corresponds to the logical channel identifier, and discard data which corresponds to a logical channel identifier not configured for the terminal.

FIGS. 12A to 12C are diagrams illustrating signaling procedures for efficiently supporting an MBS service according to an embodiment of the disclosure.

FIG. 12A illustrates a signaling procedure in which a terminal receiving MBS service data transmits feedback to a base station according to an embodiment of the disclosure. FIG. 12B illustrates a signaling procedure in which a terminal receiving MBS service data receives MBS service-related control message from a base station according to an embodiment of the disclosure. FIG. 12C illustrates a signaling procedure in which a base station transmits an MBS service-related control message to a terminal and the terminal transmits a response to the MBS service-related control message to support an MBS service.

Referring to FIG. 12A, a terminal 1201a receiving MBS service data may transmit feedback or indication information of the terminal for an MBS service to a network or a base station 1202a (step 1210a). For example, the terminal 1201a may transmit the feedback or indication information of the terminal for the MBS service to the network or the base station 1202a if a predetermined event occurs, if it has a service which it is interested in (or it intends to receive), if the service which it is interested in (or it intends to receive) is changed, if it intends to stop receiving the service which it is interested in (or it intends to receive), if it intends to stop an MBS service, or if it intends to change a method, RRC mode, or bearer for receiving the MBS service. In another embodiment, if requested by the network (step 1205a), the terminal 1201a may transmit the feedback or indication information. Information which the terminal 1201a transmits to the base station for the MBS service may include some or a plurality of pieces of the following information.

Information (e.g., a first identifier, a second identifier, a logical channel identifier, an RNTI identifier, or a bearer identifier for the MBS service) about an MBS service which a terminal is interested in or wants to receive RRC connection state (e.g., an RRC idle mode, an RRC connected mode, or an RRC inactive mode) preferred by the terminal when the MBS service is received or configured Bearer structure or configuration information (e.g., a unicast bearer, a multicast bearer, or a preferred structure among bearer structures described in FIGS. 7A to 7D or preference for a function which the terminal wants to be configured, and/or the like) which the terminal prefers when the MBS service is received or configured Service type (e.g., a unicast service (a dedicated service or a unicast service) or a multicast service (a multicast or broadcast or common service) which the terminal prefers when the MBS service is received or configured Indicator that the terminal receiving the MBS service no longer desires service reception for the MBS service, an indicator for stopping the MBS service reception, an indicator for continuing performing the MBS service reception, an indicator requesting to change the MBS service to another MBS service (or a first identifier, a second identifier, a logical channel identifier, a bearer identifier, or an RNTI identifier for the other MBS service), or an indicator that the terminal is interested in the MBS service Indicator indicating reception quality of the MBS service from a point of view of the terminal Changed terminal feedback information if there is changed information (or updated or changed feedback) when compared with MBS service information (or the feedback information)(e.g., an indicator for an MBS service of interest or information which the terminal may report) last transmitted or responded to by the terminal to the network Indicator (e.g., HARQ ACK or NACK feedback) indicating whether MBS service data has been successfully received When the terminal 1201a transmits the feedback or indication information for the MBS service to the base station 1202a, the terminal 1201a may transmit it only in an RRC connected mode. For example, if the base station 1202a requests the feedback or indication information or if the terminal 1201a needs to transmit the feedback or indication information, the terminal 1201a in the RRC connected mode may configure the feedback or indication information in an RRC message, MAC control information, RLC control information, or PDCP control information to transmit it to the base station 1202a via an SRB, a DRB, or an MBS bearer (a unicast bearer or a multicast bearer) configured in the terminal 1201a in the RRC connected mode.

In another embodiment, if the base station 1202a requests the feedback or indication information or if the terminal 1201a needs to transmit the feedback or indication information, the terminal 1201a in an RRC idle mode or an RRC inactive mode may set up a connection with the network (triggering an RRC connection procedure or an RRC connection resuming procedure) and transit into an RRC connected mode to configure the feedback or indication information in an RRC message, MAC control information, RLC control information, or PDCP control information to transmit it to the base station 1202*a* via an SRB, a DRB, or an MBS bearer (a unicast bearer or a multicast bearer) configured in the terminal 1201*a* in the RRC connected mode.

In another embodiment, when the terminal 1201*a* transmits the feedback or indication information for the MBS service to the base station 1202*a*, the terminal 1201*a* may transmit the feedback or indication information of the terminal 1201*a* in the RRC connected mode, the RRC inactive mode, or the RRC idle mode via a transmission resource indicated in system information, via a transmission resource configured by an RRC message, or via a transmission resource indicated in a PDCCH including an RNTI identifier indicating the MBS service. By transmitting the feedback or indication information from the terminal 1201*a*, the base station 1202*a* may more efficiently manage a resource for the MBS service.

Referring to FIG. 12B, a base station 1202*b* may transmit control information for an MBS service to a terminal 1201*b* which receives MBS service data. The control information for the MBS service may be transmitted via a channel or transmission resource for the MBS service, an RRC message, MAC control information, RLC control information, or PDCP control information (step 1205*b*).

The control information for the MBS service may include some or a plurality of pieces of the following information.

Indicator instructing to stop MBS service reception

Indicator which a base station will stop the MBS service or an indicator instructing to stop the MBS service reception It is possible to more specifically indicate, to the terminal, which MBS service to stop or which MBS service being instructed to stop the MBS service reception by including an identifier (e.g., a first identifier, a second identifier, a logical channel identifier, an RNTI identifier, or a bearer identifier which corresponds to the MBS service) for an MBS service to stop or an MBS service being instructed to stop the service reception. In another embodiment, it may be indicated by transmitting the control information on a PDCCH scrambled with an RNTI identifier corresponding to the MBS service. In another example, a list including the first identifier, the second identifier, the logical channel identifier, the RNTI identifier, or the bearer identifier may be transmitted to indicate a plurality of MBS services.

Information (e.g., information about a natural number value represented by mapping each first identifier value or second identifier value indicating MBS services with a natural number value) obtained by mapping each first identifier value or second identifier value indicating the MBS services configured in an MBS service list configured by system information or an RRC message with a natural number value or bitmap information represented by mapping it to a bitmap for more specifically indicating, to the terminal, which MBS service to stop or which MBS service being instructed to stop the MBS service reception Indicator indicating a time point at which MBS service reception starts to stop or a time point at which MBS service reception stops in units of time (a subframe, a time slot, or symbol)(For example, it may indicate what time unit in a cycle at which the MBS service is transmitted. In another embodiment, it may indicate how many time units after a time point at which the control information is received.)

The base station 1202*b* may transmit the control information for the MBS service to the terminal 1201*b* in the RRC inactive mode, RRC idle mode, or RRC connected mode. For example, the base station 1202*b* may configure the control information in the RRC message, MAC control information, RLC control information, or PDCP control information to transmit it to the terminal 1201*b* in the RRC inactive mode, RRC idle mode, or RRC connected mode via an SRB, a DRB, or an MBS bearer (a unicast bearer or a multicast bearer) configured in the terminal 1201*b*. In another embodiment, the base station 1202*b* may transmit the control information for the MBS service to the terminal 1201*b* in the RRC inactive mode, RRC idle mode, or RRC connected mode via a transmission resource indicated by system information, a transmission resource configured by an RRC message, or a transmission resource indicated in a PDCCH including an RNTI identifier indicating the MBS service.

Upon receiving the control information from the base station 1202*b*, the terminal 1201*b* may transmit feedback corresponding to the control information to the base station 1202*b* as feedback information or indication information by applying an embodiment in FIG. 15A (step 1210*b*).

If the MBS service of interest remains or if the terminal 1201*b* still intends to receive the MBS service, the terminal 1501*b* receiving the control information from the base station 1202*b* may receive MBS service-related control information again (e.g., system information, an RRC message, or an MBS service control message) according to at least one of embodiments in FIGS. 8 to 11, or receive configuration information from the base station so that it may receive the MBS service by performing (or triggering) an RRC connection procedure or an RRC connection resuming procedure, or request and receive MBS configuration information to reset the received MBS configuration information, and continue performing MBS service reception.

In another embodiment, if the terminal 1201*b* is in an RRC idle mode or an RRC inactive mode, not an RRC connected mode, if the MBS service of interest remains, or if the terminal still intends to receive the MBS service, the terminal receiving the control information from the base station 1202*b* may receive MBS service-related control information again (e.g., system information, an RRC message, or an MBS service control message) according to at least one of embodiments in FIGS. 8 to 11, or receive configuration information from the base station so that it may receive the MBS service again by performing (or triggering) an RRC connection procedure or an RRC connection resuming procedure, or request and receive MBS configuration information to reset the received MBS configuration information, and continue performing MBS service reception.

The base station 1202*b* may manage a resource for the MBS service more efficiently by transmitting the control information to the terminal 1201*b*.

Referring to FIG. 12C, in order to identify the number of terminals which receive an MBS service, a base station 1202*c* may configure a message requesting a response about whether terminals receiving MBS service data receive the MBS service and/or requesting a response to count the number of terminals which receive the MBS service to transmit it to the terminals receiving the MBS service data (step 1205*c*). Upon receiving the message, a terminal 1201*c* may configure and transmit a response message to the base station 1202*c* (step 1210*c*).

The terminal 1201*c* in an RRC idle mode, an RRC inactive mode, or an RRC connected mode may receive the request message. If the terminal 1201*c* receiving the request message is in the RRC idle mode, the RRC inactive mode, or the RRC connected mode, the terminal 1201c may configure a response message to the request message to transmit it using an RRC message, MAC control information, RLC control information, or PDCP control information via an SRB, a DRB, or an MBS bearer (a unicast bearer or a multicast bearer) configured in the terminal 1201c. In addition, the terminal 1201c may transmit the response message via a transmission resource indicated by system information, a transmission resource configured by an RRC message, or a transmission resource indicated in a PDCCH including an RNTI identifier indicating the MBS service.

In another embodiment, terminals in the RRC connected mode among terminals receiving the request message may configure a response message to the request message to transmit it using an RRC message, MAC control information, RLC control information, or PDCP control information via an SRB, a DRB, or an MBS bearer (a unicast bearer or a multicast bearer) configured in the terminals. Alternatively, the terminal may transmit the response message via a transmission resource indicated by system information, a transmission resource configured by an RRC message, or a transmission resource indicated in a PDCCH including an RNTI identifier indicating the MBS service.

In another embodiment, terminals in the RRC idle mode or the RRC inactive mode among the terminals receiving the request message may transit into the RRC connected mode by performing an RRC connection procedure or an RRC connection resuming procedure to transmit the response message using an RRC message, MAC control information, RLC control information, or PDCP control information via an SRB, a DRB, or an MBS bearer (a unicast bearer or a multicast bearer) configured in the terminals. Alternatively, the terminal may transmit the response message via a transmission resource indicated by system information, a transmission resource configured by an RRC message, or a transmission resource indicated in a PDCCH including an RNTI identifier indicating the MBS service.

Figure 13A:
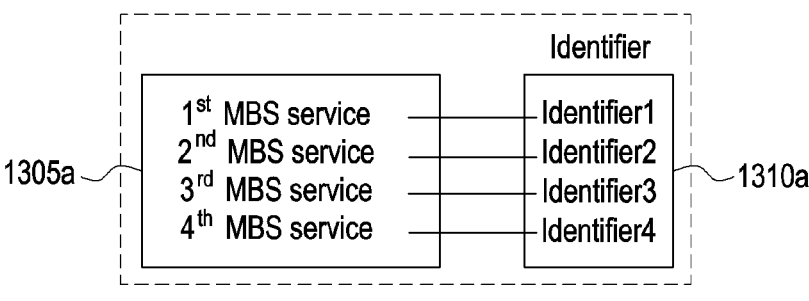
FIGS. 13A, 13B, and 13C are diagrams illustrating a method of indicating each MBS service for a plurality of MBS services according to an embodiment of the disclosure.
Figure 13B:
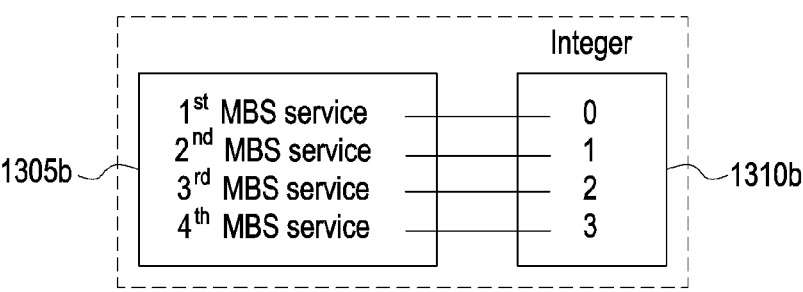
Figure 13C:
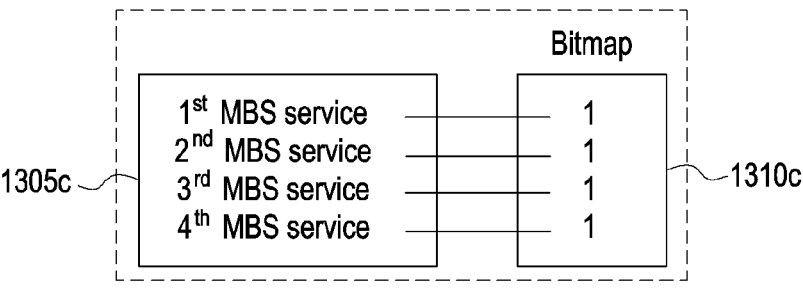

FIGS. 13A to 13C are diagrams illustrating a method of indicating each MBS service for a plurality of MBS services according to an embodiment of the disclosure.

Referring to FIG. 13A, each MBS service 1305a may have a mapping relation with a first identifier, a second identifier, a logical channel identifier, an RNTI identifier, or a bearer identifier 1310a for an MBS service, or each identifier may be allocated to each MBS service.

The mapping relation according to an embodiment in FIG. 13A has an advantage in that each MBS service may be distinguished, and a specific MBS service may be distinguished by the identifier. However, lengths of the identifiers are long, so indicating each MBS service with the first identifier, the second identifier, the logical channel identifier, the RNTI identifier, or the bearer identifier may not be efficient in terms of overhead.

Referring to FIG. 13B, a list of MBS services or a list of configured MBS services may be configured in system information, an RRC message, or an MBS control message, and an integer value 1310b may be allocated or mapped to each MBS service 1305b configured in the list of the MBS services. In another embodiment, integer values may be mapped or allocated in ascending (or descending) order of identifier values for MBS services included in the list of MBS services. When a specific MBS service is indicated, overhead may be reduced by indicating the specific MBS service with an integer value. For example, when a plurality of MBS services are indicated, the plurality of MBS services may be indicated by including each integer value for the plurality of MBS services or by including an integer values into a list.

Referring to FIG. 13C, a list of MBS services or a list of configured MBS services may be configured in system information, an RRC message, or an MBS control message, and each MBS service 1305c configured in the list of the MBS services may be allocated or mapped to each bit in a bitmap 1310c. In another embodiment, bits in the bitmap may be mapped or allocated in ascending (or descending) order of identifier values for MBS services included in the list of MBS services. When a specific MBS service is indicated, overhead may be reduced by indicating the specific MBS service with each bit in the bitmap (for example, each service may be indicated with a value of 1 or 0). For example, if a plurality of MBS services are indicated, the plurality of MBS services may be indicated by setting bit values for the plurality of MBS services in the bitmap.

Embodiments indicating each MBS service in FIGS. 13A to 13C may be utilized or extended and applied in various signaling methods of the disclosure.

For example, in an embodiment in FIG. 12C, a base station may configure a message requesting a response about whether terminals receiving MBS service data receive the MBS service or requesting a response to count the number of terminals which receive the MBS service to transmit it to the terminals receiving the MBS service data, and the following may be applied when the terminal receiving the message requesting the response configures and transmits a response message to the base station.

Specifically, the message requesting the response about whether the MBS service is received or requesting the response to count the number of terminals which receive the MBS service and the response message to the request message may be configured or generated with one of the following embodiments.

First Embodiment

As in an embodiment in FIG. 13A, each MBS service may have a mapping relation with a first identifier, a second identifier, a logical channel identifier, an RNTI identifier, or a bearer identifier for an MBS service, or each identifier may be allocated to each MBS service. According to an embodiment in FIG. 13A, a base station may configure a list of the identifiers which correspond to MBS services for which the base station wants to know how many terminals receive the MBS service, and include the list into a request message to transmit the request message to a terminal. The request message may be transmitted to the terminals receiving the MBS service, and the terminals receiving each MBS service included in the request message may respond to the request by generating a response message indicating whether they are interested in each MBS service or receive each MBS service.

In another embodiment, when the request message is generated, an integer value may be allocated or mapped to each MBS service in a list of MBS services configured with system information, an RRC message, or an MBS control message by applying an embodiment in FIG. 13B. For example, the integer value may be mapped or allocated in ascending (or descending) order of each identifier value for an MBS service included in the list of MBS services. When MBS services for that it wants to know how many terminals receive the MBS service is indicated, the MBS services for that it wants to know how many terminals receive the MBS service may be indicated by including the mapped or allocated integer value(s) into the request message or the list.

In another embodiment, when generating the request message, the base station may allocate or map each MBS service a list of MBS services configured with system information, an RRC message, or an MBS control message to each bit in a bitmap by applying an embodiment in FIG. 13C. For example, it may be mapped or allocated in ascending (or descending) order of each identifier value for an MBS service included in the list of MBS services and in ascending of each bit in the bitmap. When MBS services for that it wants to know how many terminals receive the MBS service is indicated in the request message, the MBS service is indicated by ach bit in the bitmap (for example, a value of 1 or 0 may indicate each service) so that overhead may be reduced. If a plurality of MBS services are indicated, the plurality of MBS services may be indicated by setting bit values for the plurality of MBS services in the bitmap.

Terminals receiving each MBS service included in the request message may respond to the request by configuring a response message indicating whether the terminals are interested in each MBS service or receive each MBS service. Each MBS service may have a mapping relation with a first identifier, a second identifier, a logical channel identifier, an RNTI identifier, or a bearer identifier for an MBS service in a list of MBS services included in the request message or a list of MBS services configured with system information, an RRC message, or an MBS control message, so the terminal may configure the identifiers which correspond to MBS services which the terminal is interested in or intends to receive as a list and include the list into the response message to transmit the response message to the base station when generating the response message by applying an embodiment in FIG. 13A.

In another embodiment, when generating the response message, the terminal may apply an embodiment in FIG. 13B to allocate or map an integer value to each MBS service in the list of the MBS services included in the request message or a list of MBS services configured with system information, an RRC message, or an MBS control message by applying an embodiment in FIG. 13B. For example, the integer value may be mapped or allocated in ascending (or descending) order of each identifier value for an MBS service included in the list of MBS services. When the response message indicates an MBS service which it is interested in or intends to receive, the mapped or allocated integer value (s) is included in the response message or included in the list thereby indicating, to the base station, MBS services which it is interested in or intends to receive and reducing overhead. In a case that a plurality of MBS services are indicated, the plurality of MBS services may be indicated by including each integer value for the plurality of MBS services or by including an integer value into a list.

In another embodiment, when generating the response message by applying an embodiment in FIG. 13C, the terminal may allocate or map each MBS service in the list of the MBS services included in the request message or a list of MBS services configured with system information, an RRC message, or an MBS control message to each bit in a bitmap. For example, it may be mapped or allocated in ascending (or descending) order of each identifier value for an MBS service included in the list of MBS services and in ascending of each bit in the bitmap. When an MBS service that it is interested in or intends to receive is indicated in the response message, the MBS service is indicated by ach bit in the bitmap (for example, a value of 1 or 0 may indicate each service) so that overhead may be reduced. If a plurality of MBS services are indicated, the plurality of MBS services may be indicated by setting bit values for the plurality of MBS services in the bitmap.

Second Embodiment

A base station may transmit, to terminals, a request message requesting information about an MBS service which the terminals are interested in or intend to receive. The request message may be transmitted to terminals receiving the MBS service, and the request message may include an indicator for causing the terminals receiving the MBS service to generate and transmit a response message indicating whether the terminals receiving the MBS service are interested in it or receive it. Terminals receiving each MBS service included in the request message may respond by generating a response message indicating whether the terminals are interested in each MBS service or receive each MBS service.

Each MBS service may have a mapping relation with a first identifier, a second identifier, a logical channel identifier, an RNTI identifier, or a bearer identifier for an MBS service in a list of MBS services configured with system information, an RRC message, or an MBS control message, so the terminal may configure the identifiers which correspond to MBS services which the terminal is interested in or intends to receive as a list and include the list into the response message to transmit the response message to the base station when generating the response message by applying an embodiment in FIG. 13A.

In another embodiment, when generating the response message, the terminal may apply an embodiment in FIG. 13B to allocate or map an integer value to each MBS service in a list of MBS services configured with system information, an RRC message, or an MBS control message by applying an embodiment in FIG. 13B. For example, the integer value may be mapped or allocated in ascending (or descending) order of each identifier value for an MBS service included in the list of MBS services. When the response message indicates an MBS service which it is interested in or intends to receive, the mapped or allocated integer value (s) is included in the response message or included in the list thereby indicating, to the base station, MBS services which it is interested in or intends to receive and reducing overhead. In a case that a plurality of MBS services are indicated, the plurality of MBS services may be indicated by including each integer value for the plurality of MBS services or by including an integer value into a list.

In another embodiment, when generating the response message by applying an embodiment in FIG. 13C, the terminal may allocate or map each MBS service in a list of MBS services configured with system information, an RRC message, or an MBS control message to each bit in a bitmap. For example, it may be mapped or allocated in ascending (or descending) order of each identifier value for an MBS service included in the list of MBS services and in ascending of each bit in the bitmap. When an MBS service that it is interested in or intends to receive is indicated in the response message, the MBS service is indicated by ach bit in the bitmap (for example, a value of 1 or 0 may indicate each service) so that overhead may be reduced. If a plurality of MBS services are indicated, the plurality of MBS services may be indicated by setting bit values for the plurality of MBS services in the bitmap.

Embodiments indicating an MBS service in FIGS. 13A to 13C may be extended and applied when indicating an MBS service of interest or configuring MBS service configuration information. For example, it may be extended and applied to embodiments in FIGS. 7 to 11.

Configuration information configured in system information or an RRC message may include first Discontinuous Reception (DRX) configuration information (e.g., a period, on-duration, or an offset, and/or the like) for a normal data service. So, a terminal may save terminal power by monitoring a PDCCH in a specific interval or not monitoring a PDCCH in a specific interval based on the first DRX configuration information for the normal data service.

Configuration information for an MBS service configured in system information, an RRC message, or MBS control data may include second DRX configuration information (e.g., a period, an interval length, or an offset, and/or the like) for the MBS service. So, the terminal may save terminal power by monitoring a PDCCH in a specific interval or not monitoring a PDCCH in a specific interval based on the second DRX configuration information for the MBS service.

The base station may configure the first DRX configuration information for the normal data service or the second DRX configuration information for the MBS service to the terminal, and if the first DRX configuration information or the second DRX configuration is configured, the terminal may independently operate first DRX and second DRX and transmit or receive data accordingly. For example, when normal data is received or transmitted, power may be saved by operating the first DRX, and by reading or without reading a PDCCH based on the first DRX configuration information. When MBS service data is received or transmitted, power may be saved by operating the second DRX, and by reading or without reading a PDCCH based on the second DRX configuration information.

In another embodiment, upon receiving an MBS service in an RRC connected mode, the terminal may operate the first DRX and the second DRX, and transmit or receive data accordingly. For example, when normal data is received or transmitted, power may be saved by operating the first DRX, and by reading or without reading a PDCCH based on the first DRX configuration information. When MBS service data is received or transmitted, power may be saved by operating the second DRX, and by reading or without reading a PDCCH based on the second DRX configuration information. When receiving an MBS service in an RRC idle mode or an RRC inactive mode, the terminal may operate the second DRX and transmit or receive data accordingly. For example, when MBS service data is received or transmitted, power may be saved by operating the second DRX, and by reading or without reading a PDCCH based on the second DRX configuration information.

In another embodiment, the terminal may operate third DRX configuration information for receiving a paging message in the RRC idle mode or RRC inactive mode to periodically wake up or be activated to read the paging message and monitor a PDCCH of the base station.

Figure 14A:
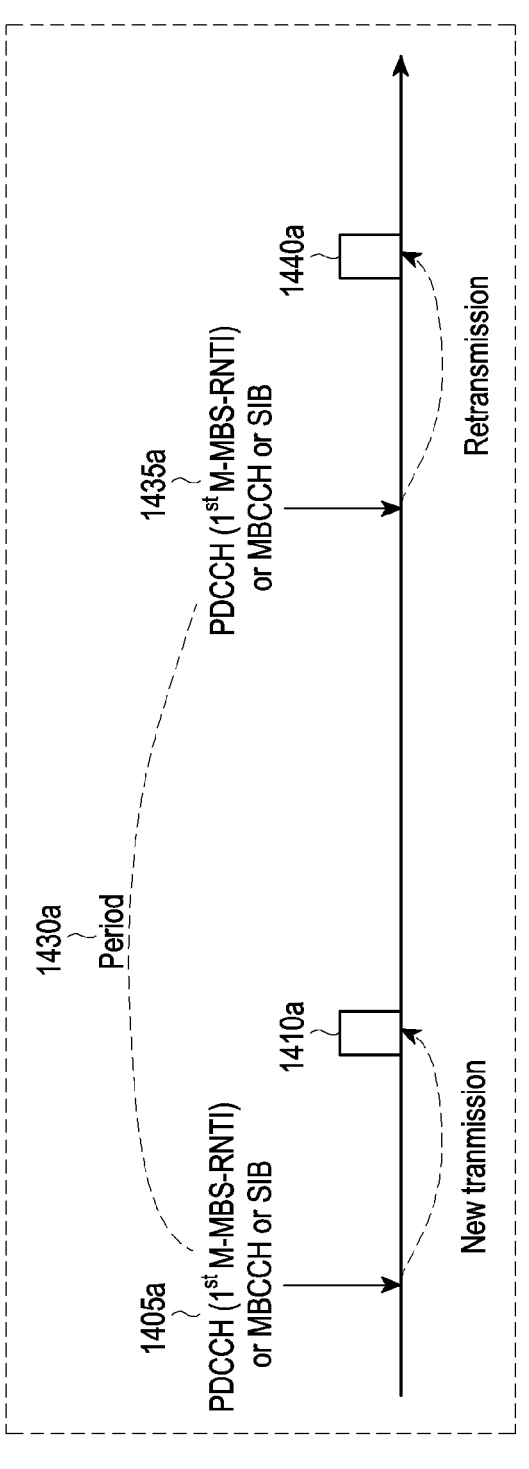
FIGS. 14A, 14B, and 14C are diagrams illustrating a method of retransmitting MBS service data according to an embodiment of the disclosure.
Figure 14B:
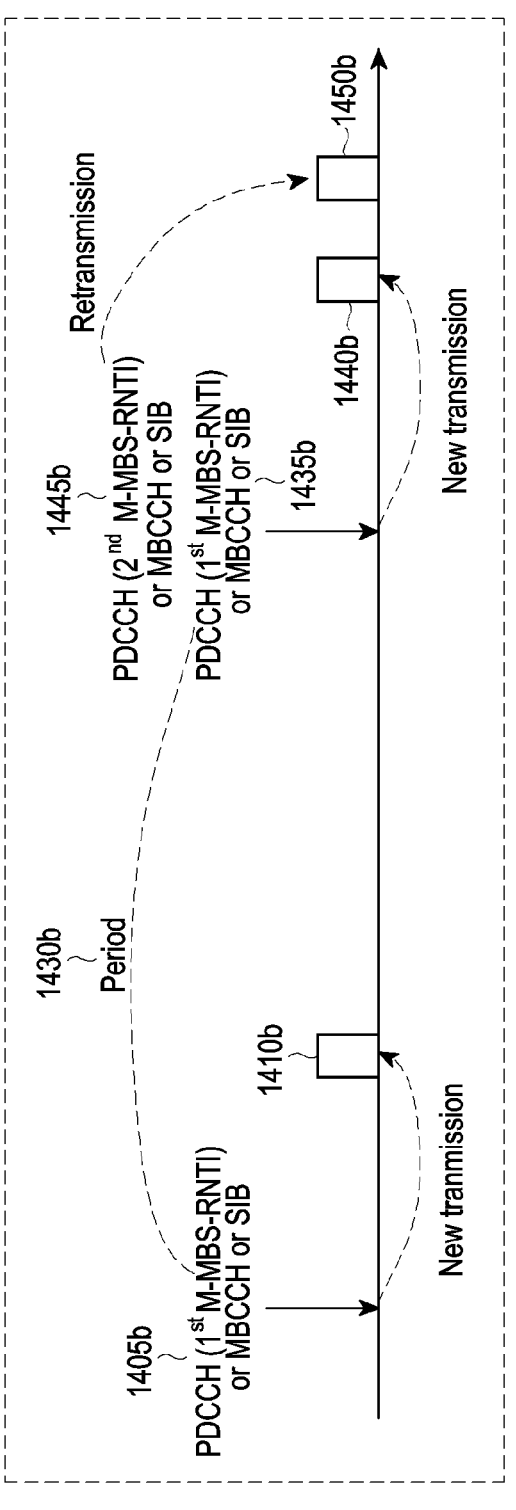
Figure 14C:
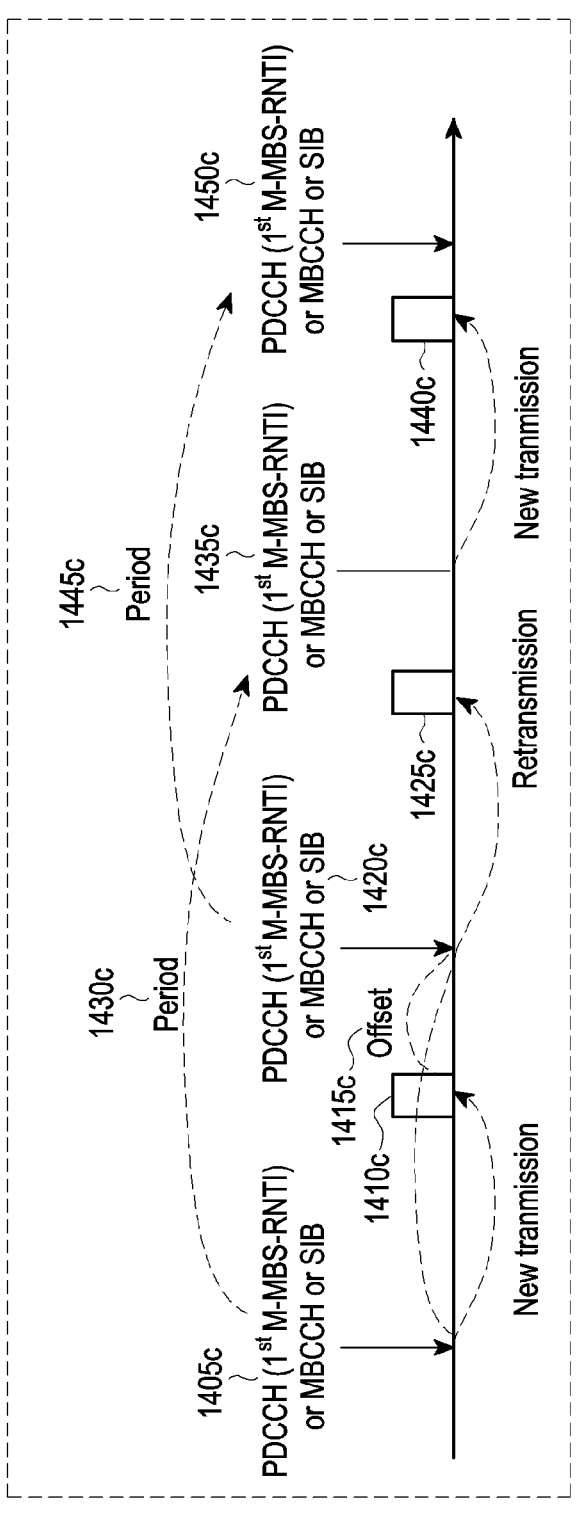

FIGS. 14A to 14C are diagrams illustrating a method of retransmitting MBS service data according to an embodiment of the disclosure.

In FIGS. 14A to 14C, in a case that HARQ reordering, an RLC reordering function, a HARQ ACK or NACK transmission function, a HARQ process or HARQ retransmission function is configured for an MBS service or a bearer supporting the MBS service by system information, an RRC message, or an MBS control message, if a terminal does not successfully receive MBS service data on a transmission resource indicated by a PDCCH (e.g., a PDCCH scrambled with an RNTI identifier for an MBS service) or a transmission resources periodically configured for the MBS service (a time resource, a frequency resource, a period or an offset, and configuration information (a period, on-duration (a length of an interval in which a PDCCH needs to be read), or an offset) for a separate DRX for an MBS service which are a transmission resources for an MBS service configured in system information or an RRC message) when receiving the MBS service data, the terminal may indicate NACK in a transmission resource (e.g., a PUCCH) indicated by the PDCCH or a transmission resource configured in the system information, the RRC message, or the MBS control message.

In another embodiment, if the MBS service data is successfully received in a transmission resource indicated by the PDCCH (e.g., a PDCCH scrambled with an RNTI identifier for the MBS service) or a periodically configured transmission resource, ACK may be indicated.

Transmission resource periodically configured for the MBS service may be activated (or used) or deactivated (or stopped being used) by an RRC message, MAC control information, or an indicator in a PDCCH. Transmission resource configuration information periodically configured for the MBS service to the terminal may be stored and maintained even if the periodic transmission resource is deactivated by the RRC message, the MAC control information, or the indicator in the PDCCH.

In another embodiment, the transmission resource configuration information periodically configured for the MBS service to the terminal may be released or discarded if the periodic transmission resource is deactivated by the RRC message, the MAC control information, or the indicator in the PDCCH.

In another embodiment, the base station or network may allocate different periodic transmission resources for a plurality of MBS services via an RRC message, and indicate activation or deactivation with an indicator of MAC control information or an MBS service identifier (a first identifier, a second identifier, a logical channel identifier, or a bearer identifier) in order to activate or deactivate a periodic transmission resource of each MBS service for the terminal, or activate or deactivate the periodic transmission resources of each MAC service with an indicator or a bitmap (e.g., it may be mapped in ascending order of identifiers) in the PDCCH. The transmission resource configuration information periodically configured for the MBS service to the terminal may be stored and maintained even if the periodic transmission resource is deactivated by the RRC message, the MAC control information, or the indicator in the PDCCH.

In another embodiment, the transmission resource configuration information periodically configured for the MBS service to the terminal may be released or discarded if the periodic transmission resource is deactivated by the RRC message, the MAC control information, or the indicator in the PDCCH.

In another embodiment, if the terminal does not successfully receive MBS service data on a transmission resources indicated by the PDCCH (e.g., a PDCCH scrambled with an RNTI identifier for the MBS service) or a periodically configured MBS service data transmission resource, the terminal may indicate to the base station which terminal has not successfully receive the MBS service data by including an indicator indicating the terminal or a terminal identifier into MAC control information, RLC control information, or PDCP control information.

In another embodiment, it is possible to indicate to the base station which terminal has not successfully receive the MBS service data by having each terminal indicate NACK on a transmission resource preconfigured for each terminal.

The base station may configure a transmission resource indicating whether a terminal has successfully received MBS service data (ACK) or not (NACK) as a common transmission resource for terminals receiving the MBS service. If at least one terminal indicates NACK or a certain terminal indicates NACK in the common transmission resource, the base station may perform retransmission of the MBS service data.

In another embodiment, if the MBS service data is not successfully received and it is indicated to the base station which terminal has not successfully received the MBS service data, the base station may perform retransmission only for the terminal.

The base station may apply one of the following embodiments or a combination of the following embodiments to perform retransmission for the MBS service data.

First Embodiment

Referring to FIG. 14A, a base station may transmit MBS service (1410a) data on a transmission resource (1405a and 1435a)(a time resource, a frequency resource, subcarrier spacing, or DRX configuration information, and/or the like) configured with system information, an RRC message, or MBS control data or at a configured period (1430a), or may indicate an MBS service data transmission resource by a PDCCH scrambled with an RNTI identifier indicating MBS service data to transmit data on the transmission resource. A terminal may receive (1410a) the MBS service data on the transmission resource (1405a and 1435a)(the time resource, the frequency resource, the subcarrier spacing, or the DRX configuration information, and/or the like) configured with the system information, the RRC message, or the MBS control data or at the configured period (1430a), or the MBS service data transmission resource may be indicated to the terminal by the PDCCH scrambled with the RNTI identifier indicating the MBS service data, and the terminal may receive the data on the transmission resource. If the terminal does not successfully receive the MBS service data, the terminal may indicate NACK in the transmission resource (e.g., a PUCCH) indicated by the PDCCH or the transmission resource configured with the system information, the RRC message, or the MBS control message. The base station may perform a retransmission procedure when receiving an indication indicating that the MBS service data has not been successfully received from a certain terminal. In the retransmission procedure, the MBS service data may be retransmitted on a transmission resource (a time resource, a frequency resource, a subcarrier spacing, or DRX configuration information, and/or the like) configured with the system information, the RRC message, or the MBS control data or at the configured period, or an MBS service data transmission resource may be indicated by the PDCCH scrambled with the RNTI identifier indicating the MBS service data, and the data may be retransmitted on the transmission resource. When performing the retransmission procedure, the base station may include an indicator indicating retransmission into the PDCCH, the MBS control data, or the RRC message which indicates the transmission resource to transmit (1435a and 1440a) it. For example, it may be indicated by whether a New Data indicator (NDI) identifier is toggled (new transmission is indicated if the NDI indicator is changed or retransmission is indicated if the NDI indicator is not changed).

In another embodiment, a separate transmission resource for retransmission may be configured and the transmission resource itself may indicate retransmission.

In another embodiment, an RNTI identifier for retransmission of MBS service data may be defined, and a PDCCH may be scrambled with the RNTI identifier to indicate retransmission.

When the terminal receives the MBS service data on the transmission resource (the time resource, the frequency resource, the subcarrier spacing, or the DRX configuration information, and/or the like) configured with the system information, the RRC message, or the MBS control data or at the configured period, or when the MBS service data transmission resource is indicated to the terminal by the PDCCH scrambled with the RNTI identifier indicating the MBS service data, if the indicator indicating the retransmission is included or if the retransmission is indicated, the terminal may receive retransmitted MBS service data if the terminal does not successfully receive previously received MBS service data. If the terminal successfully receives the previously received MBS service data, the terminal may ignore the data, or does not receive the data, or may discard the data even if the terminal receives the data (for example, a MAC layer device, an RLC layer device, or a PDCP layer device may discard the data by a duplicate detection procedure).

Second Embodiment

Referring to FIG. 14B, a base station may transmit (1410b) MBS service data on a transmission resource (1405b and 1435b)(a time resource, a frequency resource, subcarrier spacing, or DRX configuration information, and/or the like) configured with system information, an RRC message, or MBS control data or at a configured period (1430b), or may indicate an MBS service data transmission resource by a PDCCH scrambled with an RNTI identifier indicating MBS service data to transmit data on the transmission resource. A terminal may receive (1410b) the MBS service data on the transmission resource (1405b and 1435b) (the time resource, the frequency resource, the subcarrier spacing, or the DRX configuration information, and/or the like) configured with the system information, the RRC message, or the MBS control data or at the configured period (1430b), or the MBS service data transmission resource may be indicated to the terminal by the PDCCH scrambled with the RNTI identifier indicating the MBS service data, and the terminal may receive the data on the transmission resource. If the terminal does not successfully receive the MBS service data, the terminal may indicate NACK in the transmission resource (e.g., a PUCCH) indicated by the PDCCH or the transmission resource configured with the system information, the RRC message, or the MBS control message. The base station may perform a retransmission procedure when receiving an indication indicating that the MBS service data has not been successfully received from a certain terminal. In the retransmission procedure, the MBS service data may be retransmitted on a transmission resource (a time resource, a frequency resource, a subcarrier spacing, or DRX configuration information, and/or the like) configured with the system information, the RRC message, or the MBS control data or at the configured period, or an MBS service data transmission resource may be indicated by the PDCCH scrambled with the RNTI identifier indicating the MBS service data, and the data may be retransmitted on the transmission resource.

In another embodiment, MBS control data may be transmitted on the transmission resource (the time resource, the frequency resource, the subcarrier spacing, or the DRX configuration information, and/or the like) configured with the system information, the RRC message, or the MBS control data or at the configured period, or new MBS service data 1435b and retransmitted MBS service data 1445b may be simultaneously indicated by the plurality of PDCCHs (e.g., a PDCCH scrambled with an RNTI identifier for new transmission or including an indicator indicating the new transmission, and a PDCCH scrambled with an RNTI identifier for retransmission or including an indicator indicating the retransmission), a plurality of RNTI identifiers (e.g., scrambled with an RNTI identifier for new transmission or an indicator indicating the new transmission, and scrambled with an RNTI identifier for retransmission or an indicator indicating the retransmission), or a plurality of pieces of MBS control data (indicating new transmission or indicating retransmission) when the MBS service data transmission resource is indicated by the PDCCH scrambled with the RNTI identifier indicating the MBS service data, and transmission resources 1440b and 1450b in which new data is transmitted or retransmitted data are retransmitted may be indicated as different transmission resources. When performing the retransmission procedure, the base station may include an indicator indicating retransmission into the PDCCH, the MBS control data, or the RRC message which indicates the transmission resource to transmit (1445b) it. For example, it may be indicated by whether a New Data indicator (NDI) identifier is toggled (new transmission is indicated if the NDI indicator is changed or retransmission is indicated if the NDI indicator is not changed).

In another embodiment, a separate transmission resource for retransmission may be configured and the transmission resource itself may indicate retransmission.

In another embodiment, an RNTI identifier for retransmission of MBS service data may be defined, and a PDCCH may be scrambled with the RNTI identifier to indicate retransmission.

When the terminal receives the plurality of pieces of MBS control data on the transmission resource (the time resource, the frequency resource, the subcarrier spacing, or the DRX configuration information, and/or the like) configured with the system information, the RRC message, or the MBS control data or at the configured period, or when the MBS service data transmission resource is indicated to the terminal by the PDCCH scrambled with the RNTI identifier indicating a plurality of pieces of MBS service data, if the indicator indicating the retransmission is included/if the retransmission is indicated, the terminal may receive retransmitted MBS service data if the terminal does not successfully receive previously received MBS service data. When the terminal receives the plurality of pieces of MBS service data on the transmission resource (the time resource, the frequency resource, the subcarrier spacing, or the DRX configuration information, and/or the like) configured with the system information, the RRC message, or the MBS control data or at the configured period, or when the MBS service data transmission resource is indicated to the terminal by the PDCCH scrambled with the RNTI identifier indicating the plurality of pieces of MBS service data, if an indicator indicating new transmission is included or new transmission is indicated, the terminal may also receive new data. The terminal may ignore the data for the retransmission, or does not receive the data, or may discard the data even if the terminal receives the data (for example, a MAC layer device, an RLC layer device, or a PDCP layer device may discard the data by a duplicate detection procedure) if the terminal successfully receives the previously received MBS service data, and may receive new data if new transmission is indicated.

Third Embodiment

Referring to FIG. 14C, a base station may transmit (1410c) MBS service data on a transmission resource (1405c and 1435c)(a time resource, a frequency resource, subcarrier spacing, or DRX configuration information, and/or the like) configured with system information, an RRC message, or MBS control data or at a configured period (1430c), or may indicate an MBS service data transmission resource by a PDCCH scrambled with an RNTI identifier indicating MBS service data to transmit data on the transmission resource. A terminal may receive (1410c) the MBS service data on the transmission resource (1405c and 1435c)(the time resource, the frequency resource, the subcarrier spacing, or the DRX configuration information, and/or the like) configured with the system information, the RRC message, or the MBS control data or at the configured period (1430c), or the MBS service data transmission resource may be indicated to the terminal by the PDCCH scrambled with the RNTI identifier indicating the MBS service data, and the terminal may receive the data on the transmission resource. If the terminal does not successfully receive the MBS service data, the terminal may indicate NACK in the transmission resource (e.g., a PUCCH) indicated by the PDCCH or the transmission resource configured with the system information, the RRC message, or the MBS control message. The base station may perform a retransmission procedure when receiving an indication indicating that the MBS service data has not been successfully received from a certain terminal. In a transmission procedure for new data, the MBS service data may be transmitted on a transmission resource (a time resource, a frequency resource, a subcarrier spacing, or DRX configuration information, and/or the like) configured with the system information, the RRC message, or the MBS control data or at the configured period, or an MBS service data transmission resource may be indicated by the PDCCH scrambled with the RNTI identifier indicating the MBS service data, and the data may be transmitted on the transmission resource. In the retransmission procedure for data for retransmission, a separate transmission resource for retransmission is configured by the system information, the RRC message, or the MBS control message, MBS control data may be transmitted on a separately configured transmission resource (a time resource, a frequency resource, subcarrier spacing, DRX configuration information, an offset or a period, a transmission resource configured to indicate a new data transmission resource, an offset from a period, or a period, and/or the like) 1415c or at a configured period (1445c), or retransmitted MBS service data may be indicated and a transmission resource 1425c on which the retransmitted data is retransmitted may be indicated by a PDCCH for retransmission (e.g., a PDCCH scrambled with an RNTI identifier for retransmission or including an indicator indicating retransmission, or scrambled with an RNTI identifier for an MBS service, RNTI identifiers (e.g., an indicator scrambled with an RNTI identifier for retransmission or indicating retransmission), or pieces of MBS control data (indicating retransmission)(1420c and 1450c) when an MBS service data transmission resource is indicated by a PDCCH scrambled with an RNTI identifier indicating MBS service data. When performing the retransmission procedure, the base station may include an indicator indicating retransmission into the PDCCH, the MBS control data, or the RRC message which indicates the transmission resource to transmit it. For example, it may be indicated by whether a New Data indicator (NDI) identifier is toggled (new transmission is indicated if the NDI indicator is changed or retransmission is indicated if the NDI indicator is not changed).

In another embodiment, a separate transmission resource for retransmission may be configured and the transmission resource itself may indicate retransmission.

In another embodiment, an RNTI identifier for retransmission of MBS service data may be defined, and a PDCCH may be scrambled with the RNTI identifier to indicate retransmission.

When the terminal receives the MBS control data on the transmission resource (the time resource, the frequency resource, the subcarrier spacing, or the DRX configuration information, and/or the like) configured with the system information, the RRC message, or the MBS control data or at the configured period, or when the MBS service data transmission resource is indicated to the terminal by the PDCCH scrambled with the RNTI identifier indicating MBS service data, if the terminal does not successfully receive previously received MBS service data, retransmission of the MBS service data may be indicated and received on a separate transmission resource for retransmission (a time resource, a frequency resource, subcarrier spacing, DRX configuration information, an offset or a period, a transmission resource configured to indicate a new data transmission resource, an offset from a period, or a period, and/or the like) $1415c$ and $1445c$ configured with the system information, the RRC message, or the MBS control data, or at a configured period $1445c$. New MBS service data transmission may be indicated and received in a transmission resource configured for new transmission. The terminal may ignore indication or data on a separate transmission resource configured for the retransmission, or does not receive the indication or data, or may discard the indication or data even if the terminal receives the indication or data (for example, a MAC layer device, an RLC layer device, or a PDCP layer device may discard the indication or data by a duplicate detection procedure) if the terminal successfully receives the previously received MBS service data, and new MBS service data transmission may be indicated and received on a transmission resource configured for new transmission.

Fourth Embodiment

When new data is transmitted or when a first embodiment, a second embodiment, or a third embodiment is applied, a multicast bearer or multicast MBS service support, or a unicast bearer or unicast MBS service support may be applied.

In another embodiment, when the new data is transmitted or when the first embodiment, the second embodiment, or the third embodiment is applied, a multicast bearer or multicast MBS service support may be applied.

In another embodiment, when the new data is transmitted, the multicast bearer or multicast MBS service support may be applied, and when the first embodiment, the second embodiment, or the third embodiment for retransmission is applied, the unicast bearer or the unicast MBS service support may be applied. For example, a procedure for retransmission may be applied and performed only to terminals which have not successfully received MBS service data.

In the disclosure, when a terminal receiving an MBS service stops the MBS service, when the terminal no longer intends to receive the MBS service, when the terminal intends to release a bearer via which the MBS service is received, or when the terminal intends to release an MBS bearer according to configuration of a base station, an RRC message, or indication in an MBS control message, one or a combination of the following embodiments will be described as a reception operation of the terminal.

First Embodiment

When releasing an MBS bearer (e.g., a unicast bearer or multicast bearer) or when receiving an indication to release the MBS bearer, a terminal may discard all stored data if there is MBS service data stored in the MBS bearer (e.g., a MAC layer device, an RLC layer device, or a PDCP layer device)(or if there is data which has not yet been transferred to a upper layer device). Then, the terminal may release the MBS bearer.

Second Embodiment

When releasing an MBS bearer (e.g., a unicast bearer or multicast bearer) or when receiving an indication to release the MBS bearer, a terminal may process data to transfer it to a upper layer device (for example, it may be transferred to the upper layer device in order of receipt or in ascending order of serial number) if there is MBS service data stored in the MBS bearer (e.g., a MAC layer device, an RLC layer device, or a PDCP layer device)(or if there is data which has not yet been transferred to the upper layer device). Then, the terminal may release the MBS bearer.

Third Embodiment

When releasing an MBS bearer (e.g., a unicast bearer or multicast bearer) or when receiving an indication to release the MBS bearer, a terminal may stop or initialize a reordering timer if a reordering function is configured in the MBS bearer (e.g., a MAC layer device, an RLC layer device, or a PDCP layer device) or if the reordering function is performed. The terminal may process data to transfer it to a upper layer device (for example, it may be transferred to the upper layer device in order of receipt or in ascending order of serial number) if there is MBS service data stored in the MBS bearer (or if there is data which has not yet been transferred to the upper layer device). Then, the terminal may release the MBS bearer.

Fourth Embodiment

When releasing an MBS bearer (e.g., a unicast bearer or multicast bearer) or when receiving an indication to release the MBS bearer, a terminal may stop or initialize a reordering timer if a reordering function is configured in the MBS bearer (e.g., a MAC layer device, an RLC layer device, or a PDCP layer device), if the reordering function is performed, or if a header compression procedure (or data compression procedure) is configured. The terminal may perform a header decompression procedure on the MBS service data (for example, if the header decompression procedure is not performed) to transfer it to a upper layer device (for example, it may be transferred to the upper layer device in order of receipt or in ascending order of serial number) if there is MBS service data stored in the MBS bearer (or if there is data which has not yet been transferred to the upper layer device). Then, the terminal may release the MBS bearer.

Figure 15:
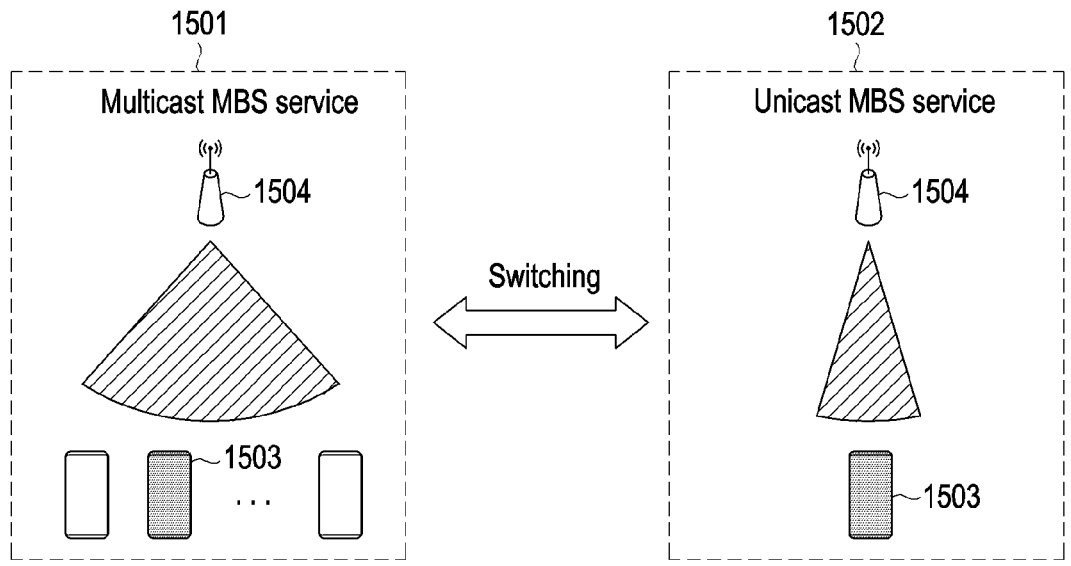
FIG. 15 is a diagram illustrating a method of switching an MBS service scheme according to an embodiment of the disclosure.

FIG. 15 is a diagram illustrating a method of switching an MBS service scheme according to an embodiment of the disclosure.

FIG. 15 shows a first switching method for switching from a multicast service or a multicast bearer to a unicast service or a unicast bearer to continuously support (transmit or receive) an MBS service or a second switching method for switching from a unicast service or a unicast bearer to a multicast service or a multicast bearer to continuously support (transmit or receive) an MBS service in a next-generation mobile communication system or Access Stratum (AS).

Referring to FIG. 15, the first switching method represents a method for switching a multicast service 1501 in which a plurality of terminals simultaneously receive MBS service data for a certain MBS service broadcasted or transmitted by a base station 1504 to a unicast service 1502 which is an MBS service in which the base station 1504 broadcasts or transmits MBS service data for the MBS service for one terminal. The first switching method may be indicated by an indicator via system information, an RRC message, an MBS control information message, MAC control information, RLC control information, PDCP control information, or a PDCCH. For example, if a terminal 1503 moves to a cell which does not support the MBS service while receiving the MBS service on a multicast bearer in a cell supporting the MBS service, the terminal 1503 may switch to a unicast bearer by making a request to a network or according to indication of the network to receive the MBS service.

Continuing to refer to FIG. 15, the second switching method represents a method for switching the unicast service 11502 which is the MBS service in which the base station 1504 broadcasts or transmits the MBS service data for the certain MBS service for the one terminal to the multicast service 1501 in which the plurality of terminals simultaneously receive the MBS service data for the MBS service broadcasted or transmitted by the base station 1504. The second switching method may be indicated by an indicator via system information, an RRC message, an MBS control information message, MAC control information, RLC control information, PDCP control information, or a PDCCH.

If the plurality of terminals simultaneously receive the MBS service data for the certain MBS service broadcasted or transmitted by the base station 1504, a bearer on which each of the plurality of terminals receives the MBS service may be referred to as a multicast bearer. If the base station 1504 broadcasts or transmits the MBS service data for the MBS service for the one terminal, a bearer on which the terminal receives the MBS service may be referred to as a unicast bearer.

Based on the multicast service 1501 or the multicast bearer, or the unicast service 1502 or the unicast bearer, the terminal 1503 may receive the MBS service. For example, the terminal 1503 may receive a service via the multicast service 1501 or the multicast bearer for the same MBS service. The terminal 1505 may receive a service via the unicast service 1502 or the unicast bearer for the same MBS service.

In another embodiment, the terminal 1503 may receive a service by configuring, establishing, or re-establishing the multicast bearer, or switching to the multicast bearer according to base station configuration, system information, an RRC message, or an MBS control message when receiving the MBS service via the multicast service 1501, and the terminal 1503 may receive a service by configuring, establishing, or re-establishing the unicast bearer, or switching to the unicast bearer according to base station configuration, system information, an RRC message, or an MBS control message when receiving the MBS service via the unicast service 1502.

In another embodiment, the terminal 1503 may configure one MBS bearer for one MBS service, and receive the multicast service 1501 or the unicast service 1502 via a bearer identifier corresponding to the one MBS bearer, a logical channel identifier, an RNTI identifier, a first identifier or a second identifier for the MBS service, or mapping relation between the identifiers.

When receiving or intending to receive the MBS service, the terminal 1503 may receive the MBS service based on the multicast service 1501, multicast bearer, unicast service 1502, or unicast bearer according to the base station configuration, system information, RRC message, or MBS control message.

The first switching method for continuously supporting (transmitting or receiving) the MBS service or the second switching method for continuously supporting (transmitting or receiving) the MBS service by switching may be performed for one or a plurality of the following cases. If one or a plurality of the following conditions are satisfied, the base station 1504 may indicate, to the terminal, or trigger the first switching method or the second switching method using an indicator via base station configuration, system information, an RRC message, an MBS control message, MAC control information, RLC control information, PDCP control information, or a PDCCH, or if the one or the plurality of the following conditions are satisfied, the terminal may perform the first switching method or the second switching method itself (for example, without indication from the base station).

Case that the terminal requests the first switching method or the second switching method from a network, Case that the terminal indicates a preference to prefer the unicast service or unicast bearer to the network, Case that the terminal indicates a preference to prefer the multicast service or multicast bearer to the network, Case that the base station intends to transit the terminal into an RRC inactive mode or RRC idle mode, Case that the terminal intends to receive the MBS service in the RRC inactive mode or RRC idle mode, Case that the base station intends to support the MBS service in the RRC inactive mode or RRC idle mode for the terminal, Case that the base station intends to transit the terminal into the RRC inactive mode or RRC idle mode or an RRC connected mode, Case that the terminal intends to transit into the RRC inactive mode, RRC idle mode, or RRC connected mode, Case that the terminal intends to receive the MBS service in the RRC inactive mode, RRC idle mode, or RRC connected mode, Case that the base station intends to support the MBS service in the RRC inactive mode, RRC idle mode, or RRC connected mode for the terminal, Case that the terminal detects or declares a radio connection failure, Case that it is required when the base station considers a network transmission resource or scheduling implementation, Case that the terminal requires it based on a terminal capability or configuration information, Case that the multicast service or the multicast bearer may not be supported in the terminal, a current cell (base station), an area, or the system information, Case that the unicast service or the unicast bearer may not be supported in the terminal, the current cell (base station), the area, or the system information, Case that a multicast service or a multicast bearer for a certain service may not be supported in the terminal, the current cell (base station), the area, or the system information, and Case that a unicast service or a unicast bearer for the certain service may not be supported in the terminal, the current cell (base station), the area, or the system information, For example, the base station 1504 may allow the terminal 1503 receiving a first MBS service in the RRC connected mode to receive the service via the multicast service 1501 or the multicast bearer. If the terminal 1503 in the RRC connected mode indicates that it wants to receive the service via the unicast service 1502 or the unicast bearer, the base station 1504 may continuously provide the terminal 1503 with the MBS service via the unicast service 1502 or the unicast bearer by reflecting preference of the terminal 1503 to indicate, via the RRC message or MBS control message, the first switching method for continuously supporting (transmitting or receiving) the MBS service. A reverse case of switching from the unicast service 1502 or the unicast bearer to the multicast service 1501 or the multicast bearer may be cited as an example as well.

For example, the base station 1504 may allow the terminal 1503 receiving the first MBS service in the RRC connected mode to receive the service via the unicast service 1502 or the unicast bearer. If the base station 1504 intends to transit the terminal 1503 in the RRC connected mode terminal 1503 into the RRC inactive mode or RRC idle mode, or if the terminal 1503 intends to transit into the RRC inactivated mode or RRC idle mode, the base station 1504 may continuously provide the terminal 1503 with the MBS service via the multicast service 1501 or the multicast bearer by indicating, via the RRC message or MBS control message, the second switching method for continuously supporting (transmitting or receiving) the MBS service. A reverse case of switching from the multicast service 1501 or the multicast bearer to the unicast service 1502 or the unicast bearer may be cited as an example as well.

For example, the base station may allow the terminal 1503 receiving the first MBS service in the RRC connected mode to receive the service via the multicast service 1501 or the multicast bearer. If a handover is indicated to the terminal 1505 in the RRC connected mode, or if a target base station does not support the first MBS service via the multicast service or multicast bearer or does not support the MBS service, the base station 1504 may continuously provide the terminal 1503 with the MBS service via the unicast service 1502 or the unicast bearer by indicating, to the terminal 1503 via the RRC message or MBS control message, the first switching method for continuously supporting (transmitting or receiving) the MBS service. A reverse case of switching from the unicast service 1502 or the unicast bearer to the multicast service 1501 or the multicast bearer may be cited as an example as well.

For example, if the terminal 1503 wants to receive a certain MBS service in the RRC idle mode or RRC inactive mode, the terminal 1503 may set up a connection with the base station 1504 according to the system information and receive the service via the multicast service 1501 or multicast bearer indication in the RRC message or MBS control message. If the terminal 1503 in the RRC inactive mode or RRC idle mode sets up a connection with a network or resumes a connection for transmitting or receiving normal data, the base station 1504 may continuously provide the terminal 1505 with the MBS service via the unicast service 1502 or unicast bearer by indicating, via the RRC message or MBS control message, the first switching method for continuously supporting (transmitting or receiving) the MBS service according to determination in the base station 1504 or preference of the terminal 1503. A reverse case of switching from the unicast service 1502 or the unicast bearer to the multicast service 1501 or the multicast bearer may be cited as an example as well.

For example, if the terminal 1503 wants to receive a certain MBS service in an RRC idle mode or an RRC inactive mode, the terminal 1503 may set up a connection with the base station 1504 according to system information and receive the service via the multicast service 1501 or the multicast bearer according to indication in an RRC message or MBS control message. If the terminal in the RRC inactive mode or RRC idle mode moves and camps on another cell via a cell selection or reselection procedure, and the MBS service is not supported in a new cell or system information of the new cell (for example, indicated by an indicator) or the MBS service is not supported via the multicast service 1501 or the multicast bearer (for example, indicated by an indicator), the terminal 1503 may set up an RRC connection with the base station 1504, the first switching method for continuously supporting (transmitting or receiving) the MBS service may be indicated via an RRC message or MBS control message according to configuration or determination in the base station 1504, and the terminal 1503 may continuously receive the MBS service via the unicast service 1502 or the unicast bearer. A reverse case of switching from the unicast service 1502 or the unicast bearer to the multicast service 1501 or the multicast bearer may be cited as an example as well.

The first switching method for continuously supporting (transmitting or receiving) the MBS service or the second switching method for continuously supporting (transmitting or receiving) the MBS service may be performed by one embodiment or combination of the following embodiments.

First Embodiment

A bearer on which each MBS service is received may be configured via system information, an RRC message, or an MBS control message, and a first identifier, a second identifier, a bearer identifier, a logical channel identifier, or an RNTI identifier corresponding to each MBS service may be set or allocated. An indicator indicating whether the bearer on which each MBS service is received is a unicast service, a unicast bearer, a multicast service, or a multicast bearer may be set.

In another embodiment, a first identifier, a second identifier, a bearer identifier, a logical channel identifier, or an RNTI identifier may be set or allocated for a unicast service or a unicast bearer which corresponds to each MBS service. In addition, a first identifier, a second identifier, a bearer identifier, a logical channel identifier, or an RNTI identifier may be set or allocated for a multicast service or multicast bearer which corresponds to each MBS service. When supporting the MBS service by unicast, the base station may configure MBS service data which corresponds to identifiers or indicators corresponding to the MBS service, and indicate a transmission resource to transmit the MBS service data. When supporting the MBS service by multicast, the base station may configure the MBS service data which corresponds to the identifiers or indicators corresponding to the MBS service, and indicate a transmission resource to transmit the MBS service data. Based on different identifiers or indicators, the base station may apply the first switching method or the second switching method. So, when receiving data from a bearer configured for the MBS service, the terminal may identify the identifier or indicator, and identify a logical channel identifier, bearer identifier, first identifier, or second identifier to receive a unicast service or a multicast service for each MBS service.

Second Embodiment

A bearer on which each MBS service is received may be configured via system information, an RRC message, or an MBS control message, and a first identifier, a second identifier, a bearer identifier, a logical channel identifier, or an RNTI identifier corresponding to each MBS service may be set or allocated. An indicator indicating whether the bearer on which each MBS service is received is a unicast service, a unicast bearer, a multicast service, or a multicast bearer may be set.

In another embodiment, a first identifier, a second identifier, a bearer identifier, a logical channel identifier, or an RNTI identifier may be set or allocated for a unicast service or a unicast bearer which corresponds to each MBS service. In addition, a first identifier, a second identifier, a bearer identifier, a logical channel identifier, or an RNTI identifier may be set or allocated for a multicast service or multicast bearer which corresponds to each MBS service. In the second embodiment, the first identifier, the second identifier, the bearer identifier, or the logical channel identifier corresponding to each MBS service may be set or allocated. For each MBS service, a first RNTI identifier may be allocated for a unicast service of the MBS service, and a second RNTI identifier may be allocated for a multicast service of the MBS service. When supporting the MBS service by unicast, the base station may configure MBS service data which corresponds to identifiers corresponding to the MBS service, scramble a PDCCH with the first RNTI identifier, and indicate a transmission resource to transmit the MBS service data. When supporting the MBS service by multicast, the base station may configure the MBS service data which corresponds to the identifiers corresponding to the MBS service, scramble a PDCCH with the second RNTI identifier, and indicate a transmission resource to transmit the MBS service data. Based on the first RNTI identifier or the second RNTI identifier which are different each other, the base station may apply the first switching method or the second switching method. So, when receiving data from a bearer configured for the MBS service, the terminal may identify the first RNTI identifier or the second RNTI identifier, and identify a logical channel identifier, bearer identifier, first identifier, or second identifier to receive a unicast service or a multicast service.

Third Embodiment

A bearer on which each MBS service is received may be configured via system information, an RRC message, or an MBS control message, and a first identifier, a second identifier, a bearer identifier, a logical channel identifier, or an RNTI identifier corresponding to each MBS service may be set or allocated. An indicator indicating whether the bearer on which each IBS service is received is a unicast service, a unicast bearer, a multicast service, or a multicast bearer may be set.

In another embodiment, a first identifier, a second identifier, a bearer identifier, a logical channel identifier, or an RNTI identifier may be set or allocated for a unicast service or a unicast bearer which corresponds to each MBS service. In addition, a first identifier, a second identifier, a bearer identifier, a logical channel identifier, or an RNTI identifier may be set or allocated for a multicast service or multicast bearer which corresponds to each MBS service. In the third embodiment, a first RNTI identifier may be configured or allocated for a unicast service of IBS services, and a second RNTI identifier may be configured or allocated for a multicast service of the MBS services. So, a terminal may distinguish the unicast service or the multicast service based on the first RNTI identifier or the second RNTI identifier, or the base station may support the unicast service or the multicast service based on the first RNTI identifier or the second RNTI identifier. The base station may support the unicast service with the first RNTI identifier, and distinguish each IBS service in the unicast service via a bearer identifier, a logical channel identifier, a first identifier, or a second identifier to generate and transmit MBS service data. So, if the terminal receives the unicast service with the first RNTI identifier, the terminal may distinguish each NIBS service based on the bearer identifier, the logical channel identifier, the first identifier, or the second identifier to receive and process each NIBS service data on each NIBS service bearer. The base station may support the multicast service with the second RNTI identifier, and distinguish each MBS service in the multicast service via a bearer identifier, a logical channel identifier, a first identifier, or a second identifier to generate and transmit MBS service data. So, if the terminal receives the multicast service with the second RNTI identifier, the terminal may distinguish each MBS service based on the bearer identifier, the logical channel identifier, the first identifier, or the second identifier to receive and process each MBS service data on each NIBS service bearer. When supporting the MBS service by unicast, the base station may configure MBS service data which corresponds to identifiers corresponding to the NIBS service, scramble a PDCCH with the first RNTI identifier, and indicate a transmission resource to transmit the MBS service data. When supporting the NIBS service by multicast, the base station may configure the NIBS service data which corresponds to the identifiers corresponding to the MBS service, scramble a PDCCH with the second RNTI identifier, and indicate a transmission resource to transmit the NIBS service data. Based on the first RNTI identifier or the second RNTI identifier which are different each other, the base station may apply the first switching method or the second switching method. So, when receiving data from a bearer configured for the MBS service, the terminal may identify the first RNTI identifier or the second RNTI identifier, and identify a logical channel identifier, bearer identifier, first identifier, or second identifier to receive a unicast service or a multicast service.

Fourth Embodiment

A bearer on which each NIBS service is received may be configured in system information, an RRC message, or an NIBS control message, and a first identifier, a second identifier, a bearer identifier, a logical channel identifier, or an RNTI identifier corresponding to each MBS service may be set or allocated. An indicator indicating whether the bearer on which each MBS service is received is a unicast service, a unicast bearer, a multicast service, or a multicast bearer may be set.

In another embodiment, a first identifier, a second identifier, a bearer identifier, a logical channel identifier, or an RNTI identifier may be set or allocated for a unicast service or a unicast bearer which corresponds to each MBS service. In addition, a first identifier, a second identifier, a bearer identifier, a logical channel identifier, or an RNTI identifier may be set or allocated for a multicast service or multicast bearer which corresponds to each MBS service. In the fourth embodiment, for a first identifier, a second identifier, a bearer identifier, a logical channel identifier, or an RNTI identifier which corresponds to each MBS service, a restriction, rule, or mapping for receiving downlink data may be configured via system information, an RRC message, or an MBS control message. For example, a downlink logical channel restriction method may be configured for each MBS service. For example, in the above, for an identifier (e.g., the first identifier, the second identifier, the logical channel identifier, or the bearer identifier) corresponding to each MBS service, a rule or restriction (e.g., sub carrier spacing, a maximum PUSCH interval length, a periodic transmission resource type, an SCell identifier, a partial bandwidth identifier, a periodic transmission resource group, or a physical layer device priority indicator identifier) for receiving data may be configured. That is, a base station may support an MBS service by mapping or configuring a certain MBS service or unicast or multicast service with respect to a first rule or restriction. So, if the first rule or restriction is configured, a terminal may receive a service by causing a corresponding MBS service bearer to process MBS service data received according to the first rule or restriction. For example, the base station may support a certain MBS service according to the first rule or restriction and transmit MBS service data by unicast. So, if the first rule or restriction is configured, the terminal may receive a service by causing a corresponding MBS service bearer to process MBS service data received according to the first rule or restriction. For example, the base station may support a certain MBS service and transmit MBS service data by multicast with respect to a second rule or restriction (e.g., sub carrier spacing, a maximum PUSCH interval length, a periodic transmission resource type, an SCell identifier, a partial bandwidth identifier, a periodic transmission resource group, or a physical layer device priority indicator identifier). So, if the second rule or restriction is configured, the terminal may receive a service by causing a corresponding MBS service bearer to process MBS service data received according to the second rule or restriction. Therefore, in the fourth embodiment, depending on a certain MBS service or RRC mode (e.g., an RRC idle mode, an RRC inactive mode, or an RRC connected mode) or unicast service or multicast service, the base station may configure a corresponding rule or restriction and support an MBS service. So, the base station may support an MBS service by configuring a restriction or rule as a corresponding dedicated transmission resource, dedicated carrier (cell), dedicated partial bandwidth identifier, dedicated sub carrier spacing, or priority depending on a certain MBS service, unicast service, or multicast service, or RRC mode of the terminal, and the terminal may receive each NBS service by unicast or multicast according to the configured restriction or rule. The base station or the terminal may perform a first switching method or a second switching method by configuring different rules or restrictions for each MBS service. For example, a logical channel identifier of a certain NBS service is mapped or set to a first SCell identifier (or partial bandwidth identifier) or a second SCell identifier (or partial bandwidth identifier), and the base station may support a unicast service with the first SCell identifier (or partial bandwidth identifier) and may support a multicast service with the second SCell identifier (or partial bandwidth identifier).

In another embodiment, the base station or the terminal may limit all NMBS services to unicast services for the first SCell identifier (or partial bandwidth identifier), and provide or receive a service by classifying data received on an SCell (or partial bandwidth) which corresponds to the first SCell identifier (or partial bandwidth identifier) into different MBS service data based on a logical channel identifier (or bearer identifier). Further, the base station or the terminal may limit all NBS services to multicast services for the second SCell identifier (or partial bandwidth identifier), and provide or receive a service by classifying data received on an SCell (or partial bandwidth) which corresponds to the second SCell identifier (or partial bandwidth identifier) into different NBS service data based on a logical channel identifier (or bearer identifier). The base station or the terminal may support each MBS service, a unicast service, or a multicast service by configuring or mapping various restrictions or rules for each NBS service, or may support an NBS service in an RRC connected mode, RRC idle mode, or RRC inactive mode.

Fifth Embodiment

A bearer on which each NBS service is received may be configured via system information, an RRC message, or an NBS control message, and a first identifier, a second identifier, a bearer identifier, a logical channel identifier, or an RNTI identifier corresponding to each MBS service may be set or allocated. An indicator indicating whether the bearer on which each NBS service is received is a unicast service, a unicast bearer, a multicast service, or a multicast bearer may be set.

In another embodiment, a first identifier, a second identifier, a bearer identifier, a logical channel identifier, or an RNTI identifier may be set or allocated for a unicast service or a unicast bearer which corresponds to each MBS service. In addition, a first identifier, a second identifier, a bearer identifier, a logical channel identifier, or an RNTI identifier may be set or allocated for a multicast service or multicast bearer which corresponds to each MBS service. In the fifth embodiment, if a first switching method or a second switching method is triggered or applied for a first identifier, a second identifier, a bearer identifier, a logical channel identifier, or an RNTI identifier which corresponds to each MBS service, a bearer for the MBS service may be released, a new MBS bearer may be established, and MBS service data may be received via an RRC message, system information, an MBS control message, or MAC control information. For example, if the first switching method is indicated for a certain MBS service, the terminal may release a multicast bearer on which a service is received, newly establish a unicast bearer for the MBS service (for example, identifiers corresponding to the MBS service may also be newly set), and receive MBS service data. For example, if the second switching method is indicated for a certain MBS service, the terminal may release a unicast bearer on which a service is received, newly establish a multicast bearer for the MBS service (for example, identifiers corresponding to the MBS service may also be newly set), and receive MBS service data.

In another embodiment, two unicast bearers and two multicast bearers may be established for each MBS service, an MBS service may be received, and the first switching method or the second switching method may be applied. When the switching method is applied, an indicator indicating which data is the last data may be introduced so that data is sequentially transferred to an upper layer device upon switching.

In another embodiment, the first switching method or the second switching method may be applied through QoS flow reconfiguration or remapping (mapping configuration of QoS flow and a bearer) in an SDAP layer device for an MBS bearer supporting each MBS service. When the switching method is applied, an indicator indicating which data is the last data may be introduced so that data is sequentially transferred to an upper layer device upon switching.

For the first switching method or the second switching method, the base station may set a timer value via an RRC message, system information, or an MBS control message, and cause the first switching method or the second switching method to be performed or triggered if the timer expires. The timer may be set for each bearer (e.g., a unicast bearer, a multicast bearer, or each MBS bearer) or for each MBS service or identifier. The timer may be started or restarted when a bearer is established or whenever MBS service data is received. In addition, the timer may be stopped when the bearer is released, when the MBS service is stopped or reception for the MBS service is stopped, or when an indication that the MBS service is stopped is received. If the timer expires, the first switching method or the second switching method may be performed or triggered.

When the MBS service is supported as a multicast service, the multicast service may be supported only in a default partial bandwidth or an initial partial bandwidth. If the MBS service is supported by multicast in the default partial bandwidth or the initial partial bandwidth, an terminal in an RRC idle mode or an RRC inactive mode may easily receive the MBS service.

In another embodiment, if a terminal intends to receive an MBS service in an RRC idle mode or an RRC inactive mode, the terminal may perform synchronization in an initial partial bandwidth, camp on to read system information, set up an RRC connection in the initial partial bandwidth or a partial bandwidth indicated by the system information, and receive MBS data via an MBS bearer in a partial bandwidth configured by a base station via an RRC message.

If a base station indicates or triggers a first switching method or a second switching method, or bearer release or bearer establishment to a terminal with base station configuration, system information, an RRC message, an MBS control message, MAC control information, RLC control information, PDCP control information, or an indicator in a PDCCH, the terminal may perform one or a combination of the following embodiments as an operation of the terminal.

First Embodiment

Upon receiving the indication, the terminal may discard all stored data if there is MBS service data stored in the MBS bearer (e.g., a MAC layer device, an RLC layer device, or a PDCP layer device)(or if there is data which has not yet been transferred to a upper layer device). Alternatively, a variable initialization (e.g., initialization to 0) or reset procedure (e.g., setting to a specific value) may be performed in the RLC layer device or the PDCP layer device.

In another embodiment, the RLC layer device may update a reception window variable (e.g., RX_NEXT, RX_NEXT_Highest, and/or the like) to an RLC serial number of received data+1.

In another embodiment, the PDCP layer device may update a reception window variable (e.g., RX_NEXT, RX_DELIV, RX_REORD, and/or the like) to a PDCP serial number (or a COUNT value) of received data+1, or set an HFN value to 1.

Second Embodiment

Upon receiving the indication, the terminal may process data to transfer it to a upper layer device (for example, it may be transferred to the upper layer device in order of receipt or in ascending order of serial number) if there is MBS service data stored in the MBS bearer (e.g., a MAC layer device, an RLC layer device, or a PDCP layer device)(or if there is data which has not yet been transferred to a upper layer device). Alternatively, a variable initialization (e.g., initialization to 0) or reset procedure (e.g., setting to a specific value) may be performed in the RLC layer device or the PDCP layer device.

In another embodiment, the RLC layer device may update a reception window variable (e.g., RX_NEXT, RX_NEXT_Highest, and/or the like) to an RLC serial number of received data+1.

In another embodiment, the PDCP layer device may update a reception window variable (e.g., RX_NEXT, RX_DELIV, RX_REORD, and/or the like) to a PDCP serial number (or a COUNT value) of received data+1, or set an HFN value to 1.

Third Embodiment

When receiving the indication, the terminal may stop or initialize a reordering timer if a reordering function is configured in the MBS bearer (e.g., a MAC layer device, an RLC layer device, or a PDCP layer device) or if the reordering function is performed. The terminal may process data to transfer it to a upper layer device (for example, it may be transferred to the upper layer device in order of receipt or in ascending order of serial number) if there is MBS service data stored in the MBS bearer (or if there is data which has not yet been transferred to a upper layer device). Alternatively, a variable initialization (e.g., initialization to 0) or reset procedure (e.g., setting to a specific value) may be performed in the RLC layer device or the PDCP layer device.

In another embodiment, the RLC layer device may update a reception window variable (e.g., RX_NEXT, RX_NEXT_Highest, and/or the like) to an RLC serial number of received data+1.

In another method, the PDCP layer device may update a reception window variable (e.g., RX_NEXT, RX_DELIV, RX_REORD, and/or the like) to a PDCP serial number (or a COUNT value) of received data+1, or set an HFN value to 1.

Fourth Embodiment

Upon receiving the indication, a terminal may stop or initialize a reordering timer if a reordering function is configured in the MBS bearer (e.g., a MAC layer device, an RLC layer device, or a PDCP layer device), if the reordering function is performed, or if a header compression procedure (or data compression procedure) is configured. The terminal may perform a header decompression procedure on the MBS service data (if the header decompression procedure is not performed) to transfer it to a upper layer device (for example, it may be transferred to the upper layer device in order of receipt or in ascending order of serial number) if there is MBS service data stored in the MBS bearer (or if there is data which has not yet been transferred to a upper layer device). Then, the MBS bearer may be released. Alternatively, a variable initialization (e.g., initialization to 0) or reset procedure (e.g., setting to a specific value) may be performed in the RLC layer device or the PDCP layer device.

In another embodiment, the RLC layer device may update a reception window variable (e.g., RX_NEXT, RX_NEXT_Highest, and/or the like) to an RLC serial number of received data+1.

In another embodiment, the PDCP layer device may update a reception window variable (e.g., RX_NEXT, RX_DELIV, RX_REORD, and/or the like) to a PDCP serial number (or a COUNT value) of received data+1, or set an HFN value to 1.

The disclosure describes a method of supporting mobility of a terminal receiving an MBS service.

If a base station or a network indicates a handover to a terminal via an RRC message (e.g., an RRCReconfiguration message), or intends to transit a terminal in an RRC connected mode into an RRC inactive mode or RRC idle mode by transmitting an RRC message (e.g., an RRCRelease message) to the terminal, or if an MBS service is supported to a terminal via an MBS bearer, or the terminal receives the MBS service via the MBS bearer, or the MBS bearer is a unicast bearer or multicast bearer, the base station may include an indicator (e.g., a new indicator indicating a terminal operation, a PDCP re-establishment indicator, or a bearer (or PDCP) stop or release procedure indicator) into the RRC message to transmit the RRC message thereby indicating, to the terminal, to perform the first switching method, the second switching method, or a terminal operation for bearer release or bearer configuration. The RRC message may include an indicator indicating whether to reconfigure, release, or maintain an MBS bearer previously configured in the terminal, or whether to indicate the first switching method or the second switching method, reconfiguration information (e.g., a transmission resource or identifier information for the MBS service) for the MBS bearer, or information about an area (or a list of frequencies or cell identifiers) supporting the MBS service, and/or the like.

In another embodiment, if the received RRC message includes an indicator indicating a handover, or includes an indicator to transit a terminal in an RRC connected mode into an RRC inactive mode or an RRC idle mode, or if an MBS service is supported to the terminal via an MBS bearer, or the terminal receives the MBS service via the MBS bearer (if the terminal does not indicate to stop the MBS service), or the MBS bearer is a unicast bearer or multicast bearer, or if the RRC message includes an indicator (e.g., a new indicator indicating a terminal operation, a PDCP re-establishment indicator, a bearer (or PDCP) stop or release procedure indicator, or an indicator indicating a first switching method, a second switching method, or bearer release), or if the terminal moves to an area where the MBS service is not supported in system information, or the terminal moves to an area where the MBS service is supported in the system information, or if an upper layer device (e.g., an RRC layer device) receives indication that a data inactivity timer has expired from a lower layer device (e.g., a MAC layer device), or the upper layer device (e.g., the RRC layer device) receives the indication that the data inactivity timer has expired from the lower layer device (e.g., the MAC layer device) to transit into the RRC idle mode, the base station may indicate to perform the first switching method, the second switching method, or a terminal operation for bearer release or bearer configuration. The RRC message may include an indicator indicating whether to reconfigure, release, or maintain an MBS bearer previously configured in the terminal, or whether to indicate the first switching method or the second switching method, reconfiguration information (e.g., a transmission resource or identifier information for the MBS service) for the MBS bearer, or information about an area (or a list of frequencies or cell identifiers) supporting the MBS service, and/or the like.

Figure 16:
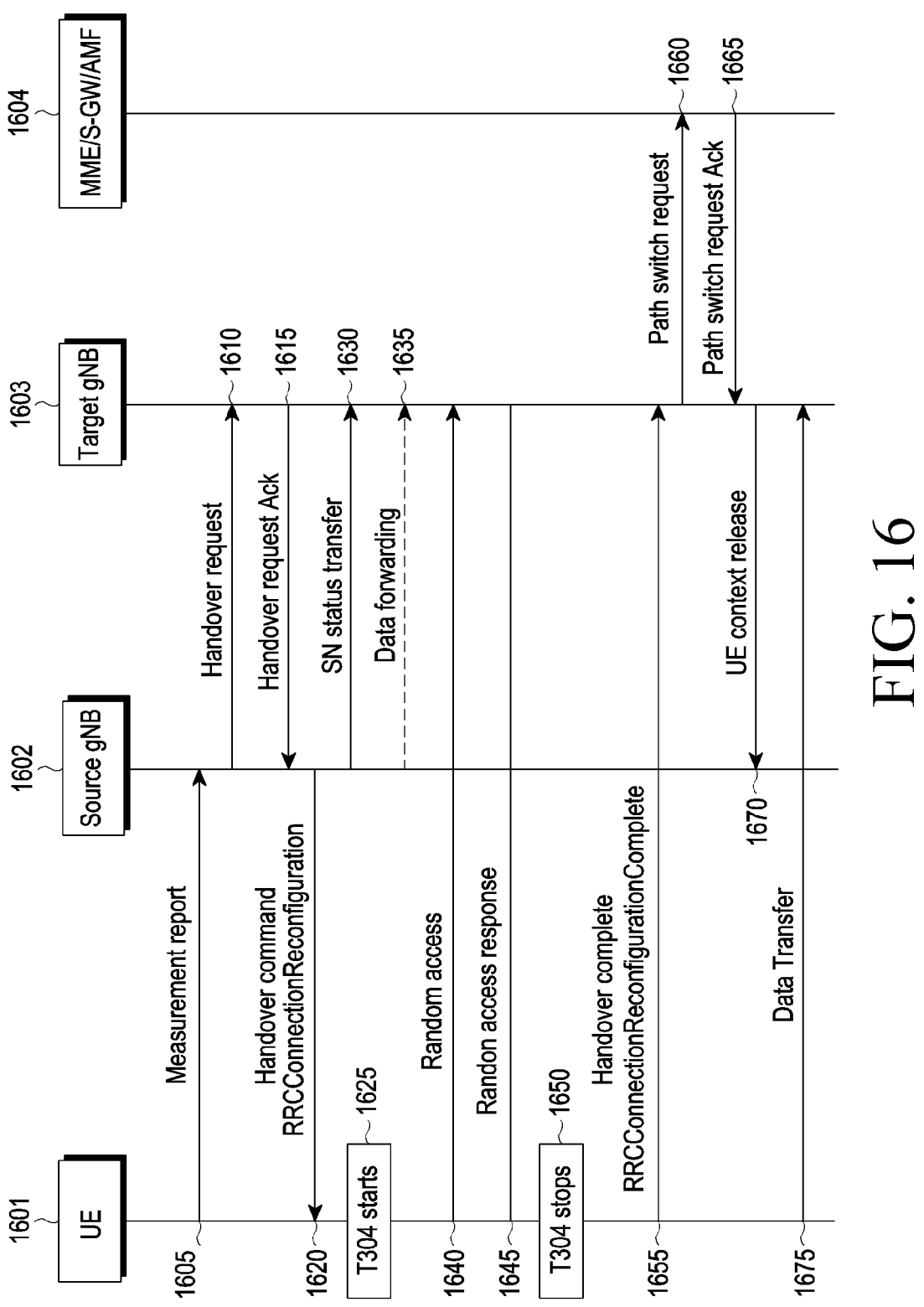
FIG. 16 is a diagram illustrating signaling procedures for performing a handover in a next-generation mobile communication system according to an embodiment of the disclosure.

FIG. 16 is a diagram illustrating signaling procedures for performing a handover in a next-generation mobile communication system according to an embodiment of the disclosure.

Referring to FIG. 16, a terminal 1601 in an RRC connected mode reports cell measurement information (Measurement Report) to a current source base station (eNB) 1602 when a periodic or specific event is satisfied (step 1605). The source base station 1602 determines whether the terminal 1601 will perform a handover to a neighbor cell based on the measurement information. The handover is a technology of changing a source base station providing a service to a terminal in a connected mode to another base station (or another cell of the same base station). If the source base station 1602 determines the handover, the source base station 1602 may transmit a handover request message (Handover (HO) request) to a new base station, i.e., a target base station (Target eNB) 1603, which will provide a service to the terminal 1601 to request the handover (step 1610).

The handover request message may include one or more handover methods supported or preferred by the source base station 1602, and, in another embodiment, the handover request message may include an indicator requesting a handover method preferred by the target base station 1603.

If the target base station 1603 accepts the handover request, the target base station 1603 transmits a handover request accept (HO request Ack) message to the source base station 1602 (step 1615). The handover request message may include at least one of an indicator indicating whether the terminal 1601 receives an MBS service or wants to receive the MBS service (or is interested in the MBS service) or supports the MBS service, identifier information of the MBS service which the MBS service, information (e.g., last data information received by the terminal, serial number information, time information, or transmission resource information) for seamless MBS service support, or MBS service configuration information or transmission resource information supported by the source base station 1602 to the terminal 1601.

The handover request accept message may include a handover method supported (or preferred or indicated) by the target base station 1603 among one or more handover methods included by the source base station 1602 in the handover request message, and the source base station 1602 may indicate, to the terminal 1601, the handover method indicated by the target base station 1603 in the handover request accept message. In another embodiment, the target base station 1603 may include an indicator indicating the handover method supported by the target base station 1603 in the handover request accept message to cause the source base station 1602 and the terminal 1601 to perform the indicated handover method. Further, the handover request accept message may include at least one of an indicator indicating whether the target base station 1603 supports the MBS service to the terminal 1601, identifier information of the supported MBS service, information for seamless MBS service support (e.g., configuration information, reconfiguration information (e.g., transmission resource information or identifier information (a logical channel identifier, an RNTI identifier, or a bearer identifier) used when the target base station 1603 supports the MBS service), time information, or transmission resource information for the MBS service which the terminal 1601 receives), MBS service configuration information supported by the target base station 1603 to the terminal 1601, or transmission resource information.

Upon receiving the handover request accept message, the source base station 1602 transmits a handover command message (a HO command message) to the terminal 1601 (step 1620). The handover command message may be transmitted from the source base station 1602 to the terminal 1601 using an RRC Connection Reconfiguration message.

The source base station 1602 may configure which handover method the source base station 1602 indicates to the terminal 1601 in consideration of terminal capability using an indicator defined for each handover method via the handover command message (e.g., the RRCReconfiguration message). The terminal 1601 may perform a handover procedure to the target base station 1603 according to the handover method indicated in the handover command message. The handover command message may include at least one of the indicator indicating whether the target base station 1603 supports the MBS service to the terminal 1601, the identifier information of the MBS service supported by the target base station 1603, the information for seamless MBS service support (e.g., the configuration information and the reconfiguration information (e.g., the transmission resource information used when the target base station 1603 supports the MBS service), the identifier information (the logical channel identifier, the RNTI identifier, or the bearer identifier) for the MBS service which the terminal 1601 receives), the time information, or the transmission resource information), the MBS service configuration information supported by the target base station 1603 to the terminal 1601, or the transmission resource information.

In order to support the seamless MBS service, the terminal 1601 may start receiving the MBS service or may continue to receive the MBS service while performing the handover procedure according to the MBS configuration information indicated or configured in the handover command message or an indicator supporting a multicast MBS service, or even before completing the handover procedure. In another embodiment, the terminal 1601 may start receiving the MBS service or may receive the MBS service when the terminal 1601 completes the handover procedure according to the MBS configuration information indicated or configured in the handover command message, the indicator supporting the multicast MBS service, or an indicator supporting a unicast MBS service, or after the terminal 1601 completes the handover procedure.

Upon receiving the handover command message, the terminal 1601 stops data transmission and reception with the source base station 1902 and starts a timer T304. The T304 causes the terminal to return to its original setting and to switch to an RRC Idle state if the terminal 1901 does not successfully perform the handover to the target base station 1603 for predetermined time. The source base station 1602 transfers sequence number (SN) status for uplink/downlink data to the target base station 1603 (step 1630), and if there is downlink data, the source base station 1602 transfers the downlink data to the target base station 1603 (step 1635). The terminal 1601 attempts a random access to a target cell indicated by the source base station 1602 (step 1640). The random access is for notifying the target cell that the terminal 1601 moves through the handover and simultaneously obtaining uplink synchronization. For the random access, the terminal 1601 transmits, to the target cell, a preamble which corresponds to a preamble ID provided from the source base station 1602 or a randomly selected preamble ID. After a specific number of subframes have elapsed after the transmission of the preamble, the terminal 1601 monitors whether a random access response (RAR) message is transmitted from the target cell. A time interval for monitoring is referred to as a Random Access Response Window (RAR window). During the specific time, if a random access response (RAR) is received (step 1645), the terminal 1601 transmits a handover complete (HO complete) message to the target base station 1603 via an RRC Reconfiguration Complete message (step 1655). As described above, upon successfully receiving the random access response from the target base station 1603, the terminal 1601 terminates the T304 timer (step 1650). The target base station 1603 requests path modification from an external network entity 1604 (an MME, a S-GW, or an Access and Management Function (AMF)) in order to modify a path of bearers configured to the source base station 1602 (step 1660), and receives a response to the path modification (step 1665). The target base station 1603 notifies the source base station 1602 to delete a UE context of the terminal 1601 (step 1670). So, the terminal 1601 attempts to receive data from a start time point of the RAR window for the target base station 1603, and starts data transmission and reception with the target base station 1603 while transmitting the RRC Reconfiguration Complete message after receiving the RAR.

When a handover procedure for a terminal receiving an MBS service is supported via the MBS bearer, a bearer structure described in FIGS. 4A to 4D of the present invention may be configured or applied to support a handover with no data loss or little data loss.

For example, a fourth bearer structure may be effectively used to support an MBS service with no data loss or little data loss even in a handover procedure. For example, when the terminal 1601 performs a handover procedure to the target base station 1603 according to indication (e.g., a handover command message (RRCReconfiguration message)) of the source base station 1602 while receiving an MBS service (a multicast service or a unicast service) from the source base station 1602 via an MBS bearer for which the fourth bearer structure is configured, the terminal 1601 may maintain the fourth bearer structure for the MBS bearer, or the MBS bearer may be reconfigured with the fourth bearer structure, or may be newly configured. For example, in order to continuously receive the MBS service based on the handover command message while receiving the MBS service from the source base station 1602 via the MBS bearer configured with one of the fourth bearer structures in the source base station 1602, the terminal 1601 may reconfigure the MBS bearer with the one of the fourth bearer structures or configure new MBS bearer. When reconfiguring or newly configuring the MBS bearer due to the handover procedure, the terminal 1601 may perform the following procedures.

1> The terminal 1601 receives the handover command message (the RRCReconfiguration message)(e.g., an RRC message including a reconfigurationWithsync indicator) from the source base station 1602, and if the handover command message includes configuration information for configuring or reconfiguring an MBS bearer, or includes a PDCP layer device reestablishment indicator (reestablishPDCP) for the MBS bearer, or includes a PDCP layer device recovery indicator (recoverPDCP) for the MBS bearer, or if it indicates to reconfigure the PDCP layer device for the MBS bearer, or if the handover command message includes indication to re-establish or release a certain RLC layer device for the MBS bearer, the terminal 1601 may perform the following procedures for the MBS bearer in order to continuously receive the MBS service without error or data loss or to prevent a problem in a reception window operation.

2> In a PDCP layer device connected to an RLC layer device for a multicast service or an RLC layer device for a unicast service in the fourth bearer structure, the terminal may not perform an initialization procedure on window variables (e.g., RX_NEXT (a variable indicating a COUNT value of data (a PDCP SDU) expected to be received next), RX_DELIV (a variable indicating a COUNT value of first data (a PDCP SDU) not transferred to a upper layer device, or data still waiting to be received), or RX_REORD (a variable indicating a next COUNT value (or a COUNT value incremented by 1) of a COUNT value of data (PDCP data PDU) triggering a PDCP reordering timer, or may use the PDCP reordering timer as it is without initializing the PDCP reordering timer. This is because information (e.g., a PDCP status report) about data which is retransmitted or is not received is transmitted to the base station to recover data loss, thereby minimizing data loss because a COUNT value (or a PDCP serial number) of the data by the window variables is maintained if the window variables are not initialized or the PDCP reordering timer is not initialized (if it is running, it is kept running) and then is used as it is. In another embodiment, to facilitate synchronization for window variables with the base station and to reduce data transmission delay, the terminal may perform a PDCP re-establishment procedure or a PDCP data recovery procedure in the PDCP layer device, initialize the window variables, or stop (or initializes) the PDCP reordering timer, and perform data processing on stored (or received) data and transfer it to the upper layer device. The window variables may be initialized to a value of 0, or in order for the base station to easily manage the window variables (for example, in order for the terminal to synchronize the window variables based on received data even though the base station does not initialize the window variables), the window variables may be initialized based on received data. For example, the RX_NEXT variable may be initialized to a combination of a PDCP serial number of data (a PDCP data PDU or a PDCP SDU) firstly received after the indication+1 or an HFN value initialized to 0 (or a previously used HFN value, an HFN value determined by terminal implementation, or an HFN value included in the indication). The RX_DELIV variable may be initialized to the initialized RX_NEXT value or the combination of the PDCP serial number of the data (the PDCP data PDU or the PDCP SDU) firstly received after the indication or the HFN value initialized to 0 (or the previously used HFN value, the HFN value determined by the terminal implementation, or the HFN value included in the indication). The RX_REORD value may be initialized to the initialized RX_NEXT value or the combination of the PDCP serial number of the data (the PDCP data PDU or the PDCP SDU) firstly received after the indication+1 or the HFN value initialized to 0 (or the previously used HFN value, the HFN value determined by the terminal implementation, or the HFN value included in the indication). In another embodiment, initialization for the RX_REORD variable may be omitted so that the reordering timer is driven. In another embodiment, the RX_DE-LIV may be initialized to a value obtained by subtracting a reception window size (or half of the reception window size) from the RX_NEXT value and adding 1 thereto. In another embodiment, to facilitate base station implementation, the window variables may initialized to each initialization value (reference values or initial values) for the variables included in the indication information (an RRC message, system information, MAC control information, or PDCP control data) indicated by the base station.

2> Upon receiving the indication, the terminal may report to the base station whether data has been successfully received, and the base station may configure a PDCP status report to transmit the PDCP status report to an RLC layer device for a unicast service (or an RLC layer device configured with a logical channel identifier which corresponds to the unicast service) in order to perform retransmission for reducing loss. Upon receiving the PDCP status report, the base station may retransmit data via the RLC layer device for the unicast service based on the PDCP status report. If the terminal transmits the PDCP status report via the RLC layer device for the unicast service, the base station may easily distinguish which terminal the PDCP status report is for. In addition, if retransmission is performed via the RLC layer device for the unicast service, it is possible to prevent waste of a transmission resource by performing the retransmission via an individual transmission resource (in another embodiment, the terminal may transmit a PDCP status report in an RLC layer device for multicast). In another embodiment, upon receiving the indication, the terminal may report to the base station whether data has been successfully received, and the base station may configure a PDCP status report to transmit the PDCP status report to an RLC layer device for a multicast service (or an RLC layer device configured with a logical channel identifier which corresponds to the multicast service) in order to perform retransmission for reducing loss. Upon receiving the PDCP status report, the base station may retransmit data via an RLC layer device for the multicast service or the unicast service based on the PDCP status report. If the terminal transmits the PDCP status report via the RLC layer device for the multicast service, the base station may easily detect PDCP status reports of all terminals.

2> Upon receiving the indication, the terminal may still receive data in the RLC layer device for the unicast service or the RLC layer device for the multicast service in the fourth bearer structure. This is because the terminal may receive data transmitted late. In another embodiment, the RLC layer device may be released or re-established (initialization of window variables or discard of stored divided data), thereby facilitating window variable synchronization of the RLC layer device in the base station and quickly discarding unnecessary data.

2> Upon receiving the indication, the terminal may not perform an initialization procedure on the window variables (for example, in a case of UM mode, RX_Next_Reassembly (a variable indicating the smallest (or the fastest) RLC serial number value which is still under consideration for reassembly), RX_Timer_Trigger (a variable indicating an RLC serial number which is 1 greater than an RLC serial number which triggers the RLC reassembly timer, or which is after the RLC serial number which triggers the RLC reassembly timer), or RX_Next_Highest (a variable indicating an RLC serial number which is 1 greater than an RLC serial number which is the highest among received data (UMD PDUs), or which is after the RLC serial number which is the highest among the received data), or for example, in a case of AM mode, RX_Next (a variable indicating an RLC serial number which is 1 greater than an RLC serial number of the last completely received data (an RLC SDU) in sequence, or which is after the RLC serial number of the last completely received data, RX_Next_Status_Trigger (a variable indicating an RLC serial number which is 1 greater than an RLC serial number which triggers the RLC reassembly timer, or which is after the RLC serial number which triggers the RLC reassembly timer), or RX_Highest_Status (a variable indicating a highest RLC serial number which may be indicated with ACK_SN (a variable indicating an RLC serial number of the next data (an RLC SDU) which has not been reported as lost in the RLC status report or has not yet been received)) or may use an RLC reassembly timer as it is without initializing the RLC reassembly timer in the RLC layer device for the multicast service or the RLC layer device for the unicast service (or the RLC layer device configured with the logical channel identifier which corresponds to the unicast service). This is because it is easy to implement the terminal or the base station (for example, no additional procedure is required) because an RLC serial number of data by the window variables is maintained if the window variables are not initialized or the RLC reassembly timer is not initialized (if it is running, it is kept running) and then is used as it is. In another embodiment, to facilitate synchronization for window variables with the base station and to reduce data transmission delay, the terminal may initialize the RLC re-establishment (or establishment) procedure or the window variables, or stop (or initialize) the RLC reassembly timer in the RLC layer device. The window variables may be initialized to a value of 0, or in order for the base station to easily manage the window variables (for example, in order for the terminal to synchronize the window variables based on received data even though the base station does not initialize the window variables), the window variables may be initialized based on received data. For example, in the case of UM mode, because an RLC serial number is included only for divided data, complete data without an RLC serial number may be directly processed and transferred to the upper layer device, and a window variable may be updated based on the RLC serial number of the received divided data. For example, RX_Next_Reassembly may be initialized to an RLC serial number of data (an RLC SDU, a UMD PDU, or an RLC SDU segment) which is received first after the indication and includes the RLC serial number. The RX_Next_Highest may be initialized to the RLC serial number of the data (the RLC SDU, the UMD PDU, or the RLC SDU segment) which is received first after the indication and includes the RLC serial number. The RX_Timer_Trigger may be initialized to the RLC serial number of the data (the RLC SDU, the UMD PDU, or the RLC SDU segment) which is received first after the indication and includes the RLC serial number (the RX_Timer_Trigger variable does not have a significant effect on window operation (it causes unnecessary processing), so variable initialization may be omitted). For example, in the case of AM mode, an RLC serial number is included for all data (RLC data PDU or an RLC SDU), so the RX_Next, the RX_Next_Status_Trigger, or the RX_Highest_Status may be initialized to the RLC serial number of the data (the RLC SDU, the UMD PDU, or the RLC SDU segment) which is received first after the indication and includes the RLC serial number (the RX_Next_Status_Trigger variable or the RX_Highest_Status variable does not have a significant effect on window operation (it causes unnecessary processing), so variable initialization may be omitted). In another embodiment, to facilitate base station implementation, the window variables may initialized to each initialization value (reference values or initial values) for the window variables included in the indication information (an RRC message, system information, MAC control information, or PDCP control data) indicated by the base station. In another embodiment, an RLC re-establishment procedure may be performed to minimize complexity of an ARQ operation for an RLC layer device configured with an RLC AM mode.

2> Then, the terminal may start receiving data in the RLC layer device for the multicast service or the RLC layer device for the unicast service (or the RLC layer device configured with the logical channel identifier which corresponds to the unicast service).

If the MBS bearer via which the terminal receives the MBS service has the fourth bearer structure described in FIG. 7D, a COUNT value used by a PDCP layer device configured in an MBS bearer of the terminal and a COUNT value used by a PDCP layer device corresponding to the MBS bearer of the base station may not be synchronized or may not match. The COUNT value is composed of a Hyper Frame Number (HFN) and a PDCP serial number, and a case that the COUNT values are synchronized or match may mean a case that an HFN value used by the terminal and an HFN value used by the base station are the same, or a case that the HFN value used by the terminal and the HFN value used by the base station are the same and a difference between the highest PDCP serial number received by the terminal and the highest PDCP serial number transmitted by the base station is less than or equal to a constant size of a window.

The reason why the COUNT value used in the PDCP layer device configured in the MBS bearer of the terminal and the PDCP serial number (or the RLC serial number) or the COUNT value used by the base station in the PDCP layer device which corresponds to the MBS bearer are not synchronized or do not match is that a PDCP serial number (or an RLC serial number), a window variable value, or COUNT value has not initialized at the same time point, or a value thereof has not increased from a value of 0 at the same time point because the terminal may start receiving the MBS service during the MBS service already being served by the base station.

Therefore, when the base station configures the MBS bearer for the terminal, when the base station switches or changes an MBS service type for the MBS bearer configured for the terminal, or when the base station indicates a handover to the terminal receiving the MBS service, there is a need for setting, in an RRC message (or PDCP control data, RLC control data, or MAC control information), a PDCP serial number value (or an RLC serial number value), a COUNT value, or a window variable value to be used as a reference value or an initialization value in the PDCP layer device (or the RLC layer device) of the MBS bearer. For example, when the terminal in the RRC idle mode, the RRC inactive mode, or the RRC connected mode configures the MBS bearer, the base station may set the PDCP serial number value (or the RLC serial number value), the COUNT value, or the window variable value to be used as the reference value or the initialization value in the PDCP layer device (or the RLC layer device) of the MBS bearer by including it into the RRC message (e.g., an RRCSetup message, an RRCResume message, an RRCRelease message, or an RRCReconfiguration message, and/or the like). For example, when the MBS service type is switched or changed for the MBS bearer having the fourth bearer structure described in FIG. 7D, or when a handover is indicated to the terminal receiving the MBS service, methods for initializing window variables in the PDCP layer device or the RLC layer device of the MBS bearer may be applied. In another embodiment, the terminal may initialize or update window variables based on a PDCP serial number (or an RLC serial number) of received data.

Further, to synchronize PDCP serial number values (or RLC serial number values), COUNT values, or window variable values used in PDCP layer devices (or RLC layer devices) of different MBS bearers which different base stations (e.g., a source base station or a target base station in a handover procedure) configure for the same MBS service, a procedure for setting, sharing, or transferring a PDCP serial number value (or an RLC serial number value), a COUNT value, or a window variable value for each MBS service by including the values in a inter-base station message may be introduced. For example, a message requesting the information or a response message including the corresponding information may be introduced.

Figure 17:
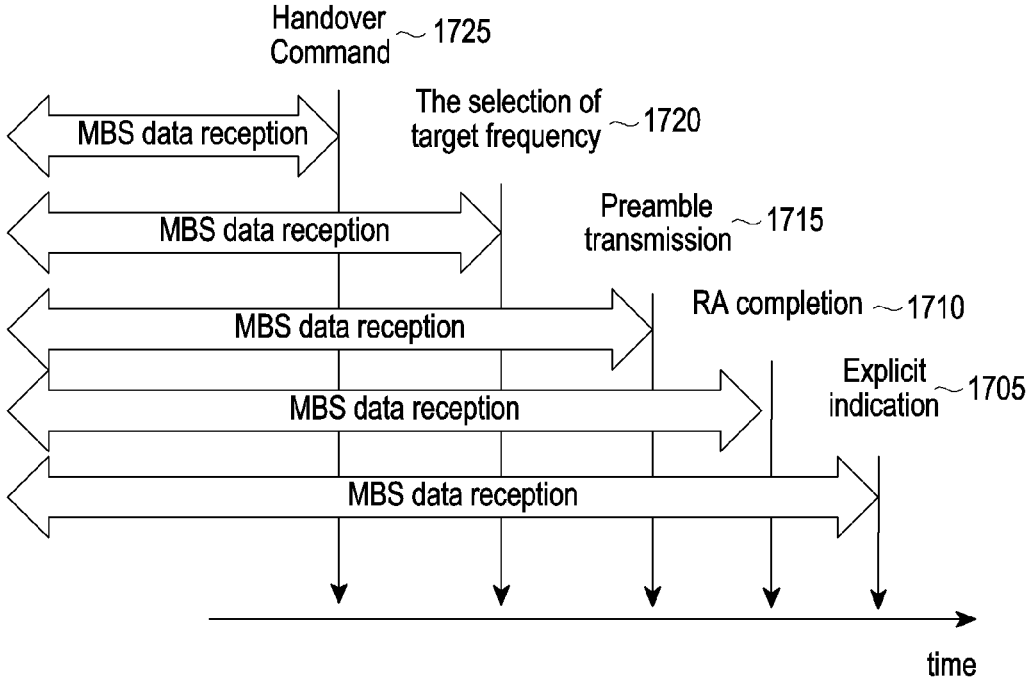
FIG. 17 is a diagram illustrating a time point and method of releasing an MBS bearer or stopping an MBS service when a terminal for which an MBS bearer is configured performs a handover procedure according to an embodiment of the disclosure.

FIG. 17 is a diagram illustrating a time point and method for releasing an MBS bearer or stopping an MBS service when a terminal for which an MBS bearer is configured performs a handover procedure according to an embodiment of the disclosure.

A terminal, which receives, from a source base station, configuration information for an MBS bearer (a multicast bearer or a unicast bearer) to receive an MBS service via the MBS bearer, may affect a quality of the MBS service depending on how the MBS bearer is processed when receiving a handover command message (e.g., an RRCReconfiguration message or an RRC message including a ReconfigurationWithSync indicator). So, embodiments in which the terminal processes the MBS bearer in a handover procedure will be described as follows. Different embodiments may be applied according to the indicator configured in the handover message, or different embodiments may be applied depending on whether the MBS bearer configured in the terminal is the multicast bearer or the unicast bearer.

First Embodiment

A terminal for which an MBS bearer is configured (which receives an MBS service) may receive a handover command message, and continue to receive the MBS service via the MBS bearer even when performing a handover procedure. For example, regardless of the handover procedure or regardless of an RRC connected state (e.g., an RRC INACTIVE mode, an RRC Connected mode, or an RRC IDLE mode) of the terminal, the MBS service may be continuously received via the MBS bearer in an existing frequency, cell, or partial bandwidth (or at a frequency, cell, or partial bandwidth newly configured in the RRC message). So, even if the handover procedure is performed, the MBS service may be continuously received without interruption.

Second Embodiment

A second embodiment corresponds to step 1705 in FIG. 17. A terminal, for which an MBS bearer is configured (which receives an MBS service), may receive a handover command message and continue to receive the MBS service via the MBS bearer even when performing a handover procedure. For example, regardless of the handover procedure or regardless of an RRC connected state (e.g., an RRC INACTIVE mode, an RRC Connected mode, or an RRC IDLE mode) of the terminal, the MBS service may be continuously received via the MBS bearer in an existing frequency, cell, or partial bandwidth (or at a frequency, cell, or partial bandwidth newly configured in the RRC message). If an MBS bearer is configured to receive the MBS service from the target base station after the handover procedure has been completed to a target base station, and an indication to release the MBS service received from the source base station (or an indication to release a connection with the source base station) is received from the target base station, the MBS service received from the source base station may be released (for example, a Dual Active Protocol Stack (DAPS) handover method may be applied to the MBS bearer). The indication from the target base station may be transmitted to the terminal by including an indicator in MAC control information, an RRC message, or PDCP control data. For example, a DAPS handover procedure may be indicated in the handover command message for the MBS bearer receiving the MBS service from the source base station. Then, a PDCP layer device of the MBS bearer may be reconfigured as a PDCP layer device of a DAPS bearer, an RLC layer device for the source base station and an RLC layer device for the target base station may be connected and configured to one PDCP layer device, MBS service data may be received from the source base station during the handover procedure (e.g., during a cell selection procedure or random access procedure), and the MBS service data may also be received from the target base station after the random access procedure has been completed to the target base station. When an indication to release the MBS service received from the source base station (or an indication to release a connection with the source base station) is received from the target base station, the MBS service received from the source base station may be released (for example, the DAPS may be released in the PDCP layer device in which the DAPS is configured, or the RLC layer device configured in the source base station may be re-established or released). Reconfiguring the DAPS in the PDCP layer device may indicate that a security key, an encryption function (or algorithm), an integrity protection function (or algorithm), or a header compression protocol for the target base station is additionally configured, and releasing the DAPS from the PDCP layer device may indicate that a security key, an encryption function (or algorithm), an integrity protection function (or algorithm), or a header compression protocol for the source base station is released. So, even if the handover procedure is performed, the MBS service may be continuously received without interruption.

Third Embodiment

A third embodiment corresponds to step 1710 in FIG. 17. A terminal, for which an MBS bearer is configured (which receives an MBS service), may receive a handover command message and continue to receive the MBS service via the MBS bearer which is configured for the source base station even when performing a handover procedure (e.g., a cell selection procedure or a random access procedure). However, if the random access procedure is completed with the target base station, reception of the MBS service from a source base station may be released and reception of the MBS service from a target base station may be started. For example, even when receiving the handover command message, the terminal may maintain a connection from the source base station, or maintain the MBS bearer configured for the source base station and receive the MBS service. However, if the random access procedure is completed with the target base station, reception of the MBS service from the target base station may be started by reconfiguring the MBS bearer configured for the source base station as an MBS bearer for the target base station according to bearer configuration information configured in the handover command message (for example, a PDCP re-establishment procedure, an RLC re-establishment procedure, or a MAC initialization procedure), or by newly configuring an MBS bearer for the target base station (or by releasing the MBS bearer for the source base station). So, interruption of the MBS service may be reduced even when a handover procedure is performed.

Fourth Embodiment

A fourth embodiment corresponds to step 1715 in FIG. 17. A terminal, for which an MBS bearer is configured (which receives an MBS service), may receive a handover command message and continue to receive the MBS service via the MBS bearer which is configured for the source base station even when performing a handover procedure (e.g., a cell selection procedure). However, if the cell selection procedure is performed or a random access procedure is started and a preamble is transmitted, reception of the MBS service from the source base station may be released, and after the random access procedure to the target base station has been completed, reception of the MBS service from the target base station may be started. For example, even when receiving the handover command message, the terminal may maintain a connection from the source base station, or maintain the MBS bearer configured for the source base station and receive the MBS service. However, if the cell selection procedure is performed or the random access procedure is started and the preamble is transmitted, reception of the MBS service from the target base station may be started by reconfiguring the MBS bearer configured for the source base station as an MBS bearer for the target base station according to bearer configuration information configured in the handover command message (for example, a PDCP re-establishment procedure, an RLC re-establishment procedure, or a MAC initialization procedure), or by newly configuring an MBS bearer for the target base station (or releasing the MBS bearer for the source base station) and completing the random access procedure to the target base station. So, interruption of the MBS service may be reduced even when a handover procedure is performed.

Fifth Embodiment

A fifth embodiment corresponds to step 1720 in FIG. 17. A terminal, for which an MBS bearer is configured (which receives an MBS service), may receive a handover command message and continue to receive the MBS service via the MBS bearer which is configured for the source base station even when performing a handover procedure (e.g., a cell selection procedure). However, if the cell selection procedure is performed or a suitable cell is selected (or found), reception of the MBS service from the source base station may be released, and after the random access procedure to the target base station has been completed, reception of the MBS service from the target base station may be started. For example, even when receiving the handover command message, the terminal may maintain a connection from the source base station, or maintain the MBS bearer configured for the source base station and receive the MBS service. However, if the cell selection procedure is performed or the suitable cell is selected (or found), reception of the MBS service from the target base station may be started by reconfiguring the MBS bearer configured for the source base station as an MBS bearer for the target base station according to bearer configuration information configured in the handover command message (for example, a PDCP re-establishment procedure, an RLC re-establishment procedure, or a MAC initialization procedure), or by newly configuring an MBS bearer for the target base station (or releasing the MBS bearer for the source base station) and completing the random access procedure to the target base station. So, interruption of the MBS service may be reduced even when a handover procedure is performed.

Sixth Embodiment

A sixth embodiment corresponds to step 1725 in FIG. 17. Upon receiving a handover command message, a terminal, for which an MBS bearer is configured (which receives an MBS service), may start to receive the MBS service from a target base station by reconfiguring an MBS bearer configured for a source base station as an MBS bearer for the target base station according to bearer configuration information configured in the handover command message (for example, a PDCP re-establishment procedure, an RLC re-establishment procedure, or a MAC initialization procedure), or by newly configuring an MBS bearer for the target base station (or releasing the MBS bearer for the source base station) and completing a random access procedure to the target base station. Implementation of the terminal may be simplified by processing the same as DRBs via which a normal data service is transmitted or received.

Hereinafter, a procedure, in which a terminal which configures an MBS bearer and receives an MBS service via the MBS bearer configures and transmits a PDCP status report to perform retransmission for MBS data which has not been received, or to identify reliability of a wireless connection or a quality of the MBS service based on a degree of data loss, will be described.

Hereinafter, a method, in which an LTE or NR PDCP layer device connected to an MBS bearer (a multicast bearer or a unicast bearer) or an AM DRB (an RLC layer device operating in an AM mode), or an LTE or NR PDCP layer device connected to an MBS bearer (a multicast bearer or a unicast bearer) or an UM DRB (an RLC layer device operating in a UM mode) generates and configures a condition for triggering the PDCP status report and the triggered PDCP status report, will be described.

A PDCP layer device for each bearer or MBS bearer may trigger, generate, and configure a PDCP status report, transfer it to a lower layer device, and perform transmission if one of the following conditions is satisfied. Operations described below may be applied to a PDCP layer device of a terminal or a base station.

1> If it is configured for a upper layer device (an RRC layer device) to trigger or transmit a PDCP status report for a PDCP layer device connected to an RLC layer device operating in an AM mode or an RLC layer device operating in a UM mode (or if whether to trigger the PDCP status report is configured by an indicator (e.g., status Report Required) in an RRC message), 2> if a terminal receives an RRC message (e.g., a handover command message) from a base station, and the RRC message includes an indicator (reestablishPDCP) indicating a PDCP re-establishment procedure to the PDCP layer device, or a upper layer device (e.g., an RRC layer device) of the terminal indicates PDCP re-establishment procedure to the PDCP layer device, and 3> the PDCP layer device may trigger and configure the PDCP status report and perform transmission to the base station (a target base station or a source base station).

1> If it is configured for a upper layer device (an RRC layer device) to trigger or transmit a PDCP status report for a PDCP layer device connected to an RLC layer device operating in an AM mode or an RLC layer device operating in a UM mode (or if whether to trigger the PDCP status report is configured by an indicator (e.g., status Report Required) via an RRC message), 2> if a terminal receives an RRC message (e.g., a handover command message) from a base station, and the RRC message includes an indicator (recoverPDCP) indicating PDCP data recovery to the PDCP layer device, or a upper layer device (e.g., an RRC layer device) of the terminal indicates PDCP data recovery to the PDCP layer device, and 3> the PDCP layer device may trigger and configure the PDCP status report and perform transmission to the base station (a target base station or a source base station).

1> If it is configured for a upper layer device (an RRC layer device) to trigger or transmit a PDCP status report for a PDCP layer device connected to an RLC layer device operating in an AM mode or an RLC layer device operating in a UM mode (or if whether to trigger the PDCP status report is configured by an indicator (e.g., status Report Required) via an RRC message), or if reconfiguration for the MBS bearer is indicated in an RRC message, MAC control information, RLC control data, or PDCP control data received from the base station, or if MBS service type switching (PTP to PTM or PTM to PTP) is indicated for the MBS bearer, and 2> the PDCP layer device may trigger and configure the PDCP status report and perform transmission to the base station (a target base station or a source base station).

1> If it is configured for a upper layer device (an RRC layer device) to trigger or transmit a PDCP status report for a PDCP layer device connected to an RLC layer device operating in an AM mode or an RLC layer device operating in a UM mode (or if whether to trigger the PDCP status report is configured by an indicator (e.g., status Report Required) via an RRC message), or if a timer value configured from a base station expires (it is a timer for periodically transmitting the PDCP status report, and may be restarted after the PDCP status report is transmitted), or if an indicator triggering (or requesting) the PDCP status report is included and received in MAC control information, PDCP control data, RLC control data, or a PDCP header, and 2> the PDCP layer device may trigger and configure the PDCP status report and perform transmission to the base station (a target base station or a source base station).

1> If it is configured for a upper layer device (an RRC layer device) to trigger or transmit a PDCP status report for a PDCP layer device connected to an RLC layer device operating in an AM mode or an RLC layer device operating in a UM mode (or if whether to trigger the PDCP status report is configured by an indicator (e.g., status Report Required) via an RRC message), or if an indication that a random access procedure to a target base station has been successfully completed is received in a handover procedure, or if a preamble is transmitted (or is about to be transmitted) in a random access procedure, or if a target cell for the target base station is selected as a suitable cell, or if an indication to release an MBS bearer (for a source base station) is received from a base station (e.g., the target base station), and 2> the PDCP layer device may trigger and configure the PDCP status report and perform transmission to the base station (a target base station or a source base station).

1> If it is configured for a upper layer device (an RRC layer device) to trigger or transmit a PDCP status report for a PDCP layer device connected to an RLC layer device operating in an AM mode or an RLC layer device operating in a UM mode (or if whether to trigger the PDCP status report is configured by an indicator (e.g., status Report Required) via an RRC message), or if an indication to trigger the PDCP status report is received from the upper layer device, or if an indication to release an MBS bearer is received, and 2> the PDCP layer device may trigger and configure the PDCP status report and perform transmission to the base station (a target base station or a source base station).

If the PDCP status report is triggered in the LTE or NR PDCP layer device connected to the AM DRB (the RLC layer device operating in the AM mode) or the LTE or NR PDCP layer device connected to the UM DRB (the RLC layer device operating in the UM mode) according to the triggering condition for the PDCP status report, the following embodiments of configuring the PDCP status report may be applied. Alternatively, the PDCP status report may be configured differently according to a type of a bearer for which the PDCP status report is triggered.

If the PDCP status report is triggered at the NR PDCP layer device connected to the AM DRB or the UM DRB, the PDCP status report may be configured as follows.

A First Missing COUNT (FMC) value of the PDCP status report may be set to a value (a COUNT value of the first data not transferred to a upper layer device) of an RX_DELIV variable.

If the RX_DELIV value (the COUNT value of the first data not transferred to the upper layer device) is smaller than an RX_NEXT value (a COUNT value of data expected to be received next), a length of a bitmap field may be set to a length which is a multiple of 8 including from a COUNT value not including a first missing PDCP SDU to a COUNT value of the last out-of-order data, or the length of the bitmap field may be set to a length from the COUNT value not including the first missing PDCP SDU to a COUNT value of a PDCP SDU which makes a size of PDCP control data (a PDCP status report) 9000 bytes, and the length may be set according to a case where it is first satisfied among the above two cases.

If PDCP SDUs corresponding to the bitmap field are not successfully received or header decompression fails, the bitmap field corresponding to the PDCP SDU may be set to 0.

If PDCP SDUs corresponding to the bitmap field are successfully received, the bitmap field corresponding to the PDCP SDUs may be set to 1.

When the configured PDCP status report is transmitted to a lower layer device, the configured PDCP status report may be transmitted to the lower layer device as a first PDCP PDU of a transmitting PDCP layer device. That is, the highest priority is given to the PDCP status report, and if the PDCP status report is generated, the PDCP status report is transferred to the lower layer device first so that it may make transmission faster.

If the PDCP status report is triggered at the PDCP layer device connected to the MBS bearer, the PDCP status report may be configured as follows.

A First Missing COUNT (FMC) value of the PDCP status report is set to a value of an RX_DELIV variable (a COUNT value of the first data not transferred to a upper layer device). In another embodiment, if a base station sets a COUNT value (or an HFN value) or values of window variables, which are a criterion for the PDCP status report, in an RRC message, PDCP control data, MAC control information, or system information, the FMC value may be set based on the set value and the RX_DELIV value. For example, the FMC value may be set to the set COUNT value and the PDCP status report may be configured, or the HFN value of the COUNT value (or the HFN value) may be set to a upper HFN value of the FMC, and a lower PDCP serial number value of the FMC may be set to a lower PDCP serial number value of the RX_DELIV value. In another embodiment, if the base station has not (or does not) set the COUNT value (or the HFN value) or the values of the window variables, which are the criterion for the PDCP status report, in the RRC message, the PDCP control data, or the MAC control information, or, for example, if a COUNT value (or window variable values or an HFN value) being used in the base station and a COUNT value being used in the terminal are not synchronized or are different (by more than a certain value), the base station may interpret lost data based on a PDCP serial number when interpreting the PDCP status report configured based on the FMC set by the terminal to the value of the RX_DELIV variable.

If the RX_DELIV value (the COUNT value of the first data not transferred to the upper layer device) is smaller than an RX_NEXT value (a COUNT value of data expected to be received next), a length of a bitmap field may be set to a length which is a multiple of 8 including from a COUNT value not including a first missing PDCP SDU to a COUNT value of the last out-of-order data, or the length of the bitmap field may be set to a length from the COUNT value not including the first missing PDCP SDU to a COUNT value of a PDCP SDU which makes a size of PDCP control data (a PDCP status report) 9000 bytes, and the length may be set according to a case where it is first satisfied among the above two cases.

If PDCP SDUs corresponding to the bitmap field are not successfully received or header decompression fails, the bitmap field corresponding to the PDCP SDU may be set to 0.

If PDCP SDUs corresponding to the bitmap field are successfully received, the bitmap field corresponding to the PDCP SDUs may be set to 1.

When the configured PDCP status report is transmitted to a lower layer device, the configured PDCP status report may be transmitted to the lower layer device as a first PDCP PDU of a transmitting PDCP layer device. That is, the highest priority is given to the PDCP status report, and if the PDCP status report is generated, the PDCP status report is transferred to the lower layer device first so that it may make transmission faster.

If the PDCP status report is triggered at the PDCP layer device connected to the MBS bearer, a PDCP status report for an MBS bearer (or an MBS service) based on a PDCP serial number may be newly introduced and configured as follows to prevent a asynchronous problem which may occur when a COUNT value (or window variable values or an HFN value) used in a base station and a COUNT value used in a terminal are not synchronized or are different by more than a certain value.

A First Missing COUNT (FMC) value of the PDCP status report is set to a serial number of the first missing PDCP SDU, a PDCP serial number of the first data not transferred to a upper layer device, a value obtained by incrementing 1 to a PDCP serial number of data finally transferred to the upper layer device, lower values having a PDCP serial number value of RX_DELIV, or a lower PDCP serial number value of RX_DELIV.

If the RX_DELIV value (the COUNT value of the first data not transferred to the upper layer device) (or the lower PDCP serial number value of the RX_DELIV) is smaller than an RX_NEXT value (a COUNT value of data expected to be received next)(or a PDCP serial number value of data expected to be received next), a length of a bitmap field may be set to a length which is a multiple of 8 including from a COUNT value (or a PDCP serial number) not including a first missing PDCP SDU to a COUNT value (or a PDCP serial number) of the last out-of-order data, or the length of the bitmap field may be set to a length from the COUNT value (or the PDCP serial number) not including the first missing PDCP SDU to a COUNT value (or a PDCP serial number) of a PDCP SDU which makes a size of PDCP control data (a PDCP status report) 9000 bytes, and the length may be set according to a case where it is first satisfied among the above two cases.

If PDCP SDUs corresponding to the bitmap field are not successfully received or header decompression fails, the bitmap field corresponding to the PDCP SDU may be set to 0.

If PDCP SDUs corresponding to the bitmap field are successfully received, the bitmap field corresponding to the PDCP SDUs may be set to 1.

When the configured PDCP status report is transmitted to a lower layer device, the configured PDCP status report may be transmitted to the lower layer device as a first PDCP PDU of a transmitting PDCP layer device. That is, the highest priority is given to the PDCP status report, and if the PDCP status report is generated, the PDCP status report is transferred to the lower layer device first so that it may make transmission faster.

When transmitting a PDCP status report, a terminal may configure and transmit the PDCP status report to a unicast bearer or an RLC layer device for a unicast service (or an RLC layer device set with a logical channel identifier corresponding to the unicast service). Upon receiving the PDCP status report, a base station may retransmit data via the RLC layer device for the unicast service based on the PDCP status report. If the terminal transmits the PDCP status report via the RLC layer device for the unicast service, the base station may easily distinguish which terminal the PDCP status report is for. Alternatively, if the retransmission is performed via the RLC layer device for the unicast service, it is possible to prevent waste of a transmission resource by performing the retransmission via an individual transmission resource (in another embodiment, the terminal may transmit the PDCP status report in the RLC layer device for the multicast).

In another embodiment, a terminal may configure a PDCP status report to transmit the PDCP status report to an RLC layer device for a multicast service (or an RLC layer device set with a logical channel identifier corresponding to the multicast service) to repot, to a base station, whether data reception is successful so that the base station may perform retransmission to reduce loss. Upon receiving the PDCP status report, the base station may retransmit data via the RLC layer device for the multicast service or a unicast service based on the PDCP status report. If the terminal transmits the PDCP status report via the RLC layer device for the multicast service, the base station may easily identify PDCP status reports of all terminals.

As in embodiments in FIGS. 8, 9, 10, and/or 16, when a terminal receives an RRC message (e.g., an RRCRelease message, an RRCReconfiguration message, or a new RRC message for an MBS service) from a base station or a network, or when a upper layer device (e.g., an RRC layer device) receives an indication that a data inactivity timer has expired from a lower layer device (e.g., a MAC layer device), or when the upper layer device (e.g., the RRC layer device) receives the indication that the data inactivity timer has expired from the lower layer device (e.g., the MAC layer device) and transits a state into an RRC idle mode, the terminal may perform one of the following embodiments or a combination of the following embodiments as an operation of the terminal.

First Embodiment

If the received RRC message includes an indicator indicating a handover, or includes an indicator to transit a terminal in an RRC connected mode into an RRC inactive mode or an RRC idle mode, or if an MBS service is supported for the terminal via an MBS bearer, or if the terminal receives the MBS service via the MBS bearer (or if the terminal does not indicate a stop to the MBS service), or if the MBS bearer is a unicast bearer or a multicast bearer, or if an indicator (e.g., a new indicator indicating a terminal operation, a PDCP re-establishment indicator, or a bearer (or a PDCP) stop or release procedure indicator, or an indicator indicating a first switching method, a second switching method, or bearer release) is included in the RRC message, the terminal may not perform a MAC layer device initialization (reset) procedure. This is because when a MAC layer device is initialized, if the terminal receives MBS data, interruption or data transmission delay for MBS data service may occur.

In another embodiment, a MAC layer device partial initialization (reset) procedure may be performed. The partial initialization procedure of the MAC layer device may prevent a case that the interruption or the data transmission delay for the MBS data service occurs and prevent unnecessary retransmission if the terminal receives MBS data. In another embodiment, if an indicator indicating the partial initialization of the MAC layer device is included in the RRC message, or if a upper layer device indicates the partial initialization of the MAC layer device, the partial initialization procedure of the MAC layer device may be performed.

Alternatively, it may be released except for configuration information (configuration information related to a MAC layer device, an RLC layer device, a PDCP layer device, or an SDAP layer device) for all bearers configured for the terminal, or configuration information (configuration information related to a MAC layer device, an RLC layer device, a PDCP layer device, or an SDAP layer device) for the MBS bearer when a transmission resource is released. In another embodiment, when indicated by an indicator via the RRC message, the configuration information (the configuration information related to the MAC layer device, the RLC layer device, the PDCP layer device, or the SDAP layer device) for the MBS bearer may be continuously maintained and applied, or may not be released. Alternatively, when indicated by the indicator via the RRC message, the configuration information (the configuration information related to the MAC layer device, the RLC layer device, the PDCP layer device, or the SDAP layer device) for the MBS bearer may be released.

Alternatively, all SRBs or all DRBs except for an SRB0 or MBS bearers (a unicast bearer or a multicast bearer) configured in the terminal may be suspended. This is because as the MBS bearer is suspended, if the terminal receives MBS data, the interruption or the data transmission delay for the MBS data service may occur.

Alternatively, a PDCP suspend procedure (PDCP suspend) may be indicated to lower layer devices (e.g., PDCP layer devices) of all DRBs configured in the terminal except for MBS bearers (a unicast bearer or a multicast bearer).

If the received RRC message includes the indicator indicating the handover, or includes the indicator to transit the terminal in the RRC connected mode into the RRC inactive mode or the RRC idle mode, the terminal may perform the MAC layer device initialization (reset) procedure. This is because if the terminal does not receive the MBS data, the MAC layer device needs to be initialized to prevent unnecessary retransmission.

Alternatively, the configuration information (the configuration information related to the MAC layer device, the RLC layer device, the PDCP layer device, or the SDAP layer device) or the transmission resource for all bearers configured for the terminal may be released.

Alternatively, all SRBs except for the SRB0 or all DRBs configured in the terminal may be suspended.

Alternatively, the PDCP suspend procedure (the PDCP suspend) may be indicated to the lower layer device (e.g., the PDCP layer device) of all DRBs configured in the terminal. In another embodiment, the PDCP suspend procedure (the PDCP suspend) may be indicated to the lower layer device (e.g., the PDCP layer device) of the MBS bearers configured in the terminal.

Second Embodiment

If the received RRC message includes an indicator indicating a handover, or includes an indicator to transit a terminal in an RRC connected mode into an RRC inactive mode or an RRC idle mode, or if an MBS service is not supported for the terminal via an MBS bearer, or if the terminal does not receive the MBS service via the MBS bearer, or if the MBS bearer is not a unicast bearer or a multicast bearer, or if an indicator (e.g., a new indicator indicating a terminal operation, a PDCP re-establishment indicator, or a bearer (or a PDCP) stop or release procedure indicator, or an indicator indicating a first switching method, a second switching method, or bearer release) is not included in the RRC message, the terminal may perform the MAC layer device initialization (reset) procedure. This is because if the terminal does not receive the MBS data, the MAC layer device needs to be initialized to prevent unnecessary retransmission.

Alternatively, the configuration information (the configuration information related to the MAC layer device, the RLC layer device, the PDCP layer device, or the SDAP layer device) or the transmission resource for all bearers configured for the terminal may be released.

Alternatively, all SRBs except for the SRB0 or all DRBs configured in the terminal may be suspended.

Alternatively, the PDCP suspend procedure (the PDCP suspend) may be indicated to the lower layer device (e.g., the PDCP layer device) of all DRBs configured in the terminal.

If the received RRC message includes the indicator indicating the handover, or includes the indicator to transit the terminal in the RRC connected mode into the RRC inactive mode or the RRC idle mode, or if the MBS service is supported for the terminal via the MBS bearer, or if the terminal receives the MBS service via the MBS bearer (or if the terminal does not indicate stop to the MBS service), or if the MBS bearer is the unicast bearer or the multicast bearer, or if the indicator (e.g., the new indicator indicating the terminal operation proposed in the present invention, the PDCP re-establishment indicator, or the bearer (or the PDCP) stop or release procedure indicator, or the indicator indicating the first switching method, the second switching method, or the bearer release) is included in the RRC message, the terminal may not perform a MAC layer device initialization (reset) procedure. This is because when a MAC layer device is initialized, if the terminal receives MBS data, interruption or data transmission delay for MBS data service may occur.

In another embodiment, a MAC layer device partial initialization (reset) procedure may be performed. The partial initialization procedure of the MAC layer device may prevent a case that the interruption or the data transmission delay for the MBS data service occurs and prevent unnecessary retransmission if the terminal receives MBS data. In another embodiment, if the RRC message includes an indicator indicating the partial initialization of the MAC layer device, or if a upper layer device indicates the partial initialization of the MAC layer device, the partial initialization procedure of the MAC layer device may be performed.

Alternatively, it may be released except for configuration information (configuration information related to a MAC layer device, an RLC layer device, a PDCP layer device, or an SDAP layer device) for all bearers configured for the terminal, or configuration information (configuration information related to a MAC layer device, an RLC layer device, a PDCP layer device, or an SDAP layer device) for the MBS bearer when a transmission resource is released. In another embodiment, when indicated by an indicator in the RRC message, the configuration information (the configuration information related to the MAC layer device, the RLC layer device, the PDCP layer device, or the SDAP layer device) for the MBS bearer may be continuously maintained and applied, or may not be released. Alternatively, when indicated by the indicator via the RRC message, the configuration information (the configuration information related to the MAC layer device, the RLC layer device, the PDCP layer device, or the SDAP layer device) for the MBS bearer may be released.

Alternatively, all SRBs or all DRBs except for an SRB0 or MBS bearers (a unicast bearer or a multicast bearer) configured in the terminal may be suspended. This is because as the MBS bearer is suspended, if the terminal receives MBS data, the interruption or the data transmission delay for the MBS data service may occur.

Alternatively, a PDCP suspend procedure (PDCP suspend) may be indicated to lower layer devices (e.g., PDCP layer devices) of all DRBs configured in the terminal except for MBS bearers (a unicast bearer or a multicast bearer). In another embodiment, a PDCP suspend procedure (PDCP suspend) may be indicated to the lower layer device (e.g., the PDCP layer device) of the MBS bearers configured in the terminal.

The partial initialization (partial reset) of the MAC layer device may include one or a plurality of terminal operations among the following procedures.

The terminal performs an operation to flush the remaining HARQ processes (i.e., a normal HARQ process, or a HARQ process for system information, and/or the like) except for a HARQ process for an MBS among HARQ processes configured in a serving cell, and performs an operation of omitting emptying, releasing, initializing, or flushing the HARQ process for the MBS after handover completion or RRC state mode transition (into an RRC inactive mode or an RRC idle mode).

In a case of flush operation, data of the HARQ process related to the MBS may be flushed at a time point when MBS service reception becomes possible in a target base station, or at a time point when G-RNTI monitoring is started after the handover completion or after the RRC state mode transition (into the RRC inactive mode or the RRC idle mode). Alternatively, data reception via a G-RNTI may continue to be performed until the handover is completed or until the RRC state mode transition (into the RRC inactive mode or the RRC idle mode) is completed, and in a case of handover, an operation of monitoring a C-RNTI in a target allocated via the RRC message may be performed for the target base station. In another embodiment, the data reception via the G-RNTI may continue to be performed even before an random access from the target base station is completed.

If there is a random access procedure in progress, it may be stopped.

Specifically, if there is a configured or indicated preamble identifier, preamble configuration information, or PRACH (random access configuration-related information) configuration information, it may be discarded.

If there is a temporary cell identifier (Temporary C-RNTI), it may be released.

A buffer for message3 transmission may be flushed.

All New data indicators for a HARQ process for uplink may be set to 0.

If a uplink DRX retransmission timer for the uplink is running, the uplink DRX retransmission timer may be stopped.

If all uplink HARQ-related timers are running, all uplink HARQ-related timers may be stopped.

However, if an initialization procedure of a MAC layer device is performed, or if a partial initialization procedure indicator of the MAC layer device is not included or not indicated, the terminal performs the initialization procedure of the entire MAC layer device, and the terminal flush the configured normal HARQ process, HARQ process for the MBS, or HARQ process for the system information.

If a terminal receives an MBS service in an RRC inactive mode, the terminal may transit from the RRC inactive mode into an RRC idle mode if one of the following conditions is satisfied.

First condition: a case that a paging message is received according to third DRX configuration information, and an identifier included in the paging message is a terminal unique identifier (5G-S-TMSI), not an identifier (I-RNTI) for RRC connection resumption, Second condition: a case that the terminal transmits an RRCResumeRequest message in an RRC connection resume procedure and receives an RRCSetup message in response thereto, Third condition: a case that the terminal does not find a suitable cell in a cell selection or reselection procedure in the RRC inactive mode and camps on an acceptable cell, Fourth condition: a case that the terminal transmits an RRCResumeRequest message in the RRC connection resume procedure and receives an RRCResume message in response thereto, and then an error occurs therein, Fifth condition: a case that the terminal performs inter-RAT reselection in the cell selection or reselection procedure in the RRC inactive mode, or selects a cell supporting another radio access technology, Sixth condition: a case that a timer (a T319 timer and a timer for checking whether the RRC connection resume procedure fails (or succeeds) triggered by the terminal in the RRC connection resume procedure expires, and Seventh condition: a case that the terminal transmits an RRCResumeRequest message in the RRC connection resume procedure and receives an RRCReject message in response thereto.

Hereinafter, if a terminal in an RRC inactive mode receives an MBS service, a case, that the terminal continues to receive the MBS service even though the terminal transits into an RRC idle mode as the first condition, the second condition, the third condition, the fourth condition, the fifth condition, the sixth condition, or the seventh condition is satisfied, will be described. For example, regardless of the RRC inactivation mode or the RRC idle mode, the terminal may continuously receive the MBS service according to system information configuration information, configuration information configured in an RRC message, or configuration information configured in an MBS control message.

In another embodiment, if a terminal in an RRC inactive mode receives an NBS service, a case that the terminal determines that MBS service reception may not be continued if the terminal transits into an RRC idle mode as the third condition or the fifth condition is satisfied, or a case that the terminal stops or releases an MBS bearer or MBS service-related configuration information configured in the terminal in order to identify whether the MBS service is supported in a newly accessed cell or a cell supporting another radio access technology will be described. In another embodiment, a case will be described that the terminal performs a procedure (e.g., a system information receiving procedure or an RRC connection setup procedure) for receiving system information configuration information, configuration information by an RRC message, or configuration information in an NBS control message again in order to resume, reconfigure, or newly configure the NBS service reception.

In another embodiment, if a terminal in an RRC inactive mode receives an NBS service, it is determined that MBS service reception may not continue to be performed as the first condition, the second condition, the third condition, the fourth condition, the fifth condition, the sixth condition, or the seventh condition is satisfied, and an NBS bearer or NMBS service-related configuration information configured in the terminal may be stopped or released. In addition, the terminal may perform a procedure (e.g., a system information receiving procedure or an RRC connection setup procedure) for receiving system information configuration information, configuration information by an RRC message, or configuration information in an MBS control message again in order to resume, reconfigure, or newly configure the NBS service reception.

Hereinafter, a first embodiment of extending, into an MBS service, a method (data inactivity monitoring) for notifying that data transmission or reception between a terminal and a network continues by driving and maintaining a timer according to whether a terminal transmits or receives data will be described.

First Embodiment

1> When a terminal is in an RRC connected mode, a data inactivity monitoring function may be configured by an RRC layer device or an RRC message. An RRC layer device of the terminal may operate a data inactivity monitoring method by configuring a timer (a data inactivity timer or dataInactivityTimer).

2> If a certain MAC layer device received a MAC SDU for a Data Traffic Channel (DTCH), a Downlink Control Channel (DCCH), a Common Control Channel (CCCH), an MBCCH, or an MBTCH, or 2> if the certain MAC layer device transmitted a MAC SDU for a DTCH, a DCCH, an MBCCH, or an MBTCH, 3> the data inactivity timer may be started or restarted.

2> If the data inactivity timer expires,

3> expiration of the data inactivity timer is indicated to a upper layer device (e.g., an RRC layer device). Upon receiving the indication of the expiration of the data inactivity timer, the upper layer device may perform a procedure for transiting the terminal into an RRC idle mode.

Hereinafter, a second embodiment of extending, into an MBS service, a method (data inactivity monitoring) for notifying that data transmission or reception between a terminal and a network continues by driving and maintaining a timer according to whether a terminal transmits or receives data will be described.

Second Embodiment

1> When a terminal is in an RRC connected mode, a data inactivity monitoring function may be configured by an RRC layer device or an RRC message. An RRC layer device of the terminal may operate a data inactivity monitoring method by configuring a timer (a data inactivity timer or dataInactivityTimer).

1> If the data inactivity timer is configured, the terminal performs the following operation.

2> If a certain MAC layer device received a MAC SDU for a DTCH, a DCCH, a CCCH, an MBCCH, or an MBTCH, or 2> if the certain MAC layer device transmitted a MAC SDU for a DTCH or a DCCH, 3> the data inactivity timer may be started or restarted.

2> If the data inactivity timer expires,

3> expiration of the data inactivity timer is indicated to a upper layer device (e.g., an RRC layer device). Upon receiving the indication of the expiration of the data inactivity timer, the upper layer device may perform a procedure for transiting the terminal into an RRC idle mode.

According to an embodiment of the disclosure, a method for enabling a terminal receiving an MBS service to identify that MBS service-related configuration information, MBS service control information, or system information has been changed will be described. A base station or a network may perform one or a combination of the following embodiments as an operation for the terminal.

First Embodiment

A terminal identifier, an MBS service identifier, MBS service-related configuration information change indicator, or system information change indicator is included in a paging message and transmitted so that the terminal receiving the paging message may identify that MBS service-related configuration information, MBS service control information, or system information has been changed.

Second Embodiment

A terminal identifier, an MBS service identifier, MBS service-related configuration information change indicator, or system information change indicator is included in an RRC message, MAC control information, or an MBS control information message (or an MBS control data channel) and transmitted so that the terminal receiving the RRC message, the MAC control information, or the MBS control information message (or the MBS control data channel) may identify that MBS service-related configuration information, MBS service control information, or system information has been changed.

Third Embodiment

A terminal identifier, an MBS service identifier, MBS service-related configuration information change indicator, system information change indicator, or bitmap information is included in a message (e.g., a short message) in a PDCCH and transmitted so that the terminal receiving the PDCCH may identify that MBS service-related configuration information, MBS service control information, or system information has been changed.

Fourth Embodiment

When a PDCCH is transmitted to a terminal, it is scrambled with an RNTI identifier indicating a change in MBS service-related configuration information or system information and transmitted so that the terminal receiving the PDCCH may identify that the MBS service-related configuration information, MBS service control information, or the system information has been changed.

When a terminal identifies that MBS service-related configuration information, MBS service control information, or system information has been changed according to one embodiment or a combination of the embodiments, the terminal may perform a procedure for obtaining system information again, request or receive MBS control information on an MBS control data channel again, or configure an RRC connection procedure to request or receive the changed information from a base station.

A base station or a network may configure security configuration for an MBS bearer (a unicast bearer or a multicast bearer) of a terminal receiving an MBS service via an RRC message, and may configure an encryption procedure or an integrity protection procedure. Security key information for performing the encryption procedure or the integrity protection procedure may be configured in the RRC message, or may be included, transmitted, and configured in a header of a protocol layer device (a MAC layer device, an RLC layer device, or a PDCP layer device). In another embodiment, the security configuration information may be configured for a unicast bearer for the MBS service and may not may be configured for a multicast bearer for the MBS service. This is because security is weakened if the security configuration information is configured for unspecified number of people.

In addition, for the bearer for the MBS service, it may be restricted from configuring a PDCP re-establishment indicator (reestablishPDCP) or a PDCP data recovery (recoverPDCP) indicator. This is because the procedures are not suitable for the MBS bearer, or retransmission of uplink data is unnecessary for the MBS bearer.

Figure 18:
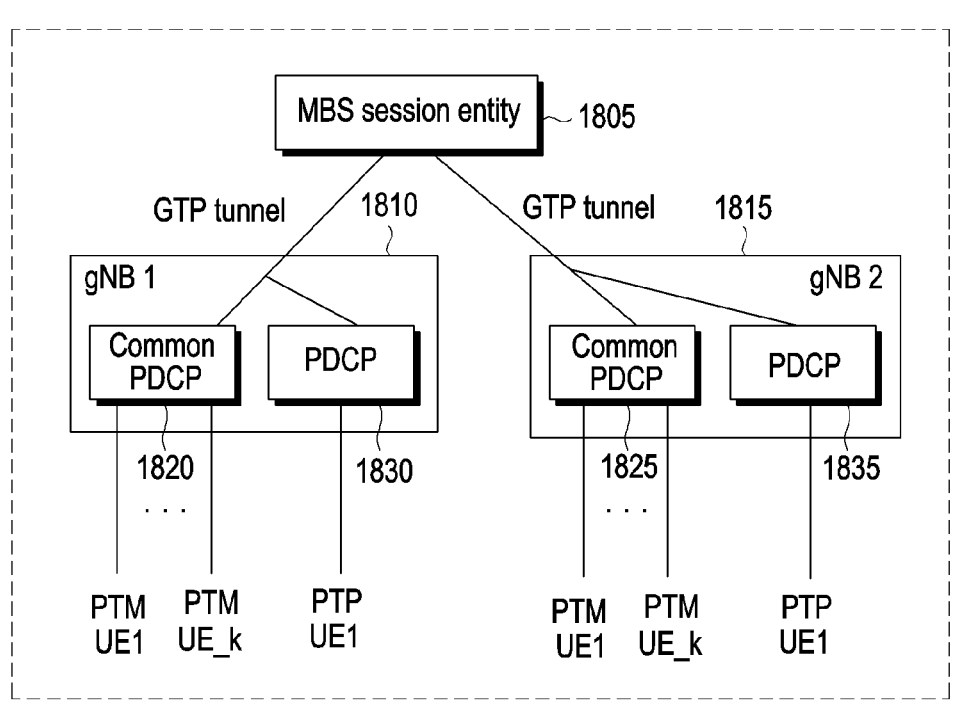
FIG. 18 is a diagram illustrating a first embodiment of a method of synchronizing COUNT values (or HFN values) or PDCP serial numbers in PDCP layer devices for supporting an MBS service in a base station according to an embodiment of the disclosure.

FIG. 18 is a diagram illustrating a first embodiment of a method of synchronizing COUNT values (or HFN values) or PDCP serial numbers in PDCP layer devices for supporting an MBS service in a base station according to an embodiment of the disclosure.

Referring to FIG. 18, when a first base station 1810 and a second base station 1815 support an MBS service, the base stations may be connect to the same PDU session and receive MBS service data from the same MBS session device 1805. The MBS session device 1805 may transmit the MBS service data to respective base stations 1810 and 1815 via a protocol (e.g., a GTP protocol (General Packet Radio System (GPRS) Tunneling Protocol)) which transmit data. The respective base stations 1810 and 1815 may receive the MBS service data from the MBS session device 1805, and may support the MBS service to each terminal which is connected to the respective base stations 1810 and 1815 and receives a service. The respective base stations 1810 and 1815 may support the MBS service to each terminal with different MBS service types (e.g., a multicast service, a PTM or unicast service, a PTP).

Continuing to refer to FIG. 18, when the respective base stations 1810 and 1815 which belong to the same PDU session or which are connected to the same MBS session device receive data received from the MBS session device, and process the data in PDCP layer devices 1820 and 1825, the base stations 1810 and 1815 may allocate the same COUNT value or PDCP serial number to each data based on information included in the data. The information may indicate header information of the protocol or serial number information. The PDCP layer devices 1820 and 1825 of the respective base stations 1810 and 1815 may be applied to MBS bearers supporting a multicast service. So, terminals receiving the MBS service from the first base station 1810 or the second base station 1815 may be implemented to have a common PDCP serial number value or COUNT value for each MBS service data for the same MBS service.

However, for an MBS bearer supporting a unicast service, respective terminals in the respective base stations 1810 and

1815 are implemented to use separate PDCP layer devices 1830 and 1835, so that terminals receiving the same MBS service may have different PDCP serial number values or COUNT values for each MBS service data. If an MBS bearer supporting a multicast service is implemented like the separate PDCP layer devices 1830 and 1835, a new inter-base station message may be introduced to share a PDCP serial number value or COUNT value in order for different base stations to synchronize the PDCP serial number value or COUNT value.

If implemented according to the method of the first embodiment in FIG. 18, when a terminal receiving a service from the first base station 1810 via a multicast bearer first configures an MBS bearer, the terminal may apply a window variable configuration (or initialization) method of a PDCP layer device or an RLC layer device according to an embodiment of the disclosure. If the terminal performs a handover procedure to the second base station 1815 to continuously receives the MBS service from the second base station 1815 via the multicast bearer, the terminal may apply the window variable configuration (or initialization) method of the PDCP layer device or the RLC layer device according to an embodiment of the disclosure, and an MBS service data forwarding procedure from the first base station 1810 to the second base station 1815 may not be required. This is because the COUNT values or the PDCP serial number values are synchronized, and the second base station 1815 may already have the same data (the second base station 1815 may continue to support (for example, transmit or retransmit) the MBS service data based on a PDCP status report transmitted by the terminal).

If implemented according to the method of the first embodiment in FIG. 18, when a terminal receiving a service from the first base station 1810 via a unicast bearer first configures an MBS bearer, the terminal may apply a window variable configuration (or initialization) method of a PDCP layer device or an RLC layer device according to an embodiment of the disclosure. If the terminal performs a handover procedure to the second base station 1815 to continuously receives the MBS service from the second base station 1815 via the unicast bearer, the terminal may apply the window variable configuration (or initialization) method of the PDCP layer device or the RLC layer device according to an embodiment of the disclosure, and an MBS service data forwarding procedure from the first base station 1810 to the second base station 1815 may be required. This is because the COUNT values or the PDCP serial number values are not synchronized.

If implemented according to the method of the first embodiment in FIG. 18, when a terminal receiving a service from the first base station 1810 via a unicast bearer first configures an MBS bearer, the terminal may apply a window variable configuration (or initialization) method of a PDCP layer device or an RLC layer device according to an embodiment of the disclosure. If the terminal performs a handover procedure to the second base station 1815 to continuously receives the MBS service from the second base station 1815 via a multicast bearer, the terminal may apply the window variable configuration (or initialization) method of the PDCP layer device or the RLC layer device according to an embodiment of the disclosure, and an MBS service data forwarding procedure from the first base station 1810 to the second base station 1815 may be required. This is because the COUNT values or the PDCP serial number values are not synchronized. In another embodiment, a procedure for synchronizing a COUNT value or a PDCP serial number value (for example, a base station informs a terminal of a COUNT value, a PDCP serial number value, or a window variable value, or shares the COUNT value, the PDCP serial number value, or the window variable value between base stations) may be performed, and a data forwarding procedure may be omitted.

If implemented according to the method of the first embodiment in FIG. 18, when a terminal receiving a service from the first base station 1810 via a multicast bearer first configures an MBS bearer, the terminal may apply a window variable configuration (or initialization) method of a PDCP layer device or an RLC layer device according to an embodiment of the disclosure. If the terminal performs a handover procedure to the second base station 1815 to continuously receives the MBS service from the second base station 1815 via a unicast bearer, the terminal may apply the window variable configuration (or initialization) method of the PDCP layer device or the RLC layer device according to an embodiment of the disclosure, and an MBS service data forwarding procedure from the first base station 1810 to the second base station 1815 may be required. This is because the COUNT values or the PDCP serial number values are not synchronized. In another embodiment, a procedure for synchronizing a COUNT value or a PDCP serial number value (for example, a base station informs a terminal of a COUNT value, a PDCP serial number value, or a window variable value, or shares the COUNT value, the PDCP serial number value, or the window variable value between base stations) may be performed, and a data forwarding procedure may be omitted.

Figure 19:
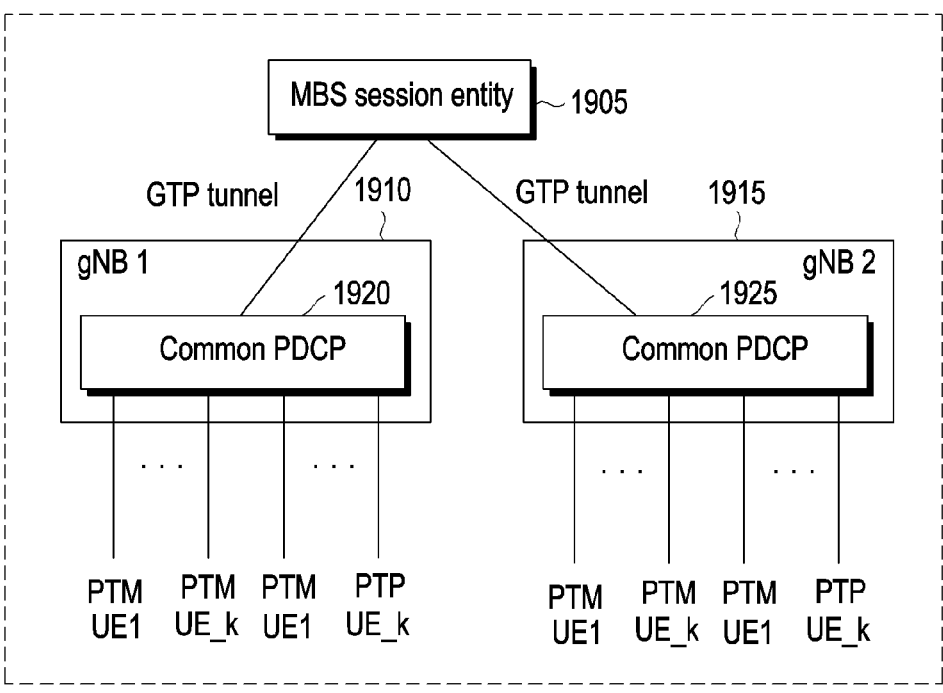
FIG. 19 is a diagram illustrating a second embodiment of a method of synchronizing COUNT values (or HFN values) or PDCP serial numbers in PDCP layer devices for supporting an MBS service in a base station according to an embodiment of the disclosure.

FIG. 19 is a diagram illustrating a second embodiment of a method of synchronizing COUNT values (or HFN values) or PDCP serial numbers in PDCP layer devices for supporting an MBS service in a base station according to an embodiment of the disclosure.

Referring to FIG. 19, when a first base station 1910 and a second base station 1915 support an MBS service, the base stations 1910 and 1915 may be connect to the same PDU session and receive MBS service data from the same MBS session device 1905. The MBS session device 1905 may transmit the MBS service data to respective base stations 1910 and 1915 via a protocol (e.g., a GTP protocol) which transmit data. The respective base stations 1910 and 1915 may receive the MBS service data from the MBS session device 1905, and may support the MBS service to each terminal which is connected to the respective base stations 1910 and 1915 and receives a service. The respective base stations 1910 and 1915 may support the MBS service to each terminal with different MBS service types (e.g., a multicast service, a PTM or unicast service, a PTP).

Continuing to refer to FIG. 19, when the respective base stations 1910 and 1915 which belong to the same PDU session or which are connected to the same MBS session device receive data received from the MBS session device 1905, and process the data in PDCP layer devices 1920 and 1925, the base stations 1910 and 1915 may allocate the same COUNT value or PDCP serial number to each data based on information included in the data. The information may indicate header information of the protocol or serial number information. The PDCP layer devices 1920 and 1925 of the respective base stations 1910 and 1915 may be applied to MBS bearers supporting a multicast service or a unicast service. So, terminals receiving the MBS service from the first base station 1910 or the second base station 1915 may be implemented to have a common PDCP serial number value or COUNT value for each MBS service data for the same MBS service.

If different base stations do not have a common PDCP serial number value or COUNT value, and if there is a difference in value or if synchronization is not achieved, a new inter-base station message may be introduced to synchronize the PDCP serial number value or COUNT value or to perform a synchronization procedure in order for the different base stations to synchronize the PDCP serial number value or COUNT value, and it may also be applied to the terminal.

If implemented according to the method of the second embodiment in FIG. 19, when a terminal receiving a service from the first base station 1910 via a multicast bearer or a unicast bearer first configures an MBS bearer, the terminal may apply a window variable configuration (or initialization) method of a PDCP layer device or an RLC layer device according to an embodiment of the disclosure. If the terminal performs a handover procedure to the second base station 1915 to continuously receives the MBS service from the second base station 1915 via the multicast bearer or the unicast bearer, the terminal may apply the window variable configuration (or initialization) method of the PDCP layer device or the RLC layer device according to an embodiment of the disclosure, and an MBS service data forwarding procedure from the first base station 1910 to the second base station 1915 may not be required. This is because the COUNT values or the PDCP serial number values are synchronized, and the second base station 1915 may already have the same data (the second base station 1915 may continue to support (for example, transmit or retransmit) the MBS service data based on a PDCP status report transmitted by the terminal).

When a handover procedure is performed, if the COUNT values or the PDCP serial number values between base stations are not synchronized, an MBS service data forwarding procedure from the first base station 1910 to the second base station 1915 is required.

Figure 20:
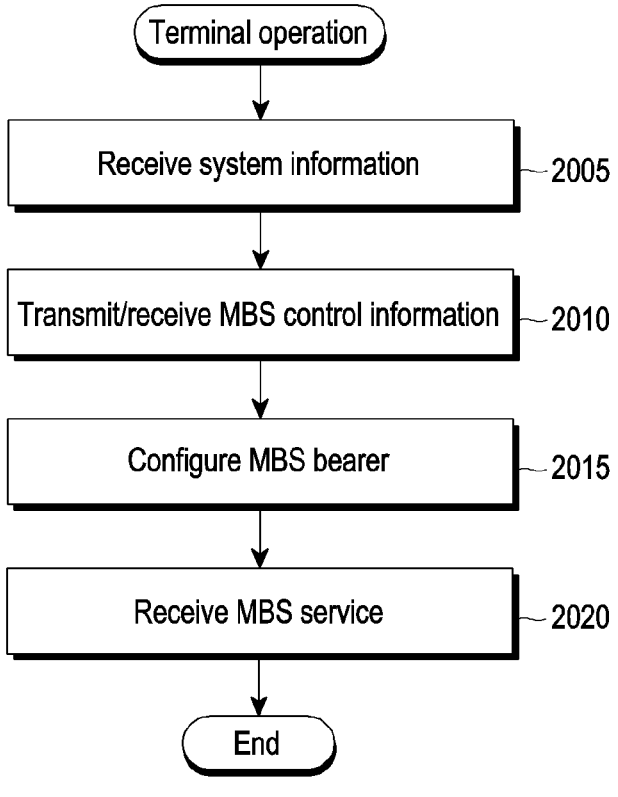
FIG. 20 is a diagram illustrating a terminal operation according to an embodiment of the disclosure.

FIG. 20 is a diagram illustrating an operation of a terminal according to an embodiment of the disclosure.

Referring to FIG. 20, a terminal may camp on or access a cell according to a first signaling procedure, a second signaling procedure, a third signaling procedure, or a fourth signaling procedure according to an embodiment of the disclosure to receive system information in an RRC idle mode, an RRC inactive mode, or an RRC connected mode (step 2005), and identify whether an MBS service is supported, or a type or configuration of a supported MBS service, and/or the like. The terminal may receive or transmit MBS control information (MBS service-related configuration information) from or to a base station (e.g., MBS service request or interest or preference indication)(step 2010). If the terminal supports the MBS service, or if the MBS service which the terminal is interested in or intends to receive is supported, the terminal may configure (step 2015) an MBS bearer with a bearer structure in FIGS. 4A to 4D, and receive (step 2020) MBS data according to the MBS service configuration. The terminal may receive MBS data according to an embodiment in FIG. 5, thereby a service may be supported to the terminal.

Figure 21:
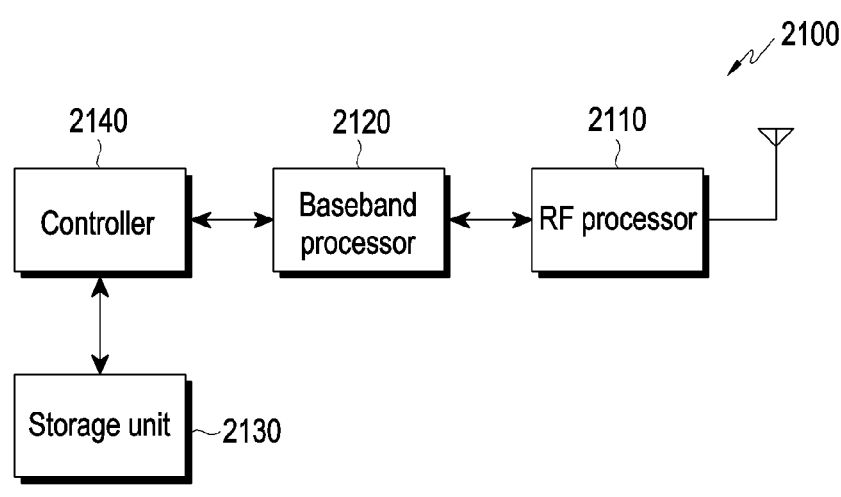
FIG. 21 is a diagram illustrating a structure of a terminal applicable to the disclosure.

FIG. 21 is a diagram illustrating a structure of a terminal applicable to the disclosure.

Referring to FIG. 21, a terminal 2100 includes a Radio Frequency (RF) processor 2110, a baseband processor 2120, a storage unit 2130, and a controller 2140.

The RF processor 2110 performs a function for transmitting and receiving a signal through a wireless channel, such as band conversion, amplification, and/or the like for the signal. That is, the RF processor 2110 up-converts a baseband signal provided from the baseband processor 2120 into an RF band signal to transmit the RF band signal via an antenna, and down-converts an RF band signal received via the antenna into a baseband signal. For example, the RF processor 2110 may include a transmission filter, a reception filter, an amplifier, a mixer, an oscillator, a digital to analog convertor (DAC), an analog to digital convertor (ADC), and/or the like. In FIG. 21, only one antenna is shown, but the terminal 2100 may include a plurality of antennas. Also, the RF processor 2110 may include a plurality of RF chains. Furthermore, the RF processor 2110 may perform beamforming. For the beamforming, the RF processor 2110 may adjust a phase and magnitude of each of signals transmitted and received via a plurality of antennas or antenna elements. Also, the RF processor 2110 may perform MIMO, and may receive a plurality of layers upon performing a MIMO operation. The RF processor 2110 may appropriately set the plurality of antennas or antenna elements under the control of the controller 2140 to perform reception beam sweeping, or adjust a direction and beam width of a reception beam so that the reception beam is coordinated with a transmission beam.

The baseband processor 2120 performs a conversion function between a baseband signal and a bit stream according to a physical layer standard of a system. For example, upon transmitting data, the baseband processor 2120 generates complex symbols by encoding and modulating a transmission bit stream. Also, upon receiving data, the baseband processor 2120 demodulates and decodes a baseband signal provided from the RF processor 2110 to restore a received bit stream. For example, upon following an OFDM scheme, when transmitting data, the baseband processor 2120 generates complex symbols by encoding and modulating a transmission bit stream, maps the complex symbols to subcarriers, and then generates OFDM symbols through an inverse fast Fourier transform (IFFT) operation and cyclic prefix (CP) insertion. In addition, upon receiving data, the baseband processor 2120 divides a baseband signal provided from the RF processor 2110 into OFDM symbol units, restores signals mapped to subcarriers through a fast Fourier transform (FFT) operation, and then restores a received bit stream through demodulation and decoding.

The baseband processor 2120 and the RF processor 2110 transmit and receive a signal as described above. Accordingly, the baseband processor 2120 and the RF processor 2110 may be referred to as a transmitter, a receiver, a transceiver, or a communication unit. At least one of the baseband processor 2120 and the RF processor 2110 may include a plurality of communication modules to support a plurality of different radio access technologies. Further, at least one of the baseband processor 2120 and the RF processor 2110 may include different communication modules to process signals of different frequency bands. For example, the different radio access technologies may include an LTE network, an NR network, and/or the like. The different frequency bands may include a super high frequency (SHF)(e.g., 2.5 GHz and 5 GHz) band and a millimeter wave (mm wave)(e.g., 60 GHz) band.

The storage unit 2130 stores data such as a basic program for an operation of the terminal 2100, an application program, setting information, and/or the like. The storage unit 2130 provides stored data according to a request of the controller 2140.

The controller 2140 controls overall operations of the terminal 2100. For example, the controller 2140 transmits and receives a signal via the baseband processor 2120 and the RF processor 2110. The controller 2140 writes and reads data in and from the storage unit 2130. To this end, the controller 2140 may include at least one processor. For example, the controller 2140 may include a communication processor (CP) which performs control for a communication and an application processor (AP) which controls a upper layer such as an application program, and/or the like.

Figure 22:
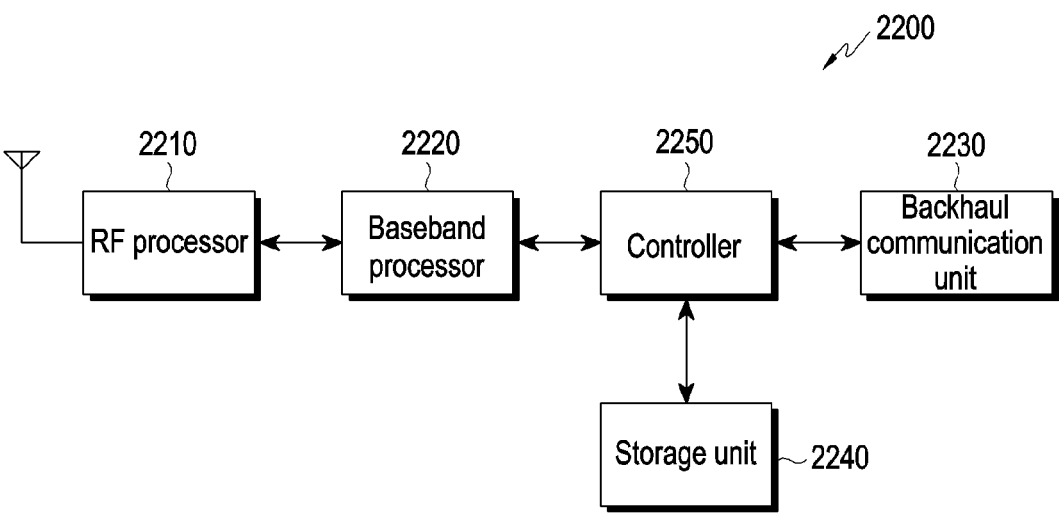
FIG. 22 is a diagram illustrating a structure of a base station applicable to the disclosure.

FIG. 22 is a diagram illustrating a structure of a base station applicable to the disclosure.

Referring to FIG. 22, the base station 2200 is configured to include an RF processor 2210, a baseband processor 2220, a backhaul communication unit 2230, a storage unit 2240, and a controller 2250.

The RF processor 2210 performs a function for transmitting and receiving a signal through a wireless channel, such as band conversion, amplification, and/or the like for the signal. That is, the RF processor 2210 up-converts a baseband signal provided from the baseband processor 2220 into an RF band signal to transmit the RF band signal via an antenna, and down-converts an RF band signal received via the antenna into a baseband signal. For example, the RF processor 2210 may include a transmission filter, a reception filter, an amplifier, a mixer, an oscillator, a DAC, an ADC, and/or the like. In FIG. 22, only one antenna is shown, but the base station 2200 may include a plurality of antennas. Also, the RF processor 2210 may include a plurality of RF chains. Furthermore, the RF processor 2210 may perform beamforming. For the beamforming, the RF processor 2210 may adjust a phase and magnitude of each of signals transmitted and received via a plurality of antennas or antenna elements. The RF processor 2250 may perform a downlink MIMO operation by transmitting one or more layers.

The baseband processor 2220 performs a conversion function between a baseband signal and a bit stream according to a physical layer standard of a first radio access technology. For example, upon transmitting data, the baseband processor 2220 generates complex symbols by encoding and modulating a transmission bit stream. Also, upon receiving data, the baseband processor 2220 demodulates and decodes a baseband signal provided from the RF processor 2210 to restore a received bit stream. For example, upon following an OFDM scheme, when transmitting data, the baseband processor 2220 generates complex symbols by encoding and modulating a transmission bit stream, maps the complex symbols to subcarriers, and then generates OFDM symbols through an IFFT operation and CP insertion. In addition, upon receiving data, the baseband processor 2220 divides a baseband signal provided from the RF processor 2210 into OFDM symbol units, restores signals mapped to subcarriers through an FFT operation, and then restores a received bit stream through demodulation and decoding. The baseband processor 2220 and the RF processor 2210 transmit and receive a signal as described above. Accordingly, the baseband processor 2220 and the RF processor 2210 may be referred to as a transmitter, a receiver, a transceiver, a communication unit, or a wireless communication unit.

The communication unit 2230 provides an interface for performing a communication with other nodes within a network.

The storage unit 2240 stores data such as a basic program for an operation of the base station 2200, an application program, setting information, and/or the like. In particular, the storage unit 2240 may store information about a bearer allocated to an attached terminal, a measurement result reported from the attached terminal, and/or the like. The storage unit 2240 may store information which is a criterion for determining whether to provide or stop a multi-connection to the terminal. The storage unit 2240 provides stored data according to a request of the controller 2250.

The controller 2250 controls overall operations of the base station 2200. For example, the controller 2250 transmits and receives a signal via the baseband processor 2220 and the RF processor 2210 or via the backhaul communication unit 2230. The controller 2250 writes and reads data in and from the storage unit 2240. To this end, the controller 2250 may include at least one processor.

Embodiments disclosed in the specification and drawings above are only presented as specific examples to easily explain the technical content of the present invention and aid understanding, and are not intended to limit the scope of the present invention. In addition, it goes without saying that one or more of various embodiments described above may be combined and performed. Therefore, the scope of the present invention should be construed as including all changes or modifications derived based on the disclosure in addition to embodiments disclosed herein.

The invention claimed is:

1. A method of a terminal for supporting a multicast/broadcast service (MBS) by a user equipment (UE) in a wireless communication system, the method comprising:
   receiving, from a source base station, a radio resource control (RRC) message for a handover including bearer configuration information for an MBS bearer, wherein the bearer configuration information includes a first indicator associated with a packet data convergence protocol (PDCP) reestablishment for the MBS bearer and a second indicator associated with a PDCP status report for the MBS bearer;
   requesting, by an upper layer of the UE, a PDCP entity reestablishment for the MBS bearer based on the first indicator;
   when the upper layer requests the PDCP entity reestablishment, triggering the PDCP status report by a PDCP entity of the UE; and
   transmitting, to a target base station, the PDCP status report for the MBS bearer,
   wherein the PDCP entity is associated with a radio link control (RLC) entity operating in an acknowledged mode (AM).

2. A user equipment (UE) for supporting a multicast/broadcast service (MBS) in a wireless communication system, the UE comprising:
   a transceiver; and
   at least one processor coupled to the transceiver, the at least one processor configured to;
   receive, from a source base station, a radio resource control (RRC) message for a handover including bearer configuration information for an MBS bearer, wherein the bearer configuration information includes a first indicator associated with a packet data convergence protocol (PDCP) reestablishment for the MBS bearer and a second indicator associated with a PDCP status report for the MBS bearer,
   request, by an upper layer of the UE, a PDCP entity reestablishment for the MBS bearer based on the first indicator,
   when the upper layer requests the PDCP entity reestablishment, trigger the PDCP status report by a PDCP entity of the UE, and
   transmit, to a target base station, the PDCP status report for the MBS bearer, wherein the PDCP entity is associated with a radio link control (RLC) entity operating in an acknowledged mode (AM).

3. The method of claim 1, wherein the source base station and a target base 16, station support the MBS.

4. The method of claim 1, wherein the RLC entity operating in the AM is for a point-to-point (PTP) transmission.

5. The method of claim 1, further comprising:

when the upper layer requests a PDCP reestablishment, reestablishing the PDCP entity for the MBS bearer, wherein reestablishing the PDCP entity comprises setting at least one variable of the PDCP entity to an initial value, the initial value is included in the RRC message.

6. The UE of claim 2, wherein the source base station and a target base station support the MBS.

7. The UE of claim 2, wherein the RLC entity operating in the AM is for a point-to-point (PTP) transmission.

8. The UE of claim 2, wherein the at least one processor is further configured to, in case that the upper layer requests a PDCP reestablishment, reestablish the PDCP entity for the MBS bearer, and wherein for reestablishing the PDCP entity, the at least one processor is further configured to set at least one variable of the PDCP entity to an initial value, the initial value being included in the RRC message.

9. A method for supporting a multicast/broadcast service (MBS) by a source base station in a wireless communication system, the method comprising:

transmitting, to a target base station, a handover request message including information on MBS service;

receiving, from the target base station, a handover request accept message including the information on MBS service; and transmitting, to a user equipment (UE), a radio resource control (RRC) message for a handover including bearer configuration information for an MBS bearer, wherein the bearer configuration information includes a first indicator associated with a packet data convergence protocol (PDCP) reestablishment for the MBS bearer and a second indicator associated with a PDCP status report for the MBS bearer.

10. The method of claim 9, wherein the source base station and the target base station support the MBS.

11. The method of claim 9, further comprising:

forwarding downlink data to the target base station while performing the handover.

12. The method of claim 9, wherein a radio link control (RLC) entity operating in the AM is for a point-to-point (PTP) transmission.

13. The method of claim 9, wherein the RRC message includes an initial value for at least one variable of the PDCP entity.

* * * * *